United States Patent
Abe et al.

(10) Patent No.: US 8,226,513 B2
(45) Date of Patent: Jul. 24, 2012

(54) POWER PLANT

(75) Inventors: Noriyuki Abe, Saitama-ken (JP); Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 12/448,526

(22) PCT Filed: Dec. 27, 2007

(86) PCT No.: PCT/JP2007/075184
§ 371 (c)(1),
(2), (4) Date: Jun. 24, 2009

(87) PCT Pub. No.: WO2008/081893
PCT Pub. Date: Jul. 10, 2008

(65) Prior Publication Data
US 2010/0029428 A1 Feb. 4, 2010

(30) Foreign Application Priority Data

Dec. 28, 2006 (JP) ................................. 2006-356633
Dec. 18, 2007 (JP) ................................. 2007-326611

(51) Int. Cl.
*F16H 3/72* (2006.01)
(52) U.S. Cl. ............................................................ 475/5
(58) Field of Classification Search .................. 475/211, 475/5
See application file for complete search history.

(56) References Cited

U.S. PATENT DOCUMENTS

| | | | |
|---|---|---|---|
| 3,023,638 A | 3/1962 | Westbury et al. | |
| 4,823,640 A * | 4/1989 | Donnelly | 475/75 |
| 6,053,833 A | 4/2000 | Masaki | |
| 6,371,878 B1 | 4/2002 | Bowen | |
| 6,380,653 B1 * | 4/2002 | Seguchi | 310/112 |
| 6,478,705 B1 | 11/2002 | Holmes et al. | |

(Continued)

FOREIGN PATENT DOCUMENTS

EP 0 308 078 A2 3/1989

(Continued)

OTHER PUBLICATIONS

European Search Report 07860406.3-2421/2098399 dated Nov. 16, 2009.

*Primary Examiner* — Dirk Wright
(74) *Attorney, Agent, or Firm* — Squire Sanders (US) LLP

(57) ABSTRACT

To provide a power plant which is capable of reducing power passing through a distributing and combining device, thereby making it possible to attain reduction of the size and manufacturing costs of the power plant and enhance driving efficiency of the same. The power plant 1 for driving driven parts DW and DW includes a prime mover 3, a first distributing and combining device 20 having first, second and third elements 21, 24 and 22, a second distributing and combining device 30 having fourth, fifth and sixth elements 31, 34 and 32, and speed-changing devices 40, 50, 2, 61 and 62 which are connected to the third and sixth elements 22 and 32 and are capable of changing the relationship between the rotational speed of the third element and that of the sixth element 32. The second and fourth elements 24 and 31 are mechanically connected to an output shaft 3*a* of the prime mover 3, and the first and fifth elements 21 and 34 are mechanically connected to the driven parts DW and DW.

20 Claims, 88 Drawing Sheets

U.S. PATENT DOCUMENTS

| | | | |
|---|---|---|---|
| 6,546,319 B2 * | 4/2003 | Yamaguchi et al. | 701/22 |
| 6,579,201 B2 * | 6/2003 | Bowen | 475/5 |
| 7,347,798 B2 * | 3/2008 | Raghavan et al. | 475/5 |
| 7,534,185 B2 * | 5/2009 | Goma Ayats | 475/209 |
| 2005/0049570 A1 | 3/2005 | Chin et al. | |

FOREIGN PATENT DOCUMENTS

| | | |
|---|---|---|
| EP | 0 750 137 A2 | 12/1996 |
| EP | 1 717 483 A1 | 11/2006 |
| JP | 50-85019 | 7/1975 |
| JP | 02-190649 | 7/1990 |
| JP | 11-301291 | 11/1999 |
| JP | 2000-197324 | 7/2000 |
| JP | 2000-350309 | 12/2000 |
| JP | 2001-339805 | 12/2001 |
| JP | 2006-199077 | 8/2006 |
| WO | 02/097303 A1 | 12/2002 |

* cited by examiner

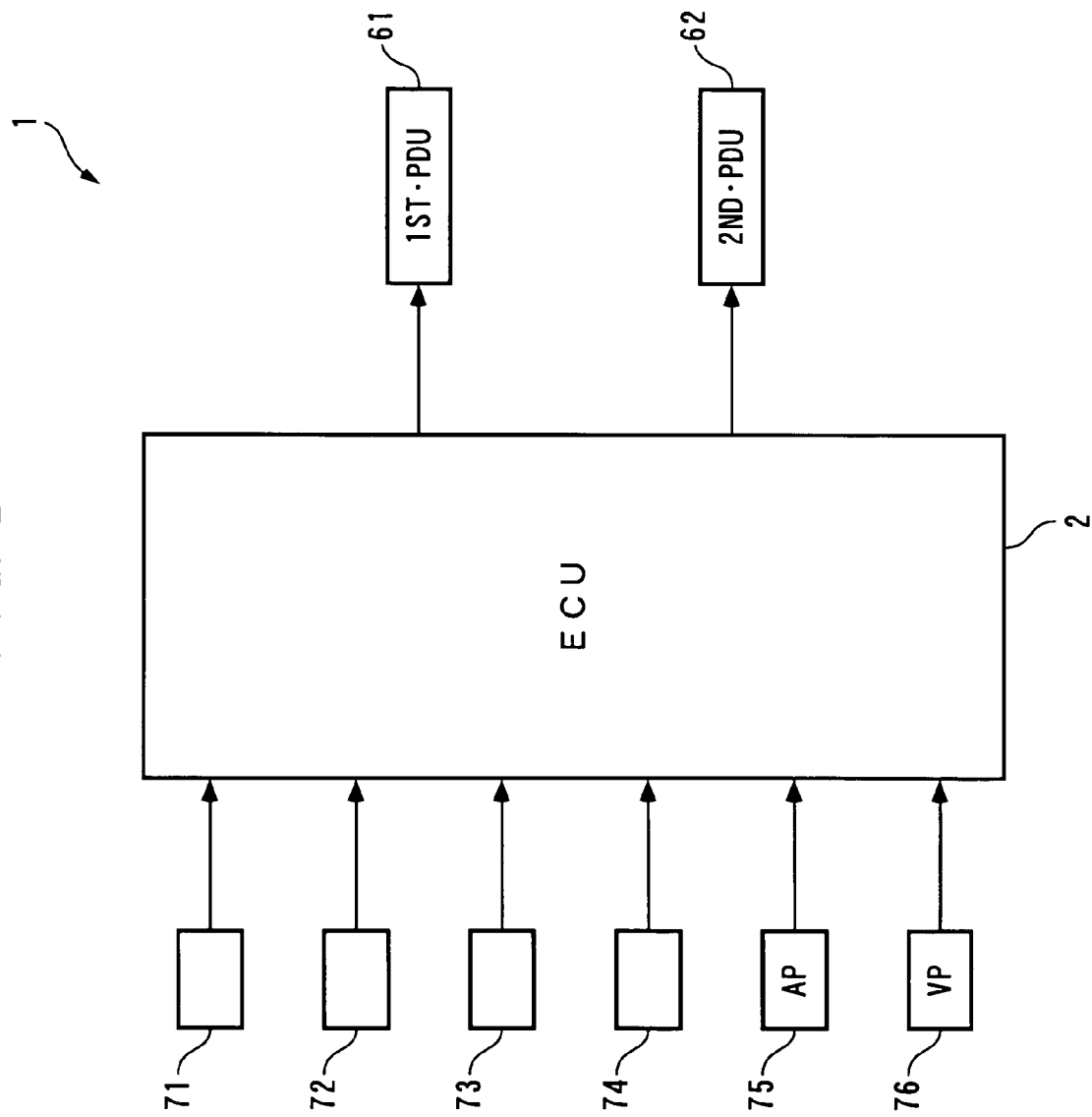

F I G. 2 8
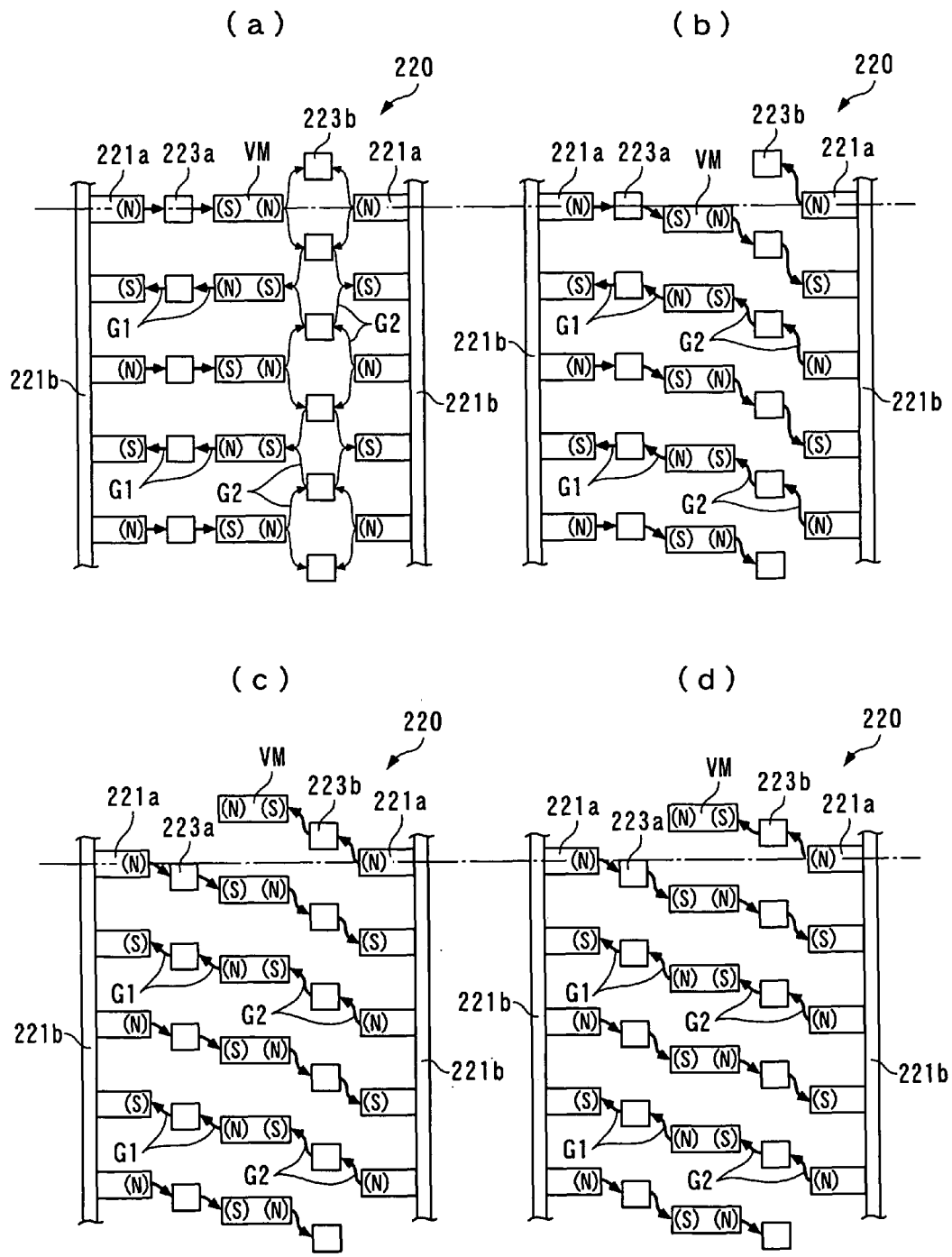

F I G. 3 0
(a)
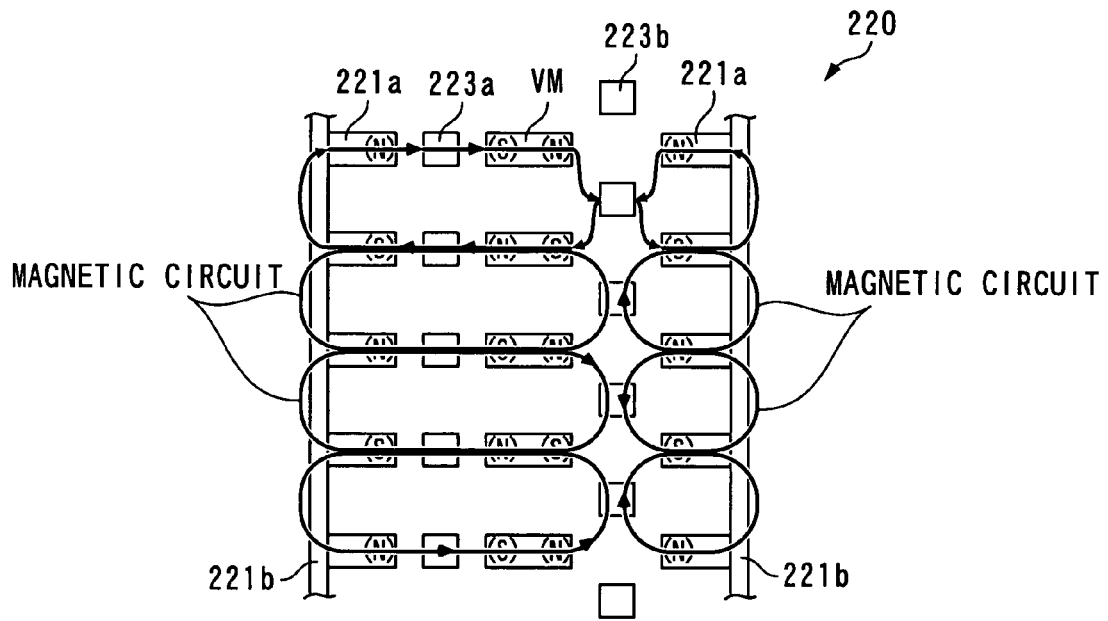
(b)
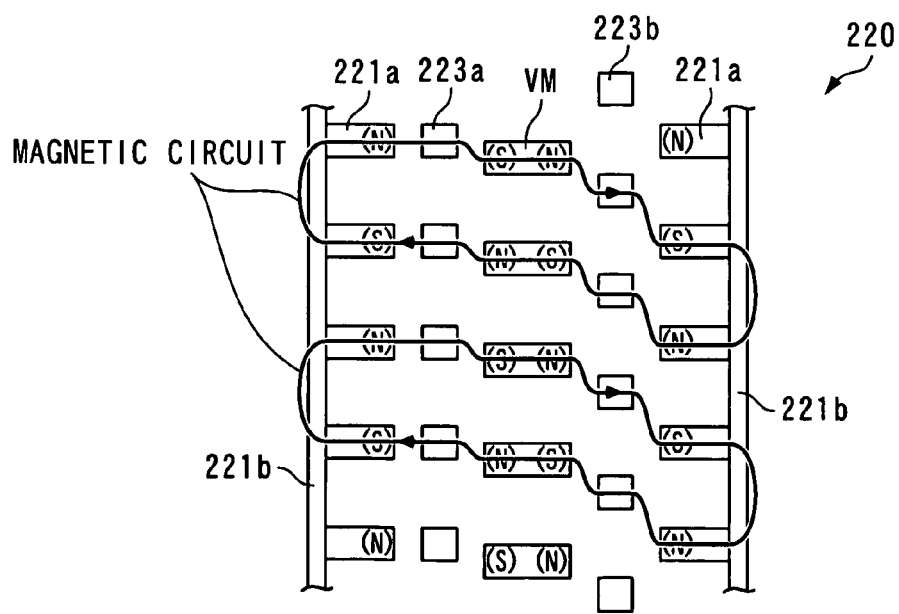

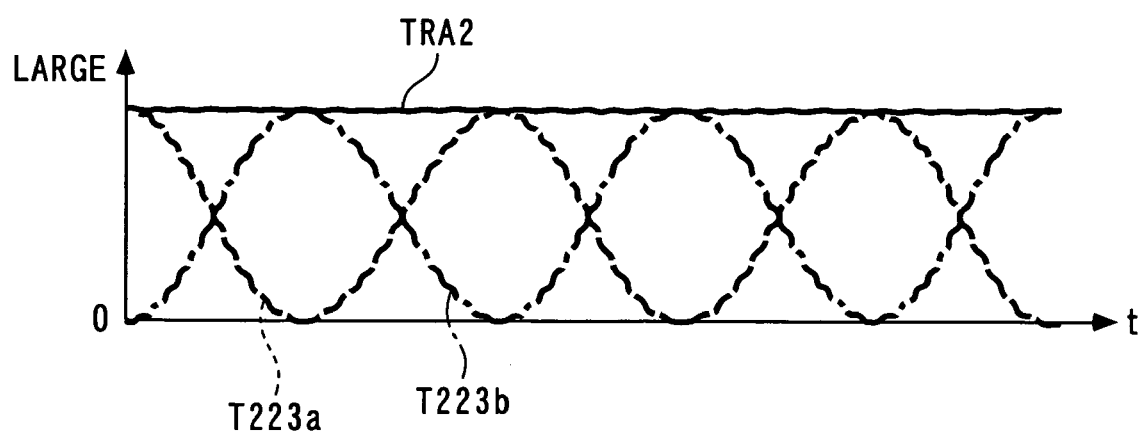
F I G. 3 1

FIG. 32
(a)
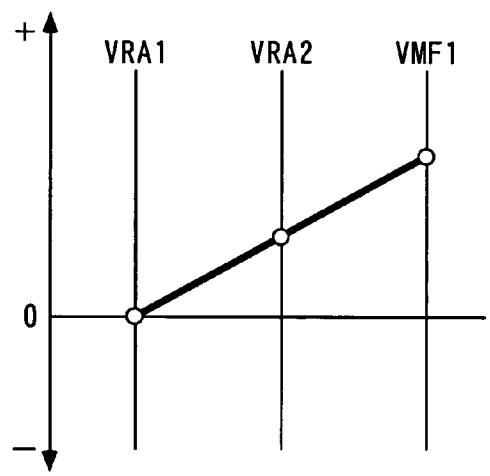
(b)
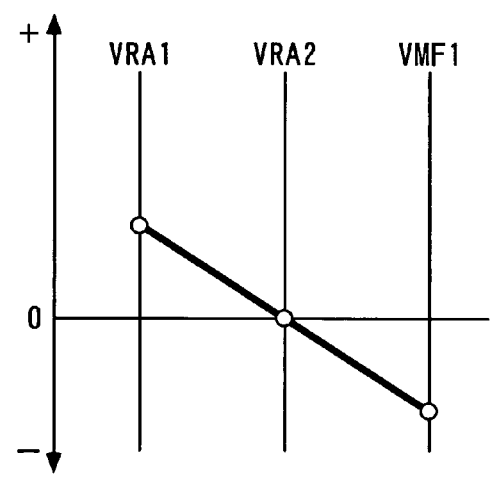
(c)
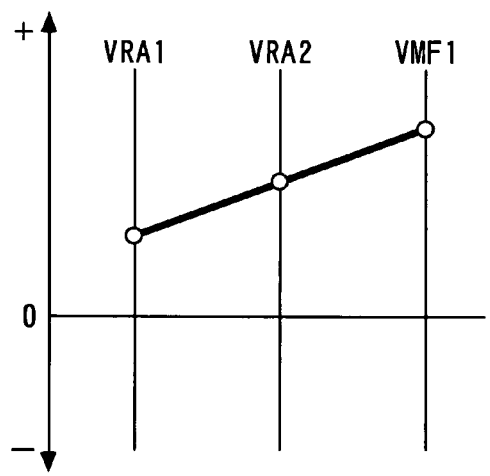
(d)
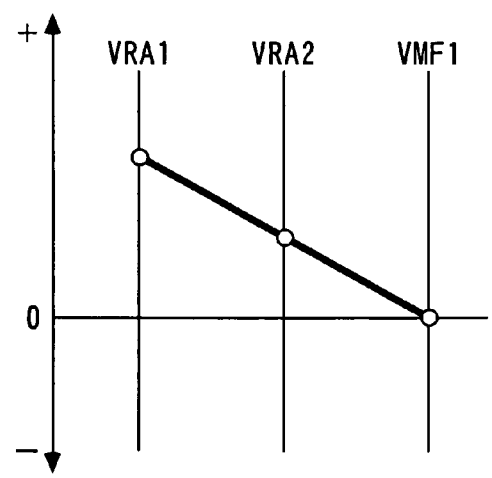

F I G. 3 4
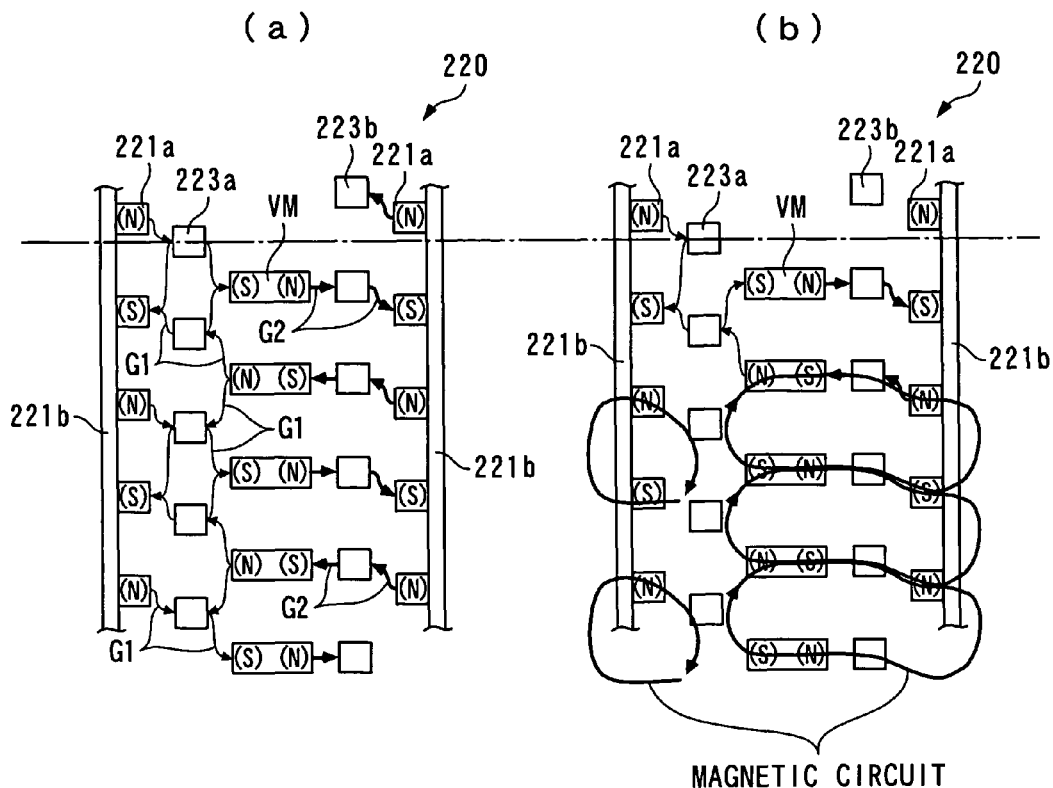
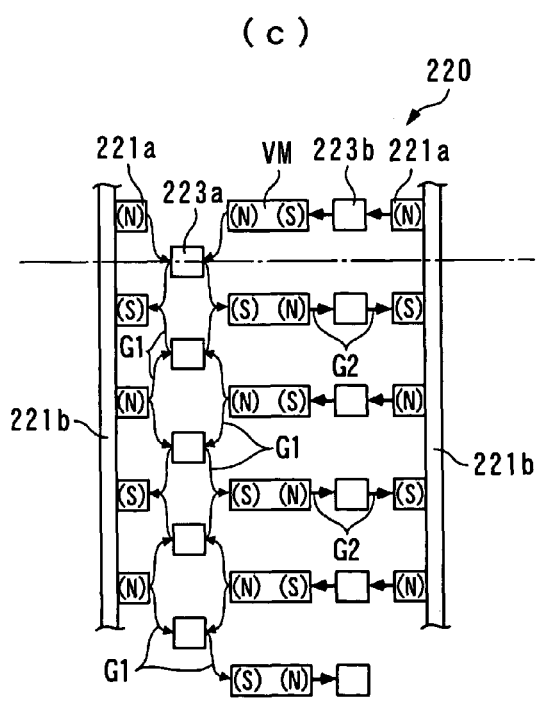

F I G. 3 6
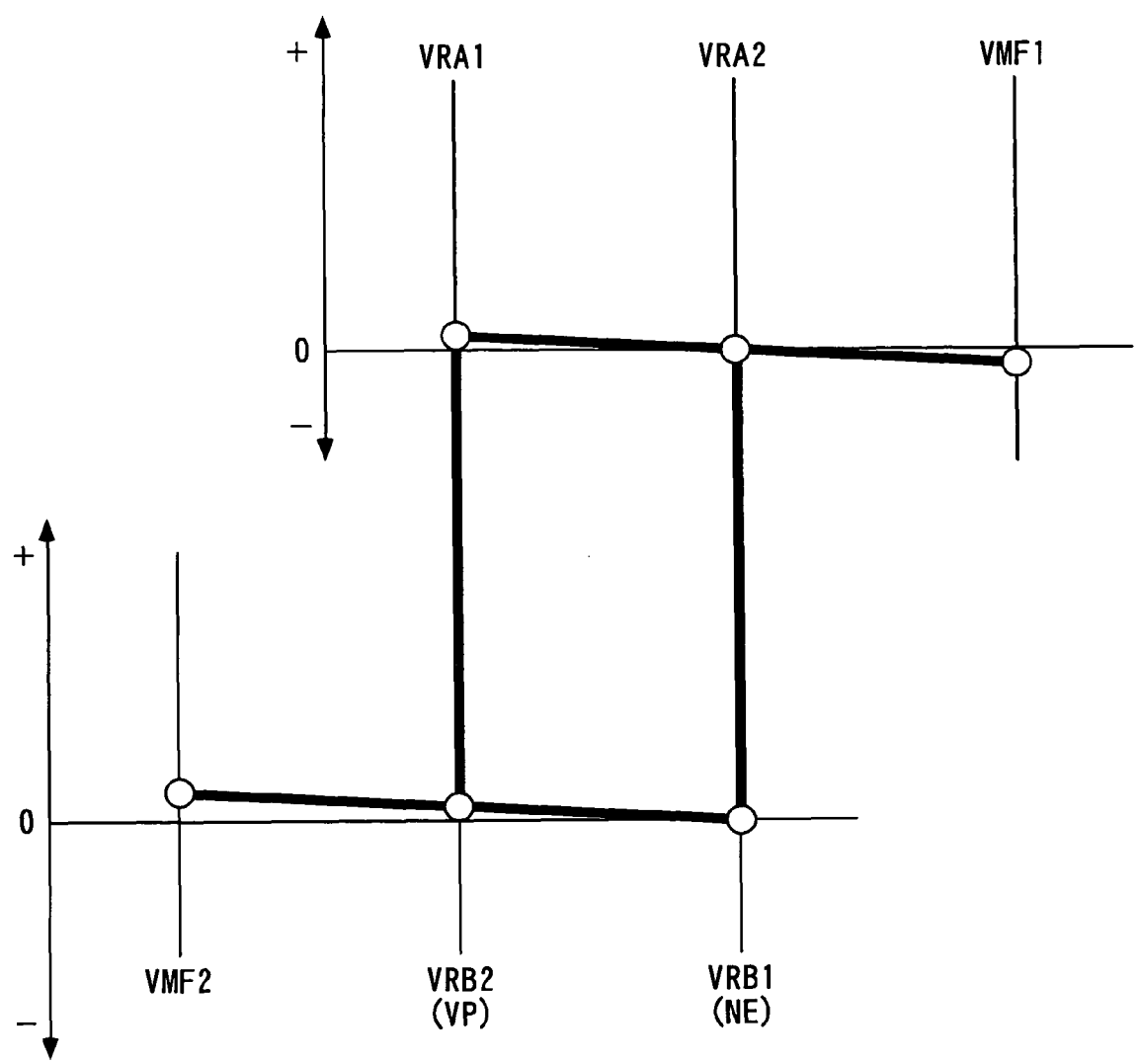

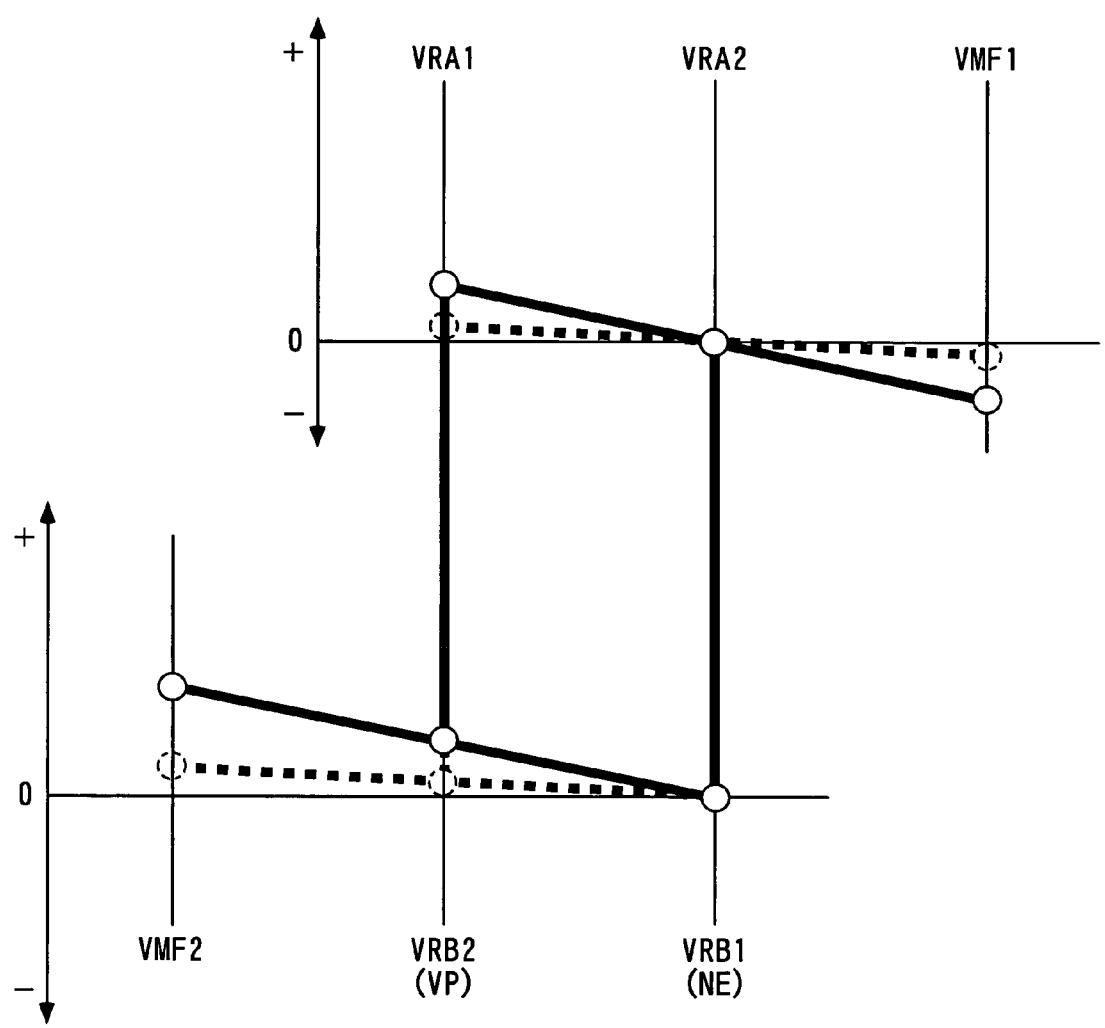
F I G. 3 7

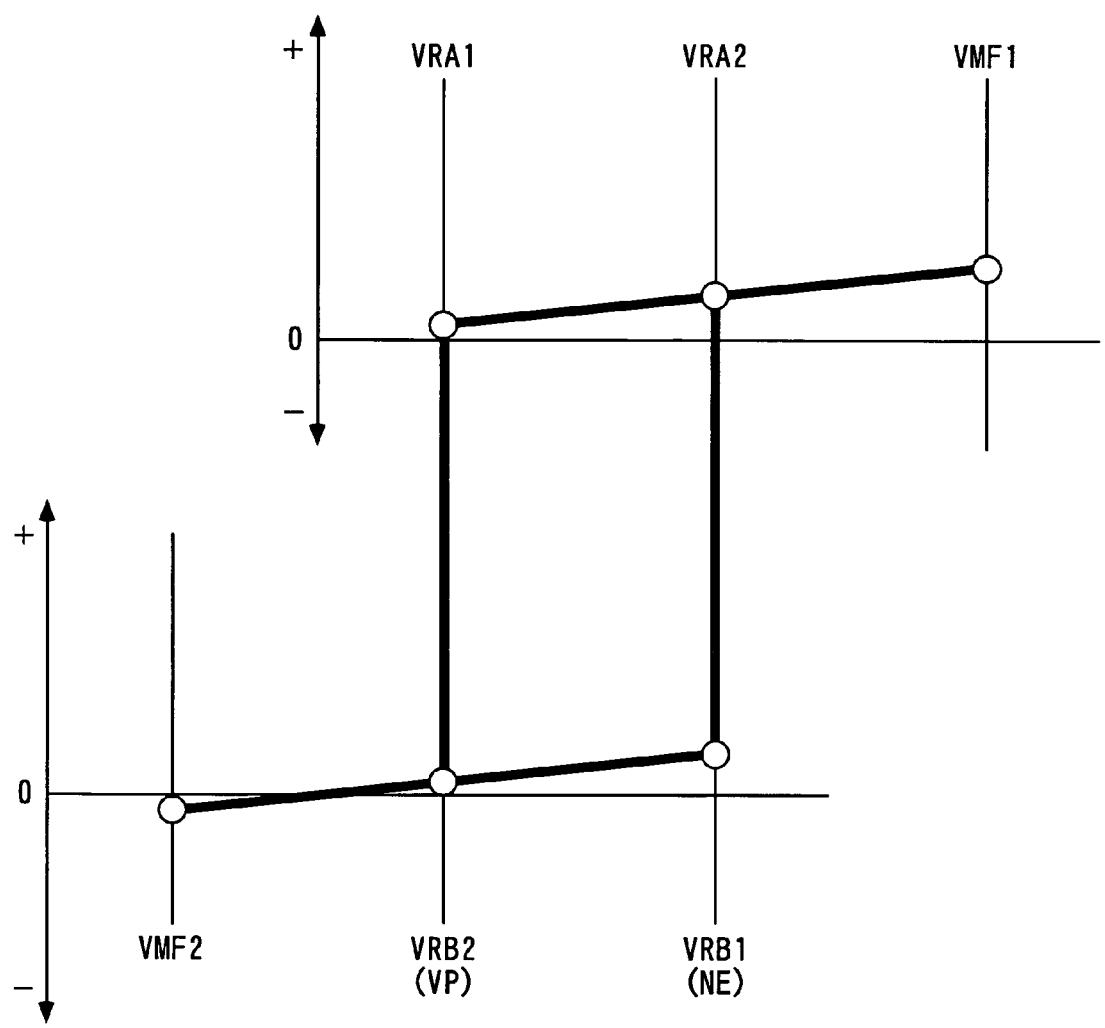
F I G. 4 9

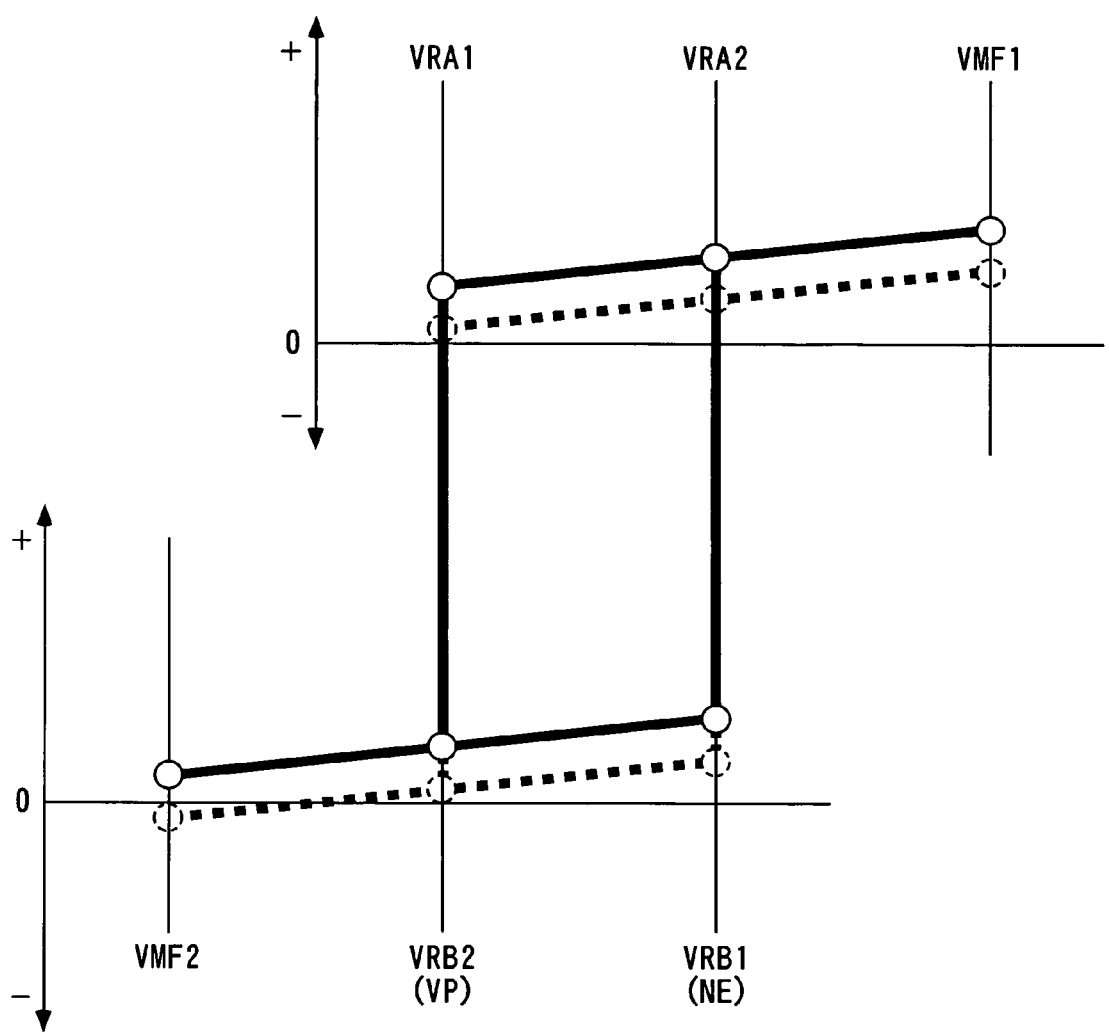
F I G. 5 0

F I G. 5 7
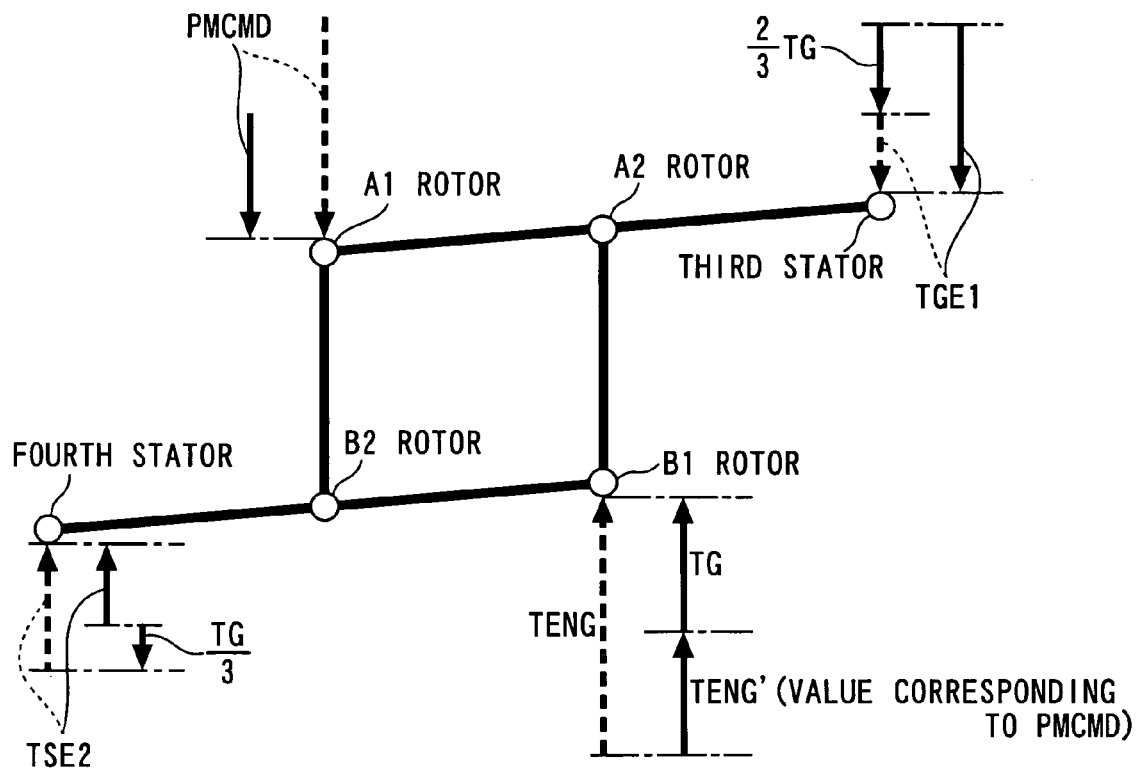

FIG. 66
(a)
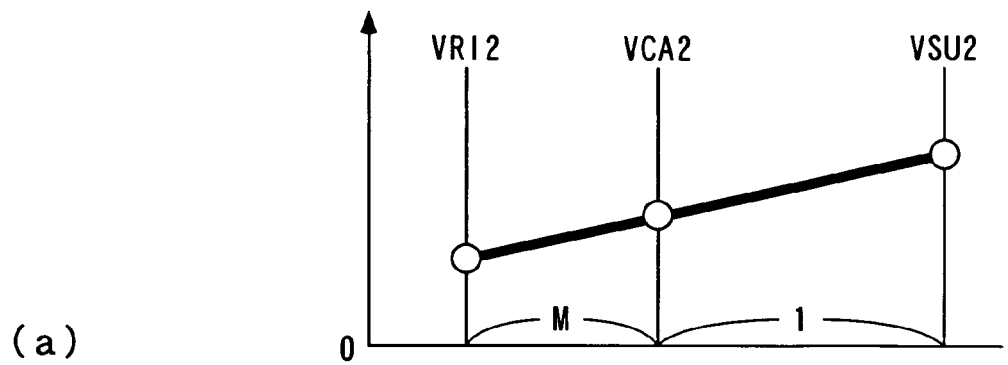
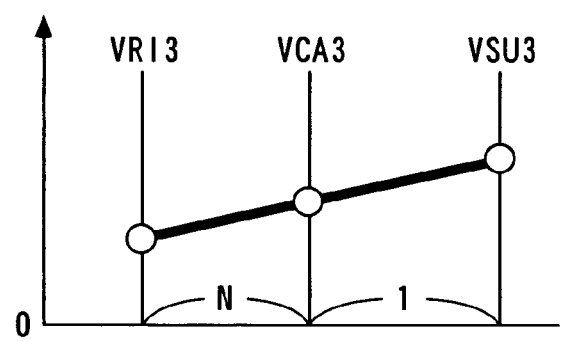
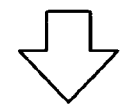
(b)
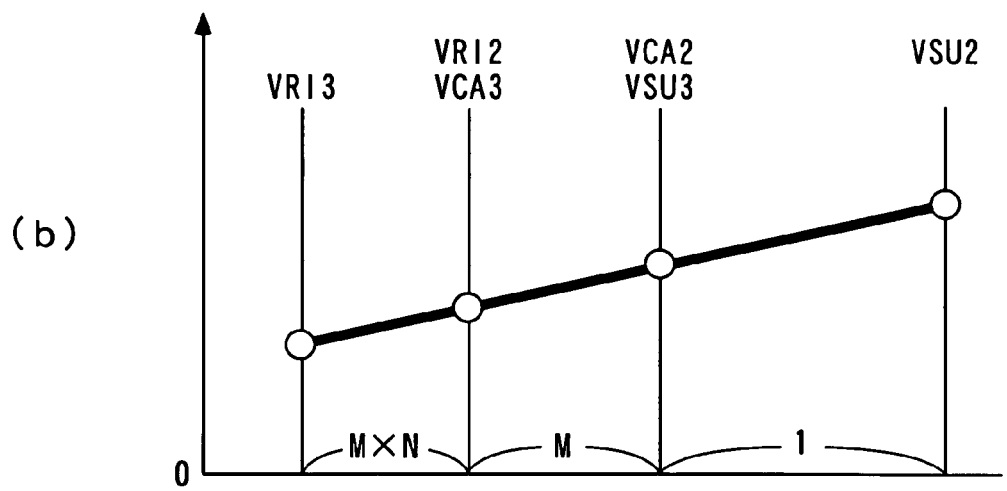

F I G. 6 8
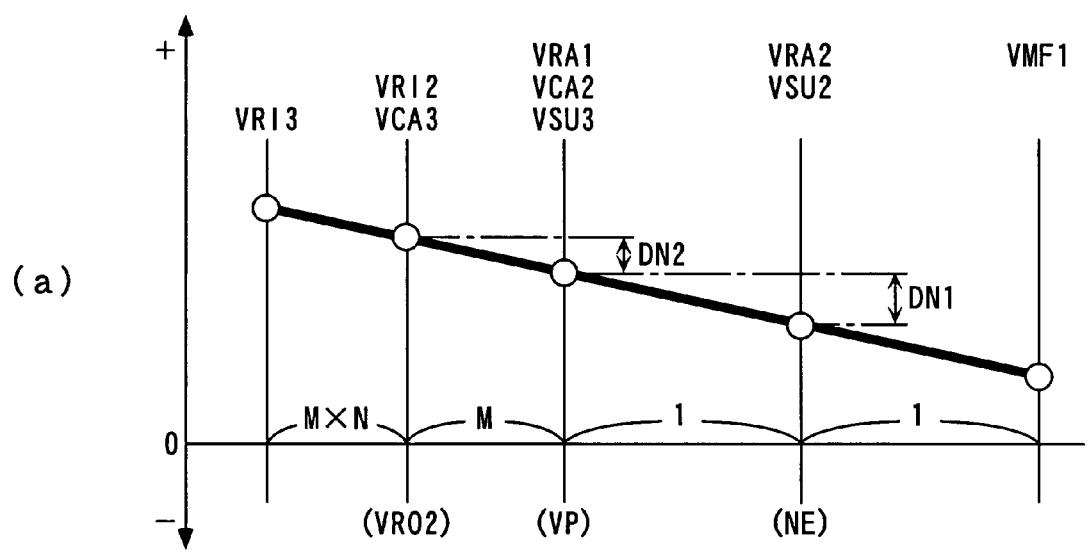
(a)
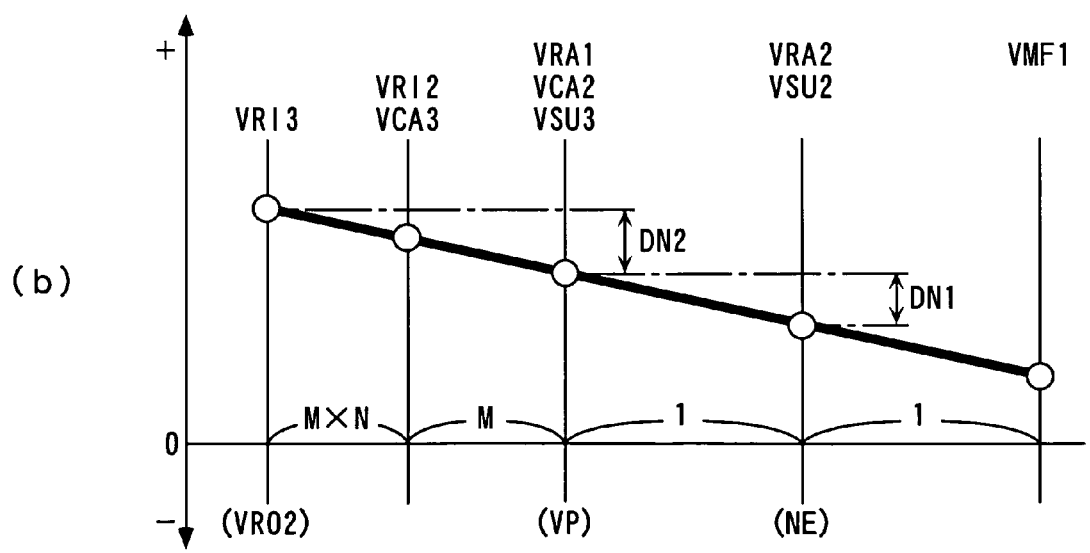
(b)

F I G. 7 1
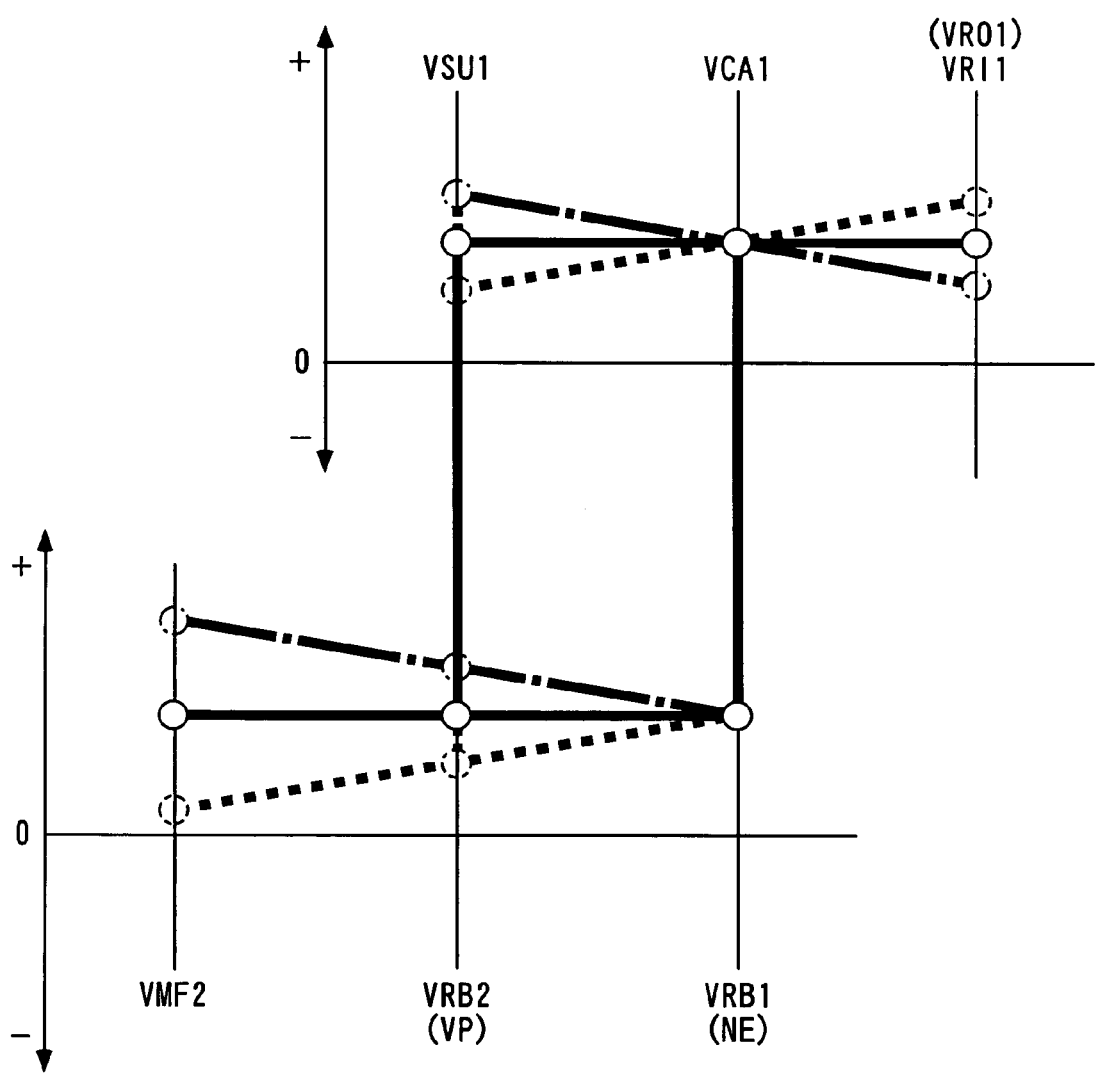

FIG. 77
(a)
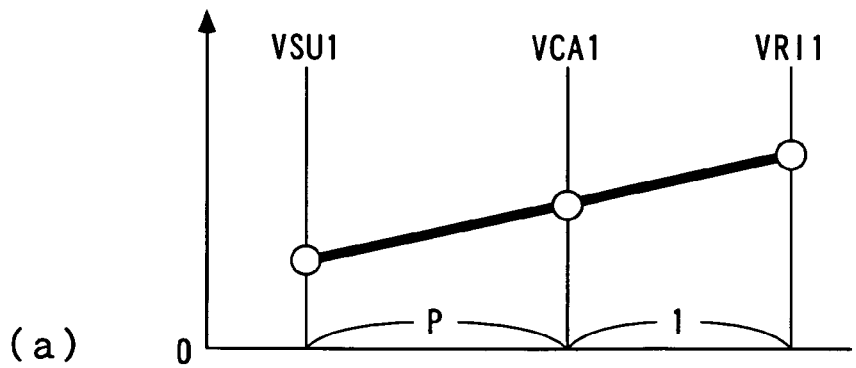
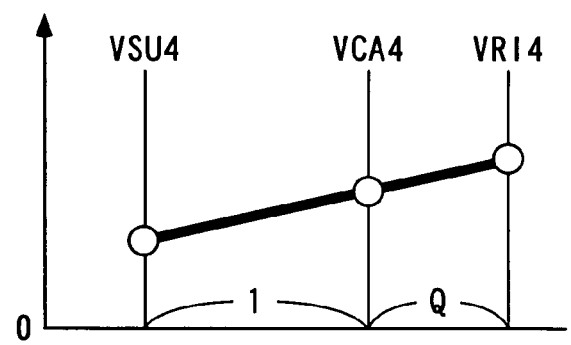
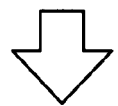
(b)
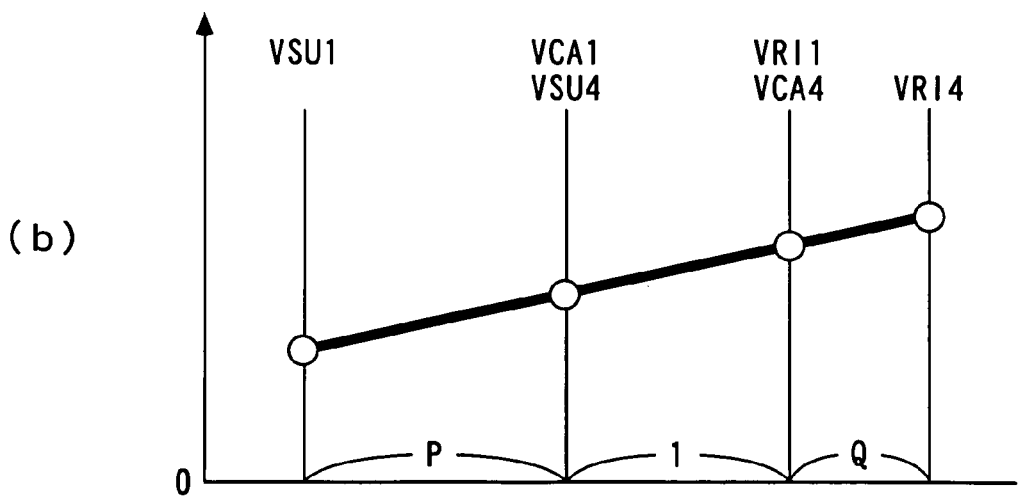

FIG. 79
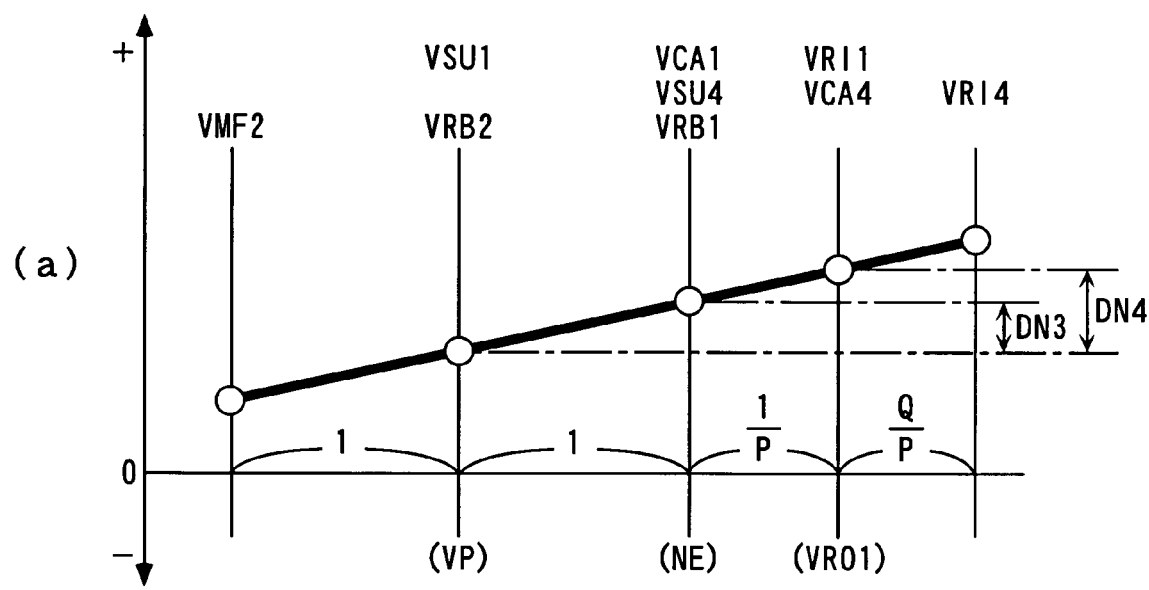
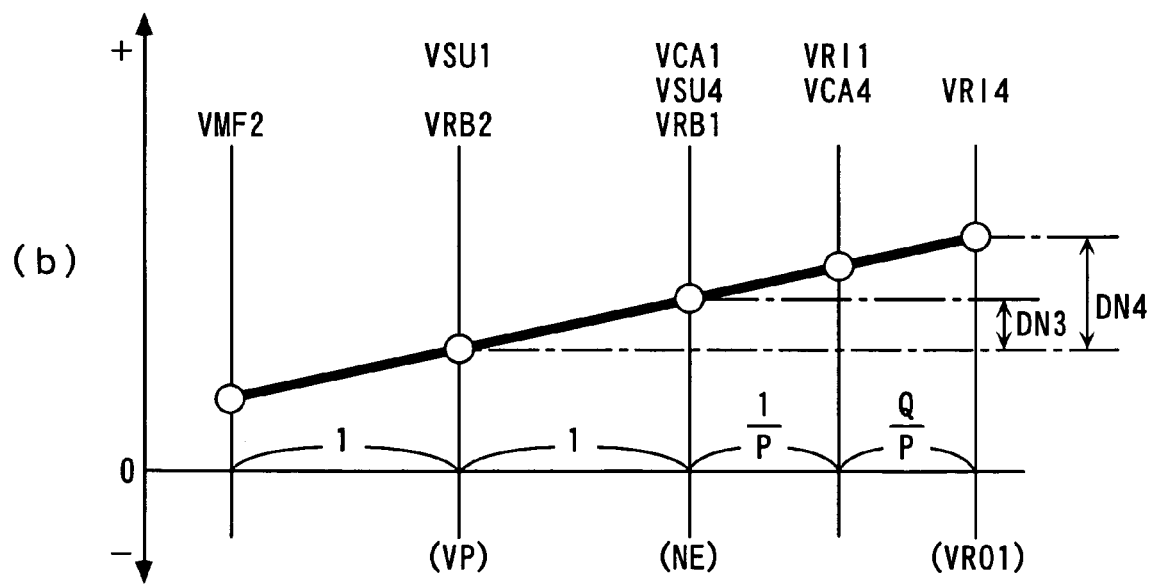

F I G. 8 6
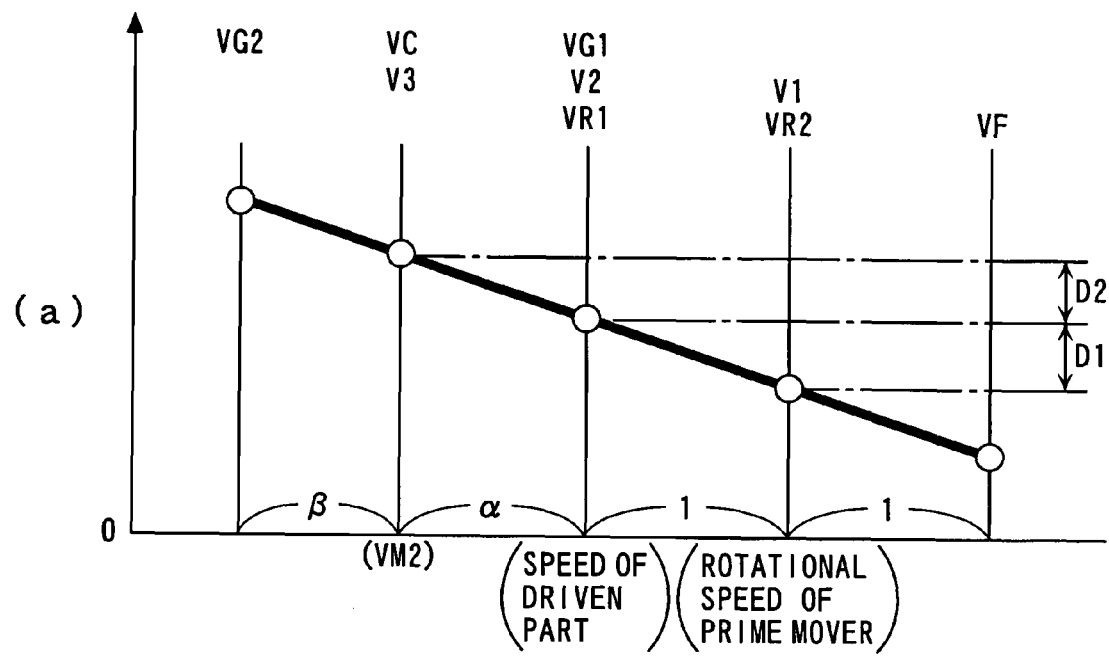
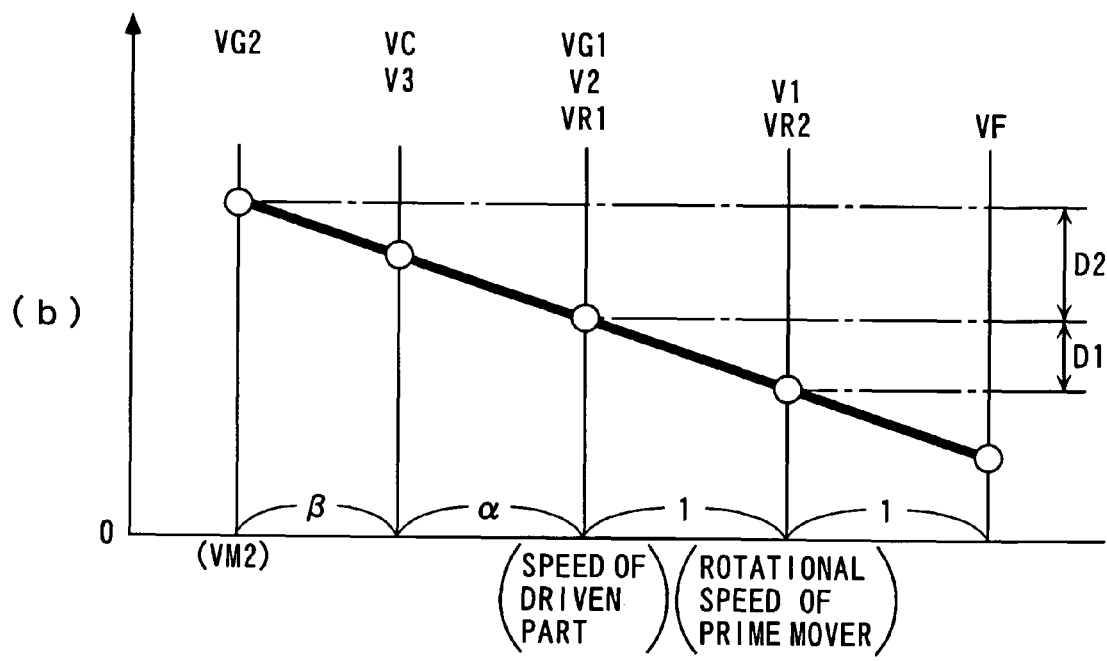

FIG. 88
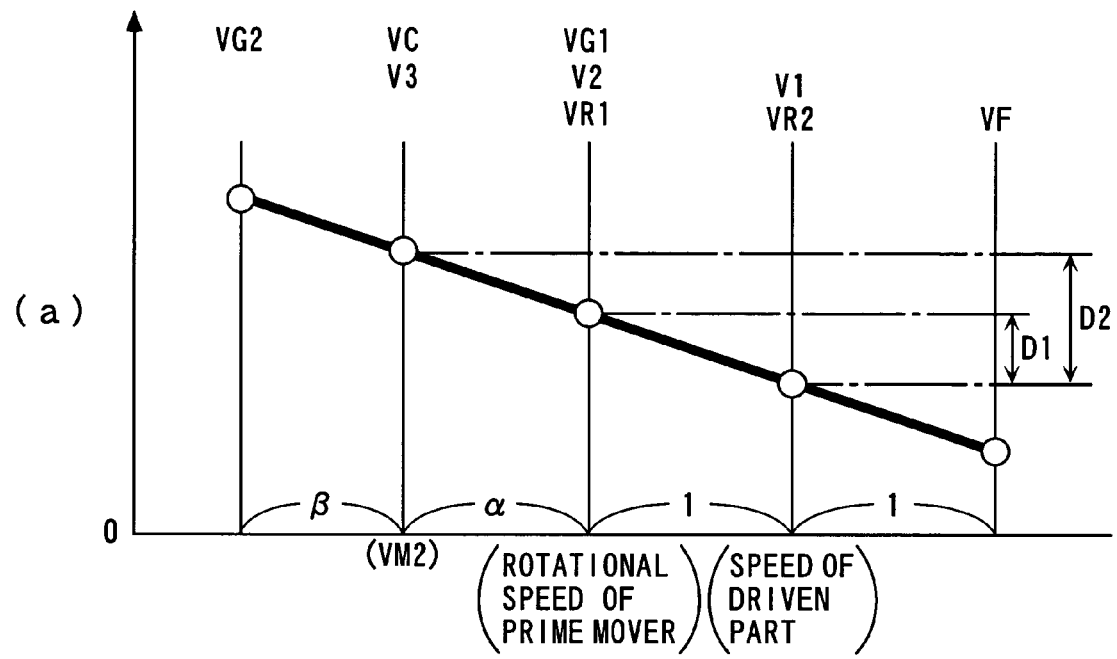
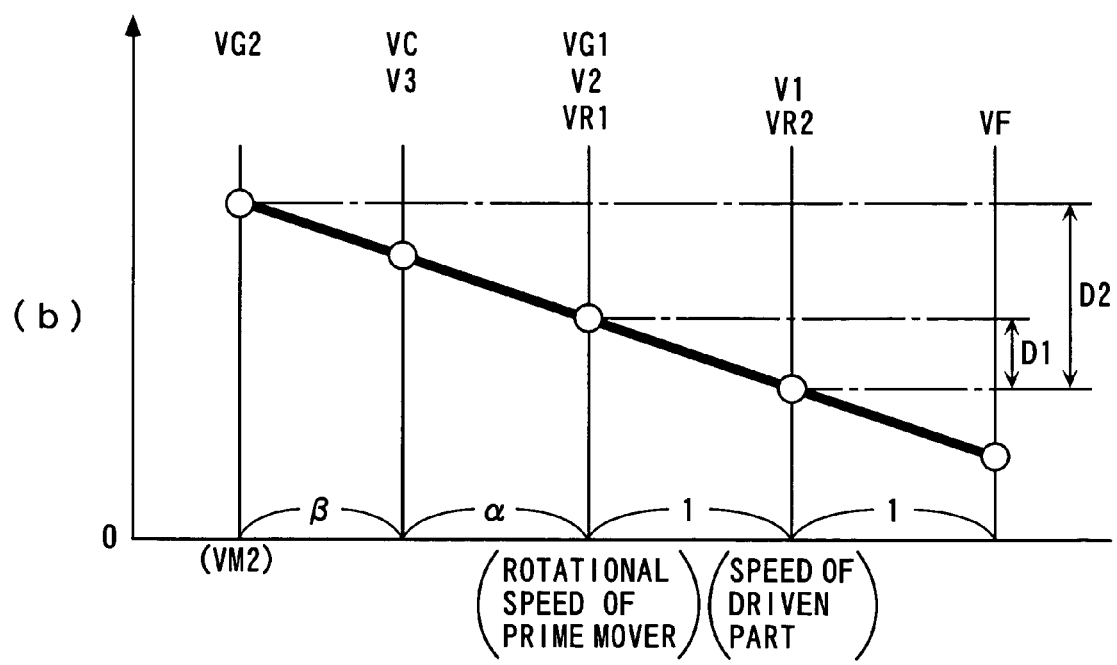

POWER PLANT

FIELD OF THE INVENTION

The present invention relates to a power plant for driving driven parts, and more particularly to a power plant that is provided with a prime mover as a power source, and is configured to be capable of transmitting power from the prime mover to the driven parts while changing the speed of the power.

BACKGROUND ART

Conventionally, as the power plant of this kind, one disclosed in Patent Literature 1 is known. This power plant is for driving left and right drive wheels of a vehicle, and is equipped with an internal combustion engine as power source, and a transmission connected to the engine and the drive wheels. The transmission includes first and second planetary gear units of a general single pinion type, and first and second rotating machines each having a rotor and a stator.

As shown in FIG. 51, the first planetary gear unit has a first ring gear, a first carrier and a first sun gear mechanically connected to the engine, a second carrier of the second planetary gear unit, and the first rotating machine, respectively. The second planetary gear unit has a second sun gear, a second carrier and a second ring gear mechanically connected to the second rotating machine, the drive wheels, and the first rotating machine, respectively. Further, the first and second rotating machines are electrically connected to each other via a controller. It should be noted that in FIG. 51, mechanical connections between elements are indicated by solid lines, and electrical connections therebetween are indicated by one-dot chain lines. Further, flows of power and electric power are indicated by thick lines with arrows.

In the conventional power plant configured as above, during traveling of the vehicle, the power from the engine is transmitted to the drive wheels, e.g. as follows: As shown in FIG. 51, the power from the engine is transmitted to the first ring gear, and is then combined with power transmitted, as described hereinafter, to the first sun gear. This combined power is transmitted to the second carrier via the first carrier. Further, in this case, electric power is generated by the second rotating machine, and the generated electric power is supplied to the first rotating machine via the controller. In accordance with the electric power generation, part of the combined power transmitted to the second carrier is distributed to the second sun gear and the second ring gear, and the remainder of the combined power is transmitted to the drive wheels. The power distributed to the second sun gear is transmitted to the second rotating machine, and the power distributed to the second ring gear is transmitted to the first sun gear via the first rotating machine. Furthermore, the power of the first rotating machine, generated in accordance with the above-described supply of the electric power, is transmitted to the first sun gear.

As described above, in the conventional power plant, power is recirculated via a path formed by the first carrier→the second carrier→the second ring gear→the first rotating machine→the first sun gear→the first carrier, and a path formed by the first carrier→the second carrier→the second sun gear→the second rotating machine→the first rotating machine→the first sun gear→the first carrier. This recirculation of the power causes very large combined power from the first ring gear and the first sun gear to pass through the first carrier and then pass through the second carrier as it is, so that to withstand the above large combined power, it is inevitable to increase the size of the first and second planetary gear units, which results in the increased size and manufacturing costs of the power plant. Further, in accordance with the increases in the size of the above power plant and the power passing through the power plant, losses generated in the power plant are increased to decrease the driving efficiency of the power plant.

The present invention has been made to provide a solution to the above-described problems, and an object thereof is to provide a power plant which is capable of reduce power passing through a distributing and combining device, whereby it is possible to attain reduction of the size and manufacturing costs of the power plant and enhance the driving efficiency thereof.
[Patent Literature 1] U.S. Pat. No. 6,478,705

DISCLOSURE OF THE INVENTION

To attain the object, the invention as claimed in claim 1 provides a power plant 1, 1A, 1B for driving driven parts (drive wheels DW and DW in the embodiment (the same applies hereinafter in this section)), comprising a prime mover (engine 3) including an output shaft (crankshaft 3a), a first distributing and combining device (first planetary gear unit 20, third generator-motor 220) that includes first, second and third elements (first sun gear 21, first carrier 24, first ring gear 22, A1 rotor 221, A2 rotor 223, third stator 222), and has a function of distributing energy input to the second element to the first and third elements and a function of combining energy input to the first and third elements and then outputting combined energy to the second element, the first to third elements rotating while maintaining a linear speed relationship therebetween, during distributing and combining the energy, a second distributing and combining device (second planetary gear unit 30, fourth generator-motor 230) that includes fourth, fifth and sixth elements (second sun gear 31, second carrier 34, second ring gear 32, B1 rotor 231, B2 rotor 233, fourth stator 232) and has a function of distributing energy input to the fifth element to the fourth and sixth elements and a function of combining energy input to the fourth and sixth elements and then outputting combined energy to the fifth element, the fourth to sixth elements rotating while maintaining a linear speed relationship therebetween, during distributing and combining the energy, and a speed-changing device (first generator-motor 40, second generator-motor 50, ECU 2, 1st·PDU 61, 2nd·PDU 62, stepless transmission 110) that is connected to the third and sixth elements such that the speed-changing device is capable of changing a relationship between a rotational speed of the third element and a rotational speed of the sixth element, wherein the second and fourth elements are mechanically connected to the output shaft of the prime mover, and the first and fifth elements are mechanically connected to the driven parts.

According to the power plant, the second element of the first distributing and combining device and the fourth element of the second distributing and combining device are mechanically connected to the output shaft of the prime mover, and the first element of the first distributing and combining device and the fifth element of the second distributing and combining device are mechanically connected to the driven parts. Further, the speed-changing device capable of changing the relationship between the rotational speed of the third element and the rotational speed of the sixth element is connected to the third element of the first distributing and combining device and the sixth element of the second distributing and combining device.

In the power plant configured as above, the power from the prime mover is transmitted to the driven parts e.g. as follows: As shown in FIG. 52, part of the power from the prime mover is transmitted to the second element, and the remainder thereof is transmitted to the fourth element. The power transmitted from the prime mover to the second element is distributed to the first element and the third element, and the power distributed to the first element is transmitted to the driven parts, while the power distributed to the third element is transmitted to the sixth element via the speed-changing device. Further, the power transmitted to the sixth element and the power from the prime mover transmitted to the fourth element, as described above, are combined, and then the combined power is transmitted to the driven parts via the fifth element. As a consequence, power equal in magnitude to the power from the prime mover is transmitted to the driven parts. It should be noted that in FIG. 52, thick lines with respective arrows indicate flows of power (energy).

As described above, in the power plant according to the present invention, differently from the aforementioned conventional case, the power from the prime mover is transmitted to the driven parts without being recirculated, and hence it is possible to reduce power passing through the first and second distributing and combining devices. This makes it possible to reduce the sizes of the first and second distributing and combining devices, thereby making it possible to attain reduction of the size and manufacturing costs of the power plant. Further, the first and second distributing and combining devices each having torque capacity corresponding to the power reduced as described above are used, whereby it is possible to suppress the loss of power to improve the driving efficiency of the power plant.

Further, the power from the prime mover is transmitted to the driven parts in a divided state via three paths, i.e. a first path formed by the second element and the first element, and a second path formed by the second element, the third element, the speed-changing device, the sixth element, and the fifth element, and a third path formed by the fourth element and the fifth element. This makes it possible to reduce power passing through the speed-changing device via the second path, so that it is possible to reduce the size of the speed-changing device, thereby making it possible to attain further reduction of the size and manufacturing costs of the power plant.

Furthermore, when power is transmitted to the driven parts, as described above, if the relationship between the rotational speed of the third element and that of the sixth element is changed by the speed-changing device, it is possible to transmit the power from the prime mover to the driven parts while changing the speed thereof. More specifically, in the first distributing and combining device, during distributing and combining energy between the first to third elements, the first to third elements rotate while maintaining a linear speed relationship therebetween, and in the second distributing and combining device, similarly to the first distributing and combining device, the fourth to sixth elements rotate while maintaining a linear speed relationship therebetween during distributing and combining energy between the fourth to sixth elements. Further, in the above-described connecting relationship, in a case where the second and fourth elements are directly connected to the output shaft of the prime mover without via a transmission, such as a gear, the rotational speeds of the second and fourth elements are both equal to the rotational speed of the prime mover. Furthermore, in a case where the first and fifth elements are directly connected to the driven parts, the rotational speeds of the first and fifth elements are both equal to the speed of the driven parts. Further, the relationship between the rotational speed of the third element and that of the sixth element is changed by the speed-changing device. From the above, the relationship between the rotational speed of the prime mover, the speed of the driven parts, and the rotational speeds of the first to sixth elements (hereinafter referred to as "the first to sixth element rotational speeds V1 to V6", respectively) are indicated e.g. by thick solid lines in FIG. 53. It should be noted that the FIG. 53 speed diagram and other speed diagrams, referred to hereinafter, are so-called collinear charts, and in each speed diagram, the rotational speeds of the plurality of elements in the linear speed relationship are on a straight line, which means that they are in a collinear relationship. Further, in these speed diagrams, actually, vertical lines intersecting horizontal lines indicative of a value of 0 are for representing the velocities of parameters, and the distance between each white circle shown on the vertical lines and an associated one of the horizontal lines corresponds to the velocity of each parameter, a reference numeral indicative of the velocity of each parameter is shown on one end of each vertical line for convenience.

Therefore, as indicated by broken lines in FIG. 53, by changing the relationship between the third and sixth element rotational speeds V3 and V6 using the speed-changing device, for example, such that the third element rotational speed V3 becomes higher and at the same time the sixth element rotational speed V6 becomes lower than the second and fourth element rotational speeds V2 and V4, it is possible to transmit the power from the prime mover to the driven parts while decreasing the speed of thereof. Inversely, as indicated by one-dot chain lines in FIG. 53, by the relationship between the third and sixth element rotational speeds V3 and V6 using the speed-changing device, for example, such that the third element rotational speed V3 becomes lower and at the same time the sixth element rotational speed V6 becomes higher than the second and fourth element rotational speeds V2 and V4, it is possible to transmit the power from the prime mover to the driven parts while increasing the speed thereof.

The invention as claimed in claim 2 is the power plant 1A as claimed in claim 1, wherein the speed-changing device is a mechanical stepless transmission 110.

With this arrangement, since a general mechanical stepless transmission is used as the speed-changing device, it is possible to configure the power plant easily and inexpensively without preparing a special device. Further, as claimed in claim 1, power passing through the speed-changing device can be reduced, and hence if a stepless transmission having torque capacity corresponding to the power reduced as described above is used, it is possible to suppress the loss of power to further improve the driving efficiency of the power plant.

The invention as claimed in claim 3 is the power plant 1 as claimed in claim 1, wherein the speed-changing device comprises a first energy conversion device (first generator-motor 40) that is mechanically connected to the third element, for transmitting rotational power between the first energy conversion device and the third element, and converting a form of energy between the rotational power and another form of energy than the rotational power, a second energy conversion device (second generator-motor 50) that is connected to the first energy conversion device, and is mechanically connected to the sixth element, for transmitting rotational power between the second energy conversion device and the sixth element, and converting a form of energy between the rotational power and the other form of energy, and a controller (1st·PDU 61, 2nd·PDU 62, ECU 2) that controls torque and a rotational speed of the rotational power when the other form of energy is converted into the rotational power by at least one of the first and second energy conversion devices.

With this arrangement, the rotational power is transmitted between the third element and the first energy conversion device, and the first energy conversion device converts the form of energy between the rotational power and another form of energy than the rotational power. Further, the rotational power is transmitted between the second energy conversion device connected to the first energy conversion device and the sixth element, and the second energy conversion device converts the form of energy between the rotational power and the other form of energy. Furthermore, when the first energy conversion device and/or the second energy conversion device convert(s) the other form of energy into the rotational power, the controller controls the torque and rotational speed of the rotational power.

When the torque and the rotational speed are changed in a state of the rotational power, e.g. when a belt-type stepless transmission is used, it is required to use a large-sized stepless transmission when desired to transmit relatively large torque, since such a stepless transmission has relatively small torque transmitting capacity per volume. This results in an increase in the size of the power plant, and hence such a stepless transmission is not suitable for transmitting large torque. According to the present invention, as described above, when the other form of energy than the rotational power is converted into the rotational power, the torque and rotational speed of the rotational power are controlled. Therefore, when generator-motors are employed as the first and second energy conversion devices, for example, the generator-motors are larger in torque capacity than the stepless transmission with respect to the size, so that it is possible to reduce the size of the speed-changing device including the first and second energy conversion devices, whereby it is possible to further reduce the size of the power plant.

The invention as claimed in claim 4 is the power plant 1 as claimed in claim 3, further comprising an energy storing and releasing device (battery 63) that is configured to be capable of storing and releasing the other form of energy, and is connected to the first and second energy conversion devices.

With this arrangement, the other form of energy is stored in the energy storing and releasing device, and the stored other form of energy is released to the first energy conversion device and/or the second energy conversion device.

Therefore, e.g. in a case where a heat engine is used as a prime mover, when demanded power demanded for driving the driven parts is smaller than the optimum fuel economy power that will make it possible to obtain optimum fuel economy of the heat engine (hereinafter referred to as "the optimum fuel economy"), it is possible to control the power from the heat engine such that the optimum fuel economy can be obtained, and convert surplus power from the heat engine into another form of energy to store the other form of energy in the energy storing and releasing device. Inversely, when the demanded power is larger than the optimum fuel economy power, it is possible to control the power from the heat engine such that the optimum fuel economy can be obtained, and input the other form of energy stored in the above-described energy storing and releasing device to the driven parts as rotational power via the first energy conversion device and/or the second energy conversion device, to thereby make up for shortage of power. From the above, the optimum fuel economy of the heat engine can be obtained, and therefore it is possible to further enhance the driving efficiency of the power plant.

The invention as claimed in claim 5 is the power plant 1 as claimed in claim 3 or 4, wherein the other form of energy is electric energy.

With this arrangement, in the first and second energy conversion devices, the form of energy is converted between the rotational power and the electric energy. In general, energy conversion between rotational power and electric energy can be performed more efficiently with smaller losses of energy than energy conversion e.g. between rotational power and pressure energy. Therefore, according to the present invention, it is possible to further enhance the driving efficiency of the power plant.

Further, in general, electric energy can be controlled with higher responsiveness and accuracy than pressure energy and the like. Therefore, according to the present invention, it is possible to accurately perform energy conversion by the first and second energy conversion devices. For this reason, for example, when the power from the prime mover transmitted to the third element, as described above, is once converted into electric energy by the first energy conversion device, and the electric energy is converted into rotational power by the second energy conversion device again, whereafter the rotational power is transmitted to the driven parts via the sixth element, it is possible to properly perform such transmission of power to the driven parts.

On the other hand, when rotational power is transmitted by a so-called electrical path in which the rotational power is once converted into electric energy and then the electric power is converted into rotational power again, as described above, loss by generation of Joule heat occurs to make the transmission efficiency via this path lower than that via a so-called mechanical path e.g. via gears, and a so-called magnetic path via magnetism. According to the present invention, since power passing through the speed-changing device can be reduced as described above, it is possible to reduce power transmitted to the driven parts via the first and second energy conversion devices, i.e. via the electrical path. This makes it possible to further enhance the driving efficiency of the power plant.

Further, when electric energy is stored, and when the stored electric energy is taken out by releasing the same, it is possible to more accurately control the stored and released electric energy, than when pressure energy is stored and released, for example. Therefore, according to the present invention, it is possible to accurately store and release the electric energy for obtaining the optimum fuel economy, as described concerning claim 4.

Furthermore, when electric energy is stored and released, energy loss is smaller than when pressure energy is stored and released, for example. Therefore, according to the present invention, it is possible to efficiently perform the storing and releasing operations of electric energy, for obtaining the optimum fuel economy, as described concerning claim 4.

The invention as claimed in claim 6 is the power plant 1, 1A as claimed in any one of claims 1 to 5, wherein the first distributing and combining device is a first planetary gear unit 20, one of the first and third elements is a first sun gear 21, the other thereof is a first ring gear 22, and the second element is a first carrier 24 for rotatably supporting first planetary gears 23 in mesh with the first sun gear 21 and the first ring gear 22, and wherein the second distributing and combining device is a second planetary gear unit 30, one of the fourth and sixth elements is a second sun gear 31, the other thereof is a second ring gear 32, and the fifth element is a second carrier 34 for rotatably supporting second planetary gears 33 in mesh with the second sun gear 31 and the second ring gear 32.

With this arrangement, general first and second planetary gear units are used as the first and second distributing and combining devices, respectively, so that it is possible to configure the power plant easily and inexpensively without preparing special devices. Further, the planetary gear units have a characteristic that they have relatively large torque transmitting capacity with respect to a size thereof. Therefore, according to the present invention, it is possible to further downsize the first and second distributing and combining devices, thereby making it possible to further downsize the power plant.

The invention as claimed in claim 7 is the power plant 1, 1A as claimed in claim 6, wherein the first element is the first sun gear 21, the third element is the first ring gear 22, the fourth element is the second sun gear 31, and the sixth element is the second ring gear 32.

With this arrangement, the first and second ring gears are connected to the speed-changing device. The ring gears are arranged on outer peripheries of the planetary gear units. Therefore, according to the present invention, it is possible to easily connect the speed-changing device to the first and second ring gears.

To attain the above object, the invention as claimed in claim 8 provides a power plant 1C to 1R for driving driven parts (drive wheels DW and DW in the embodiment (the same applies hereinafter in this section)), comprising a prime mover (engine 3) including a first output portion (crankshaft 3a), a first generator-motor (third generator-motor 220, fourth generator-motor 230) that includes an immovable stator (third stator 222, fourth stator 232) for generating a rotating magnetic field, a first rotor (A1 rotor 221, B1 rotor 231) formed by magnets and disposed in a manner opposed to the stator, and a second rotor (A2 rotor 223, B2 rotor 233) formed by soft magnetic material elements and disposed between the stator and the first rotor, the first generator-motor inputting and outputting energy between the stator, the first rotor and the second rotor, via magnetic circuits formed by generation of the rotating magnetic field, the rotating magnetic field and the first and second rotors rotating along with the input and output of the energy while holding such a linear speed relationship that a difference between a rotational speed of the rotating magnetic field and a rotational speed of the second rotor, and a difference between the rotational speed of the second rotor and a rotational speed of the first rotor become equal to each other, a first controller (ECU 2, 1st·PDU 61, 2nd·PDU 62) electrically connected to the stator, for controlling electric power generated by the stator and electric power supplied to the stator, a distributing and combining device (first planetary gear unit 20, second planetary gear unit 30) that includes first, second and third elements mechanically connected to each other and has a function of distributing power input to the second element (first carrier 24, second carrier 34) to the first and third elements (first sun gear 21, second sun gear 31, first ring gear 22, second ring gear 32) and a function of combining power input to the first and third elements and then outputting combined power to the second element, the first to third elements rotating while maintaining a linear speed relationship therebetween, during distributing and combining the power, a second generator-motor 50 (first generator-motor 40) that includes a second output portion (first rotor 42, second rotor 52), and has a function of converting supplied electric power into power and outputting the converted power to the second output portion and a function of converting the power input to the second output portion into electric power to thereby generate electric power, and a second controller (ECU 2, 2nd·PDU 62, 1st·PDU 61) electrically connected to the second generator-motor 50, for controlling electric power generated by the second generator-motor 50 and electric power supplied to the second generator-motor 50, wherein one of a pair of the first rotor and the second element, and a pair of the second rotor and the first element are mechanically connected to the first output portion of the prime mover, while the other of the pair of the first rotor and the second element, and the pair of the second rotor and the first element are mechanically connected to the driven parts, the third element being mechanically connected to the second output portion of the second generator-motor 50, and the stator and the second generator-motor 50 being electrically connected to each other via the first and second controllers.

According to the power plant, in the first generator-motor, energy is input and output between the stator and the first and second rotors via the magnetic circuits formed by generation of the rotating magnetic field of the stator, and along with the input and output of the energy, the rotating magnetic field and the first and second rotors rotate while holding the linear speed relationship in which the difference between the rotational speed of the rotating magnetic field and the rotational speed of the second rotor, and the difference between the rotational speed of the second rotor and the rotational speed of the first rotor become equal to each other. Such a linear speed relationship between the rotating magnetic field and the first and second rotors corresponds to the relationship between the rotational speeds of one and the other of the sun gear and ring gear of the planetary gear unit, and the carrier supporting the planetary gears (hereinafter, the sun gear, the ring gear and the carrier are referred to as "the three elements").

Therefore, the relationship in the input and output energy between the stator and the first and second rotors is the same as that between the above-described three elements of the planetary gear unit. That is, in the first generator-motor, the power (energy) input to the second rotor is distributed to the stator and the first rotor via the magnetic circuits, and the power (energy) input to the first rotor and the electric power (energy) supplied to the stator are combines via the magnetic circuits, and the combined power is output to the second rotor. Further, as is clear from the above-described arrangement, the distributing and combining device has the same functions as those of the planetary gear unit.

Further, one of a pair of the first rotor and the second element of the distributing and combining device, and a pair of the second rotor and the first element of the distributing and combining device are mechanically connected to the first output portion of the prime mover, while the other pair are mechanically connected to the driven parts. Further, the third element is mechanically connected to the second output portion of the second generator-motor, and the stator and the second generator-motor are electrically connected to each other via the first and second controllers.

With the above arrangement, the driven parts can be driven using the power from the prime mover, for example. Hereinafter, the power plant in which the second rotor and the first element are connected to the first output portion of the prime mover, and the first rotor and the second element are connected to the driven parts is referred to as "the first power plant", and the power plant in which the first rotor and the second element are connected to the first output portion of the prime mover, and the second rotor and the first element are connected to the driven parts is referred to as "the second power plant". Further, transmission of the power from the prime mover to the driven parts in the first and second power plants will be sequentially described from the first power plant. FIG. 82 schematically shows an example of how the power is transmitted in the first power plant. It should be noted that in FIG. 82, the mechanical connections between the elements are indicated by solid lines, electrical connections therebetween are indicated by one-dot chain lines, and magnetic connections therebetween are indicated by broken lines. Further, flows of power and electric power are indicated by thick lines with arrows.

When the power from the prime mover is transmitted to the driven parts, electric power is generated by the first generator-motor using part of the power from the prime mover under the control of the first and second controllers, and the generated electric power is supplied to the second generator-motor. During the electric power generation by the first generator-motor, as shown in FIG. 82, part of the power from the prime mover is transmitted to the second rotor, and further is distributed to the first rotor and the stator via the magnetic circuits. In this case, part of the power transmitted to the second rotor is converted into electric power, and is distributed. Further, the power distributed to the first rotor, as described above, is transmitted to the driven parts, and the power distributed to the stator is supplied to the second generator-motor. Furthermore, the remainder of the power from the prime mover is transmitted to the first element. Further, when the electric power generated by the first generator-motor, as described above, is supplied to the second generator-motor, the electric power is converted into power, and then the converted power is transmitted to the third element. Further, the remainders of the power transmitted to the third element and the power from the prime mover transmitted to the first element, as described above, are combined, whereafter the combined power is transmitted to the driven parts via the second element. As a result, power equal in magnitude to the power from the prime mover is transmitted to the driven parts.

As described above, in the first power plant according to the present invention, differently from the aforementioned conventional case, the power from the prime mover is transmitted to the driven parts without being recirculated, and hence it is possible to reduce power passing through the first generator-motor, the distributing and combining device and the second generator-motor. This makes it possible to reduce the sizes of the first generator-motor, the distributing and combining device and the second generator-motor, thereby making it possible to attain reduction of the size and manufacturing costs of the first power plant. Further, the first generator-motor, the distributing and combining device and the second generator-motor each having torque capacity corresponding to the power reduced as described above are used, whereby it is possible to suppress the loss of power to improve the driving efficiency of the first power plant.

Furthermore, the power from the prime mover is transmitted to the driven parts in a divided state via three paths, i.e. a first path formed by the second rotor and the first rotor, and a second path formed by the second rotor, the stator, the first and second controllers, the second generator-motor, the third element, and the second element, and a third path formed by the first and second elements. This makes it possible to reduce electric power (energy) passing through the first and second controllers via the second path, so that it is possible to downsize the first and second controllers, thereby making it possible to attain further reduction of the size and manufacturing costs of the first power plant.

Furthermore, when power is transmitted to the driven parts, as described above, by controlling the rotational speed of the rotating magnetic field of the stator and the rotational speed of the second output portion of the second generator-motor using the first and second controllers, it is possible to transmit the power from the prime mover to the driven parts while changing the speed thereof. More specifically, in the first generator-motor, during distributing and combining energy between the stator and the first and second rotors, the rotating magnetic field and the second and first rotors rotate while maintaining a linear speed relationship therebetween, and in the distributing and combining device, the first to third elements rotate while maintaining a linear speed relationship therebetween during distributing and combining energy between the first to third elements. Further, in the above-described connecting relationship, when the second rotor and the first element are directly connected to the first output portion of the prime mover, the rotational speeds of the second rotor and the first element are both equal to the rotational speed of the first output portion of the prime mover (hereinafter referred to as "the rotational speed of the prime mover"). Furthermore, when the first rotor and the second element are directly connected to the driven parts, the rotational speeds of the first rotor and the second element are both equal to the speed of the driven parts. Further, when the second output portion of the second generator-motor and the third element are directly connected to each other, the rotational speeds of the second output portion of the second generator-motor and the third element are equal to each other.

Now, let it be assumed that the rotational speed of the rotating magnetic field is "the magnetic field rotational speed VF", the respective rotational speeds of the first and second rotors are "the first rotor rotational speed VR1" and "the second rotor rotational speed VR2", the respective rotational speeds of the first to third elements are "the first to third element rotational speeds V1 to V3", similarly to the case of claim 1, and the rotational speed of the second output portion of the second generator-motor is "the second motor rotational speed VM2". From the above-described relationship between the rotational speeds of the respective elements, the relationship between the rotational speed of the prime mover, the speed of the driven parts, the magnetic field rotational speed VF, the first and second rotor rotational speeds VR1 and VR2, the first to third element rotational speeds V1 to V3, and the second motor rotational speed VM2 are indicated e.g. by thick solid lines in FIG. 83.

Therefore, as indicated by broken lines in FIG. 83, e.g. if the magnetic field rotational speed VF is increased and the second motor rotational speed VM2 is decreased, with respect to the second rotor rotational speed VR2 and the first element rotational speed V1, it is possible to transmit the power from the prime mover to the driven parts while steplessly reducing the speed thereof. Inversely, as indicated by one-dot chain lines in FIG. 83, if the magnetic field rotational speed VF is decreased and the second motor rotational speed VM2 is increased, with respect to the second rotor rotational speed VR2 and the first element rotational speed V1, it is possible to transmit the power from the prime mover to the driven parts while steplessly increasing the speed thereof.

On the other hand, FIG. 84 schematically shows an example of how power is transmitted from the prime mover of the aforementioned second power plant to the driven parts. It should be noted that the method of indicating the connecting relationship between the respective elements in FIG. 84 is the same as the method employed in FIG. 82. In the second power plant, the power from the prime mover is transmitted to the driven parts e.g. as follows: Electric power is generated by the second generator-motor using part of the power from the prime mover under the control of the first and second controllers, and the generated electric power is supplied to the stator of the first generator-motor. During the electric power generation by the second generator-motor, as shown in FIG. 84, part of the power from the prime mover is transmitted to the second element connected to the prime mover, and is distributed to the first and third elements. The power distributed to the first element is transmitted to the driven parts, while the power distributed to the third element is transmitted to the second generator-motor so as to be converted into electric power, and is then supplied to the stator. Further, the remainder of the power from the prime mover is transmitted to the first rotor.

Furthermore, when the electric power from the second generator-motor is supplied to the stator, as described above, the electric power is converted into power, and is then transmitted to the second rotor via the magnetic circuits. In accordance therewith, the remainder of the power from the prime mover transmitted, as described above, to the first rotor is transmitted to the second rotor via the magnetic circuits. That is, the electric power (energy) supplied to the stator and the power (energy) transmitted to the first rotor are combined to be transmitted to the second rotor. The power transmitted to the second rotor is transmitted to the driven parts. As a result, power equal in magnitude to the power from the prime mover is transmitted to the driven parts.

As described above, also in the second power plant, similarly to the above-described first power plant, the power from the prime mover is transmitted to the driven parts without being recirculated, and hence it is possible to reduce power passing through the first generator-motor, the distributing and combining device and the second generator-motor. Therefore, similarly to the first power plant, it is possible to reduce the sizes of the first generator-motor, the distributing and combining device and the second generator-motor, thereby making it possible to attain reduction of the size and manufacturing costs of the second power plant and enhance the driving efficiency of the second power plant. Further, the first power plant and the second power plant are only different in that the distributing and combining of power in the first generator-motor and the distributing and combining device are in an opposite relationship, and hence also in the second power plant, as shown in FIG. 84, the power from the prime mover is transmitted to the driven parts in a divided state via the above-described first to third paths. Therefore, similarly to the first power unit, it is possible to reduce the sizes of the first and second controllers, thereby making it possible to attain further reduction of the size and manufacturing costs of the second power plant.

Furthermore, also in the second power plant, similarly to the first power unit, when power is transmitted to the driven parts, as described above, by controlling the magnetic field rotational speed VF and the second motor rotational speed VM2 using the first and second controllers, respectively, it is possible to transmit the power from the prime mover to the driven parts while steplessly changing the speed of the power. More specifically, in the second power plant, the relationship between the rotational speed of the prime mover, the speed of the driven parts, the magnetic field rotational speed VF, the first and second rotor rotational speeds VR1 and VR2, the first to third element rotational speeds V1 to V3, and the second motor rotational speed VM2 are indicated e.g. by thick solid lines in FIG. 85. Therefore, as indicated by broken lines in the figure, e.g. if the second motor rotational speed VM2 is increased and the magnetic field rotational speed VF is decreased, with respect to the second element rotational speed V2 and the first rotor rotational speed VR1, it is possible to transmit the power from the prime mover to the driven parts while steplessly reducing the speed thereof. Inversely, as indicated by one-dot chain lines in FIG. 85, if the second motor rotational speed VM2 is decreased and the magnetic field rotational speed VF is increased, with respect to the second element rotational speed V2 and the first rotor rotational speed VR1, it is possible to transmit the power from the prime mover to the driven parts while steplessly increasing the speed thereof.

Further, as described above, the first generator-motor has functions as a combination of a general generator-motor and a general planetary gear unit, so that the first planetary gear unit for distributing and combining the power from the power plant as recited in claim 6 can be dispensed with. Therefore, in both of the first and second power plants, compared with the power plant as claimed in claim 6, it is possible to reduce the number of component parts to thereby reduce the size of the power plant. Furthermore, in the power plant as recited in claim 6, transmission of power to the driven parts is performed via the first planetary gear unit, which causes power transmission losses due to the meshing of gears of the first planetary gear unit. According to the present invention, as described hereinabove, the input and output of energy between the stator, the first rotor and the second rotor is performed via the magnetic circuits in a non-contacting manner, i.e. by a so-called magnetic path. Therefore, there occur no power transmission losses in the planetary gear unit, as described above. This makes it possible to further enhance the driving efficiency of the power plant in both of the first and second power plants.

Further, as described concerning the operation of claim 3, when a belt-type stepless transmission is used for changing the speed of power, as described above, to transmit relatively large torque, it is required to employ a large-sized stepless transmission, which causes an increase in the size of the power plant. Further, as described hereinabove concerning the operation of claim 3, the first and second generator-motors are larger than the belt-type stepless transmission in torque capacity with respect to the size. According to the present invention, the first and second generator-motors as described above are used to change the speed of the power from the prime mover, and hence compared with the case in which a stepless transmission is used, it is possible to downsize both of the first and second power plants.

Further, as described hereinabove concerning the operation of claim 5, energy conversion between rotational power and electric energy can be performed more efficiently with smaller losses of energy than energy conversion e.g. between rotational power and pressure energy. Therefore, according to the present invention, it is possible to enhance the driving efficiency of both the first and second power plants. Furthermore, as described hereinabove concerning the operation of claim 5, electric energy can be controlled with higher responsiveness and accuracy than pressure energy and the like. Therefore, according to the present invention, in both of the first and second power plants, when the power from the prime mover is transmitted to the driven parts using the first and second generator-motors, as described above, conversion between power and electric power can be performed accurately by the first and second generator-motors, which makes it possible to properly perform the above transmission of the power.

On the other hand, as described hereinabove concerning the operation of claim 5, when rotational power is transmitted by a so-called electrical path in which the rotational power is once converted into electric energy and then the electric power is converted into rotational power again, loss by generation of Joule heat occurs to make the transmission efficiency via this path lower than that via a so-called mechanical path e.g. via gears, and a so-called magnetic path via magnetism. According to the present invention, as described above, in both of the first and second power plants, it is possible to reduce power transmitted to the driven parts via the first and second controllers and the second generator-motor, i.e. by the electrical path. This makes it possible to further enhance the driving efficiency.

Further, according to the present invention, it is possible not only to drive the driven parts using the power from the prime mover, as described above, but also to drive the driven parts using the power from the first generator-motor and the second generator-motor.

The invention as claimed in claim 9 is the power plant 1C to 1R as claimed in claim 8, further comprising an electric power storage device (battery 63) that is configured to be capable of being charged and discharged and is electrically connected to the stator and the second generator-motor 50 via the first and second controllers, respectively.

With this arrangement, the electric power storage device capable of being charged and discharged is connected to the stator and the second generator-motor. Therefore, for example, similarly to the power plant as claimed in claim 4, when a heat engine is used as the prime mover, it possible to obtain the optimum fuel economy of the heat engine. More specifically, when demanded power demanded for driving the driven parts is smaller than the optimum fuel economy power that will make it possible to obtain optimum fuel economy of the heat engine, it is possible to control the power from the heat engine such that the optimum fuel economy can be obtained, and convert surplus power from the heat engine into electric power by the first or second generator-motor to charge the electric power into the electric power storage device. Inversely, when the demanded power is larger than the optimum fuel economy power, it is possible to control the power from the heat engine such that the optimum fuel economy can be obtained, and input the electric power charged in the above-described electric power storage device to the driven parts as rotational power via the first generator-motor and/or the second generator-motor, to thereby make up for shortage of power. From the above, the optimum fuel economy of the heat engine can be obtained, and therefore it is possible to further enhance the driving efficiency of the power plant.

Further, as described concerning the operation of claim 5, when electric energy is stored, and when the stored electric energy is taken out by releasing the same, it is possible to more accurately control the stored and released electric energy, than when pressure energy is stored and released, for example. Therefore, according to the present invention, it is possible to accurately store and release the electric energy for obtaining the optimum fuel economy, as described hereinabove. Furthermore, as described concerning the operation of claim 5, when electric energy is stored and released, energy loss is smaller than when pressure energy is stored and released, for example. Therefore, according to the present invention, it is possible to efficiently perform the charging and releasing operations of electric energy for obtaining the optimum fuel economy, as described above.

The invention as claimed in claim 10 is the power plant 1D, 1L as claimed in claim 8 or 9, further comprising a transmission 240, 300 disposed between the other of the pair of the first rotor and the second element and the pair of the second rotor and the first element, and the driven parts, for transmitting power from the other to the driven parts while changing the speed of the power.

With this arrangement, the power from the other pair (hereinafter referred to as "the driven part-connecting element") of the pair of the first rotor and the second element, and the pair of the second rotor and the first element is transmitted to the driven parts while having the speed of the power changed by the transmission. Therefore, for example, when load on the driven parts is very large, and hence torque transmitted to the driven parts is too large, by controlling the transmission gear ratio of the transmission to be decreased, torque transmitted from the driven part-connecting element to the transmission can be made smaller with respect to the torque transmitted from the transmission to the driven parts. This makes it possible to downsize the first or second rotor, which in turn makes it possible to reduce the size and costs of the first generator-motor.

Further, for example, in both of a case where the first element is connected to the driven parts and a case where the second element is connected to the driven parts, it is possible to reduce the sizes and costs of the second generator-motor and the distributing and combining device. More specifically, in the case where the first element is connected to the driven parts (see FIG. 84), when the load on the driven parts is very large, the transmission gear ratio of the transmission is controlled to be decreased, whereby torque transmitted from the first element to the transmission is made smaller with respect to the torque transmitted from the transmission to the driven parts. This makes it possible to make smaller torque distributed to the first and third elements via the second element, and hence it is possible to reduce the size and costs of the distributing and combining device. Further, as the torque distributed to the third element becomes smaller, torque transmitted from the third element to the second generator-motor can be made smaller, and hence it is possible to reduce the size and costs of the second generator-motor.

Furthermore, for example, in the case where the second element is connected to the driven parts (see FIG. 82), when the load on the driven parts is very large, by controlling the transmission gear ratio of the transmission to be decreased, torque transmitted from the second generator-motor to the transmission via the third and second elements can be made smaller with respect to the torque transmitted from the transmission to the driven parts. This makes it possible to reduce the sizes and costs of the second generator-motor and the distributing and combining device.

Further, for example, when the speed of the driven parts is very high, by controlling the transmission gear ratio of the transmission to be increased, it is possible to lower the first or second rotor rotational speed VR1 or VR2 with respect to the speed of the driven parts, so that it is possible to prevent failure of the first generator-motor due to an excessive increase in the first or second rotor rotational speed VR1 or VR2. In the case where the first rotor is connected to the driven parts, the above-mentioned inconveniences liable to occur, since the first rotor is formed by magnets and the magnets are lower in strength than soft magnetic material elements, as described hereinabove. Therefore, the above-mentioned control is particularly effective.

Furthermore, in the case where the second element is connected to the driven parts, when the speed of the driven parts is higher than the rotational speed of the prime mover, as is clear from the above-described FIG. 83 speed relationship, the second motor rotational speed VM2 sometimes becomes too high. Therefore, in such a case, for example, by controlling the transmission gear ratio of the transmission to be increased, to thereby lower the second element rotational speed V2 with respect to the speed of the driven parts, it is possible to lower the second motor rotational speed VM2, as is clear from FIG. 83, so that it is possible to prevent failure of the second generator-motor due to an excessive increase in the second motor rotational speed VM2.

Further, in the case where the first element is connected to the driven parts, when the rotational speed of the prime mover is higher than the speed of the driven parts, as is clear from the above-described FIG. 85 speed relationship, the second motor rotational speed VM2 sometimes becomes too high. Therefore, in such a case, for example, by controlling the transmission gear ratio of the transmission to be decreased, to thereby increase the first element rotational speed V1 with respect to the speed of the driven parts, it is possible to lower the second motor rotational speed VM2, as is clear from FIG. 85. This makes it possible to prevent failure of the second generator-motor due to an excessive increase in the second motor rotational speed VM2.

Furthermore, for example, by controlling the transmission gear ratio of the transmission, it is possible to control the first or second rotor rotational speed VR1 or VR2 to an appropriate magnitude with respect to the speed of the driven parts, whereby it is possible to obtain high efficiency of the first generator-motor. Further, by controlling the transmission gear ratio of the transmission, the second or first element rotational speed V2 or V1 is increased or decreased with respect to the speed of the driven parts, whereby as is clear from FIG. 83 and FIG. 85, the second motor rotational speed VM2 can be controlled to an appropriate magnitude, thereby making it possible to obtain high efficiency of the second generator-motor.

Further, for example, as described concerning the operation of claim 8, by using the first and second generator-motors, it is possible to transmit the power from the prime mover to the driven parts while steplessly changing the speed thereof, and hence it is possible to reduce the frequency of the speed-changing operation of the transmission. This makes it possible to enhance the driving efficiency of the power plant for the following reason: When the rotational speed of the prime mover is decreased by changing the speed of the power from the prime mover by the transmission, energy based on the decreased amount of the rotational speed and the inertias of the prime mover and the transmission is lost by heat losses, whereby as the frequency of the speed-changing operation of the transmission becomes higher, the driving efficiency of the power plant becomes lower.

The invention as claimed in claim 11 is the power plant 1E, 1M as claimed in claim 8 or 9, further comprising a transmission 250, 310 disposed between the first output portion of the prime mover and the one of the pair of the first rotor and the second element and the pair of the second rotor and the first element, for transmitting power from the first output portion to the one while changing the speed of the power.

With this arrangement, the power from the first output portion of the prime mover is transmitted to the one pair (hereinafter referred to as "the prime mover-connecting element") of the pair of the first rotor and the second element and the pair of the second rotor and the first element while having the speed of the power changed by the transmission. Therefore, by controlling the transmission gear ratio of the transmission to be increased, for example, it is possible to make smaller the torque input from the first output portion of the prime mover to the prime mover-connecting element, thereby making it possible to reduce the sizes and costs of the first generator-motor, the distributing and combining device and the second generator-motor.

Further, when the rotational speed of the prime mover is very high, by controlling the transmission gear ratio of the transmission to be decreased, the first or second rotor rotational speed VR1 or VR2 can be lowered with respect to the rotational speed of the prime mover, so that it is possible to prevent failure of the first generator-motor due to an excessive increase in the first or second rotor rotational speed VR1 or VR2. In the case where the first rotor is connected to the first output portion of the prime mover, the above-mentioned inconveniences liable to occur since the first rotor is formed by magnets, and hence the above control is particularly effective.

Further, for example, in both of the case where the second element is connected to the first output portion of the prime mover and the case where the first element is connected to the first output portion of the prime mover, it is possible to prevent failure of the second generator-motor due to an excessive increase in the second motor rotational speed VM2. More specifically, in the case where the first element is connected to the first output portion of the prime mover, when the speed of the driven parts is higher than the rotational speed of the prime mover, as is clear from FIG. 83, the second motor rotational speed VM2 sometimes becomes too high. Therefore, in such a case, for example, by controlling the transmission gear ratio of the transmission to be increased, to thereby increase the first element rotational speed V1 with respect to the rotational speed of the prime mover, it is possible, as is clear from FIG. 83, to lower the second motor rotational speed VM2, so that it is possible to prevent failure of the second generator-motor due to an excessive increase in the second motor rotational speed VM2.

Further, in the case where the second element is connected to the first output portion of the prime mover, when the rotational speed of the prime mover is higher than the speed of the driven parts, as is clear from FIG. 85, the second motor rotational speed VM2 sometimes becomes too high. Therefore, in such a case, for example, by controlling the transmission gear ratio of the transmission to be decreased to thereby lower the second element rotational speed V2 with respect to the rotational speed of the prime mover, it is possible, as is clear from FIG. 85, to lower the second motor rotational speed VM2, so that it is possible to prevent failure of the second generator-motor due to an excessive increase in the second motor rotational speed VM2.

Furthermore, for example, by controlling the transmission gear ratio of the transmission, it is possible to control the first or second rotor rotational speed VR1 or VR2 to an appropriate magnitude with respect to the rotational speed of the prime mover, whereby it is possible to obtain high efficiency of the first generator-motor. Further, by controlling the transmission gear ratio of the transmission, the first or second element rotational speed V1 or V2 is increased or decreased with respect to the rotational speed of the prime mover, whereby as is clear from FIG. 83 and FIG. 85, the second motor rotational speed VM2 can be controlled to an appropriate magnitude, thereby making it possible to obtain high efficiency of the second generator-motor.

Further, in a case where the prime mover is connected to the driven parts via a gear-type stepped transmission, during a speed-changing operation until a gear train is connected for a shift to a desired transmission gear ratio, the prime mover and the driven parts are disconnected from each other by the stepped transmission, whereby the power from the prime mover is not transmitted, which is liable to cause a speed-change shock, such as a sudden decrease in torque. According to the present invention, for example, the other of the pair of the first rotor and the second element and the pair of the second rotor and the first element can be connected to the driven parts without via the above stepped transmission. Therefore, even when the stepped transmission is used as a transmission that transmits power from the first output portion of the prime mover to the prime mover-connecting element, the above-described speed-change shock can be suppressed during the speed-changing operation of the transmission by the following operation:

In the case where the second rotor and the first element are connected to the first output portion of the prime mover and the second rotor and the first element are connected to each other, when the first output portion of the prime mover and the second rotor and the first element are disconnected from each other by the speed-changing operation of the transmission, electric power is supplied to the stator of the first generator-motor and the second generator-motor. As a consequence, based on the aforementioned relationship between the input of energy and the output of energy in the first generator-motor, torque from the stator, and torque, as described hereafter, transmitted to the first rotor are combined, and then the combined torque is transmitted to the second rotor. Since the second rotor and the first element are connected to each other as mentioned above, the torque transmitted to the second rotor is transmitted to the first element, and is combined with torque transmitted from the second generator-motor to the third element, and then the combined torque is transmitted to the second element. Part of the torque transmitted to the second element is transmitted to the driven parts, and the remainder thereof is transmitted to the first rotor via the driven parts. As described above, during the speed-changing operation of the transmission, torque can be transmitted from the first and second generator-motors to the driven parts, and hence it is possible to suppress speed-change shock, thereby making it possible to improve marketability.

The above effects can be obtained also when the first rotor and the second element are connected to the first output portion of the prime mover, and the first rotor and the second element are connected to each other. More specifically, in this case, when electric power is supplied to the stator and the second generator-motor, torque from the second generator-motor is transmitted to the third element and is combined with torque transmitted to the first element, as described hereinafter. The combined torque is transmitted to the second element. Since the first rotor and the second element are connected to each other, the torque transmitted to the second element is transmitted to the first rotor to be combined with torque from the stator, and is then transmitted to the second rotor. Part of the torque transmitted to the second rotor is transmitted to the driven parts, and the remainder thereof is transmitted to the first element via the driven parts. Therefore, in this case as well, during the speed-changing operation of the transmission, it is possible to suppress a speed-change shock, thereby making it possible to improve marketability.

The invention as claimed in claim 12 is the power plant 1F as claimed in claim 8 or 9, wherein the second rotor (A2 rotor 223) and the first element (second sun gear 31, second ring gear 32) are mechanically connected to the first output portion of the prime mover, and the first rotor (A1 rotor 221) and the second element (second carrier 34) are mechanically connected to the driven parts, the power plant further comprising a transmission 260 disposed between the first rotor and the driven parts, for transmitting power from the first rotor to the driven parts while changing the speed of the power.

With this arrangement, the second rotor and the first element are mechanically connected to the first output portion of the prime mover, and the first rotor and the second element are mechanically connected to the driven parts. The transmission transmits the power from the first rotor to the driven parts while changing the speed of the power. Therefore, e.g. during transmission of power to the driven parts, described above with reference to FIG. 82, when the load on the driven parts is very large, by controlling the transmission gear ratio of the transmission to be decreased, torque transmitted from the first rotor to the transmission can be made smaller with respect to the torque transmitted from the transmission to the driven parts. This makes it possible to downsize the first rotor to reduce the size and costs of the first generator-motor.

Further, for example, when the speed of the driven parts is very high, by controlling the transmission gear ratio of the transmission to be increased, it is possible to lower the first rotor rotational speed VR1 with respect to the speed of the driven parts, so that it is possible to prevent failure of the first generator-motor due to an excessive increase in the first rotor rotational speed VR1. The above-mentioned inconveniences are liable to occur since the first rotor is formed by magnets, as described hereinabove, and hence, this control is particularly effective. Furthermore, by controlling the transmission gear ratio of the transmission, the first rotor rotational speed VR1 can be controlled to an appropriate magnitude with respect to the speed of the driven parts, whereby it is possible to obtain high efficiency of the first generator-motor.

Further, as described concerning the operation of claim 11, when the prime mover is connected to the driven parts via a gear-type stepped transmission, during the speed-changing operation of the transmission, a speed-change shock is liable to occur. According to the present invention, for example, the second element can be connected to the driven parts without via such a stepped transmission and therefore, even when the stepped transmission is used as a transmission for transmitting power from the first rotor to the driven parts, during the speed-changing operation of the transmission, part of torque from the prime mover can be transmitted to the driven parts via the first and second elements, as is clear from FIG. 82. Therefore, since the above-described speed-change shock can be suppressed, it is possible to improve marketability.

Further, for example, as described concerning the operation of claim 8, by using the first and second generator-motors, it is possible to transmit the power from the prime mover to the driven parts while steplessly changing the speed thereof, and hence it is possible to reduce the frequency of the speed-changing operation of the transmission. This makes it possible to enhance the driving efficiency of the power plant, similarly to the power plant as claimed in claim 10.

The invention as claimed in claim 13 is the power plant 1G as claimed in claim 8 or 9, wherein the second rotor (A2 rotor 223) and the first element (second sun gear 31, second ring gear 32) are mechanically connected to the first output portion of the prime mover, and the first rotor (A1 rotor 221) and the second element (second carrier 34) are mechanically connected to the driven parts, the power plant further comprising a transmission 270 disposed between the second output portion (second rotor 52) of the second generator-motor 50 and the third element (second ring gear 32, second sun gear 31), for transmitting power from the second output portion to the third element while changing the speed of the power.

With this arrangement, the second rotor and the first element are mechanically connected to the first output portion of the prime mover, and the first rotor and the second element are mechanically connected to the driven parts. The transmission transmits the power from the second output portion of the second generator-motor to the third element while changing the speed of the power. Therefore, e.g. during the transmission of power to the driven parts, described above with reference to FIG. 82, when the load on the driven parts is very large, by controlling the transmission gear ratio of the transmission to be decreased, torque transmitted from the second generator-motor to the transmission can be made smaller with respect to the torque transmitted from the transmission to the driven parts via the third and second elements. This makes it possible to reduce the size and costs of the second generator-motor.

Further, when the speed of the driven parts is higher than the rotational speed of the prime mover, as is clear from FIG. 83, the second motor rotational speed VM2 sometimes becomes too high. Therefore, in such a case, for example, by controlling the transmission gear ratio of the transmission such that it is increased, it is possible to lower the second motor rotational speed VM2 with respect to the third element rotational speed V3 which is determined by the relationship between the speed of the driven parts and the rotational speed of the prime mover, so that it is possible to prevent failure of the second generator-motor due to an excessive increase in the second motor rotational speed VM2. Furthermore, by controlling the transmission gear ratio of the transmission, the second motor rotational speed VM2 can be controlled to an appropriate magnitude with respect to the third element rotational speed V3 which is determined by the relationship between the speed of the driven parts and the rotational speed of the prime mover, assumed at the time, thereby making it possible to obtain high efficiency of the second generator-motor.

Further, as described concerning the operation of claim 11, when the prime mover is connected to the driven parts via a gear-type stepped transmission, during the speed-changing operation of the transmission, a speed-change shock is liable to occur. According to the present invention, for example, the first rotor can be connected to the driven parts without via such a stepped transmission and therefore, even when the stepped transmission is used as a transmission for transmitting power from the second generator-motor to the third element, during the speed-changing operation of the transmission, part of torque from the prime mover can be transmitted to the driven parts via the second and first rotors, as is clear from FIG. 82. Therefore, the above-described speed-change shock can be suppressed, which makes it possible to improve marketability.

Further, for example, as described concerning the operation of claim 8, by using the first and second generator-motors, the power from the prime mover can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 14 is the power plant 1H as claimed in claim 8 or 9, wherein the second rotor (A2 rotor 223) and the first element (second sun gear 31, second ring gear 32) are mechanically connected to the first output portion of the prime mover, and the first rotor (A1 rotor 221) and the second element (second carrier 34) are mechanically connected to the driven parts, the power plant further comprising a transmission 280 disposed between the second element and the driven parts, for transmitting power from the second element to the driven parts while changing the speed of the power.

With this arrangement, the second rotor and the first element are mechanically connected to the first output portion of the prime mover, and the first rotor and the second element are mechanically connected to the driven parts. The transmission transmits power from the second element to the driven parts while changing the speed of the power. Therefore, e.g. during the transmission of power to the driven parts, described above with reference to FIG. 82, when the load on the driven parts is very large, the transmission gear ratio of the transmission is controlled to be decreased, whereby torque transmitted from the second element to the transmission can be made smaller with respect to the torque transmitted from the transmission to the driven parts, which in turn makes it possible to make smaller the torque combined via the first and third elements of the distributing and combining device. Therefore, it is possible to reduce the sizes and costs of the distributing and combining device and the second generator-motor.

Further, when the speed of the driven parts is higher than the rotational speed of the prime mover, as is clear from FIG. 83, the second motor rotational speed VM2 sometimes becomes too high. Therefore, in such a case, for example, by controlling the transmission gear ratio of the transmission such that it is increased, it is possible to lower the second element rotational speed V2 with respect to the speed of the driven parts, thereby making it possible to lower the second motor rotational speed VM2, as is clear from FIG. 83. Therefore, it is possible to prevent failure of the second generator-motor due to an excessive increase in the second motor rotational speed VM2. Furthermore, by controlling the transmission gear ratio of the transmission, for example, the second element rotational speed V2 is increased or decreased with respect to the speed of the driven parts, whereby as is clear from FIG. 83, the second motor rotational speed VM2 can be controlled to an appropriate magnitude, thereby making it possible to obtain high efficiency of the second generator-motor.

Further, as described concerning the operation of claim 11, when the prime mover is connected to the driven parts via a gear-type stepped transmission, during the speed-changing operation of the transmission, a speed-change shock is liable to occur. According to the present invention, for example, the first rotor can be connected to the driven parts without via such a stepped transmission and therefore, even when the stepped transmission is used as a transmission for transmitting power from the second element to the driven parts, it is possible, as is clear from FIG. 82, to transmit part of torque from the prime mover to the driven parts via the second and first rotors, during the speed-changing operation of the transmission. Therefore, since the above-described speed-change shock can be suppressed, it is possible to improve marketability.

Further, for example, as described concerning the operation of claim 8, by using the first and second generator-motors, the power from the prime mover can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 15 is the power plant 1I as claimed in claim 8 or 9, wherein the second rotor (A2 rotor 223) and the first element (second sun gear 31, second ring gear 32) are mechanically connected to the first output portion of the prime mover, and the first rotor (A1 rotor 221) and the second element (second carrier 34) are mechanically connected to the driven parts, the power plant further comprising a planetary gear unit (third planetary gear unit 290) having a sun gear (third sun gear 291), a ring gear (third ring gear 292), and a carrier (third carrier 294) rotatably supporting planetary gears (third planetary gears 293) in mesh with the sun gear and the ring gear, a first clutch C1, and a second clutch C2, wherein one of the sun gear and the ring gear is mechanically connected to the second element, wherein the carrier is mechanically connected to the third element (second ring gear 32, second sun gear 31) and is mechanically connected to the second output portion (second rotor 52) of the second generator-motor via the first clutch C1, and wherein the other of the sun gear and the ring gear is mechanically connected to the second output portion via the second clutch C2.

With this arrangement, the second rotor and the first element are mechanically connected to the first output portion of the prime mover, and the first rotor and the second element are mechanically connected to the driven parts. Further, one of the sun gear and the ring gear of the planetary gear unit (hereinafter referred to as "the one gear") is mechanically connected to the second element connected to the driven parts, and the carrier is mechanically connected to the third element. The carrier is mechanically connected to the second output portion of the second generator-motor via the first clutch. Furthermore, the other of the sun gear and the ring gear (hereinafter referred to as "the other gear") is mechanically connected to the second output portion of the second generator-motor via the second clutch.

Now, let it be assumed that the rotational speed of the one gear is the first gear rotational speed VG1, the rotational speed of the other gear is the second gear rotational speed VG2, and the rotational speed of the carrier is the carrier rotational speed VC. In the above-described connecting relationship, when the elements are directly connected to each other, and at the same time the first clutch is engaged to thereby connect the second output portion of the second generator-motor to the carrier while the second clutch is disengaged to thereby disconnect between the second output portion and the other gear (hereinafter, such a first clutch-engaged and second clutch-disengaged state is referred to as "the first speed change mode"), the relationship between the rotational speed of the prime mover, the speed of the driven parts, and the like is expressed e.g. as shown in FIG. 86(a). Further, when the first clutch is disengaged to thereby disconnect between the second output portion of the second generator-motor and the carrier while the second clutch is engaged to thereby connect the second output portion to the other gear (hereinafter, such a first clutch-disengaged and second clutch-engaged state is referred to as "the second speed change mode"), the relationship between the rotational speed of the prime mover, the speed of the driven parts, and the like is expressed e.g. as shown in FIG. 86(b).

As is clear from comparison between FIGS. 86(a) and 86(b), in the speed diagrams, the distance between a vertical line representing the speed of the driven parts and a vertical line representing the second motor rotational speed VM2 is shorter in the first speed change mode than in the second speed change mode, and therefore a ratio (D2/D1) between a speed difference D2 between the second output portion of the second generator-motor and the driven parts and a speed difference D1 between the driven parts and the prime mover is smaller in the first speed change mode.

On the other hand, when the speed of the driven parts is higher than the rotational speed of the prime mover, the second motor rotational speed VM2 becomes higher than the speed of the driven parts, and sometimes becomes too high. Therefore, in such a case, for example, by using the first speed change mode, as is clear from the relationship of the above-described ratio between the speed differences D1 and D2, the second motor rotational speed VM2 can be made smaller than when the second speed change mode is used, and hence it is possible to prevent failure of the second generator-motor due to an excessive increase in the second motor rotational speed VM2.

Further, as described heretofore, the rotating magnetic field and the first and second rotors rotate while holding the linear speed relationship in which the difference between the rotational speed of the rotating magnetic field and that of the second rotor and the difference between the rotational speed of the second rotor and that of the first rotor are equal to each other. Therefore, in the speed diagrams (collinear charts) shown in FIG. 86, the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is 1:1. Furthermore, let it be assumed that the distance from a vertical line representing the first gear rotational speed VG1 to a vertical line representing the carrier rotational speed VC is represented by α, and the distance from a vertical line representing the carrier rotational speed VC to a vertical line representing the second gear rotational speed VG2 is represented by β. In this case, assuming that out of torques transmitted during the transmission of power to the driven parts, described above with reference to FIG. 82, torque from the prime mover and torque from the second generator-motor are represented by TPM and T2, respectively, torque transmitted to the driven parts is driven part transmitting torque TOUT, and torque equivalent to electric power generated by the stator and the rotating magnetic field is power-generating equivalent torque TE1, during the first speed change mode, the relationship between the torques TPM, TOUT, TE1 and T2 is expressed e.g. by the following equations (A) and (B):

$$TPM + T2 = TOUT + TE1 \quad (A)$$

$$T2 = (2 \times TOUT - TPM)/(2+\alpha) \quad (B)$$

On the other hand, during the second speed change mode, the relationship between the torque TPM of the prime mover, the driven part transmitting torque TOUT, the power-generating equivalent torque TE1, and the torque T2 of the second generator-motor is expressed e.g. by the following equations (C) and (D):

$$TPM + T2 = TOUT + TE1 \quad (C)$$

$$T2 = (2 \times TOUT - TPM)/(2+\alpha+\beta) \quad (D)$$

As is clear from comparison between the above-described equations (B) and (D), the torque T2 of the second generator-motor is smaller in the second speed change mode with respect to the torque TPM of the prime mover and the driven part transmitting torque TOUT having respective identical magnitudes. Therefore, for example, when load on the driven parts, that is, the driven part transmitting torque TOUT is very large, by using the second speed change mode, it is possible to make smaller the torque T2 of the second generator-motor, which in turn makes it possible to reduce the size and costs of the second generator-motor.

Further, for example, by selecting the first or second speed change mode according to the rotational speed of the prime mover and the speed of the driven parts, it is possible to control the second motor rotational speed VM2 to an appropriate magnitude, thereby making it possible to obtain high efficiency of the second generator-motor. Furthermore, by performing switching between the first and second speed change modes when the carrier rotational speed VC and the second gear rotational speed VG2 are equal to each other, as shown in FIG. 87, it is possible to smoothly perform the switching while maintaining the respective rotations of the driven parts and the prime mover, thereby making it possible to ensure excellent drivability.

Further, for example, the first rotor can be connected to the driven parts without via the gear-type stepped transmission, whereby during switching between the first and second speed change modes, even if both the first and second clutches are disengaged to disconnect between the second generator-motor and the driven parts, as is clear from FIG. 82, part of the torque TPM of the prime mover can be transmitted to the driven parts via the second and first rotors. Therefore, during switching between the first and second speed change modes, it is possible to suppress a speed-change shock, thereby making it possible to enhance marketability.

The invention as claimed in claim 16 is the power plant 1N as claimed in claim 8 or 9, wherein the first rotor (B1 rotor 231) and the second element (first carrier 24) are mechanically connected to the first output portion of the prime mover, and the second rotor (B2 rotor 233) and the first element (first sun gear 21, first ring gear 22) are mechanically connected to the driven parts, the power plant further comprising a transmission 320 disposed between the second output portion (first rotor 42) of the second generator-motor (first generator-motor 40) and the third element (first ring gear 22, first sun gear 21), for changing the speed of power transmitted between the second output portion and the third element.

With this arrangement, the first rotor and the second element are mechanically connected to the first output portion of the prime mover, and the second rotor and the first element are mechanically connected to the driven parts, the transmission changing the speed of the power transmitted between the second output portion of the second generator-motor and the third element. Therefore, e.g. during transmission of power to the driven parts, described above with reference to FIG. 84, when the load on the driven parts is very large, so that very large torque is transmitted to the second generator-motor via the distributing and combining device, the transmission gear ratio of the transmission is controlled in a direction in which power transmitted to the second generator-motor is increased. This makes it possible to make smaller the torque transmitted from the transmission to the second generator-motor with respect to torque transmitted from the third element to the transmission, and hence it is possible to reduce the size and costs of the second generator-motor.

Further, in this case, even when the speed-changing operation as described above is performed by the transmission, the magnitude itself of power transmitted from the third element to the second generator-motor is not changed, and when electric power generated by the second generator-motor is transmitted as power to the second rotor via the stator, the torque transmitted to the driven parts via the second rotor can be controlled to a desired magnitude, so that it is possible to transmit torque having a sufficient magnitude to the driven parts.

Furthermore, when the rotational speed of the prime mover is higher than the speed of the driven parts, as is clear from FIG. 85, the second motor rotational speed VM2 sometimes becomes too high. Therefore, in such a case, for example, if the transmission gear ratio of the transmission is controlled in a direction in which power transmitted to the second generator-motor is decreased, the second motor rotational speed VM2 can be lowered with respect to the third element rotational speed V3 which is determined by the relationship between the rotational speed of the prime mover and the speed of the driven parts, assumed at the time, so that it is possible to prevent failure of the second generator-motor due to an excessive increase in the second motor rotational speed VM2. Further, by controlling the transmission gear ratio of the transmission, the second motor rotational speed VM2 can be controlled to an appropriate magnitude with respect to the third element rotational speed V3 which is determined by the relationship between the rotational speed of the prime mover and the speed of the driven parts, assumed at the time, thereby making it possible to obtain high efficiency of the second generator-motor.

Further, during the transmission of power to the driven parts, described above with reference to FIG. 84, the torque from the prime mover transmitted to the second element is transmitted to the driven parts via the first element by using load torque acting on the third element along with electric power generation by the second generator-motor, as a reaction. Therefore, when the gear-type stepped transmission is used as the transmission according to the present invention, the third element and the second generator-motor are disconnected from each other by the speed-changing operation of the transmission, whereby the load torque from the second generator-motor ceases to act on the third element. As a consequence, the torque transmitted from the prime mover via the second and first elements becomes very small. According to the present invention, the second rotor can be connected to the driven parts without via the gear-type stepped transmission, for example, whereby during the speed-changing operation of the transmission, as is clear from FIG. 84, part of the torque from the prime mover can be transmitted to the driven parts via the first and second rotors. This makes it possible to suppress a speed-change shock, such as a sudden decrease in torque, and therefore it is possible to enhance marketability.

Further, for example, as described concerning the operation of claim 8, the power from the prime mover can be transmitted to the driven parts while having the speed thereof steplessly changed by using the first and second generator-motors, and hence it is possible to reduce the frequency of the speed-changing operation of the transmission. This makes it possible to enhance the driving efficiency of the power plant, similarly to the power plant as claimed in claim 10.

The invention as claimed in claim 17 is the power plant 10 as claimed in claim 8 or 9, wherein the first rotor (B1 rotor 231) and the second element (first carrier 24) are mechanically connected to the first output portion of the prime mover, and the second rotor (B2 rotor 233) and the first element (first sun gear 21, first ring gear 22) are mechanically connected to the driven parts, the power plant further comprising a transmission 330 disposed between the first element and the driven parts, for transmitting power from the first element to the driven parts while changing the speed of the power.

With this arrangement, the first rotor and the second element are mechanically connected to the first output portion of the prime mover, and the second rotor and the first element are mechanically connected to the driven parts. The transmission transmits the power from the first element to the driven parts while changing the speed of the power. As a consequence, e.g. during the transmission of power to the driven parts, described above with reference to FIG. 84, when the load on the driven parts is very large, by controlling the transmission gear ratio of the transmission such that it is decreased, the torque transmitted from the first element to the transmission can be made smaller with respect to the torque transmitted from the transmission to the driven parts, whereby similarly to the power plant as claimed in claim 10, it is possible to reduce the sizes and costs of the distributing and combining device and the second generator-motor.

Further, for example, when the rotational speed of the prime mover is higher than the speed of the driven parts, as is clear from FIG. 85, the second motor rotational speed VM2 sometimes becomes too high. Therefore, in such a case, for example, by controlling the transmission gear ratio of the transmission such that it is decreased, and thereby increasing the first element rotational speed V1 with respect to the speed of the driven parts, as is clear from FIG. 85, it is possible to lower the second motor rotational speed VM2, so that it is possible to prevent failure of the second generator-motor due to an excessive increase in the second motor rotational speed VM2. Furthermore, by controlling the transmission gear ratio of the transmission, the first element rotational speed V1 is increased or decreased with respect to the speed of the driven parts, whereby as is clear from FIG. 85, the second motor rotational speed VM2 can be controlled to an appropriate magnitude, thereby making it possible to obtain high efficiency of the second generator-motor.

Further, as described concerning the operation of claim 11, when the prime mover is connected to the driven parts via a gear-type stepped transmission, during the speed-changing operation of the transmission, a speed-change shock is liable to occur. According to the present invention, for example, the second rotor can be connected to the driven parts without via such a stepped transmission, whereby even when the stepped transmission is used as a transmission for transmitting power from the first element to the driven parts, during the speed-changing operation of the transmission, part of torque from the prime mover can be transmitted to the driven parts via the first and second rotors, as is clear from FIG. 84. Therefore, since the above-described speed-change shock can be suppressed, it is possible to improve marketability.

Further, for example, as described concerning the operation of claim 8, the power from the prime mover can be transmitted to the driven parts while having the speed thereof steplessly changed by using the first and second generator-motors, and hence it is possible to reduce the frequency of the speed-changing operation of the transmission. This makes it possible to enhance the driving efficiency of the power plant, similarly to the power plant as claimed in claim 10.

The invention as claimed in claim 18 is the power plant 1P as claimed in claim 8 or 9, wherein the first rotor (B1 rotor 231) and the second element (first carrier 24) are mechanically connected to the first output portion of the prime mover, and the second rotor (B2 rotor 233) and the first element (first sun gear 21, first ring gear 22) are mechanically connected to the driven parts, the power plant further comprising a planetary gear unit (fourth planetary gear unit 340) having a sun gear (fourth sun gear 341), a ring gear (fourth ring gear 342), and a carrier (fourth carrier 344) rotatably supporting planetary gears (fourth planetary gears 343) in mesh with the sun gear and the ring gear, a first clutch (third clutch C3), and a second clutch (fourth clutch C4), wherein one of the sun gear and the ring gear is mechanically connected to the second element, wherein the carrier is mechanically connected to the third element (first ring gear 22, first sun gear 21) and is mechanically connected to the second output portion (first rotor 42) of the second generator-motor (first generator-motor 40) via the first clutch, and wherein the other of the sun gear and the ring gear is mechanically connected to the second output portion via the second clutch.

With this arrangement, the first rotor and the second element are mechanically connected to the first output portion of the prime mover, and the second rotor and the first element are mechanically connected to the driven parts. Further, one of the sun gear and ring gear of the planetary gear unit, that is, the one gear is mechanically connected to the second element connected to the prime mover, and the carrier is mechanically connected to the third element and is mechanically connected to the second output portion of the second generator-motor via the first clutch. Furthermore, the other of the sun gear and the ring gear, that is, the other gear is mechanically connected to the second output portion of the second generator-motor via the second clutch.

Now, similarly to the case as claimed in claim 15, let it be assumed that the rotational speed of the one gear is the first gear rotational speed VG1, the rotational speed of the other gear is the second gear rotational speed VG2, and the rotational speed of the carrier is the carrier rotational speed VC. In the above-described connecting relationship, when the elements are directly connected to each other, and at the same time the first clutch is engaged to thereby connect the second output portion of the second generator-motor to the carrier while the second clutch is disengaged to thereby disconnect between the second output portion and the other gear, the relationship between the rotational speed of the prime mover, the speed of the driven parts, and the like is expressed e.g. as shown in FIG. 88(*a*). Hereinafter, such a first clutch-engaged and second clutch-disengaged state is referred to as "the first speed change mode", similarly to the case as claimed in claim 15. Further, when the first clutch is disengaged to thereby disconnect between the second output portion of the second generator-motor and the carrier while the second clutch is engaged to thereby connect the second output portion to the other gear, the relationship between the rotational speed of the prime mover, the speed of the driven parts, and the like is expressed e.g. as shown in FIG. 88(*b*). Hereinafter, such a first clutch-disengaged and second clutch-engaged state is referred to as "the second speed change mode", similarly to the case as claimed in claim 15.

As is clear from comparison between FIGS. 88(*a*) and 88(*b*), in the speed diagrams, the distance between a vertical line representing the speed of the driven parts and a vertical line representing the second motor rotational speed VM2 is shorter in the first speed change mode than in the second speed change mode, and therefore a ratio (D2/D1) between a speed difference D2 between the second output portion of the second generator-motor and the driven parts and a speed difference D1 between the prime mover and the driven parts is smaller in the first speed change mode. On the other hand, when the rotational speed of the prime mover is higher than the speed of the driven parts, as is clear from FIG. 85, the second motor rotational speed VM2 becomes higher than the speed of the driven parts, and sometimes becomes too high. Therefore, in such a case, for example, by using the first speed change mode, as is clear from the relationship of the above-described ratio between the speed differences D2 and D1, the second motor rotational speed VM2 can be made smaller than when the second speed change mode is used, and hence it is possible to prevent failure of the second generator-motor due to an excessive increase in the second motor rotational speed VM2.

Further, similarly to the case as claimed in claim 15, in the speed diagrams shown in FIG. 88, the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is 1:1. Furthermore, let it be assumed that the distance from a vertical line representing the first gear rotational speed VG1 to a vertical line representing the carrier rotational speed VC is represented by α, and the distance from a vertical line representing the carrier rotational speed VC to a vertical line representing the second gear rotational speed VG2 is represented by β. In this case, let it be assumed that out of torques transmitted during the transmission of power to the driven parts, described above with reference to FIG. 84, torque from the prime mover is represented by TPM, torque transmitted to the driven parts is driven part transmitting torque TOUT, as claimed in claim 15, torque transmitted to the second generator-motor is second generator-motor transmitting torque TE2, and torque equivalent to electric power supplied to the stator and the rotating magnetic field is driving equivalent torque T1. During the first speed change mode, the relationship between the torques TPM, TOUT, T1 and TE2 is expressed e.g. by the following equations (E) and (F):

$$TPM + T1 = TOUT + TE2 \quad (E)$$

$$TE2 = (2 \times TPM - TOUT)/(2+\alpha) \quad (F)$$

On the other hand, during the second speed change mode, the relationship between the torque TPM of the prime mover, the driven part transmitting torque TOUT, the driving equivalent torque T1, and the second generator-motor transmitting torque TE2 is expressed e.g. by the following equations (G) and (H):

$$TPM + T1 = TOUT + TE2 \quad (G)$$

$$TE2 = (2 \times TPM - TOUT)/(2+\alpha+\beta) \quad (H)$$

As is clear from comparison between the above-described equations (F) and (H), the second generator-motor transmitting torque TE2 is smaller in the second speed change mode with respect to the torque TPM of the prime mover and the driven part transmitting torque TOUT having respective identical magnitudes. Therefore, for example, when load on the driven parts, i.e. the driven part transmitting torque TOUT, and the torque TPM of the prime mover are very large, and hence the second generator-motor transmitting torque TE2 becomes very large, by using the second speed change mode, it is possible to make smaller the second generator-motor transmitting torque TE2, thereby making it possible to reduce the size and costs of the second generator-motor.

Further, for example, by selecting the first or second speed change mode according to the rotational speed of the prime mover and the speed of the driven parts, it is possible to control the second motor rotational speed VM2 to an appropriate magnitude, thereby making it possible to obtain high efficiency of the second generator-motor. Furthermore, similarly to the case as claimed in claim 15, by performing switching between the first and second speed change modes when the carrier rotational speed VC and the second gear rotational speed VG2 are equal to each other, it is possible to smoothly perform the switching while maintaining the respective rotations of the driven parts and the prime mover, thereby making it possible to ensure excellent drivability.

Further, similarly to the case as claimed in claim 16, during the transmission of the power from the prime mover to the driven parts, described above with reference to FIG. 84, the torque TPM of the prime mover transmitted to the second element is transmitted to the driven parts via the first element by using load torque acting on the third element along with electric power generation by the second generator-motor, as a reaction. Therefore, during switching between the first and second speed change modes, if both the first and second clutches are disengaged, the third element and the second generator-motor are disconnected from each other, whereby the load torque from the second generator-motor ceases to act on the third element. As a consequence, the torque TPM of the prime mover transmitted via the second and first elements becomes very small. According to the present invention, the second rotor can be connected to the driven parts without via the gear-type stepped transmission, for example, whereby even if both the first and second clutches are disengaged, as is clear from FIG. 84, part of the torque TPM of the prime mover can be transmitted to the driven parts via the first and second rotors. This makes it possible to suppress a speed-change shock, such as a sudden decrease in torque, and therefore it is possible to enhance marketability.

The invention as claimed in claim 19 is the power plant 1Q as claimed in claim 8 or 9, wherein the first rotor (B1 rotor 231) and the second element (first carrier 24) are mechanically connected to the first output portion of the prime mover, and the second rotor (B2 rotor 233) and the first element (first sun gear 21, first ring gear 22) are mechanically connected to the driven parts, the power plant further comprising a transmission 350 disposed between the second rotor and the driven parts, for transmitting power from the second rotor to the driven parts while changing the speed of the power.

With this arrangement, the first rotor and the second element are mechanically connected to the first output portion of the prime mover, and the second rotor and the first element are mechanically connected to the driven parts. The transmission transmits the power from the second rotor to the driven parts while changing the speed of the power. As a consequence, e.g. during the transmission of power to the driven parts, described above with reference to FIG. 84, when the load on the driven parts is very large, by controlling the transmission gear ratio of the transmission such that it is decreased, the torque transmitted from the second rotor to the transmission can be made smaller with respect to the torque transmitted from the transmission to the driven parts, whereby it is possible to downsize the second rotor to reduce the size and costs of the first generator-motor.

Further, for example, when the speed of the driven parts is very high, by controlling the transmission gear ratio of the transmission such that it is increased, it is possible to lower the second rotor rotational speed VR2 with respect to the speed of the driven parts, so that it is possible to prevent failure of the first generator-motor due to an excessive increase in the second rotor rotational speed VR2. Furthermore, by controlling the transmission gear ratio of the transmission, the second rotor rotational speed VR2 can be controlled to an appropriate magnitude with respect to the speed of the driven parts, whereby it is possible to obtain high efficiency of the first generator-motor.

Further, as described concerning the operation of claim 11, when the prime mover is connected to the driven parts via a gear-type stepped transmission, during the speed-changing operation of the transmission, a speed-change shock is liable to occur. According to the present invention, for example, the first element can be connected to the driven parts without via such a stepped transmission and therefore, even when the stepped transmission is used as a transmission for transmitting power from the second rotor to the driven parts, during the speed-changing operation of the transmission, part of torque from the prime mover can be transmitted to the driven parts via the second and first elements, as is clear from FIG. 84. Therefore, since the above-described speed-change shock can be suppressed, it is possible to improve marketability.

Further, for example, as described concerning the operation of claim 8, by using the first and second generator-motors, the power from the prime mover can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 20 is the power plant 1C to 1R as claimed in any one of claims 8 to 19, further comprising a brake mechanism BL for blocking reverse rotation of the first output portion of the prime mover.

With this arrangement, the reverse rotation of the first output portion of the prime mover is blocked by the brake mechanism, and in accordance therewith, one of a pair of the first rotor and the second element, and a pair of the second rotor and the first element, connected to the output portion, is prevented from rotating in one direction. Hereinafter, the operation and effects of the present invention will be described. First, a description is given of the first power plant in which the second rotor and first element are connected to the first output portion of the prime mover, and the first rotor and the second element are connected to the driven parts. Further, the directions of rotations of the second rotor and the first element, blocked by the brake mechanism, are referred to as "the second rotor-blocked direction" and "the second element-blocked direction", respectively. Further, based on the aforementioned relationship between the input of energy and the output of energy in the first generator-motor, by supplying electric power to the stator, and thereby causing a rotating magnetic field generated along therewith to rotate in the same direction as the above-described second rotor-blocked direction, it is possible to convert the electric power supplied to the stator into power (hereinafter, this power is referred to as "the electric power-converted power") to thereby transmit all the electric power to the first rotor, and further to the driven parts. Further, since the distributing and combining device has the same functions as those of the planetary gear unit, as described hereinabove, by supplying electric power to the second generator-motor to thereby cause the second output portion of the second generator-motor to rotate in a direction opposite to the above-mentioned second element-blocked direction together with the third element, it is possible to transmit all the power from the second generator-motor to the second element, and further to the driven parts.

As described above, according to the first power plant, it is possible to drive the driven parts by the first generator-motor and/or the second generator-motor without using the power from the prime mover. Further, in this case, it is possible to drive the driven parts while preventing not only the reverse rotation of the first output portion of the prime mover by the brake mechanism but also the dragging of the prime mover by the following operation: The above-mentioned electric power-converted power from the stator acts on the second rotor so as to cause the second rotor to rotate in the second rotor-blocked direction, and the power from the second generator-motor acts on the first element so as to cause the first element to rotate in the first element-blocked direction, via the third and second elements. This causes, during the above-mentioned driving of the driven parts, the first output portion of the prime mover to be held in a stopped state together with the second rotor and the first element, and hence the first output portion does not drag the prime mover.

The above-described effects can also be obtained by the second power plant in which the first rotor and the second element are connected to the first output portion of the prime mover, and the second rotor and the first element are connected to the driven parts. Hereinafter, the directions of rotations of the first rotor and the second element, blocked by the brake mechanism, are referred to as "the first rotor-blocked direction" and "the second element-blocked direction", respectively. Based on the aforementioned relationship between the input of energy and the output of energy in the first generator-motor, by supplying electric power to the stator to thereby cause a rotating magnetic field generated along therewith to rotate in a direction opposite to the above-mentioned first rotor-blocked direction, it is possible to covert the electric power supplied to the stator into power (hereinafter, this power is referred to as "the electric power-converted power"), and thereby transmit all the electric power to the second rotor, and further to the driven parts. Further, based on the aforementioned relationship between the input of energy and the output of energy in the distributing and combining device, electric power is supplied to the second generator-motor, to cause the second output portion of the second generator-motor to rotate in the same direction as the above-mentioned second element blocked direction together with the third element, whereby all the power from the second generator-motor can be transmitted to the first element, and further to the driven parts.

As described above, according to the second power plant, similarly to the first power plant, it is possible to drive the driven parts by the first generator-motor and/or the second generator-motor without using the power from the prime mover. Further, in this case, similarly to the first power plant, it is possible to drive the driven parts while preventing not only the reverse rotation of the first output portion of the prime mover by the brake mechanism but also the dragging of the prime mover by the following operation: The above-described electric power-converted power from the stator acts on the first rotor so as to cause the first rotor to rotate in the first rotor-blocked direction, and the power from the second generator-motor acts on the second element so as to cause the second element to rotate in the second element-blocked direction, via the third element. This causes, during the above-mentioned driving of the driven parts, the first output portion of the prime mover to be held in a stopped state together with the first rotor and the second element, and hence the first output portion does not drag the prime mover.

BRIEF DESCRIPTION OF THE DRAWINGS

FIG. 2 A block diagram showing an ECU etc. that control the operations of the engine and the first and second generator-motors of the power plant according to the first embodiment.

FIG. 28 Diagrams which are useful in explaining the operation of the third generator-motor in the case where the first and second rotating magnetic fields are generated while an A1 rotor is held unrotatable.

FIG. 30 Diagrams each showing magnetic circuits formed when the third generator-motor is in operation.

FIG. 31 A schematic diagram illustrating torque transmitted to an A2 rotor when the first and second rotating magnetic fields are generated while holding the A1 rotor unrotatable, by way of example.

FIG. 32 Speed diagrams of a first magnetic field rotational speed VMF1 and A1 and A2 rotor rotational speeds VRA1 and VRA2 in respective cases of (a) the A1 rotor being made unrotatable, (b) the A2 rotor being made unrotatable, (c) both the A1 and A2 rotors being rotating, and (d) the first magnetic field rotational speed VMF1 being equal to 0, shown by way of example.

FIG. 34 Diagrams which are useful in explaining a continuation of the operation in FIG. 33.

FIG. 36 A speed diagram of the first and second magnetic field rotational speeds VMF1 and VMF2, and the A1, A2, B1 and B2 rotor rotational speeds VRA1, VRA2, VRB1 and VRB2 during the EV creep operation, shown by way of example.

FIG. 37 A speed diagram of the first and second magnetic field rotational speeds VMF1 and VMF2, and the A1, A2, B1 and B2 rotor rotational speeds VRA1, VRA2, VRB1 and VRB2 at the time of the EV standing start, shown by way of example.

FIG. 49 A speed diagram of the first and second magnetic field rotational speeds VMF1 and VMF2, and the A1, A2, B1 and B2 rotor rotational speeds VRA1, VRA2, VRB1 and VRB2 during the ENG creep operation, shown by way of example.

FIG. 50 A speed diagram of the first and second magnetic field rotational speeds VMF1 and VMF2, and the A1, A2, B1 and B2 rotor rotational speeds VRA1, VRA2, VRB1 and VRB2 at the time of the ENG-based standing start, shown by way of example.

FIG. 57 A schematic diagram illustrating the relationship between the engine torque TENG and the demanded torque PMCMD in the power plant according to the third embodiment, by using solid lines with arrows for the drive-time charging mode and using broken lines with arrows for the battery input/output zero mode.

FIG. 66 (*a*) A speed diagram of the second sun gear rotational speed VSU2, the second carrier rotational speed VCA2, and the second ring gear rotational speed VRI, shown by way of example, depicted together with a speed diagram of the third sun gear rotational speed VSU3, the third carrier rotational speed VCA3, and the third ring gear rotational speed VRI3, shown by way of example; and (*b*) a speed diagram of rotational speeds of four rotary elements formed by connecting the second and third planetary gear units, by way of example.

FIG. 68 Diagrams showing, by way of example, the relationship between the first magnetic field rotational speed VMF1, the engine speed NE, the vehicle speed VP, and the second rotor rotational speed VRO2, (a) in the first speed change mode and (b) in the second speed change mode of the power plant according to the tenth embodiment, respectively.

FIG. 71 A speed diagram of the first sun gear rotational speed VSU1, the first carrier rotational speed VCA1, the first ring gear rotational speed VRI1, the second magnetic field rotational speed VMF2 and the B1 and B2 rotor rotational speeds VRB1 and VRB2, in the battery input/output zero mode of the power plant according to the twelfth embodiment, shown by way of example.

FIG. 77 (a) A speed diagram of the first sun gear rotational speed VSU1, the first carrier rotational speed VCA1, and the first ring gear rotational speed VRI1, shown by way of example, depicted together with a speed diagram of a fourth sun gear rotational speed VSU4, a fourth carrier rotational speed VCA4, and a fourth ring gear rotational speed VRI4, shown by way of example; and (b) a speed diagram of rotational speeds of four rotary elements formed by connecting the first and fourth planetary gear units, by way of example.

FIG. 79 Diagrams showing, by way of example, the relationship between the first rotor rotational speed VRO1, the engine speed NE, the vehicle speed VP, and the second magnetic field rotational speed VMF2, (a) in a third speed change mode and (b) in a fourth speed change mode of the power plant according to the seventeenth embodiment, respectively.

FIG. 86 Diagrams of the rotational speed of a prime mover and a speed of a driven part of a power plant according to the invention as claimed in claim 15, (a) in the first speed change mode and (b) in the second speed change mode, shown by way of example, respectively.

FIG. 88 Diagrams of the rotational speed of a prime mover and a speed of a driven part of a power plant according to the invention as claimed in claim 18, (a) in the first speed change mode and (b) in the second speed change mode, shown by way of example, respectively.

BEST MODE FOR CARRYING OUT THE INVENTION

Figure 1:
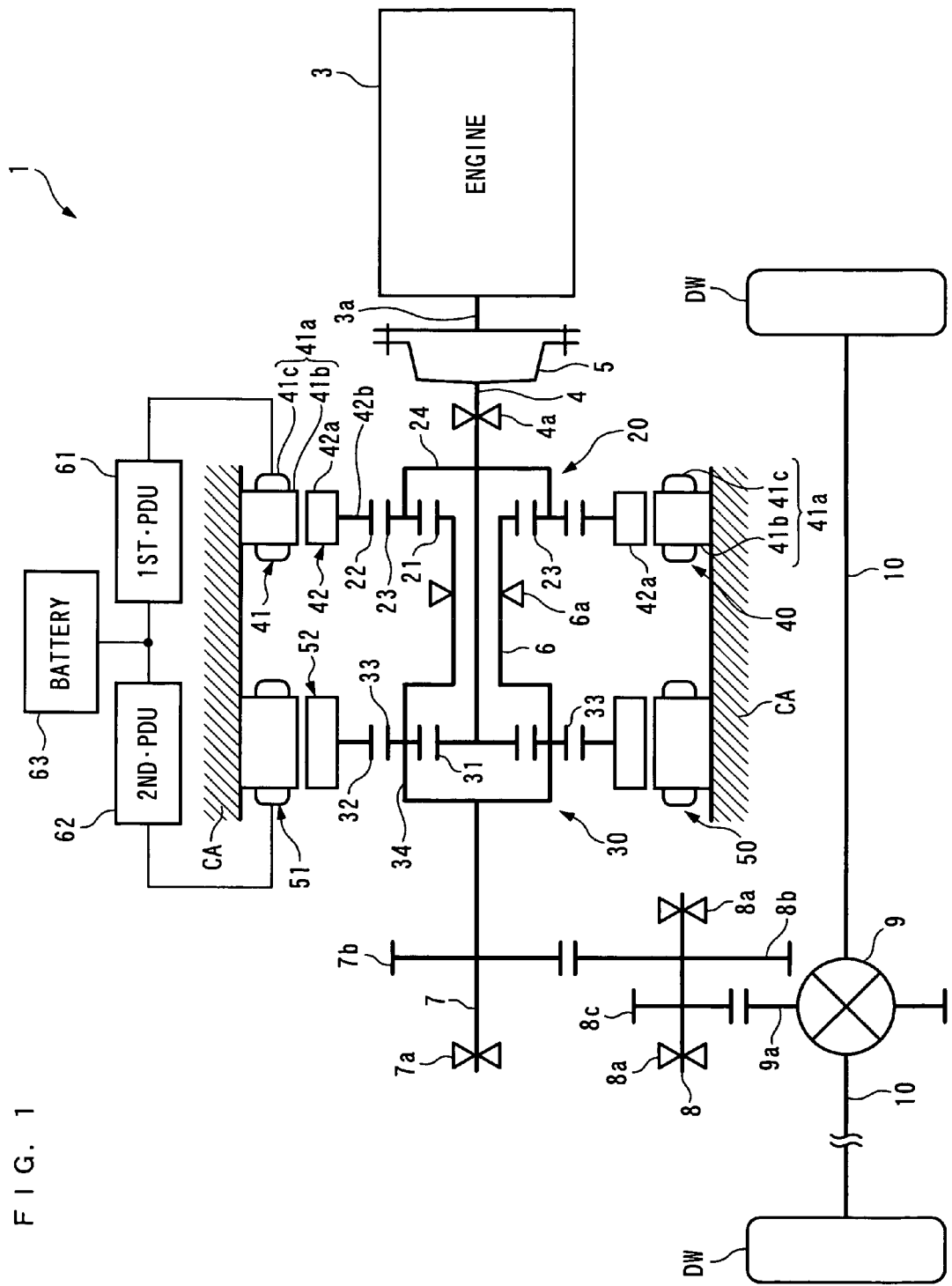
FIG. 1 A schematic view of an internal combustion engine, first and second generator-motors, etc. of a power plant according to a first embodiment.

The present invention will now be described in detail with reference to the drawings showing a preferred embodiment thereof. It should be noted that in the figures, hatching for portions illustrating cross-sections are omitted for convenience. FIGS. 1 and 2 schematically show a power plant 1 according to a first embodiment of the present embodiment. The power plant 1 is for driving left and right drive wheels DW and DW (driven parts) of a vehicle (not shown), and as shown in FIG. 1, includes an internal combustion engine 3 (prime mover), a first generator-motor 40 and a second generator-motor 50 as power sources, and a first planetary gear unit 20, a second planetary gear unit 30 and a differential gear mechanism 9 for transmitting power to the drive wheels DW and DW. Further, as shown in FIG. 2, the power plant 1 includes an ECU 2, a 1st-PDU 61 and a 2nd-PDU 62, for controlling the operations of the internal combustion engine 3 and the first and second generator-motors 40 and 50, respectively.

It should be noted that in the present embodiment, the ECU 2, the 1st-PDU 61, and the 2nd-PDU 62 correspond to a speed-changing device and a controller, the first generator-motor 40 corresponds to the speed-changing device and a first energy-converting device, and the second generator-motor 50 corresponds to the speed-changing device and a second energy-converting device. Further, the first planetary gear unit 20 corresponds to a first distributing and combining device, and the second planetary gear unit 30 corresponds to a second distributing and combining device.

The internal combustion engine (hereinafter referred to as "the engine") 3 is e.g. a gasoline engine, and has a crankshaft 3a (output shaft) to which is concentrically connected a first main shaft 4 via a flywheel 5. The first main shaft 4 is rotatably supported by a bearing 4a. Further, a connection shaft 6 and a second main shaft 7 are arranged concentrically with the first main shaft 4, and an idler shaft 8 is disposed in parallel with the first main shaft 4. The connection shaft 6, the second main shaft 7, and the idler shaft 8 are rotatably supported by bearings 6a, 7a, and 8a and 8a, respectively.

The connection shaft 6 is formed to be hollow, and the first main shaft 4 is concentrically rotatably fitted through the connection shaft 6. The idler shaft 8 is integrally formed with a first gear 8b and a second gear 8c. The first gear 8b is in mesh with a gear 7b integrally formed with the second main shaft 7, and the second gear 8c is in mesh with a gear 9a of the differential gear mechanism 9. Further, the differential gear mechanism 9 is connected to the drive wheels DW and DW via drive shafts 10 and 10. With the above arrangement, the second main shaft 7 is connected to the drive wheels DW and DW via the idler shaft 8 and the differential gear mechanism 9. Hereinafter, the circumferential direction and the axial direction of the first main shaft 4, the connection shaft 6, and the second main shaft 7 are simply referred to as "the circumferential direction" and "the axial direction", respectively.

The first planetary gear unit 20 is of a general single pinion type, and is comprised of a first sun gear 21 (first element, third element), a first ring gear 22 (first element, third element) rotatably provided on an outer periphery of the first sun gear 21, a plurality of (e.g. three) first planetary gears 23 (only two of which are shown) in mesh with the gears 21 and 22, and a first carrier 24 (second element) rotatably supporting the first planetary gears 23. The first sun gear 21 and the first carrier 24 are integrally concentrically fitted on the connection shaft 6 and the first main shaft 4, respectively.

Further, the first planetary gear unit 20 has the same known functions as those of a general planetary gear unit provided by the arrangement thereof. That is, when the directions of the rotations of the first sun gear 21, the first ring gear 22 and the first carrier 24 are identical to each other, the first planetary gear unit 20 has the function of distributing power input to the first carrier 24 to the first sun gear 21 and the first ring gear 22, and the function of combining the powers input to the first sun gear 21 and the first ring gear 22 and outputting the combined power to the first carrier 24. Further, when the first planetary gear unit 20 is distributing and combining the powers as described above, the first sun gear 21, the first ring gear 22 and the first carrier 24 are rotating while holding a linear speed relationship therebetween.

The second planetary gear unit 30 is configured similarly to the first planetary gear unit 20, and is comprised of a second sun gear 31 (fourth element, sixth element), a second ring gear 32 (fourth element, sixth element), a plurality of second planetary gears 33 in mesh with the gears 31 and 32, and a second carrier 34 (fifth element) rotatably supporting the second planetary gears 33. Although in the present embodiment, the numbers of gear teeth of the second sun gear 31, the second ring gear 32 and the second planetary gears 33 are set to be equal to those of the first sun gear 21, the first ring gear 22 and the first planetary gears 23, respectively, they are not necessarily required to be equal to those of the same. The second sun gear 31 is integrally concentrically fitted on the first main shaft 4, and the second carrier 34 is integrally concentrically fitted on the connection shaft 6 and the second main shaft 7. Further, it is to be understood that the second planetary gear unit 30 has the same functions as those of the first planetary gear unit 20.

With the above arrangement, the first carrier 24 of the first planetary gear unit 20, the second sun gear 31 of the second planetary gear unit 30, and the crankshaft 3a of the engine 3 are mechanically connected to each other via the first main shaft 4, without via a transmission mechanism, such as gears, for changing torque or rotational speed. Hereinafter, connection between elements without via a transmission mechanism, such as gears, is referred to as "direct connection" as deemed appropriate. Further, the first sun gear 21 of the first planetary gear unit 20 and the second carrier 34 of the second planetary gear unit 30 are directly connected to each other via the connection shaft 6, and the second carrier 34 and the drive wheels DW and DW are connected to each other via the second main shaft 7, the differential gear mechanism 9 and so forth. In short, the first sun gear 21 and the second carrier 34 are mechanically connected to the drive wheels DW and DW.

The first generator-motor 40 is a three-phase brushless DC motor, and is integrally formed with the above-described first planetary gear unit 20. The first generator-motor 40 has a first stator 41 comprised of 3n armatures 41a, and a first rotor 42 disposed in a manner opposed to the first stator 41. The armatures 41a, each of which is comprised of an iron core 41b and a coil 41c wound around the iron core 41b, are fixed to a casing CA, and are arranged at approximately equal intervals in the circumferential direction. The 3n coils 41c form n sets of three-phase coils of U-phase coils, V-phase coils, and W-phase coils. Further, the armatures 41a are electrically connected to a battery 63 (energy storing and releasing device) and the ECU 2 via the 1st·PDU 61. The 1st·PDU 61 is implemented by an electric circuit comprised of an inverter. The battery 63 is configured to be capable of being charged and discharged.

The first rotor 42 has n permanent magnets 42a arranged at approximately equal intervals in the circumferential direction. Each two permanent magnets 42a circumferentially adjacent to each other have polarities different from each other. Each permanent magnet 42a is attached to an annular fixing portion 42b formed e.g. of a soft magnetic material (e.g. iron). The fixing portion 42b is attached to an outer peripheral surface of the first ring gear 22 of the first planetary gear unit 30, whereby the first rotor 42 is rotatable in unison with the first ring gear 22.

With the above arrangement, in the first generator-motor 40, as electric power is supplied from the battery 63 via the 1st·PDU 61, a rotating magnetic field is generated in the first stator 41 to thereby rotate the first rotor 42. More specifically, the electric power supplied to the first stator 41 is converted into power, and is output to the first rotor 42. Further, when no electric power is supplied to the first stator 41, if the first rotor 42 rotates with respect to the first stator 41, a rotating magnetic field is generated in the first stator 41 to generate electric power. That is, the power input to the first rotor 42 is converted into electric power by the first stator 41.

Through the control of the 1st·PDU 61, the ECU 2 controls the electric power supplied to the first generator-motor 40, the electric power generated by the first generator-motor 40, and a rotational speed VRO1 of the first rotor 42 (hereinafter referred to as "the first rotor rotational speed").

Similarly to the first generator-motor 40, the above-mentioned second generator-motor 50 is a three-phase brushless DC motor, and is integrally formed with the above-described second planetary gear unit 30. The second generator-motor 50 has a second stator 51 and a second rotor 52. Since these second stator 51 and second rotor 52 are configured similarly to the first stator 41 and second rotor 42 of the first generator-motor 40, respectively, descriptions thereof will be omitted. Further, the second stator 51 is fixed to the casing CA, and is electrically connected to the battery 63 and the ECU 2 via the 2nd·PDU 62. Similarly to the 1st·PDU 61, the 2nd·PDU 62 is implemented by an electric circuit comprised of an inverter, and is electrically connected to the 1st·PDU 61. Further, the second rotor 52 is attached to an outer peripheral surface of the second ring gear 32 of the second planetary gear unit 30, whereby the second rotor 52 is rotatable in unison with the second ring gear 32.

With the above arrangement, in the second generator-motor 50, as electric power is supplied from the battery 63 via the 2nd·PDU 62, a rotating magnetic field is generated in the second stator 51 to thereby rotate the second rotor 52. More specifically, the electric power supplied to the second stator 51 is converted into power, and is output to the second rotor 52. Further, when no electric power is supplied to the second stator 52, if the second rotor 52 rotates with respect to the second stator 51, a rotating magnetic field is generated in the second stator 51 to generate electric power. That is, the power input to the second rotor 52 is converted into electric power by the second stator 51.

Through the control of the 2nd·PDU 62, the ECU 2 controls the electric power supplied to the second generator-motor 50, the electric power generated by the second generator-motor 50, and a rotational speed VRO2 of the second rotor 52 (hereinafter referred to as "the second rotor rotational speed").

Further, as shown in FIG. 2, a crank angle sensor 71 outputs a detection signal indicative of the crank angle position of the crankshaft 3a to the ECU 2. The ECU 2 calculates an engine speed NE based on the crank angle position. Furthermore, a first rotational angle sensor 72 delivers a detection signal indicative of the rotational angle position of the first rotor 42 to the ECU 2, and a second rotational angle sensor 73 delivers a detection signal indicative of the rotational angle position of the second rotor 52 to the ECU 2. The ECU 2 calculates the first rotor rotational speed VRO1 based on the detected rotational angle position of the first rotor 42, and calculates the second rotor rotational speed VRO2 based on the detected rotational angle position of the second rotor 52.

Furthermore, a current-voltage sensor 74 outputs detection signals indicative of current and voltage values input to and output from the battery 63 to the ECU 2. The ECU 2 calculates a remaining capacity SOC of the battery 63 based on the detection signals.

Further, an accelerator pedal opening sensor 75 delivers a detection signal indicative of an accelerator pedal opening AP as a stepped-on amount of an accelerator pedal (not shown) of the vehicle to the ECU 2. A vehicle speed sensor 76 delivers a detection signal indicative of a vehicle speed VP to the ECU 2.

The ECU 2 is implemented by a microcomputer comprised of an I/O interface, a CPU, a RAM and a ROM, and controls the operations of the engine 3 and the first and second generator-motors 40 and 50 based on the detection signals from the aforementioned sensors 71 to 76.

Next, the control by the ECU 2 at the start or during traveling of the vehicle will be described. First, a description will be given of the control during the creep operation and the standing start of the vehicle. During the creep operation, basically, the engine 3 is stopped and only the second generator-motor 50 is used as a power source of the vehicle. More specifically, electric power is supplied from the battery 63 to the second generator-motor 50, whereby the second rotor 52 is caused to rotate in the same direction as the direction of rotation of the crankshaft 3a together with the second ring gear 32. Further, electric power generation is performed by the first generator-motor 40 to supply the generated electric power to the second generator-motor 50. Hereinafter, such a creep operation using only the second generator-motor 50 is referred to as "the EV creep operation".

It should be noted that the direction of rotation of the crankshaft 3a is the same as the direction of normal rotation of the drive wheels DW and DW, and hereinafter rotation in the same direction as the direction of rotation of the crankshaft 3a is referred to as "normal rotation", while rotation in a direction opposite to the direction of rotation of the crankshaft 3a is referred to as "reverse rotation". Further, the rotational speeds of the first sun gear 21, the first carrier 24, the first ring gear 22, the second sun gear 31, the second carrier 34, and the second ring gear 32 are referred to as "the first sun gear rotational speed VSU1", "the first carrier rotational speed VCA1", "the first ring gear rotational speed VRI1", "the second sun gear rotational speed VSU2", "the second carrier rotational speed VCA2", and "the second ring gear rotational speed VRI2".

Figure 3:
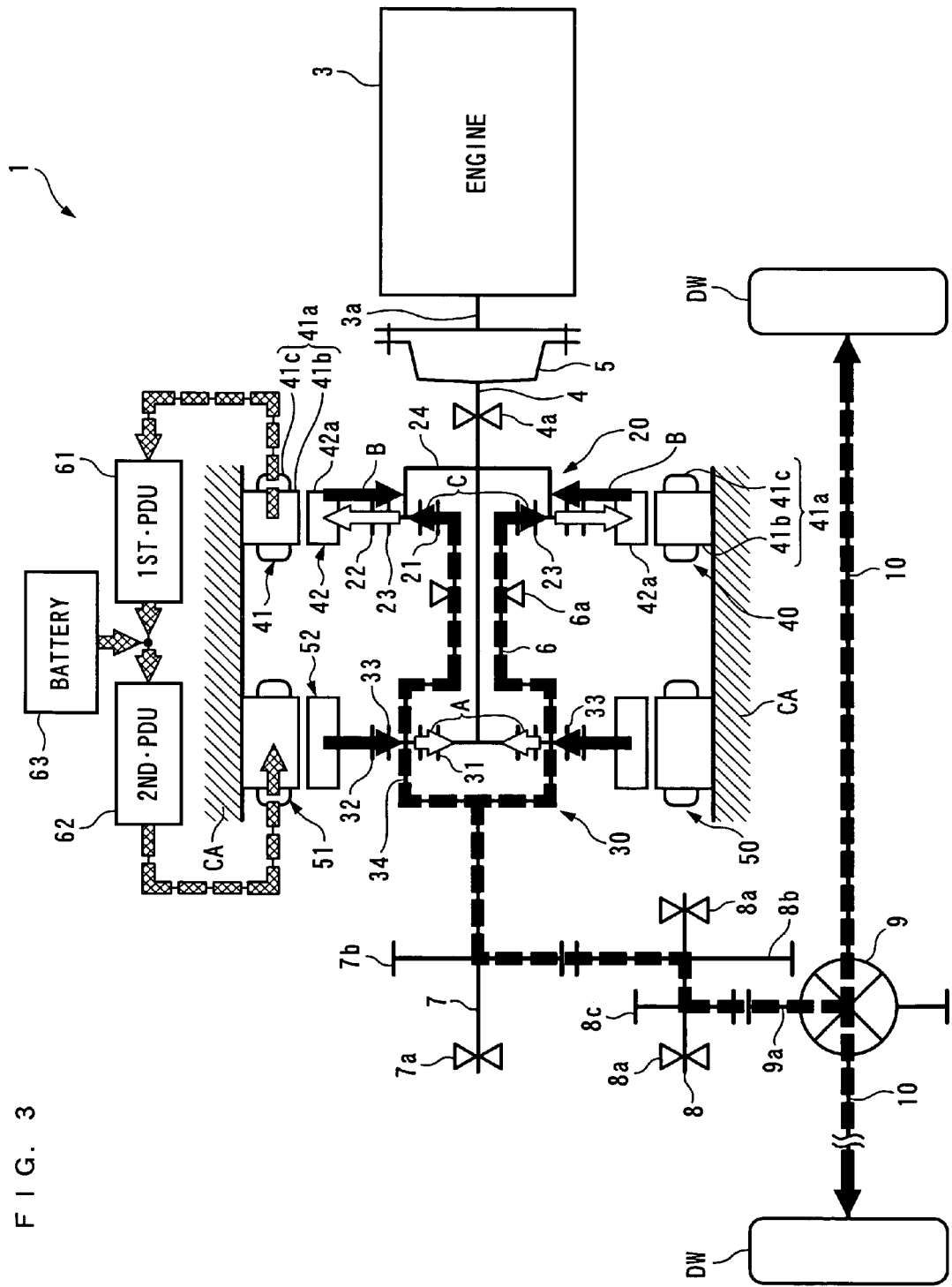
FIG. 3 A diagram showing how torque is transmitted in the power plant according to the first embodiment, during an EV creep operation of a vehicle.
Figure 4:
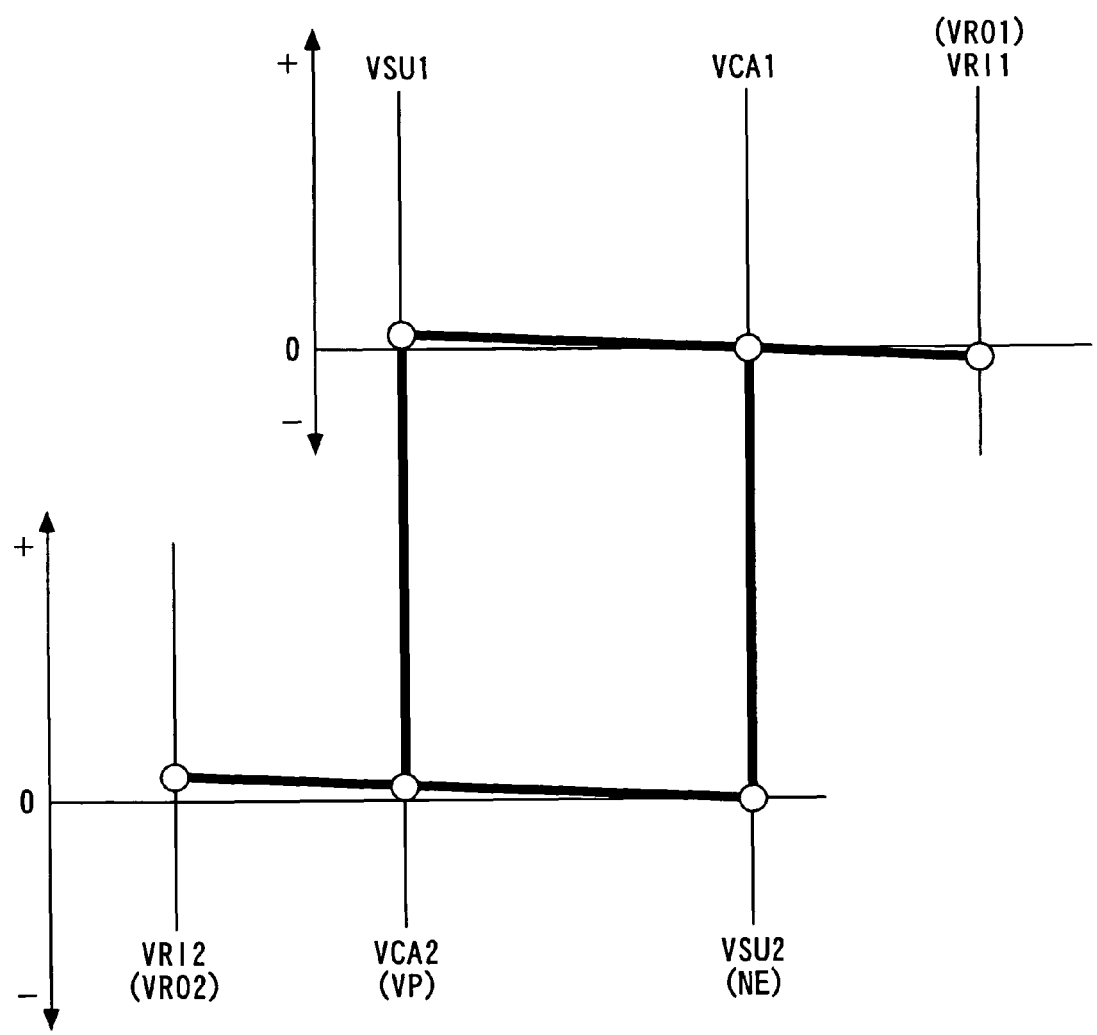
FIG. 4 A speed diagram of first and second sun gear rotational speeds VSU1 and VSU2, first and second carrier rotational speeds VCA1 and VCA2, and first and second ring gear rotational speeds VRI1 and VRI2 during the EV creep operation, shown by way of an example.

FIG. 3 shows how torque is transmitted during the above-described creep operation of the vehicle, and FIG. 4 shows a speed diagram representing the relationship between the first and second sun gear rotational speeds VSU1 and VSU2 and so forth during the EV creep operation. Further, in FIG. 3 and other figures, referred to hereinafter, which show states of transmission of torque, thick broken lines with arrows indicate flows of torque, and black-filled arrows and hollow arrows show torques acting in the direction of normal rotation and in the direction of reverse rotation, respectively. Furthermore, hatched thick broken lines with arrows indicate flows of electric energy. Further, FIG. 4 and other speed diagrams, referred to hereinafter, are so-called collinear charts, and in each of the speed diagrams, the rotational speeds of the respective elements are on a straight line, which means that they are in a collinear relationship (linear relationship). Furthermore, in FIG. 4 and other speed diagrams, referred to hereinafter, it is assumed that the direction of normal rotation is indicated by "+", and the direction of reverse rotation is indicated by "−".

As shown in FIG. 3, during the EV creep operation, torque TM2 of the second generator-motor 50 (hereinafter referred to as "the second generator-motor torque") is transmitted to the second carrier 34 and the second sun gear 31 via the second ring gear 32 and the second planetary gears 33. This torque acts on the second carrier 34 to cause the second carrier 34 to perform normal rotation while acting on the second sun gear 31 to cause the second sun gear 31 to perform reverse rotation (indicated by arrows A). Further, part of the torque transmitted to the second carrier 34 is transmitted to the drive wheels DW and DW via the second main shaft 7, the differential gear mechanism 9, and so forth, whereby the drive wheels DW and DW perform normal rotation.

Furthermore, during the EV creep operation, the remainder of the torque transmitted to the second carrier 34 is transmitted to the first sun gear 21 of the first planetary gear unit 20 via the connection shaft 6, and is then transmitted to the first rotor 42 via the first planetary gears 23 and the first ring gear 22, whereby as shown in FIG. 4, the first rotor 42 performs reverse rotation together with the first ring gear 22. Therefore, braking torque, which acts on the first rotor 42 in accordance with the electric power generation by the first generator-motor 40, acts on the first ring gear 22 performing reverse rotation to cause the same to perform normal rotation, as indicated by arrows B. As a consequence, combined torque formed by combining the torque indicated by the arrows B and the torque transmitted to the first sun gear 21, indicated by arrows C, is transmitted to the first carrier 24. This combined torque acts on the first carrier 24 to cause the first carrier 24 to perform normal rotation.

In this case, the electric power supplied to the second generator-motor 50 and the electric power generated by the first generator-motor 40 are controlled such that the above-mentioned torque indicated by the arrows A, for causing the second sun gear 31 to perform reverse rotation, and the torques indicated by the arrows B and C, for causing the first carrier 24 to perform normal rotation are balanced with each other, whereby the first carrier 24, the second sun gear 31 and the crankshaft 3a, which are connected to each other are held at rest. As a consequence, as shown in FIG. 4, during the EV creep operation, the first carrier rotational speed VCA1 and the second sun gear rotational speed VSU2 become equal to 0, and the engine speed NE as well becomes equal to 0.

Further, during the EV creep operation, the electric power supplied to the second generator-motor 50, the electric power generated by the first generator-motor 40, and the first and second rotor rotational speeds VRO1 and VRO2 are controlled as follows: They are controlled such that the relationship between the rotational speeds of the first sun gear 21, the first carrier 24 and the first ring gear 22, determined by the gear ratio of the first planetary gear unit 20, and the relationship between the rotational speeds of the second sun gear 31, the second carrier 34 and the second ring gear 32, determined by the gear ratio of the second planetary gear unit 30 are maintained, and at the same time the first sun gear rotational speed VSU1 and the second carrier rotational speed VCA2, that is, the vehicle speed VP becomes very small (see FIG. 4). From the above, the creep operation with a very low vehicle speed is carried out. As described above, it is possible to perform the creep operation using the driving force of the second generator-motor 50 in a state where the engine 3 is stopped.

Figure 5:
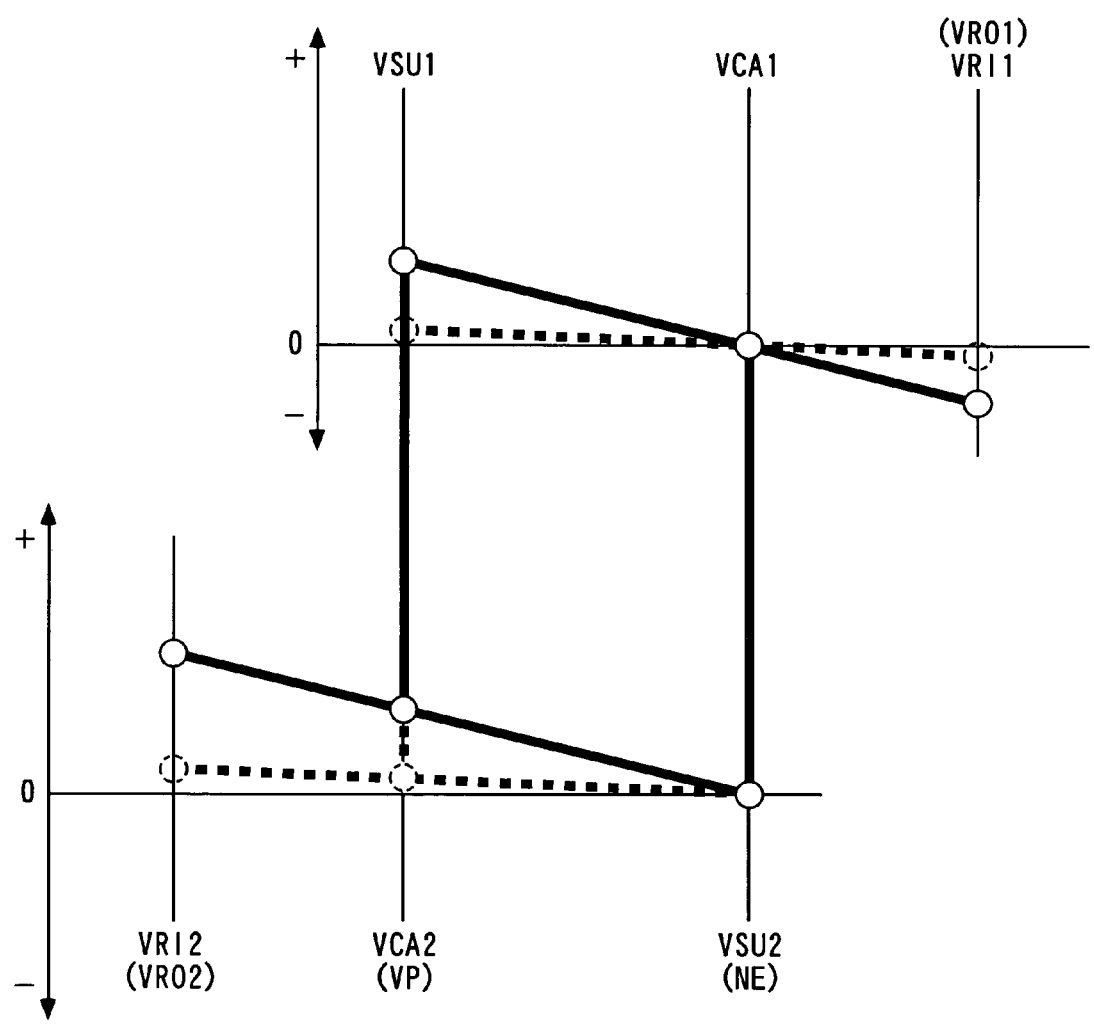
FIG. 5 A speed diagram of the first and second sun gear rotational speeds VSU1 and VSU2, the first and second carrier rotational speeds VCA1 and VCA2, and the first and second ring gear rotational speeds VRI1 and VRI2 at the time of EV standing start, shown by way of example.

The control at the standing start of the vehicle is carried out, subsequent to the above-described EV creep operation, as follows: The electric power supplied to the second generator-motor 50 and the electric power generated by the first generator-motor 40 are both increased. Further, while the relationships between the rotational speeds of the respective gears of the first and second planetary gear units 20 and 30 are maintained and at the same time, the first carrier rotational speed VCA1 and the second sun gear rotational speed VSU2, that is, the engine speed NE is held at 0, the first rotor rotational speed VRO1 of the first rotor 42 that has been performing reverse rotation during the EV creep operation, and the second rotor rotational speed VRO2 of the second rotor 52 that has been performing normal rotation during the EV creep operation are increased in the same rotation directions as they have been. From the above, as indicated by thick solid lines in FIG. 5, the first sun gear rotational speed VSU1 and the second carrier rotational speed VCA2, that is, the vehicle speed VP is increased from the state of the EV creep operation, indicated by broken lines in 5, causing the vehicle to start. Hereinafter, such start and traveling of the vehicle, which are performed using only the second generator-motor 50 as a power source, will be referred to as "the EV standing start" and "the EV traveling", respectively.

Further, subsequent to the above-described EV standing start, the start of the engine 3 is performed as follows. Hereinafter, such start of the engine 3 is referred to as "the ENG start during EV traveling". While holding the first sun gear rotational speed VSU1 and the second carrier rotational speed VCA2, that is, the vehicle speed VP at the value assumed then, the first rotor rotational speed VRO1 of the first rotor 42 that has been performing reverse rotation during the EV standing start, as described above, is controlled to 0, and the second rotor rotational speed VRO2 of the second rotor 52 that has been performing normal rotation during the EV standing start, is controlled such that it is decreased. Then, after the first rotor rotational speed VRO1 becomes equal to 0, electric power is supplied from the battery 63 not only to the second generator-motor 50 but also to the first generator-motor 40, whereby the first rotor 42 is caused to perform normal rotation, and the first rotor rotational speed VRO1 is caused to be increased.

Figure 6:
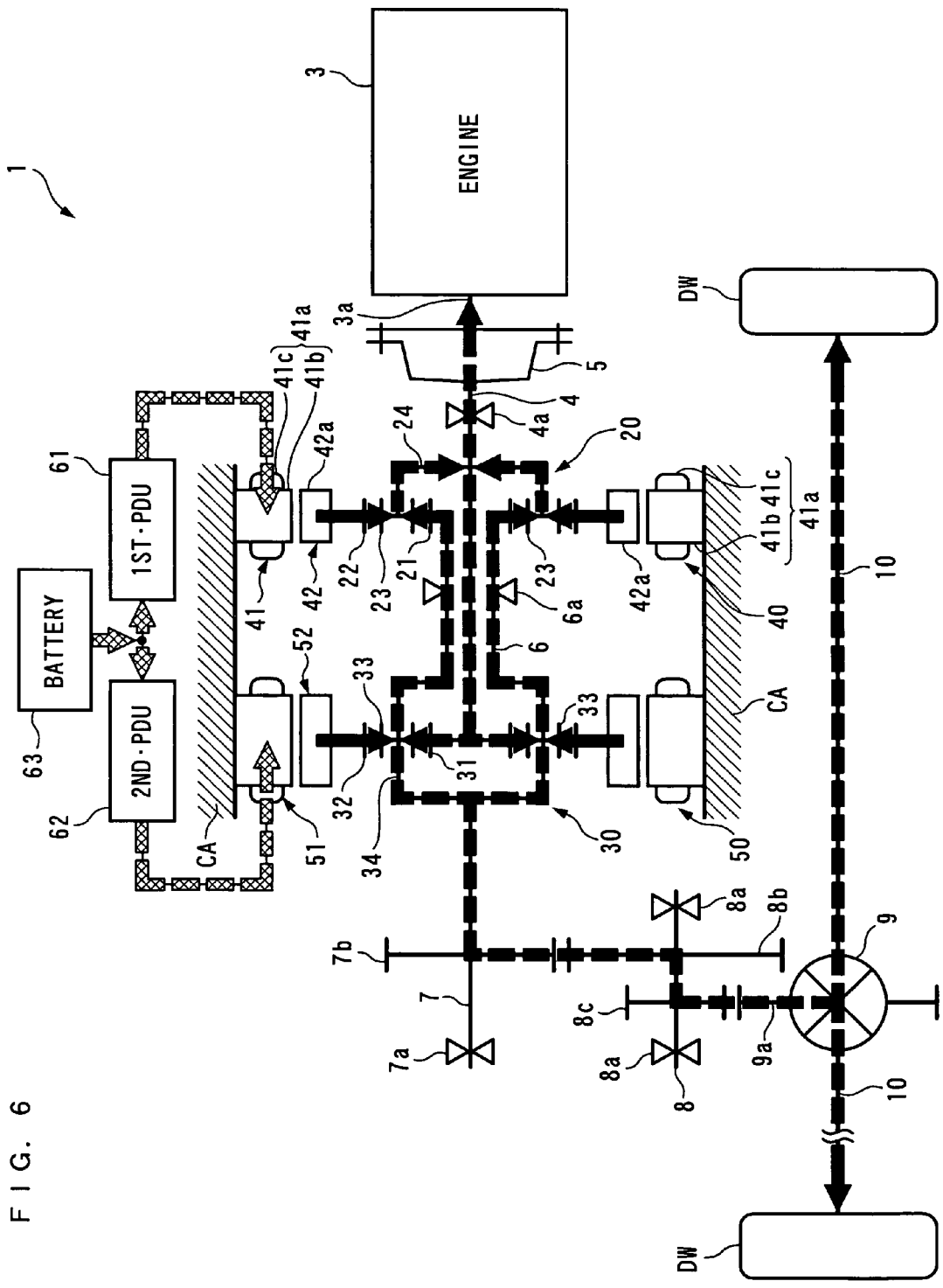
FIG. 6 A diagram showing how torque is transmitted in the power plant according to the first embodiment at the time of ENG start during EV traveling.

FIG. 6 shows how torque is transmitted in a state in which electric power is supplied to both of the first and second generator-motors 40 and 50, as described above, at the time of the ENG start during EV traveling. As shown in the figure, the second generator-motor torque TM2 is transmitted to the second carrier 34 via the second ring gear 32 and the second planetary gears 33. In accordance therewith, torque transmitted to the second sun gear 31, as described hereinafter, is transmitted to the second carrier 34 via the second planetary gears 33 such that torque is balanced between the second sun gear 31 and the second ring gear 32 using the second carrier 34 as a support. As described above, combined torque formed by combining the second generator-motor torque TM2 and the torque transmitted to the second sun gear 31 is transmitted to the second carrier 34. Further, part of the torque transmitted to the second carrier 34 is transmitted to the first sun gear 21 via the connection shaft 6, and the remainder thereof is transmitted to the drive wheels DW and DW via the second main shaft 7 and so forth.

Furthermore, at the time of the ENG start during EV traveling, torque from the first generator-motor 40 is transmitted to the first carrier 24 via the first ring gear 22 and the first planetary gears 23. In accordance therewith, the torque transmitted to the first sun gear 21, as described above, is transmitted to the first carrier 24 via the first planetary gears 23 such that torque is balanced between the first sun gear 21 and the first ring gear 22 using the second carrier 34 as a support. As described above, combined torque formed by combining the torque from the first generator-motor 40 and the torque transmitted to the first sun gear 21 is transmitted to the first carrier 24.

Further, at the time of the ENG start during EV traveling, part of the torque transmitted to the first carrier 24 is transmitted to the second sun gear 31 via the first main shaft 4, and the remainder thereof is transmitted to the crankshaft 3*a* via the first main shaft 4 and the flywheel 5, whereby the crankshaft 3*a* performs normal rotation. Furthermore, in this case, the electric power supplied to the first and second generator-motors 40 and 50 is controlled such that sufficient power is transmitted to the drive wheels DW and DW and the engine 3.

Figure 7:
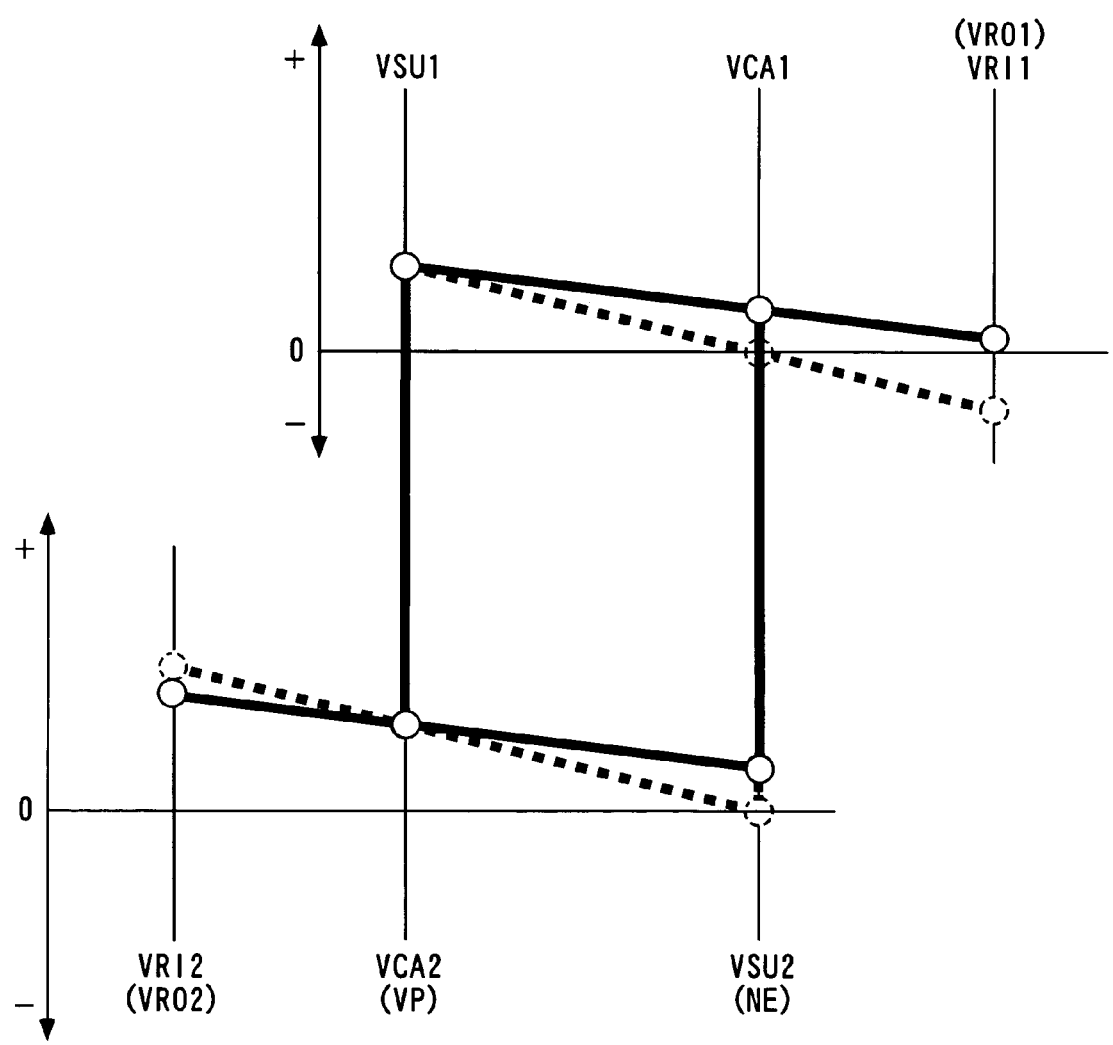
FIG. 7 A speed diagram of the first and second sun gear rotational speeds VSU1 and VSU2, the first and second carrier rotational speeds VCA1 and VCA2, and the first and second ring gear rotational speeds VRI1 and VRI2 at the time of the ENG start during the EV traveling, shown by way of example.

From the above, as indicated by thick solid lines in FIG. 7, at the time of the ENG start during EV traveling, while the vehicle speed VP is held at the value assumed then, the first carrier rotational speed VCA1 and the second sun gear rotational speed VSU2 are increased from a state in which they are equal to 0, indicated by broken lines, and the rotational speed of the crankshaft 3*a* connected to the first carrier 24 and the second sun gear 31, that is, the engine speed NE is also increased. In this state, the ignition operation of fuel injection valves (not shown) and spark plugs (not shown) of the engine 3 is controlled according to the aforementioned crank angle position, whereby the engine 3 is started. Further, in this case, by controlling the first and second rotor rotational speeds VRO1 and VRO2, the engine speed NE is controlled to a relatively small value suitable for starting the engine 3.

Figure 8:
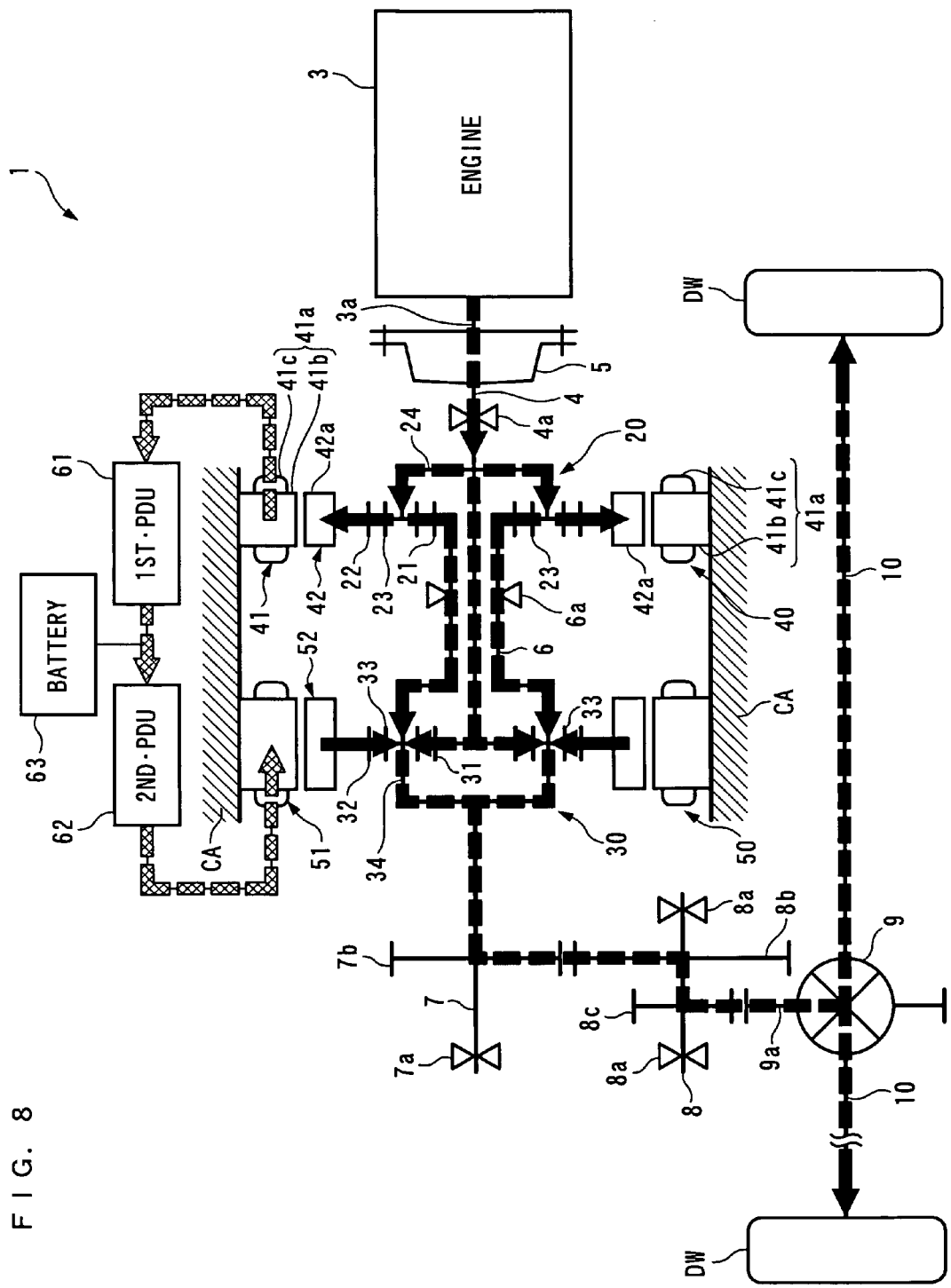
FIG. 8 A diagram showing how torque is transmitted in a battery input/output zero mode in the power plant according to the first embodiment.

Next, a description will be given of the control during traveling of the vehicle after the ENG start during EV traveling. During traveling of the vehicle, power WENG from the engine 3 (hereinafter referred to as "the engine power") is basically controlled such that fuel economy which is optimum (hereinafter referred to as "the optimum fuel economy") can be obtained within a range within which a demanded torque PMCMD can be generated. The demanded torque PMCMD is demanded by the vehicle and is calculated e.g. by searching a map (not shown) according to the vehicle speed VP and the accelerator pedal opening AP. Further, by using the engine power WENG transmitted to the first generator-motor 40 via the first carrier 24, the first planetary gears 23 and the first ring gear 22, electric power generation is performed by the first generator-motor 40 to supply generated electric power to the second generator-motor 50 without charging it into the battery 63. Hereinafter, this operation mode is referred to as "the battery input/output zero mode". FIG. 8 shows how torque is transmitted in the battery input/output zero mode.

As described above, electric power generation is performed by the first generator-motor 40, and as shown in FIG. 8, as part of torque TEGN of the engine 3 (hereinafter referred to as "the engine torque) is transmitted to the first generator-motor 40 via the first carrier 24, the first planetary gears 23 and the first ring gear 22, part of the engine torque TEGN is also transmitted to the first sun gear 21 via the first planetary gears 23 such that torque is balanced between the first ring gear 22 and the first sun gear 21. That is, part of the engine torque TEGN is transmitted to the first carrier 24, and the torque transmitted to the first carrier 24 is distributed to the first generator-motor 40 and the first sun gear 21. Further, the remainder of the engine torque TEGN is transmitted to the second sun gear 31 via the first main shaft 4.

Further, in the battery input/output zero mode, similarly to the case of the ENG start during EV traveling, the combined torque formed by combining the second generator-motor torque TM2 and the torque transmitted to the second sun gear 31, as described above, is transmitted to the second carrier 34. Furthermore, the engine torque TENG distributed to the first sun gear 21 in accordance with the electric power generation, as described above, is transmitted to the second carrier 34 via the connection shaft 6. As described above, combined torque formed by combining the engine torque TENG distributed to the first sun gear 21, the second generator-motor torque TM2, and the engine torque TENG transmitted to the second sun gear 31 is transmitted to the second carrier 34. Furthermore, this combined torque is transmitted to the drive wheels DW and DW via the second main shaft 7 and so forth. As a consequence, assuming that there is no transmission loss caused by the gears, in the battery input/output zero mode, power equal in magnitude to the engine power WENG is transmitted to the drive wheels DW and DW. Further, as described above, differently from the aforementioned conventional case, the engine power WENG is transmitted to the drive wheels DW and DW without being recirculated.

Furthermore, in the battery input/output zero mode, the engine power WENG is transmitted to the drive wheels DW and DW while having the speed thereof steplessly changed through the control of the first and second rotor rotational speeds VRO1 and VRO2. In short, the first and second generator-motors 40 and 50 function as a stepless transmission.

Figure 9:
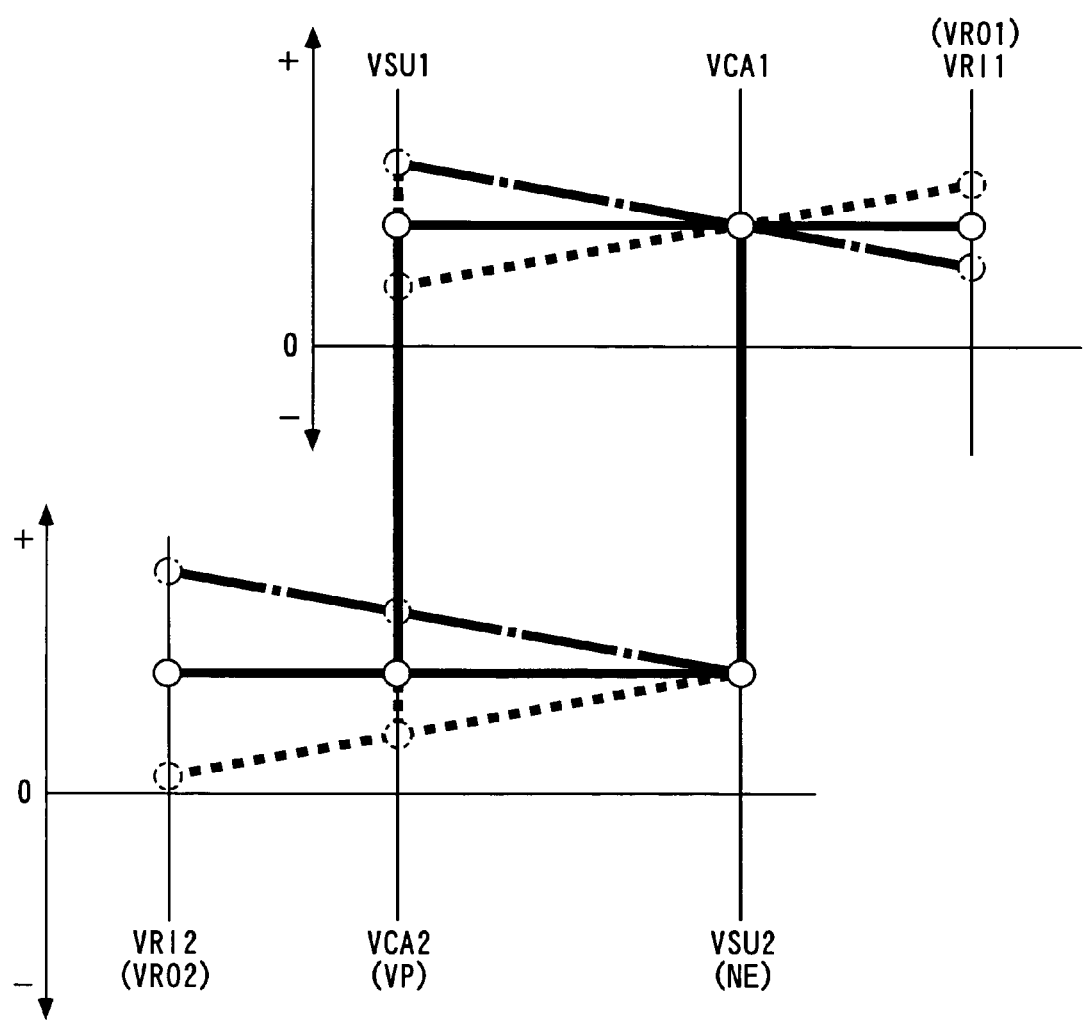
FIG. 9 A speed diagram of the first and second sun gear rotational speeds VSU1 and VSU2, the first and second carrier rotational speeds VCA1 and VCA2, and the first and second ring gear rotational speeds VRI1 and VRI2 in a battery input/output zero mode, shown by way of example.

More specifically, as indicated by broken lines in FIG. 9, while maintaining the speed relationships between the rotational speeds of the respective gears of the first and second planetary gear units 20 and 30, by increasing the first ring gear rotational speed VRI1, that is, the first rotor rotational speed VRO1 and decreasing the second ring gear rotational speed VRI2, that is, the second rotor rotational speed VRO2, with respect to the first carrier rotational speed VCA1 and the second sun gear rotational speed VSU2, that is, the engine speed NE, it is possible to steplessly decrease the first sun gear rotational speed VSU1 and the second carrier rotational speed VCA2, that is, the vehicle speed VP. Inversely, as indicated by one-dot chain lines in FIG. 9, by decreasing the first rotor rotational speed VRO1 and increasing the second rotor rotational speed VRO2 with respect to the engine speed NE, it is possible to steplessly increase the vehicle speed VP.

Furthermore, in this case, the first and second rotor rotational speeds VRO1 and VRO2 are controlled such that the engine speed NE becomes equal to a target engine speed NECMD. The target engine speed NECMD is calculated e.g. by searching a NECMD map (not shown) according to the vehicle speed VP and the demanded torque PMCMD. In this NECMD map, the NECMD value is set to such a value as will make it possible to obtain the optimum fuel economy of the engine 3 with respect to the vehicle speed VP and the demanded torque PMCMD assumed at the time.

As described hereinabove, in the battery input/output zero mode, the engine power WENG is once divided by the first and second planetary gear units 20 and 30, and is transmitted to the second carrier 34 via the following first to third transmission paths. Then, the divided engine power WENG is combined by the second carrier 34, and is then transmitted to the drive wheels DW and DW.

First transmission path: first carrier 24→first planetary gears 23→first sun gear 21→connection shaft 6→second carrier 34

Second transmission path: second sun gear 31→second planetary gears 33→second carrier 34

Third transmission path: first carrier 24→first planetary gears 23→first ring gear 22→first generator-motor 40→1st·PDU 61→2nd·PDU 62→second generator-motor 50→second ring gear 32→second planetary gears 33→second carrier 34

In the above first and second transmission paths, the engine power WENG is transmitted to the drive wheels DW and DW by so-called mechanical paths via gears, and the like, without being converted to electric power. Further, in the above-described third transmission path, the engine power WENG is once converted to electric power, and is then converted back into power again so as to be transmitted to the drive wheels DW and DW by the so-called electrical paths.

Further, in the battery input/output zero mode, the electric power generated by the first generator-motor 40 and the first and second rotor rotational speeds VRO1 and VRO2 are controlled such that the speed relationships between the rotational speeds of the respective gears of the first and second planetary gear units 20 and 30 are maintained. Further, the electric power generated by the first generator-motor 40 is more specifically controlled as follows:

In the battery input/output zero mode, the relationship between the engine power WENG and the engine power WENG transmitted to the drive wheels DW and DW via the above-described electrical paths (hereinafter referred to as "the electrical path power WP") is represented as follows: The engine power WENG is represented by the product of the engine torque TENG and the engine speed NE. Further, in the battery input/output zero mode, all the electric power generated by the first generator-motor 40 is supplied to the second generator-motor 50, so that the electrical path power WP is equal to the electric power generated by the first generator-motor 40, that is, the product of torque transmitted to the first generator-motor 40 along with the electric power generation by the first generator-motor 40 (hereinafter referred to as "the first power-generating torque TGM1") and the first rotor rotational speed VRO1. Therefore, the ratio between the electrical path power WP and the engine power WENG is expressed by the following equation (1a):

$$WP/WENG = (TGM1 \times VRO1)/(TENG \times NE) \tag{1a}$$

Further, as described above, since part of the engine torque TENG is transmitted to the first carrier 24, and the remainder thereof is transmitted to the second sun gear 31, the sum of the torque transmitted to the first carrier 24 (hereinafter referred to as "the first carrier transmitting torque TCA1") and the torque transmitted to the second sun gear 31 (hereinafter referred to as "the second sun gear transmitting torque TSU2") is equal to the engine torque TENG. Therefore, there holds the following equation (2a):

$$TENG = TCA1 + TSU2 \tag{2a}$$

Furthermore, in this case, the first carrier transmitting torque TCA1 is distributed to the first generator-motor 40 and the first sun gear 21, as described above, so that assuming that torque transmitted to the first sun gear 21 (hereinafter referred to as "the first sun gear transmitting torque") is represented by TSU1, TCA1=TGM1+TSU1 holds. Further, if a gear ratio between the first sun gear 21 and the first ring gear 22 is 1:1, and a torque distribution ratio in this case is 1:1, TGM1=TSU1 holds, so that there holds the following equation (3a):

$$TCA1 = TGM1 \times 2 \tag{3a}$$

Further, if a gear ratio between the second sun gear 31 and the second ring gear 32 is 1:1, and a torque combining ratio between the second sun gear transmitting torque TSU2 and torque transmitted to the second ring gear 332, i.e. the second generator-motor torque TM2 is 1:1, there holds the following equation (4a):

$$TSU2 = TM2 \tag{4a}$$

If the equations (3a) and (4a) are substituted into the equation (2a), there is obtained the following equation (5a):

$$TENG = 2 \times TGM1 + TM2 \tag{5a}$$

Furthermore, as described above, if the gear ratio between the first sun gear 21 and the first ring gear 22 is 1:1, the following equation (6a) holds between the first carrier rotational speed VCA1, the first sun gear rotational speed VSU1, and the first ring gear rotational speed VRI1, i.e. the first rotor rotational speed VRO1.

$$VCA1=(VSU1+VRO1)/2 \quad (6a)$$

In this equation (6a), the first carrier 24 is directly connected to the engine 3, and the first carrier rotational speed VCA1 is equal to the engine speed NE, and hence there holds the following equation (7a):

$$NE=(VSU1+VRO1)/2 \quad (7a)$$

Further, unless the gear ratio between the second sun gear 31 and the second ring gear 32 is 1:1, between the second carrier rotational speed VCA2, the second sun gear rotational speed VSU2, and the second ring gear rotational speed VRI2, i.e. the second rotor rotational speed VRO2, there holds the following equation (8a):

$$VCA2=(VSU2+VRO2)/2 \quad (8a)$$

Since the second carrier 34 and the first sun gear 21 are directly connected to each other, the second carrier rotational speed VCA2 and the first sun gear rotational speed VSU1 are equal to each other, and since the second sun gear 31 is directly connected to the crankshaft 3a, the second sun gear rotational speed VSU2 and the engine speed NE are equal to each other, so that the above equation (8a) can be expressed by the following equation (9a):

$$VSU1=(NE+VRO2)/2 \quad (9a)$$

Furthermore, by substituting the equation (9a) into the equation (7a), there is obtained the following equation (10a):

$$NE=(2\times VRO1+VRO2)/3 \quad (10a)$$

Further, by substituting the equation (5a) and the equation (10a) into the equation (1a), there is obtained the following equation (11a):

$$WP/WENG=(TGM1\times VRO1)/\{(2\times TGM1+TM2)\times(2\times VRO1+VRO2)/3\} \quad (11a)$$

Further, in this case, since the electric power generated by the first generator-motor 40 and the electric power supplied to the second generator-motor 50 are equal to each other, there holds the following equation:

$$TM2=(VRO1\times TGM1)/VRO2 \quad (12a)$$

If this equation (12a) is substituted into the equation (11a), the following equation (13a) is obtained. That is, if the gear ratio between the first sun gear 21 and the first ring gear 22 is 1:1, and at the same time the gear ratio between the second sun gear 31 and the second ring gear 32 is 1:1, the ratio between the electrical path power WP and the engine power WENG in the battery input/output zero mode is expressed by the following equation (13a):

$$WP/WENG=3/\{(2+VRO1/VRO2)\times(2+VRO2/VRO1)\} \quad (13a)$$

Provided, VRO1>0 and VRO2>0 in the equation (13a).

As described above, the electrical path power WP is equal to the electric power generated by the first generator-motor 40. Therefore, if the gear ratio between the first sun gear 21 and the first ring gear 22 is 1:1, and at the same time the gear ratio between the second sun gear 31 and the second ring gear 32 is 1:1, the electric power generated by the first generator-motor 40 is controlled according to the equation (13a) such that it becomes equal to WENG×3/{(2+VRO1/VRO2)×(2+VRO2/VRO1)}.

On the other hand, during traveling of the vehicle, if the following conditions (a) and (b) are both satisfied, the engine 3 is assisted by the second generator-motor 50. Hereinafter, this operation mode is referred to as "the assist mode".

(a) demanded torque PMCMD>first predetermined value PM1

(b) remaining capacity SOC>lower limit value SOCL

Here, the first predetermined value PM1 is calculated e.g. by searching a PM1 table (not shown) according to the vehicle speed VP. In this PM1 table, the first predetermined value PM1 is set to such a torque value as will make it possible to obtain the optimum fuel economy of the engine 3 with respect to the vehicle speed VP assumed then. The above-described lower limit value SOCL is set to such a value as will not cause excessive discharge of the battery 63. Thus, the operation in the assist mode is performed when power required for driving the vehicle (hereinafter referred to as "the vehicle demand power"), which is represented by the vehicle speed VP and the demanded torque PMCMD assumed at the time, is larger than the engine power WENG that will make it possible to obtain the optimum fuel economy of the engine 3, and at the same time when the remaining electric power in the battery 63 is large enough.

Figure 10:
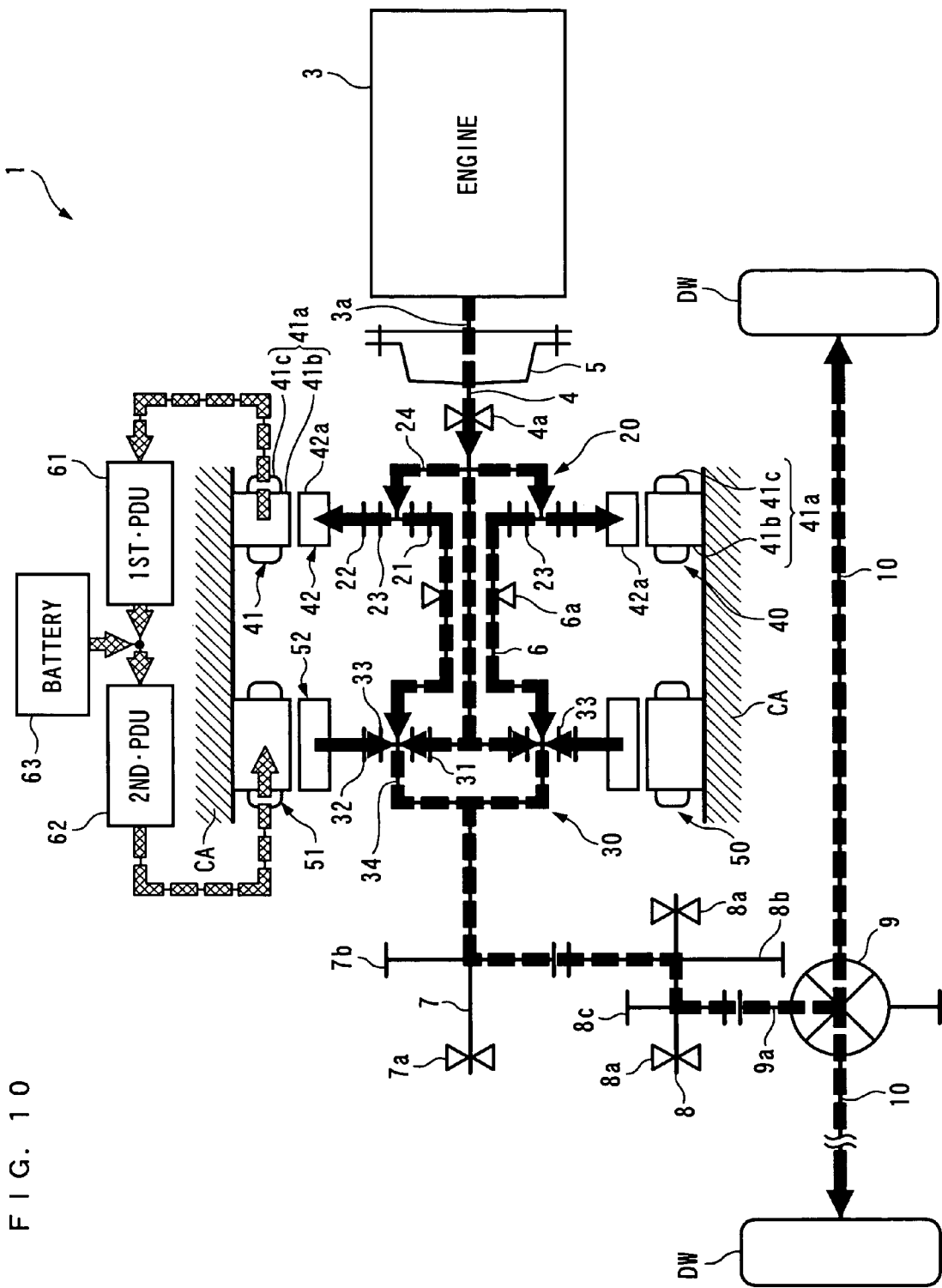
FIG. 10 A diagram showing how torque is transmitted in the power plant according to the first embodiment in an assist mode.

More specifically, similarly to the battery input/output zero mode, electric power is generated by the first generator-motor 40 using part of the engine power WENG. Further, in this case, differently from the battery input/output zero mode, as shown in FIG. 10, electric power charged in the battery 63 is supplied to the second generator-motor 50 in addition to the electric power generated by the first generator-motor 40. Therefore, the second generator-motor torque TM2 based on the sum of the electric power generated by the first generator-motor 40 and the electric power supplied from the battery 63 is transmitted to the second carrier 34. Further, similarly to the battery input/output zero mode, the second generator-motor torque TM2, the engine torque TENG distributed to the first sun gear 21 along with the electric power generation and the engine torque TENG transmitted to the second sun gear 31 are combined by the second carrier 34, and the combined torque is transmitted to the drive wheels DW and DW. As a result, assuming that there is no transmission loss caused by the gears, in the assist mode, the power transmitted to the drive wheels DW and DW becomes equal to the sum of the engine power WENG and the electric power (energy) supplied from the battery 63.

Figure 54:
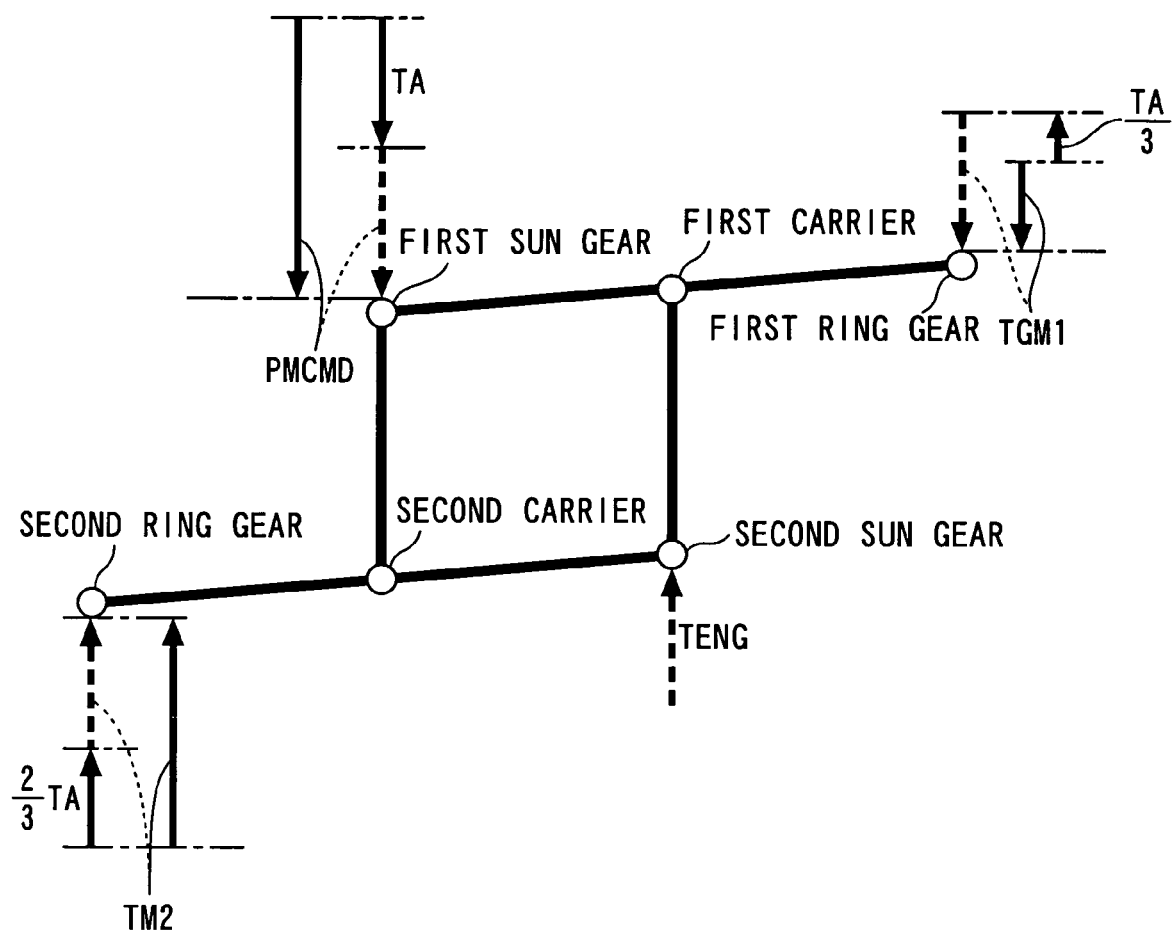
FIG. 54 A schematic diagram illustrating the relationship between the engine torque TENG and demanded torque PMCMD in the power plant according to the first embodiment, by using solid lines with arrows for the assist mode and using broken lines with arrows for the battery input/output zero mode.

Further, in the assist mode, the electric power generated by first generator-motor 40, the electric power supplied from the battery 63 to the second generator-motor 50, and the first and second rotor rotational speeds VRO1 and VRO2 are controlled such that the speed relationships between the rotational speeds of the respective gears of the first and second planetary gear units 20 and 30 are maintained. More specifically, the electric power generated by the first generator-motor 40 and the electric power supplied from the battery 63 are controlled as follows:

FIG. 54 schematically shows an example of the relationship between the engine torque TENG, the demanded torque PMCMD, and so forth, obtained in the assist mode. In FIG. 54, broken lines with arrows indicate states in the battery input/output zero mode before the assist mode, and it is assumed that the engine torque TENG, the demanded torque PMCMD, the first power-generating torque TGM1, and a second power-generating torque TGM2 are balanced with each other in the states. From the states, as indicated by solid lines with arrows in FIG. 54, when the demanded torque PMCMD is increased to switch the operation mode to the assist mode, the following control is carried out so as to supplement the insufficient amount of the engine torque TENG (hereinafter referred to as "the insufficient torque TA") with respect to the demanded torque PMCMD.

In this case, when the gear ratio between the first sun gear 21 and the first ring gear 22 is 1:1, and at the same time the gear ratio between the second sun gear 31 and the second ring gear 32 is 1:1, to maintain the speed relationships between the rotational speeds of the respective gears of the first and second planetary gear units 20 and 30, it is necessary to supplement ⅓ of the insufficient torque TA by the first generator-motor 40 and ⅔ of the insufficient torque TA by the second generator-motor 50. Further, since the first power-generating torque TGM1 acts on the engine torque TENG as negative torque, the electric power generated by the first generator-motor 40 is controlled such that the first power-generating torque TGM1 becomes equal to the difference between the first power-generating torque TGM1 in the battery input/output zero mode and the ⅓ of the insufficient torque TA (TGE1−TA/3). As a consequence, the electric power supplied from the first generator-motor 40 to the second generator-motor 50 is reduced. Further, the electric power supplied from the battery 63 to the second generator-motor 50 is controlled to a value obtained by converting the insufficient torque TA and the vehicle speed VP into electric energy. From the above, the total electric power supplied from the first generator-motor 40 and the battery 63 to the second generator-motor 50 is controlled such that the second generator-motor torque TM2 becomes equal to the sum of the second generator-motor torque TM2 in the battery input/output zero mode and the ⅔ of the insufficient torque TA (TM2+TA×⅔).

It should be noted that although the above-described example is an example of a case in which the ⅓ of the insufficient torque TA to be supplemented is small with respect to the first power-generating torque TGM1 in the battery input/output zero mode, if the ⅓ of the insufficient torque TA is larger, the electric power is supplied from the battery 63 not only to the second generator-motor 50 but also to the first generator-motor 40.

As described above, the operation in the assist mode is performed when the vehicle demand power is larger than the optimum fuel economy power. Further, in the assist mode, the engine power WENG is controlled such that the optimum fuel economy of the engine 3 can be obtained, and the insufficient amount of the engine power WENG with respect to the vehicle demand power is made up for by supply of electric power from the battery 63.

On the other hand, during traveling of the vehicle, if the following conditions (c) and (d) are both satisfied, part of the electric power generated by the first generator-motor 40 using the engine power WENG, as described above, is charged into the battery 63, and the remainder thereof is supplied to the second generator-motor 50. Hereinafter, this operation mode is referred to as "the drive-time charging mode".

(c) demanded torque PMCMD<second predetermined value PM2

(d) remaining capacity SOC<upper limit value SOCH

Here, the second predetermined value PM2 is calculated e.g. by searching a PM2 table (not shown) according to the vehicle speed VP. In this PM2 table, the second predetermined value PM2 is set to a value smaller than such a torque value as will make it possible to obtain the optimum fuel economy of the engine 3 with respect to the vehicle speed VP assumed then. The upper limit value SOCH is set to such a value as will not cause overcharge of the battery 63. Thus, the operation in the drive-time charging mode is performed when the vehicle demand power is smaller than the optimum fuel economy power and at the same time when the remaining capacity SOC is relatively small.

Figure 11:
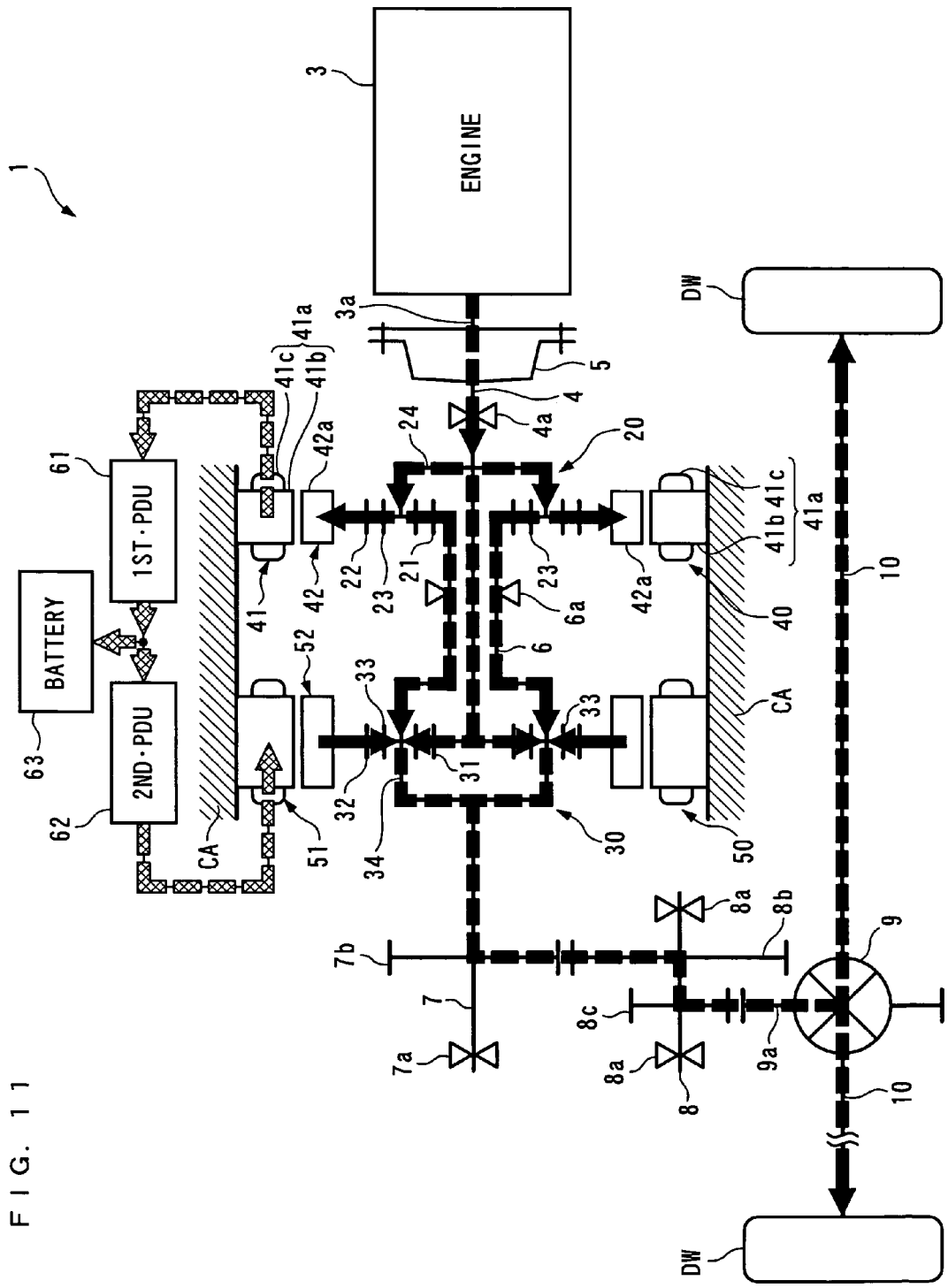
FIG. 11 A diagram showing how torque is transmitted in the power plant according to the first embodiment in a drive-time charging mode.

Referring to FIG. 11, in the drive-time charging mode, differently from the battery input/output zero mode, electric power, which has a magnitude obtained by subtracting the electric power charged into the battery 63 from the electric power generated by the first generator-motor 40, is supplied to the second generator-motor 50, and the second generator-motor torque TM2 based on the electric power having the magnitude is transmitted to the second carrier 34. Further, similarly to the battery input/output zero mode, the second generator-motor torque TM2, the engine torque TENG distributed to the first sun gear 21 along with the electric power generation and the engine torque TENG transmitted to the second sun gear 31 are combined by the second carrier 34, and the combined torque is transmitted to the drive wheels DW and DW. As a result, if there is no transmission loss caused by the gears, in the drive-time charging mode, the power transmitted to the drive wheels DW and DW has a magnitude obtained by subtracting the electric power (energy) charged into the battery 63 from the engine power WENG.

Figure 55:
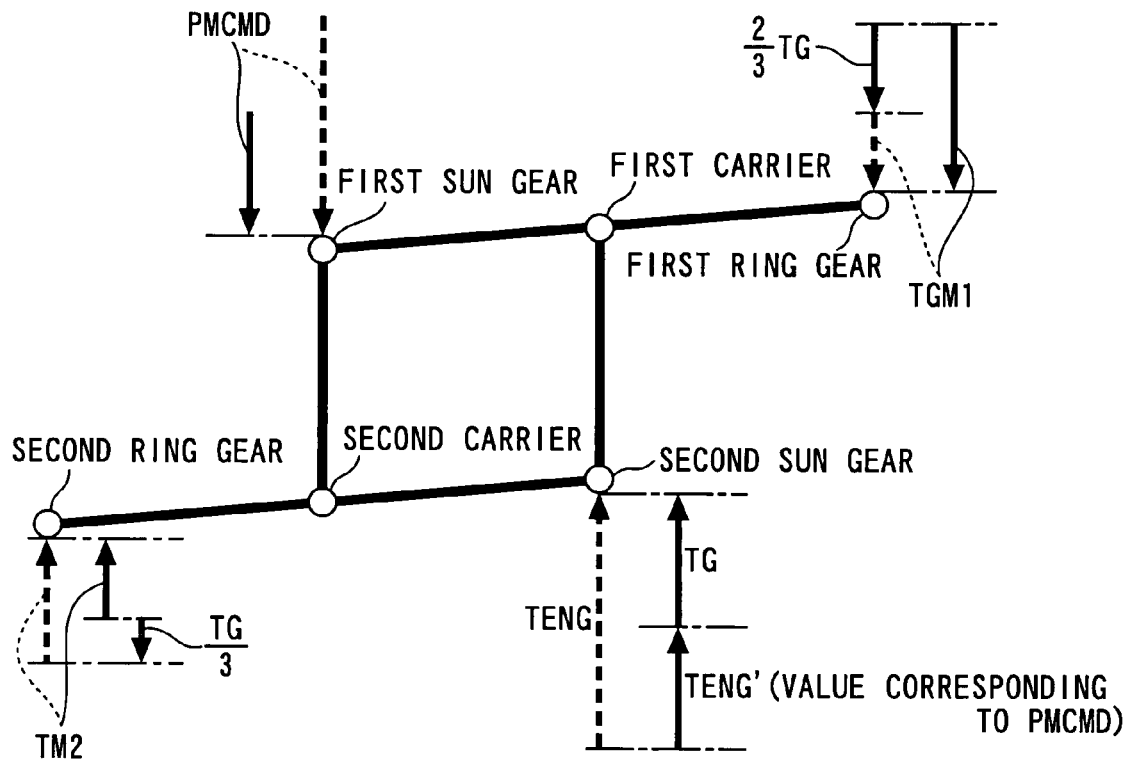
FIG. 55 A schematic diagram illustrating the relationship between the engine torque TENG and the demanded torque PMCMD in the power plant according to the first embodiment, by using solid lines with arrows for the drive-time charging mode and using broken lines with arrows for the battery input/output zero mode.

Further, in the drive-time charging mode, the electric power generated by the first generator-motor 40, the electric power charged into the battery 63 and the first and second rotor rotational speeds VRO1 and VRO2 are controlled such that the speed relationships between the rotational speeds of the respective gears of the first and second planetary gear units 20 and 30 are maintained. Furthermore, more specifically, the electric power generated by the first generator-motor 40 and the electric power charged into the battery 63 are controlled as follows:

FIG. 55 schematically shows an example of the relationship between the engine torque TENG, the demanded torque PMCMD, and so forth, obtained in the drive-time charging mode. In FIG. 55, broken lines with arrows indicate states in the battery input/output zero mode before the drive-time charging mode, and it is assumed that the engine torque TENG, the demanded torque PMCMD, the first power-generating torque TGM1 and the second generator-motor torque TM2 are balanced with each other in the states. From the states, as indicated by solid lines with arrows in FIG. 55, when the demanded torque PMCMD is decreased to switch the operation mode to the drive-time charging mode, the engine torque TENG becomes larger than the demanded torque PMCMD (hereinafter, the surplus amount of the engine torque TENG with respect to the demanded torque PMCMD is referred to as "the surplus torque TG").

In this case, when the gear ratio between the first sun gear 21 and the first ring gear 22 is 1:1, and at the same time the gear ratio between the second sun gear 31 and the second ring gear 32 is 1:1, to maintain the speed relationships between the rotational speeds of the respective gears of the first and second planetary gear units 20 and 30, it is necessary to reduce torque by an amount corresponding to ⅔ of the surplus torque TG in the first generator-motor 40, and by an amount corresponding to ⅓ of the surplus torque TG in the second generator-motor 50. In this case, since the first power-generating torque TGM1 acts on the engine torque TENG as negative torque, the electric power generated by the first generator-motor 40 is controlled such that the first power-generating torque TGM1 becomes equal to the sum of the first power-generating torque TGM1 in the battery input/output zero mode and the ⅔ of the surplus torque TG (TGE1+TG×⅔). Further, the electric power charged into the battery 63 is controlled to a value obtained by converting the surplus torque TG and the engine speed NE into electric energy. From the above, the electric power supplied from the first generator-motor 40 to the second generator-motor 50 is controlled such that the second generator-motor torque TM2 becomes equal to the difference between the second generator-motor torque TM2 in the battery input/output zero mode and the ⅓ of the surplus torque TG (TM2−TG/3).

As described above, the operation in the drive-time charging mode is performed when the vehicle demand power is smaller than the optimum fuel economy power. Further, in the drive-time charging mode, the engine power WENG is controlled such that the optimum fuel economy of the engine 3 can be obtained, and the surplus amount of the engine power WENG with respect to the vehicle demand power is charged into the battery 63 as electric power.

Figure 12:
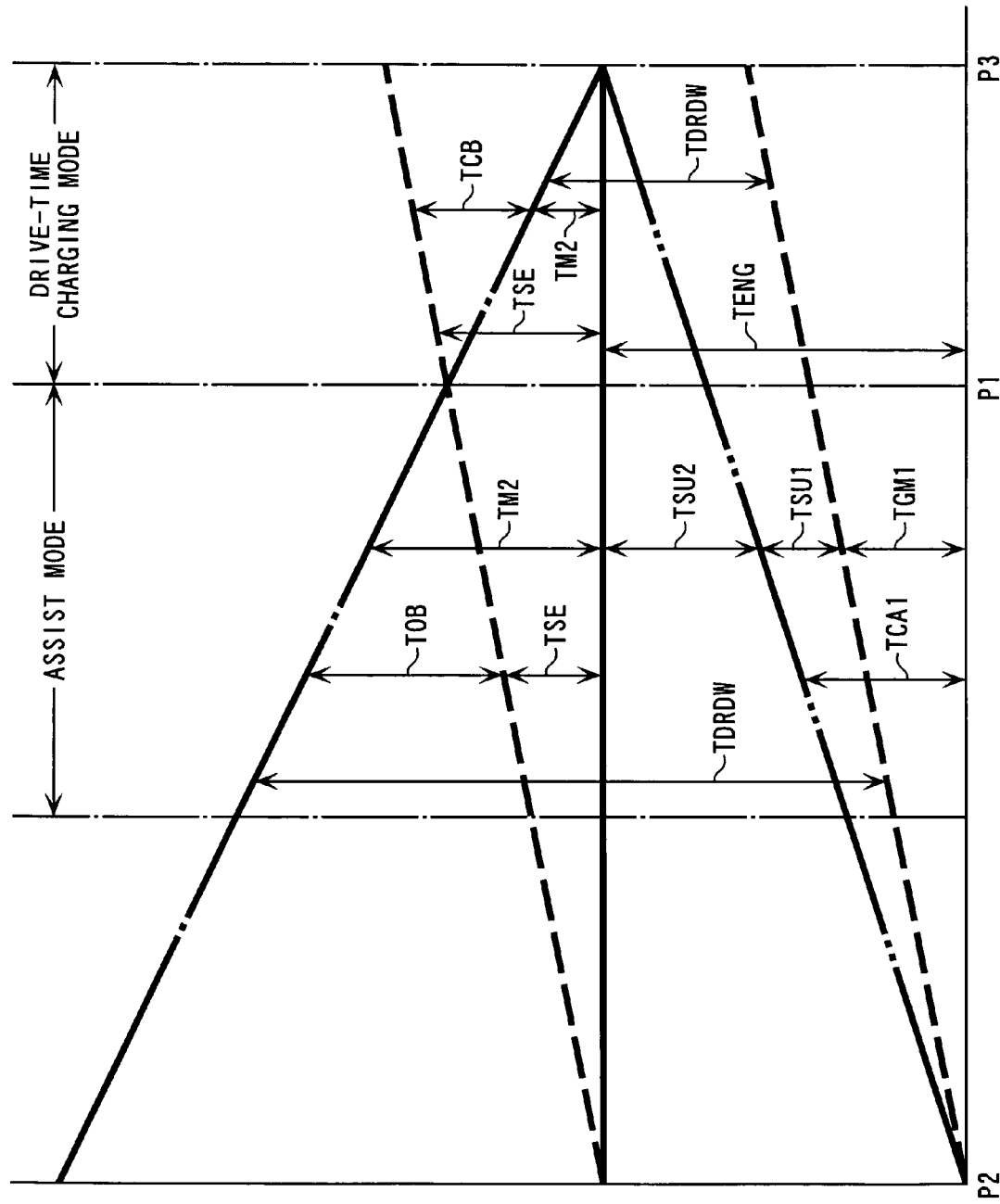
FIG. 12 A diagram showing a ratio of a foot axis drive torque TDRDW etc. to an engine torque TENG, assuming that the engine torque TENG is held constant and at the same time first and second rotor rotational speeds VRO1 and VRO2 are equal to each other, in the battery input/output zero mode, the assist mode and the drive-time charging mode.

FIG. 12 shows a diagram showing the torque transmitted to the drive wheels DW and DW (hereinafter referred to as "the foot axis drive torque TDRDW") etc. expressed in ratios to the engine torque TENG, assuming that the engine torque TENG is held constant and at the same time the first and second rotor rotational speeds VRO1 and VRO2 are equal to each other, in the battery input/output zero mode, the assist mode and the drive-time charging mode described above. Further, in FIG. 12, P1 indicates torques in the battery input/output zero mode. It should be noted that FIG. 12 does not reflect changes in the torques due to shifting of the gears of the differential gear mechanism 9, and this also applies to the following description.

Further, in FIG. 12, TSE represents torque of the second generator-motor 50, generated when all the electric power generated by the first generator-motor 40 is supplied to the second generator-motor 50 (hereinafter referred to as "the supplied electric power equivalent torque"). In short, the supplied electric power equivalent torque TSE is equal to the first power-generating torque TGM1.

As described above, basically, in all of the operation modes, combined torque formed by combining the second generator-motor torque TM2, the second sun gear transmitting torque TSU2, and the first sun gear transmitting torque TSU1 is transmitted to the drive wheels DW and DW via the second carrier 34, and therefore the foot axis drive torque TDRDW is equal to the total the first carrier 24 and the second sun gear 31 are directly connected to the engine 3, the sum of the first carrier transmitting torque TCA1 and the second sun gear transmitting torque TSU2 is equal to the engine torque TENG, and as the value of TCA1 is larger, the value of TSU2 becomes smaller. Inversely, as the value of TSU2 is larger, the value of TCA1 becomes smaller.

Further, as described hereinabove, in the battery input/output zero mode, all the electric power generated by the first generator-motor 40 is supplied to the second generator-motor 50, so that the second generator-motor torque TM2 is equal to the supplied electric power equivalent torque TSE and the first power-generating torque TGM1.

Further, in FIG. 12, TOB represents, in the assist mode, torque of the second generator-motor 50, generated by the electric power supplied from the battery 63 to the second generator-motor 50 (hereinafter referred to as "the battery output equivalent torque"). As described hereinabove, in the assist mode, not only the electric power generated by the first generator-motor 40 but also the electric power from the battery 63 are supplied to the second generator-motor 50, and hence as shown in FIG. 12, the second generator-motor torque TM2 becomes equal to the sum of the supplied electric power equivalent torque TSE and the battery output equivalent torque TOB, and as the battery output equivalent torque TOB is larger, the second generator-motor torque TM2 becomes larger. Furthermore, as the battery output equivalent torque TOB is larger, the foot axis drive torque TDRDW becomes larger.

Further, as described above, as the second generator-motor torque TM2 is transmitted to the second carrier 34 via the second ring gear 32, the second sun gear transmitting torque TSU2 is transmitted to the second carrier 34 such that torque is balanced between the second sun gear 31 and the second ring gear 32, so that as the second generator-motor torque TM2 is larger, the second sun gear transmitting torque TSU2 becomes larger. Furthermore, as described hereinabove, as the second sun gear transmitting torque TSU2 is larger, the first carrier transmitting torque TCA1 becomes smaller, and hence the first power-generating torque TGM1 distributed from the first carrier transmitting torque TCA1 is also smaller. From the above, as the second generator-motor torque TM2 is larger, and the battery output equivalent torque TOB is larger, the first power-generating torque TGM1 becomes smaller, and the ratio of the supplied electric power equivalent torque TSE to the second generator-motor torque TM2 becomes smaller. That is, as the electric power supplied from the battery 63 is larger, the engine power WENG transmitted to the drive wheels DW and DW by the above-described electrical paths becomes smaller, while the engine power WENG transmitted to the drive wheels DW and DW by the mechanical paths becomes larger.

When the electric power generation is not performed by the first generator-motor 40 but the electric power supplied from the battery 63 to the second generator-motor 50 is controlled such that the ratio between the battery output equivalent torque TOB and the engine torque TENG becomes equal to the ratio between the second ring gear 32 and the second sun gear 31, it is possible to transmit the engine power WENG to the drive wheels DW and DW only by the mechanical paths without transmitting the same by the electrical paths. In this case, as indicated by P2 in FIG. 12, the first carrier transmitting torque TCA1, the first sun gear transmitting torque TSU1, the first power-generating torque TGM1 and the supplied electric power equivalent torque TSE all become equal to 0. Further, the second sun gear transmitting torque TSU2 becomes equal to the engine torque TENG, and the foot axis drive torque TDRDW becomes equal to the sum of the engine torque TENG and the second generator-motor torque TM2, i.e. the battery output equivalent torque TOB.

Further, in FIG. 12, TCB represents torque equivalent to the electric power charged into the battery 63 and the rotational speed of the rotating magnetic field in the drive-time charging mode (hereinafter referred to as "the charging equivalent torque"). As described hereinabove, in the drive-time charging mode, part of the electric power generated by the first generator-motor 40 is supplied to the second generator-motor 50, and the remainder thereof is charged into the battery 63, so that as shown in FIG. 12, the charging equivalent torque TCB is equal to the difference between the supplied electric power equivalent torque TSE and the second generator-motor torque TM2. Furthermore, as the first power-generating torque TGM1 is larger and the first carrier transmitting torque TCA1 is larger, the second sun gear transmitting torque TSU2 becomes smaller. Further, as described above, the electric power supplied to the second generator-motor 50 is controlled such that the speed relationships between the rotational speeds of the respective gears of the first and second planetary gear units 20 and 30 are maintained, so that as the first power-generating torque TGM1 is larger and the second sun gear transmitting torque TSU2 is smaller, the second generator-motor torque TM2 becomes smaller. Further, as described above, as the first power-generating torque TGM1 is larger, the second generator-motor torque TM2 becomes smaller, and hence the charging equivalent torque TCB becomes larger. Furthermore, as the charging equivalent torque TCB is larger, the foot axis drive torque TDRDW becomes smaller.

Further, in FIG. 12, P3 indicates torques obtained in the case where the electric power generated by the first generator-motor 40 is controlled such that the first power-generating torque TGM1 becomes equal to a value obtained by multiplying the engine torque TENG by {the number of gear teeth of the first ring gear 22/(the number of gear teeth of the first sun gear 21+the number of gear teeth of the first ring gear 22)}, and all the generated electric power is charged into the battery 63. In this case, as indicated by P3, the first carrier transmitting torque TCA1 becomes equal to the engine torque TENG, and both the second sun gear transmitting torque TSU2 and the second generator-motor torque TM2 become equal to 0. Furthermore, the foot axis drive torque TDRDW becomes equal to a value obtained by multiplying the engine torque TENG by {the number of gear teeth of the first sun gear 21/(the number of gear teeth of the first sun gear 21+the number of gear teeth of the first ring gear 22)}, and the charging equivalent torque TCB becomes equal to a value obtained by multiplying the engine torque TENG by {the number of gear teeth of the first ring gear 22/(the number of gear teeth of the first sun gear 21+the number of gear teeth of the first ring gear 22)}. As described above, in this case, the second generator-motor torque TM2 becomes equal to 0, so that it is possible to transmit the engine power WENG to the drive wheels DW and DW only by the mechanical paths without transmitting the same by the electrical paths.

Next, a description will be given of the control during decelerating traveling of the vehicle. During decelerating running, when the ratio of foot axis input torque of the drive wheels DW and DW transmitted to the engine 3 to torque of the drive wheels DW and DW (hereinafter referred to as "the foot axis input torque") is small, electric power generation is performed by both the first and second generator-motors 40 and 50 using part of power from the drive wheels DW and DW, and generated electric power is charged into the battery 63.

Figure 13:
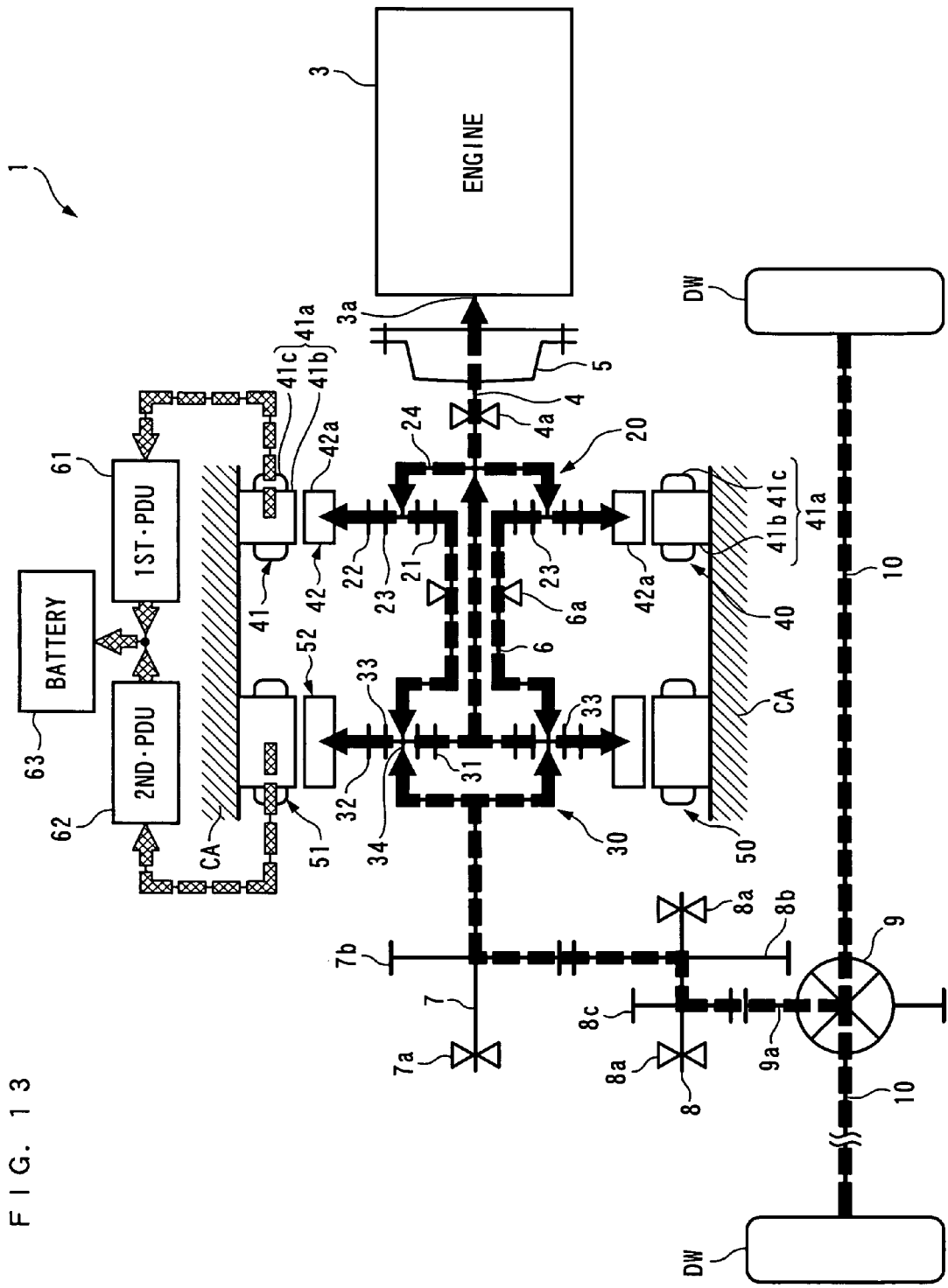
FIG. 13 A diagram showing how torque is transmitted in the power plant according to the first embodiment during decelerating traveling of the vehicle.

FIG. 13 shows how torque is transmitted during decelerating traveling of the vehicle. As shown in the figure, a combined torque formed by combining all the foot axis input torque and torque distributed to the first sun gear 21, as described hereinafter, is transmitted to the second carrier 34. Further, electric power generation is performed by the second generator-motor 50, and as part of the torque transmitted to the second carrier 34 is transmitted to the second generator-motor 50 via the second planetary gears 33 and the second ring gear 32, part of the torque transmitted to the second carrier 34 is also transmitted to the second sun gear 31 via the second planetary gears 33 such torque is balanced between the second ring gear 32 and the second sun gear 31. That is, the torque transmitted to the second carrier 34 is distributed to the second generator-motor 50 and the second sun gear 31.

Further, part of the torque distributed to the second sun gear 31 is transmitted to the engine 3. Similarly to the case in the battery input/output zero mode, as the electric power is generated by the first generator-motor 40, the remainder thereof is transmitted to the first carrier 24 and then is distributed to the first generator-motor 40 and the first sun gear 21. Further, the torque distributed to the first sun gear 21 is transmitted to the second carrier 34. As a result, if there is no transmission loss caused by the gears, during the decelerating traveling of the vehicle, the sum of the power transmitted to the engine 3 and the electric power (energy) charged into the battery 63 becomes equal to the power from the drive wheels DW and DW.

Further, in place of the above-described methods, the start of the engine 3, the creep operation and the standing start of the vehicle may be performed as follows: First, a description will be given of the start of the engine 3. Differently from the above-described start of the engine 3 during traveling of the vehicle, this start of the engine 3 is carried out during stoppage of the vehicle. Hereinafter, such start of the engine 3 is referred to as "the ENG start during stoppage of the vehicle". More specifically, electric power is supplied from the battery 63 to the first generator-motor 40, whereby the first rotor 42 is caused to perform normal rotation together with the first ring gear 22. Further, electric power is generated by the second generator-motor 50, and the generated electric power is supplied to the first generator-motor 40.

Figure 14:
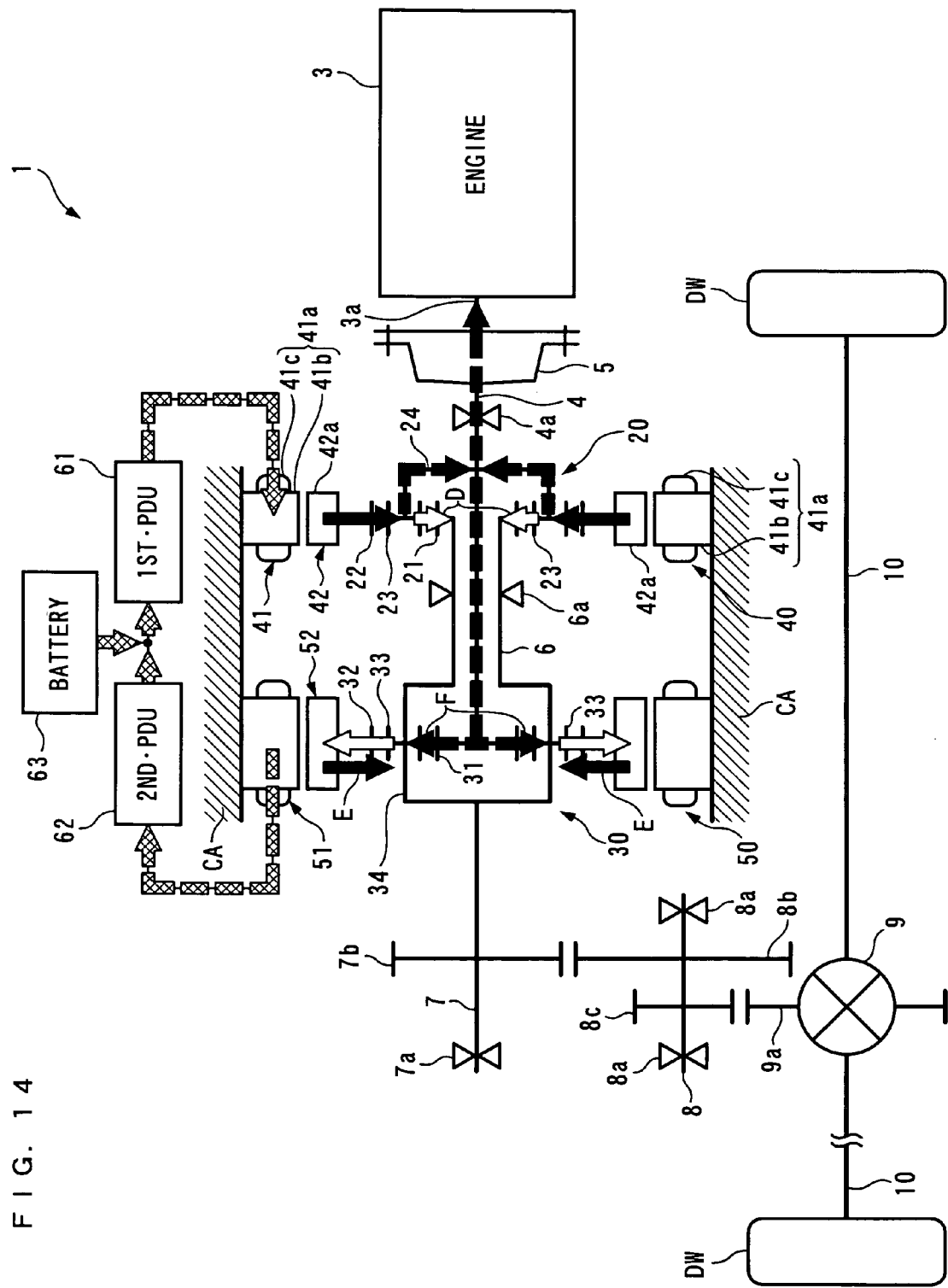
FIG. 14 A diagram showing how torque is transmitted in the power plant according to the first embodiment, at the time of ENG start during stoppage of the vehicle.
Figure 15:
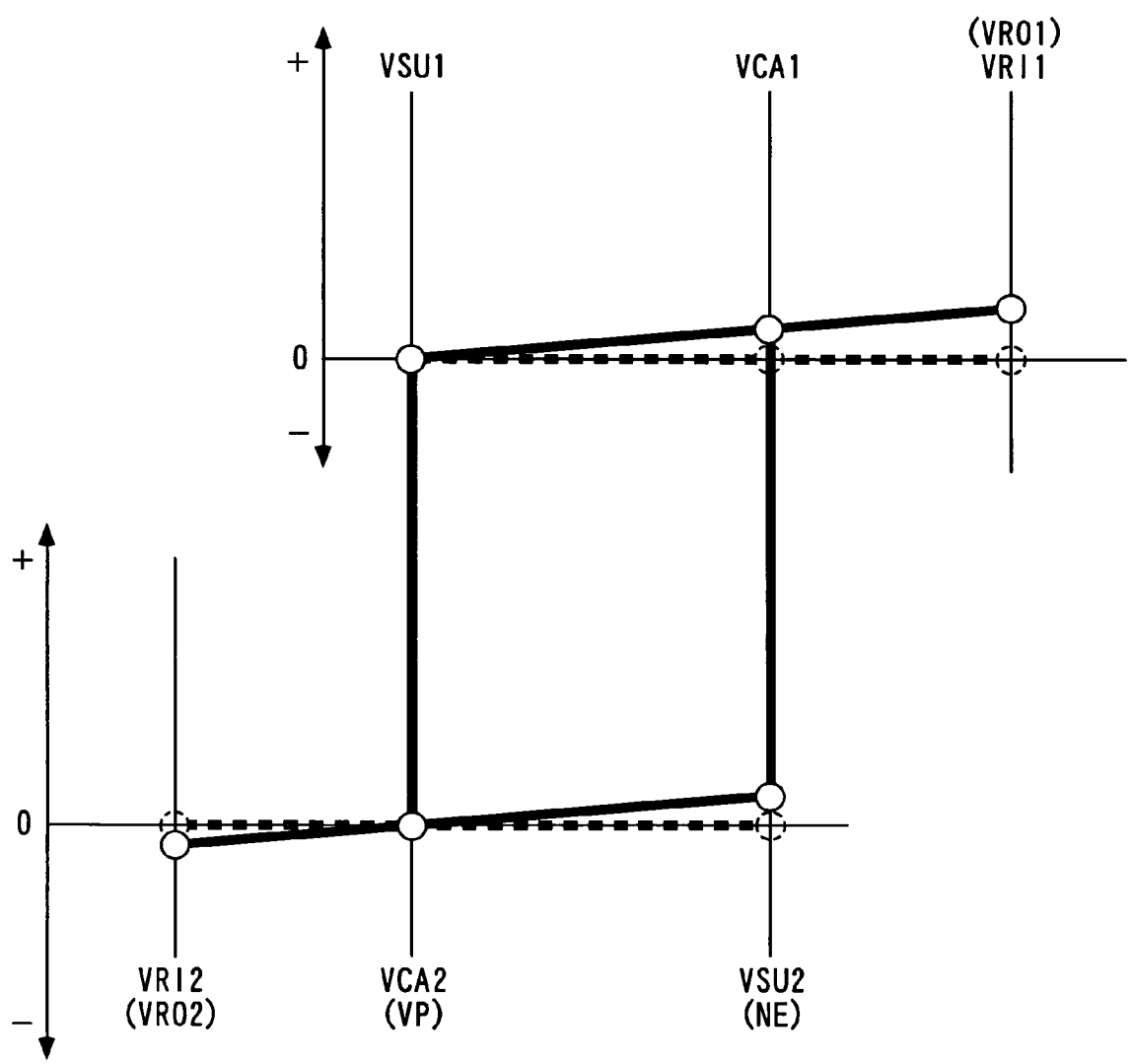
FIG. 15 A speed diagram of the first and second sun gear rotational speeds VSU1 and VSU2, the first and second carrier rotational speeds VCA1 and VCA2, and the first and second ring gear rotational speeds VRI1 and VRI2 at the time of the ENG start during stoppage of the vehicle, shown by way of example.

FIG. 14 shows how torque is transmitted at the above-described ENG start during stoppage of the vehicle, and FIG. 15 shows a speed diagram at the time of the ENG start during stoppage of the vehicle. As shown in FIG. 14, at the ENG start during stoppage of the vehicle, the torque from the first generator-motor 40 is transmitted to the first carrier 24 and the first sun gear 21 via the first ring gear 22 and the first planetary gears 23, to thereby act on the first carrier 24 to cause the first carrier 24 to perform normal rotation and on the first sun gear 21 to cause the first sun gear 21 to perform normal reverse rotation (indicated by arrows D). Further, part of the torque transmitted to the first carrier 24 is transmitted to the crankshaft 3a, whereby the crankshaft 3a performs normal rotation.

Furthermore, at the ENG start during stoppage of the vehicle, the remainder of the torque transmitted to the first carrier 24 is transmitted to the second sun gear 31 via the first main shaft 4, and then is transmitted to the second rotor 52 via the second planetary gears 33 and the second ring gear 32, whereby as indicated by thick solid lines in FIG. 15, the second rotor 52 perform reverse rotation together with the second ring gear 32. Therefore, braking torque, which acts on the second rotor 52 along with the electric power generation by the second generator-motor 50, acts on the second ring gear 32 performing reverse rotation to cause the second ring gear 32 to perform normal rotation, as indicated by arrows E. As a consequence, combined torque formed by combining the torque indicated by the arrows E and the torque transmitted to the second sun gear 31, indicated by arrows F, is transmitted to the second carrier 34. This combined torque acts on the second carrier 34 such to cause the second carrier 34 to perform normal rotation.

In this case, the electric power supplied to the first generator-motor 40 and the electric power generated by the second generator-motor 50 are controlled such that the above-mentioned torque indicated by the arrows D, for causing the first sun gear 21 to perform reverse rotation, and the torques indicated by the arrows E and F, for causing the second carrier 34 to perform normal rotation are balanced with each other, whereby the first sun gear 21, the second carrier 34, and the drive wheels DW and DW, which are connected to each other, are held at rest. As a consequence, as shown in FIG. 15, the first sun gear rotational speed VSU1 and the second carrier rotational speed VCA2 become equal to 0, and the vehicle speed VP as well become equal to 0.

Further, in this case, the electric power supplied to the first generator-motor 40, the electric power generated by the second generator-motor 50 and the first and second rotor rotational speeds VRO1 and VRO2 are controlled such that the relationships between the rotational speeds of the respective gears of the first and second planetary gear units 20 and 30 are maintained and at the same time, the first carrier rotational speed VCA1 and the second sun gear rotational speed VSU2, that is, the engine speed NE, takes a relatively small value (see FIG. 15). From the above, at the ENG start during stoppage of the vehicle, while holding the vehicle speed VP at 0, the engine speed NE is controlled to a relatively small value suitable for the start of the engine 3. Further, in this state, the ignition operation of the fuel injection valves and the spark plugs of the engine 3 is controlled, whereby the engine 3 is started.

The control during the creep operation is performed subsequent to the above-described ENG start during stoppage of the vehicle, as follows. Hereinafter, this creep operation is referred to as "the ENG creep operation". That is, electric power generation is performed by the first and second generator-motors 40 and 50 by using part of the engine power WENG, and the electric power thus generated is charged into the battery 63.

Figure 16:
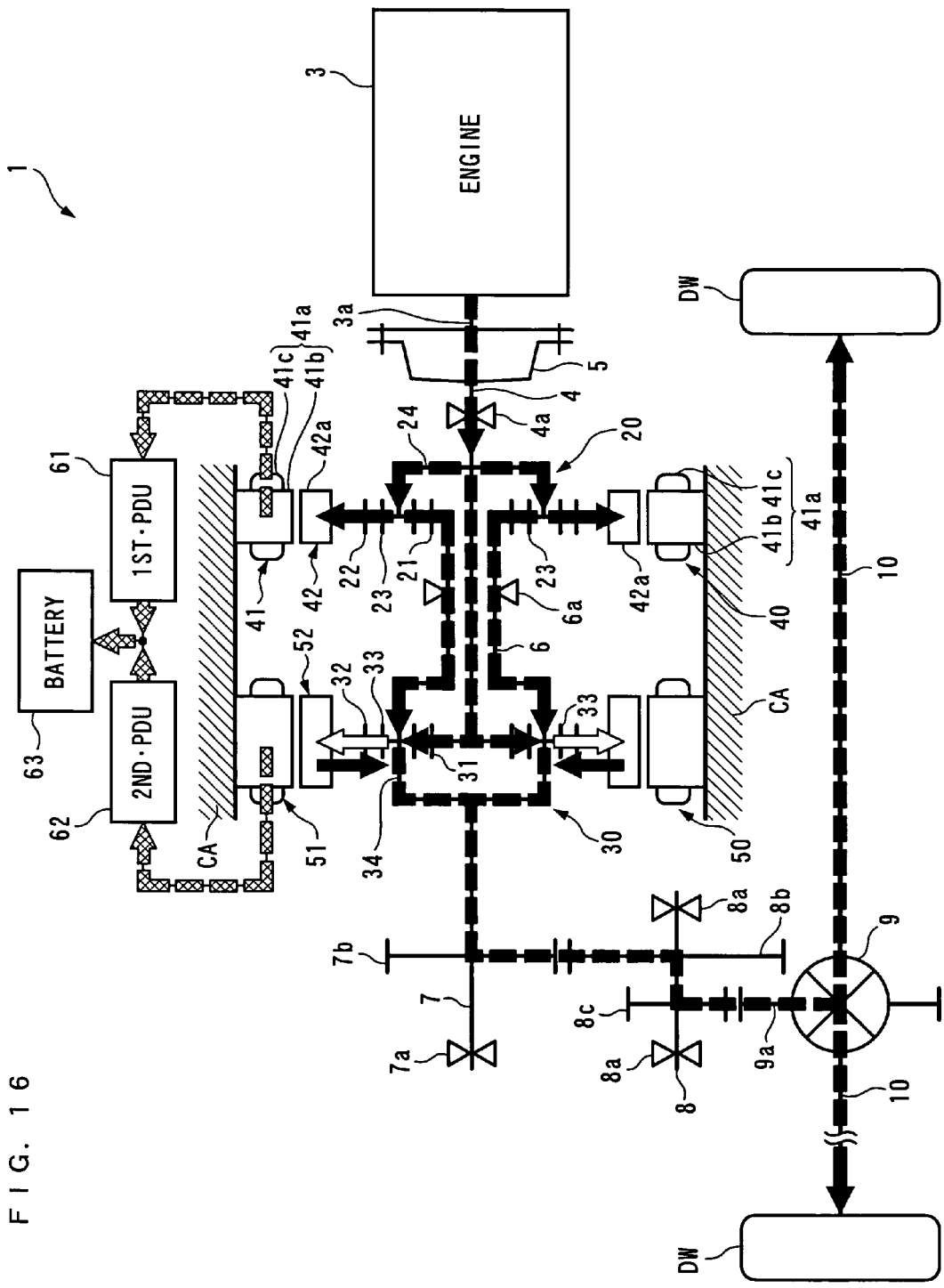
FIG. 16 A diagram showing how torque is transmitted in the power plant according to the first embodiment during an ENG creep operation.
Figure 17:
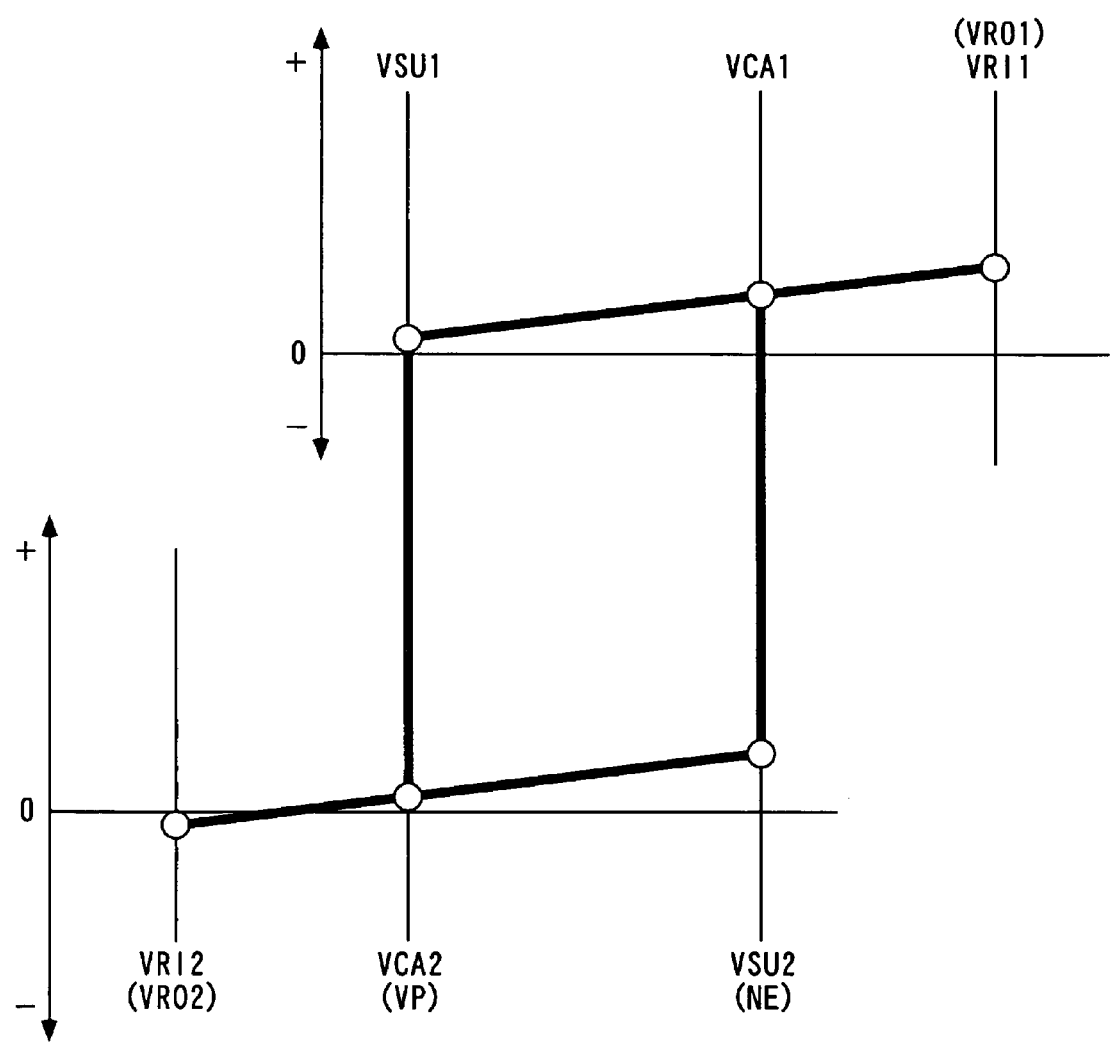
FIG. 17 A speed diagram of the first and second sun gear rotational speeds VSU1 and VSU2, the first and second carrier rotational speeds VCA1 and VCA2, and the first and second ring gear rotational speeds VRI1 and VRI2 during the ENG creep operation, shown by way of example.

FIG. 16 shows how torque is transmitted during the above-described ENG creep operation and FIG. 17 shows a speed diagram during the ENG creep operation. As shown in FIG. 16, during the ENG creep operation, similarly to the case in the above-mentioned battery input/output zero mode, along with the electric power generation by the first generator-motor 40, part of the engine torque TENG is transmitted to the first carrier 24, and the engine torque TENG transmitted to the first carrier 24 is distributed to the first generator-motor 40 and the first sun gear 21.

Further, the remainder of the torque TENG is transmitted to the second sun gear 31, and is then transmitted to the second rotor 52 via the second planetary gears 33 and the second ring gear 32, whereby as shown in FIG. 17, the second rotor 52 performs reverse rotation together with the second ring gear 32. Therefore, similarly to the case of the above-described ENG start during stoppage of the vehicle, braking torque, which acts on the second rotor 52 in accordance with the electric power generation by the second generator-motor 50, acts on the second ring gear 32 performing reverse rotation to cause the second ring gear 32 to perform normal rotation. As a consequence, combined torque formed by combining the torque causing the second ring gear 32 to perform normal rotation, and the engine torque TENG transmitted to the second sun gear 31 is transmitted to the second carrier 34. Further, the engine torque TENG distributed to the first sun gear 21, as described hereinabove, is further transmitted to the second carrier 34.

As described above, during the ENG creep operation, combined torque formed by combining the engine torque TENG distributed to the first sun gear 21, the torque transmitted to the second ring gear 32 along with the electric power generation by the second generator-motor 50, and the engine torque TENG transmitted to the second sun gear 31 is transmitted to the second carrier 34. Further, this combined torque is transmitted to the drive wheels DW and DW, for causing the drive wheels DW and DW to perform normal rotation. Furthermore, in this case, the electric power generated by the first and second generator-motors 40 and 50, and the first and second rotor rotational speeds VRO1 and VRO2 are controlled such that the first sun gear rotational speed VSU1 and the second carrier rotational speed VCA2, that is, the vehicle speed VP becomes very small (see FIG. 17), whereby the creep operation is carried out.

Further, during the ENG creep operation, as described above, the engine torque TENG distributed to the first sun gear 21 along with the electric power generation by the first generator-motor 40, and the engine torque TENG transmitted to the second carrier 34 via the second sun gear 31 along with the electric power generation by the second generator-motor 50 are transmitted to the drive wheels DW and DW. That is, since part of the engine torque TENG is transmitted to the drive wheels DW and DW, it is possible to prevent the large reaction from the drive wheels DW and DW from acting on the engine 3, thereby making it possible to perform the creep operation without causing engine stall. It should be noted that the ENG creep operation using the above-described engine power WENG is mainly carried out when the remaining charge SOC is small or when the vehicle is ascending a slope.

Figure 18:
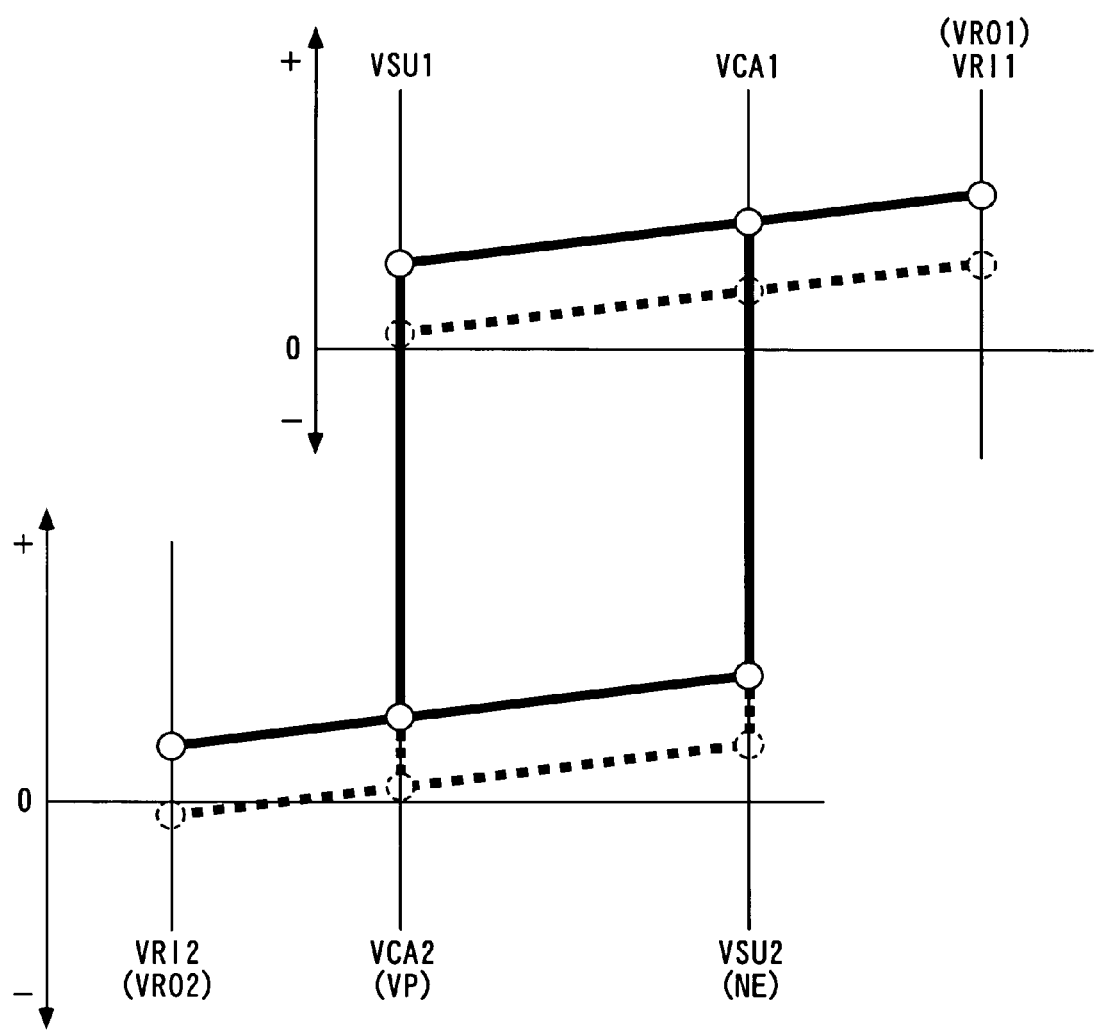
FIG. 18 A speed diagram of the first and second sun gear rotational speeds VSU1 and VSU2, the first and second carrier rotational speeds VCA1 and VCA2, and the first and second ring gear rotational speeds VRI1 and VRI2 at the time of ENG-based standing start, shown by way of example.

The control at the standing start of the vehicle is performed subsequent to the above-described ENG creep operation, as follows. Hereinafter, this standing start of the vehicle is referred to as "the ENG-based standing start". That is, while increasing the amount of electric power generated by the second generator-motor 50 to thereby control the second rotor rotational speed VRO2 of the second rotor 52, which has been performing reverse rotation during the ENG creep operation, such that it becomes equal to 0, the first rotor rotational speed VRO1 of the first rotor 42, which has been performing normal rotation during the ENG creep operation, is increased, and the engine power WENG is increased. Then, after the second rotor rotational speed VRO2 becomes equal to 0, the operation in the above-mentioned battery input/output zero mode is performed. From the above, as indicated by thick solid lines in FIG. 18, the first sun gear rotational speed VSU1 and the second carrier rotational speed VCA2, i.e. the vehicle speed VP is increased from a state of the ENG creep operation, indicated by broken lines in FIG. 18, causing the vehicle to start.

As described above, according to the aforementioned first embodiment, in the battery input/output zero mode, differently from the above-described conventional case, the engine power WENG is transmitted to the drive wheels DW and DW without being recirculated, so that it is possible to reduce power passing through the first and second planetary gear units 20 and 30. This makes it possible to reduce the sizes of the first and second planetary gear units 20 and 30, thereby making it possible to attain the reduction of the size and manufacturing costs of the power plant 1. Further, planetary gear units having torque capacity corresponding to reduced power, as described above, are used as the first and second planetary gear units 20 and 30, thereby making it possible to suppress the loss of power to improve the driving efficiency of the power plant 1.

Further, the engine power WENG is transmitted to the drive wheels DW and DW in a divided state via the first to third transmission paths. This makes it possible to reduce power (energy) passing through the first and second generator-motors 40 and 50 and the 1st and 2nd-PDUs 61 and 62 via the third transmission path. Therefore, it is possible to reduce the sizes of the first and second generator-motors 40 and 50 and the 1st and 2nd-PDUs 61 and 62, thereby making it possible to attain further reduction of the size and manufacturing costs of the power plant 1. Further, it is possible to reduce power transmitted to the drive wheels DW and DW via the third transmission path, i.e. by the electrical path, which makes it possible to further enhance the driving efficiency of the power plant 1.

Further, as described hereinabove with reference to FIG. 9, in the battery input/output zero mode, the engine power WENG is transmitted to the drive wheels DW and DW while having the speed thereof steplessly changed by controlling the first and second rotor rotational speeds VRO1 and VRO2d. Further, in this case, the first and second rotor rotational speeds VRO1 and VRO2 are controlled such that the engine speed NE becomes equal to the target engine speed NECMD set to a value that will make it possible to obtain the optimum fuel economy of the engine 3, and therefore it is possible to drive the drive wheels DW and DW while controlling the engine power WENG such that the optimum fuel economy of the engine 3 can be obtained. This makes it possible to further enhance the driving efficiency of the power plant 1.

Further, the first and second generator-motors 40 and 50, each of which has a larger torque capacity with respect to the size than a stepless transmission, are used as the first and second energy conversion devices, respectively, which makes it possible to reduce the sizes of the first and second generator-motors 40 and 50, whereby it is possible to further reduce the size of the power plant 1.

The operation in the drive-time charging mode is performed when the vehicle demand power is smaller than the optimum fuel economy power. Further, during the drive-time charging mode, the engine power WENG is controlled such that the optimum fuel economy of the engine 3 can be obtained, and the surplus amount of the engine power WENG with respect to the vehicle demand power is charged into the battery 63 as electric power. Furthermore, the operation in the assist mode is performed when the vehicle demand power is larger than the optimum fuel economy power, and during the assist mode, the engine power WENG is controlled such that the optimum fuel economy of the engine 3 can be obtained. Further, the insufficient amount of the engine power WENG with respect to the vehicle demand power is made up for by supply of electric power from the battery 63. Therefore, it is possible to further enhance the driving efficiency of the power plant 1.

Further, since electric energy is used as energy in another form of energy converted from the engine power WENG, it is possible to efficiently convert energy between the engine power WENG and electric energy, thereby making it possible to further enhance the driving efficiency of the power plant 1. For the same reason, since energy can be accurately converted in the first and second generator-motors 40 and 50, it is possible to properly transmit power to the drive wheels DW and DW via the above-described third transmission path. Furthermore, in the drive-time charging mode and the assist mode, it is possible to accurately charge and discharge electric energy, and efficiently perform operations for charging and discharging electric energy.

Further, since the first and second planetary gear units 20 and 30 are used as the first and second distributing and combining devices according to the present invention, it is possible to construct the power plant 1 easily and inexpensively without preparing special devices, and further downsize the power plant 1. Furthermore, since the first and second ring gears 22 and 32 are connected to the first and second generator-motors 40 and 50, respectively, this connection can be performed easily.

Figure 19:
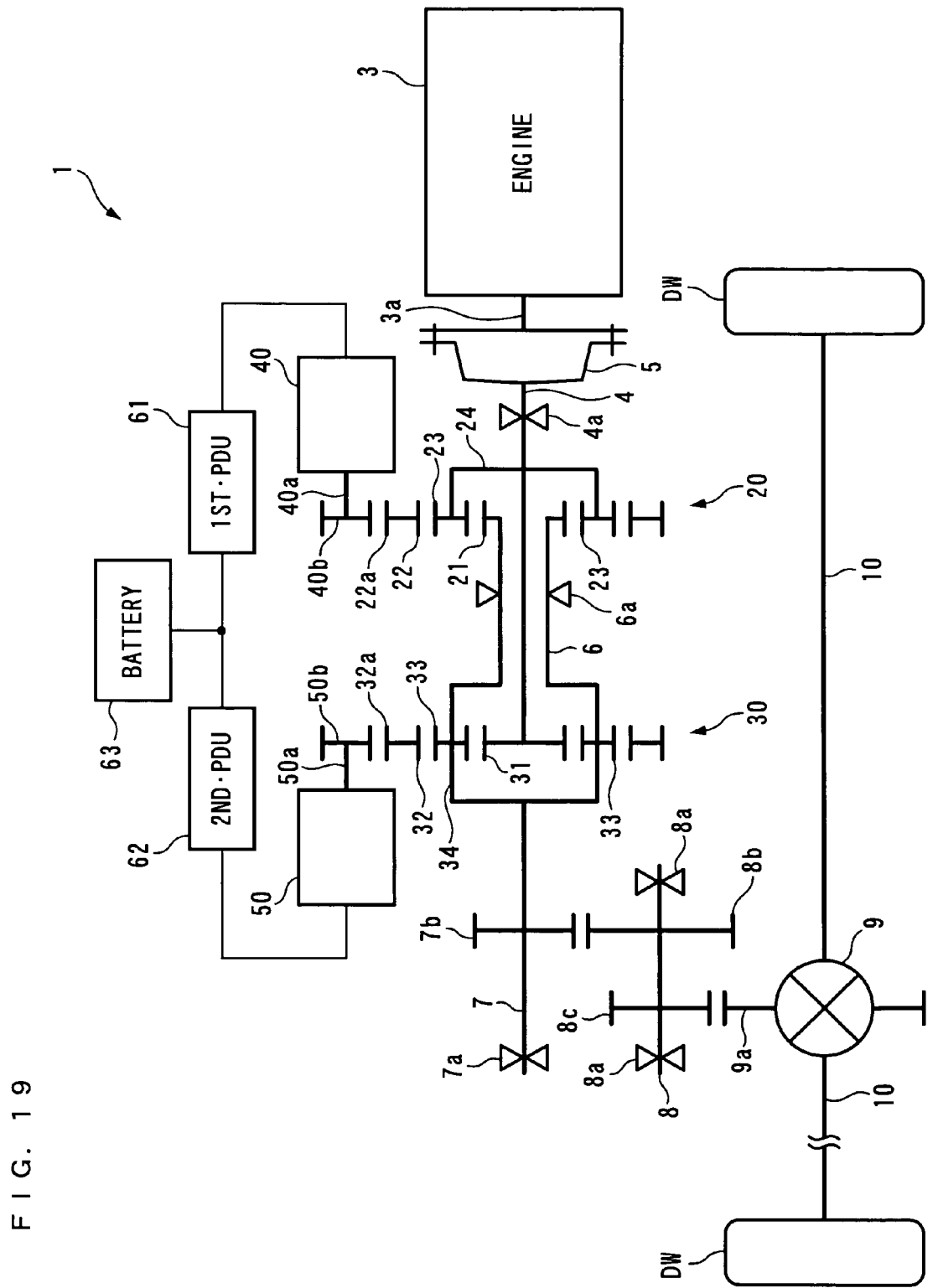
FIG. 19 A schematic diagram of an engine, first and second generator-motors, etc. of a variation of the power plant according to the first embodiment.

FIG. 19 shows a variation of the above-described first embodiment. In this variation, the first and second generator-motors 40 and 50 are provided separately from the first and second planetary gear units 20 and 30, respectively.

More specifically, a gear 22a and a gear 32a are formed on outer peripheral surfaces of the first and second ring gear 22 and 32, respectively. Further, gears 40b and 50b are integrally formed with respective output shafts 40a and 50a of the first and second generator-motors 40 and 50. These gears 40b and 50b are in mesh with the above-mentioned gears 22a and 32a, respectively. With the above arrangement, according to this variation, it is possible to obtain the same advantageous effects as provided by the first embodiment.

Although in the above-described first embodiment, the first carrier 24 and the second sun gear 31 are directly connected to each other, and the first sun gear 21 and the second carrier 34 are directly connected to each other, this is not limitative, but the first carrier 24 and the second sun gear 31 are not necessarily required to be directly connected to each other insofar as they are connected to the crankshaft 3a. Further, the first sun gear 21 and the second carrier 34 are not necessarily required to be directly connected to each other insofar as they are connected to the drive wheels DW and DW.

Further, in the first embodiment, the connecting relationship between the engine 3, the first and second generator-motors 40 and 50, the drive wheels DW and DW, the first and second sun gears 21 and 31, the first and second carriers 24 and 34, and the first and second ring gears 22 and 32 can be configured as desired insofar as they satisfy the following conditions: One of the first sun gear 21 and the first ring gear 22, and the second carrier 34 are connected to the drive wheels DW and DW; one of the second sun gear 31 and the second ring gear 32, and the first carrier 24 are connected to the engine 3; the other of the first sun gear 21 and the first ring gear 22 is connected to the first generator-motor 40; and the other of the second sun gear 31 and the second ring gear 32 is connected to the second generator-motor 50.

For example, the first carrier 24 and the second ring gear 32 may be connected to the engine 3, the first ring gear 22 and the second carrier 34 to the drive wheels DW and DW, and the first and second sun gears 21 and 31 to the first generator-motor 40 and the second generator-motor 50, respectively.

Further, although in the first embodiment, the battery 63 is used as the energy storing and releasing device for storing and releasing electric energy, it is to be understood that e.g. a capacitor may be used. Furthermore, the engine power WENG may be converted into electric energy, e.g. into pressure energy by an oil pressure pump and the like and the converted pressure energy may be stored e.g. in an accumulator.

Figure 20:
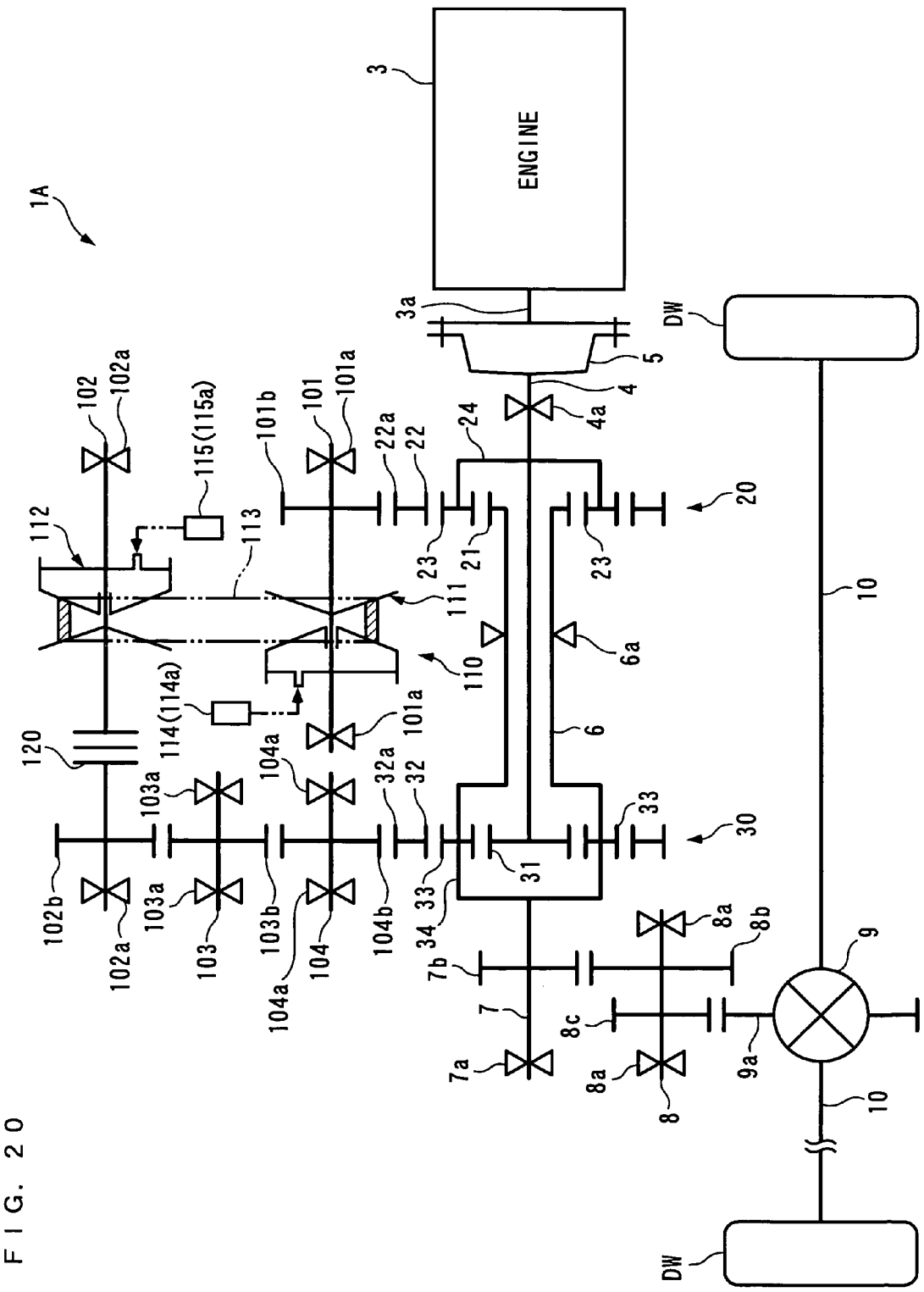
FIG. 20 A schematic diagram of an engine, a stepless transmission, etc. of a power plant according to a second embodiment.
Figure 21:
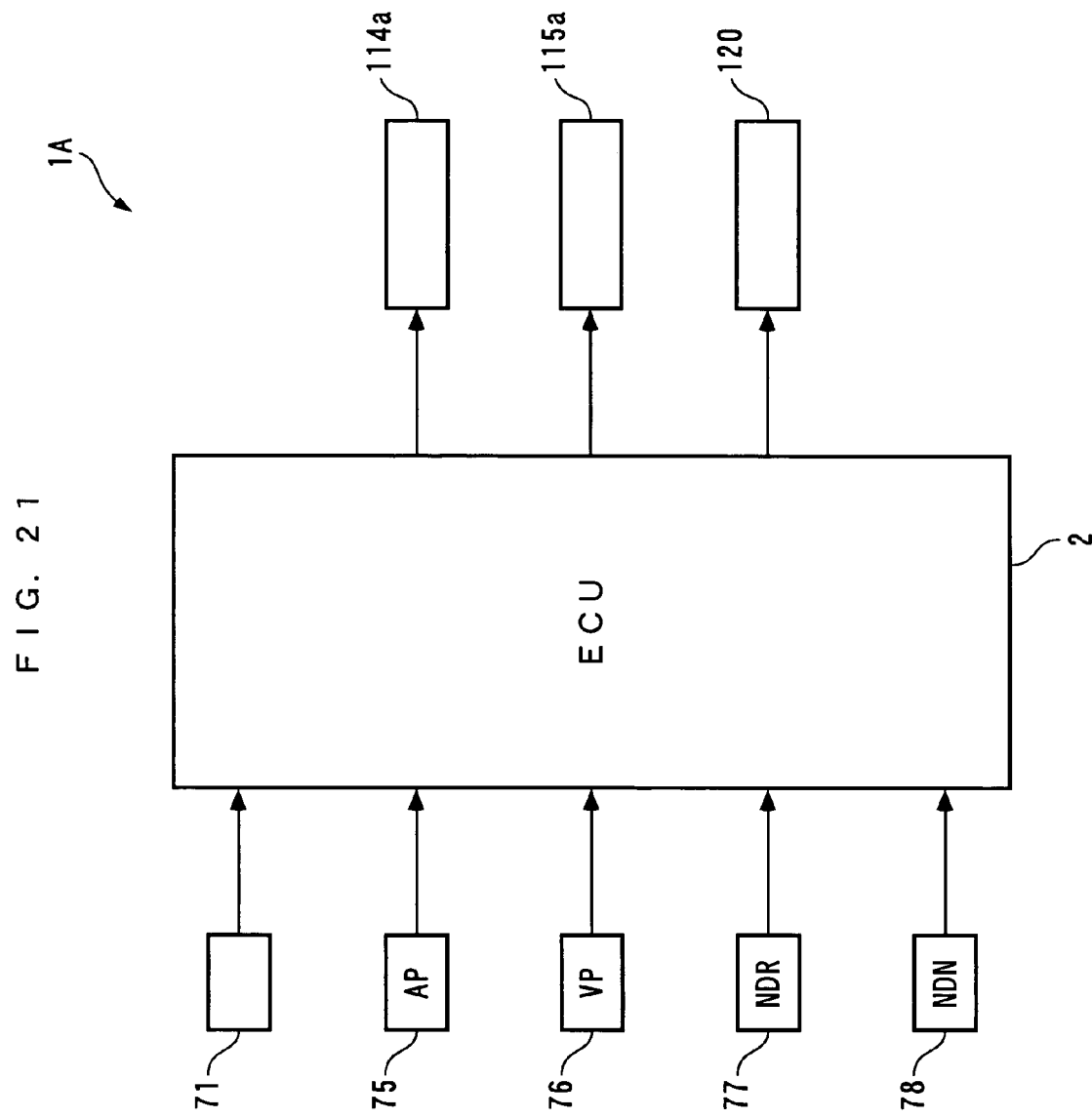
FIG. 21 A block diagram showing an ECU etc. that control the operations of the engine and the stepless transmission of the power plant according to the second embodiment.

Next, a power plant 1A according to a second embodiment of the present invention will be described with reference to FIGS. 20 and 21. In this power plant 1A, the first and second generator-motors 40 and 50 of the power plant 1 according to the above-described first embodiment are replaced by a belt-type stepless transmission 110 (speed-changing device). In FIGS. 20 and 21, the component elements identical to those of the first embodiment are denoted by the same reference numerals. The following description is mainly given of different points from the first embodiment.

More specifically, similarly to the above-described variation of the first embodiment, the gear 22a and the gear 32a are formed on outer peripheral surfaces of the first and second ring gears 22 and 32, respectively. Further, first to fourth auxiliary shafts 101 to 104 parallel to the first main shaft 4 are arranged. The first to fourth auxiliary shafts 101 to 104 are rotatably supported by bearings 101a, 101a to 104a, and 104a, respectively.

The first to fourth auxiliary shafts 101 to 104 are integrally formed with gears 101b to 104b, respectively. The gear 101b of the first auxiliary shaft 101 is in mesh with the gear 22a on the outer peripheral surface of the first ring gear 22. The gear 102b of the second auxiliary shaft 102 is in mesh with the gear 103b of the third auxiliary shaft 103, and the gear 104b of the fourth auxiliary shaft 104 is in mesh with the gear 103b of the third auxiliary shaft 103 and the gear 32a on the outer peripheral surface of the second ring gear 32.

The above-described stepless transmission 110 is comprised of a first pulley 111, a second pulley 112, a transmission belt 113, a first-pulley variable effective diameter mechanism 114, and a second-pulley variable effective diameter mechanism 115.

The first pulley 111 is configured such that the width of a belt groove thereof is changed by oil pressure, and is unrotatably attached to the first auxiliary shaft 101. Similarly to the first pulley 111, the second pulley 112 is configured such that the width of a belt groove thereof is changed by oil pressure, and is unrotatably attached to the second auxiliary shaft 102. The transmission belt 113 is made of a metal, and is wound around the two pulleys 111 and 112 in a state fitted in the belt grooves thereof. With the above arrangement, the first ring gear 22 is mechanically connected to the stepless transmission 110 via the gear 101b and the first auxiliary shaft 101, and the second ring gear 32 is mechanically connected to the stepless transmission 110 via the gears 102b to 104b and the second auxiliary shaft 102.

The first-pulley and second-pulley variable effective diameter mechanisms 114 and 115 are for changing the widths of the belt grooves of the two pulleys 111 and 112, respectively, to thereby change the effective diameters of the respective pulleys 111 and 112. The first-pulley variable effective diameter mechanism 114 has a first electromagnetic valve 114a for controlling oil pressure supplied from an oil pressure pump (not shown) to the first pulley 111. The second-pulley variable effective diameter mechanism 115 has a second electromagnetic valve 115a for controlling oil pressure supplied from the above-described oil pressure pump to the driven pulley 112. The electromagnetic valves 114a and 115a have their valve openings controlled by the ECU 2 (see FIG. 21).

In the stepless transmission 110 configured as above, the oil pressures supplied to the two pulleys 111 and 112 are controlled by controlling the two electromagnetic valves 114a and 115a by the ECU 2, respectively, whereby the widths of the belt grooves of the two pulleys 111 and 112 are changed. As a consequence, the effective diameters of the two pulleys 111 and 112 are steplessly changed, whereby the transmission gear ratio of the stepless transmission 110 is steplessly controlled.

Further, disposed between the second pulley 112 and the gear 102b of the second auxiliary shaft 102 is a clutch 120. The clutch 120 is formed by a friction multiple disk clutch, and the degree of engagement thereof is controlled by the ECU 2, to thereby connect and disconnect between the stepless transmission 110 and the gear 102b.

Furthermore, as shown in FIG. 21, to the ECU 2, a first pulley rotational speed sensor 77 delivers a detection signal indicative of a first pulley rotational speed NDR as the rotational speed of the first pulley 111, and a second pulley rotational speed sensor 78 delivers a detection signal indicative of a second pulley rotational speed NDN as the rotational speed of the second pulley 112. The ECU 2 calculates a transmission gear ratio RATIO (=NDR/NDN) of the stepless transmission 110 based on the first pulley rotational speed NDR and the second pulley rotational speed NDN.

Figure 22:
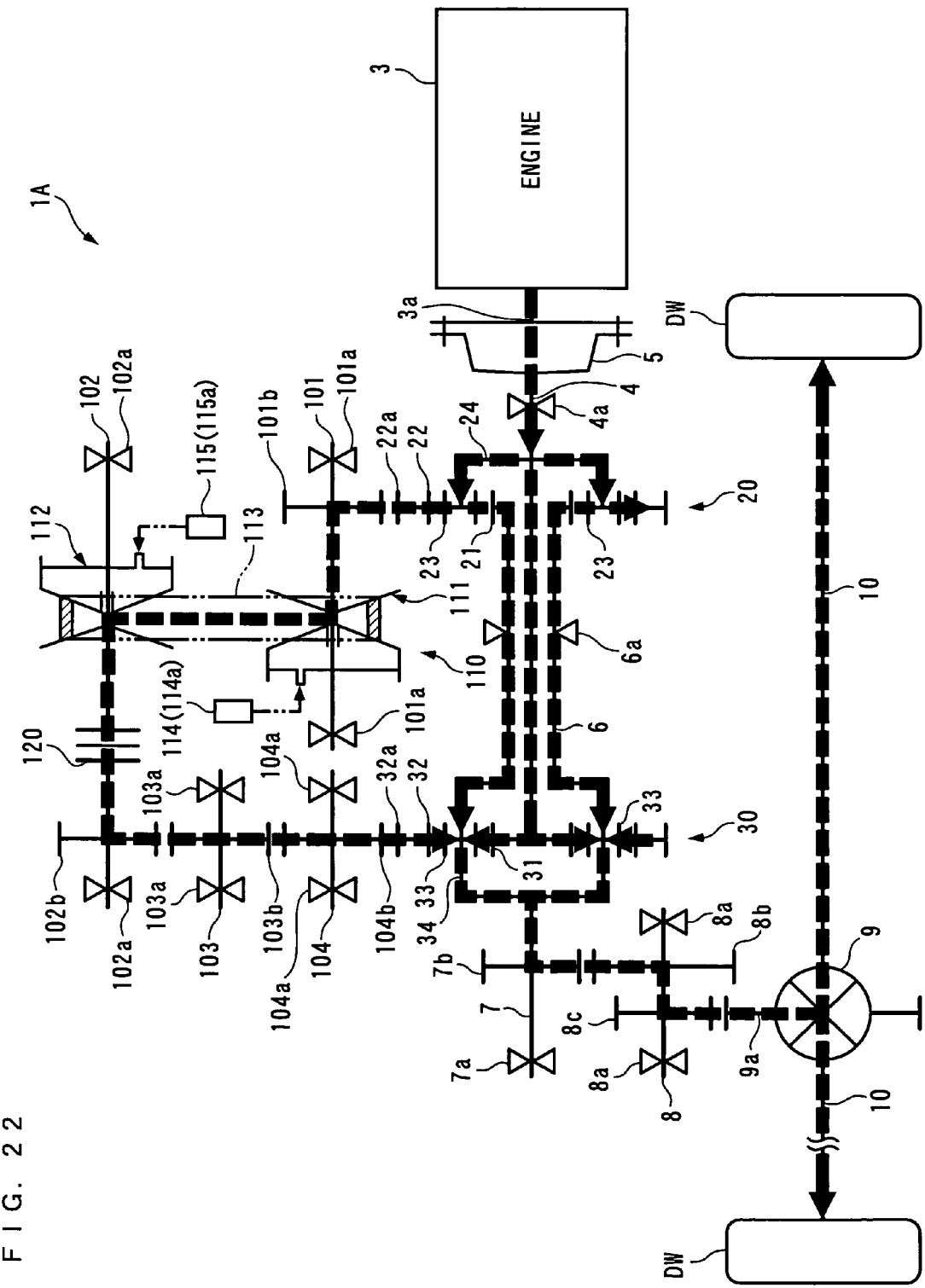
FIG. 22 A diagram showing how torque is transmitted during traveling of the vehicle in the power plant according to the second embodiment.

FIG. 22 shows a state of transmission of torque during traveling of the vehicle. As shown in the figure, part of the engine torque TENG is transmitted to the first carrier 24, and the remainder of the engine torque TENG is transmitted to the second sun gear 31. Further, the engine torque TENG transmitted to the first carrier 24 is distributed to the first sun gear 21 and the first ring gear 22, and the engine torque TENG distributed to the first ring gear 22 is transmitted to the second ring gear 32 via the gear 101b, the first auxiliary shaft 101, the stepless transmission 110, and the gears 102b to 104b. Further, the engine torque TENG transmitted to the second sun gear 31, and the engine torque TENG transmitted to the second ring gear 32, as described above, are combined, and the combined torque is transmitted to the second carrier 34. Furthermore, the engine torque TENG distributed to the first sun gear 21, as described above, is transmitted to the second carrier 34.

As described above, transmitted to the second carrier 34 is the combined torque obtained by combining the engine torque TENG distributed to the first sun gear 21, the engine torque TENG transmitted to the second ring gear 32 via the first ring gear 22, the stepless transmission 110, and so forth, and the engine torque TENG transmitted to the second sun gear 31. Further, this combined torque is transmitted to the drive wheels DW and DW e.g. via the second main shaft 7. As a result, the power equal in magnitude to the engine power WENG is transmitted to the drive wheels DW and DW. Further, similarly to the first embodiment but differently from the aforementioned conventional case, the engine power WENG is transmitted to the drive wheels DW and DW without being recirculated.

Furthermore, during traveling of the vehicle, by controlling the transmission gear ratio RATIO of the stepless transmission 110, the engine power WENG is transmitted to the drive wheels DW and DW while having the speed thereof steplessly changed. In this case, the transmission gear ratio RATIO is controlled such that the engine speed NE becomes equal to the above-described target engine speed NECMD.

As described above, according the second embodiment, during traveling of the vehicle, similarly to the aforementioned first embodiment, the engine power WENG is transmitted to the drive wheels DW and DW without being recirculated, and hence it is possible to reduce the power passing through the first and second planetary gear units 20 and 30. This makes it possible to downsize the first and second planetary gear units 20 and 30, thereby making it possible to attain the reduction of the size and manufacturing costs of the power plant 1A to enhance the driving efficiency of the power plant 1A.

Further, during traveling of the vehicle, similarly to the first embodiment, the engine power WENG is once divided by the first and second planetary gear units 20 and 30, and is then transmitted to the second carrier 34 via the aforementioned first and second transmission paths and the next fourth transmission path. The engine power WENG transmitted to the second carrier 34 is combined by the second carrier 34, and is then transmitted to the drive wheels DW and DW.

The fourth transmission path: the first carrier 24→the first planetary gears 23→the first ring gear 22→the gear 101b→the first auxiliary shaft 101→the stepless transmission 110→the second auxiliary shaft 102→the gears 102b to 104b→the second ring gear 32→the second planetary gears 33→the second carrier 34

This makes it possible to reduce the power passing through the stepless transmission 110 via the fourth transmission path. Therefore, if a stepless transmission having torque capacity corresponding to the reduced power is used as the stepless transmission 110, it is possible to attain the high efficiency and reduced size of the stepless transmission 110, thereby making it possible to attain improvement of the driving efficiency of the power plant 1A, and further reduction of the size and manufacturing costs thereof.

Further, during traveling of the vehicle, the transmission gear ratio RATIO is controlled to thereby transmit the engine power WENG to the drive wheels DW and DW while steplessly changing the speed of the engine power WENG. The transmission gear ratio RATIO is controlled such that the engine speed NE becomes equal to the target engine speed NECMD. Therefore, similarly to the first embodiment, it is possible to drive the drive wheels DW and DW while controlling the engine power WENG such that the optimum fuel economy of the engine 3 can be obtained. This makes it possible to further enhance the driving efficiency of the power plant 1A.

Further, similarly to the first embodiment, the first and second planetary gear units 20 and 30 are used as the first and second distributing and combining devices, respectively, so that it is possible to configure the power plant 1A easily and inexpensively without preparing special devices, to further downsize the power plant 1A. Furthermore, since the first and second ring gears 22 and 32 are connected to the stepless transmission 110, this connection can be performed easily.

It should be noted that similarly to the above-described first embodiment, the first carrier 24 and the second sun gear 31 are not necessarily required to be directly connected to each other insofar as they are connected to the crankshaft 3a. Further, the first sun gear 21 and the second carrier 34 are not necessarily required to be directly connected to each other insofar as they are connected to the drive wheels DW and DW.

Further, in the second embodiment, the connecting relationship between the engine 3, the drive wheels DW and DW, the stepless transmission 110, the first and second sun gears 21 and 31, the first and second carriers 24 and 34, and the first and second ring gears 22 and 32 can be set as desired insofar as they satisfy the following conditions: One of the first sun gear 21 and the first ring gear 22, and the second carrier 34 are connected to the drive wheels DW and DW; one of the second sun gear 31 and the second ring gear 32, and the first carrier 24 are connected to the engine 3; and the other of the first sun gear 21 and the first ring gear 22 and the other of the second sun gear 31 and the second ring gear 32 are connected to the stepless transmission 110.

For example, the first carrier 24 and the second ring gear 32 may be connected to the engine 3, the first ring gear 22 and the second carrier 34 to the drive wheels DW and DW, and the first and second sun gears 21 and 31 to the stepless transmission 110.

Further, although a belt-type stepless transmission is used as the stepless transmission 110, a toroidal-type stepless transmission may be employed. Further, although the clutch 120 is disposed between the second pulley 112 and the gear 102b of the second auxiliary shaft 102, it may be disposed between the first pulley 111 and the gear 101b of the first auxiliary shaft 101.

Further, although in the first and second embodiments, the first and second planetary gear units 20 and 30 are used as the first and second distributing and combining devices, respectively, any other suitable devices may be employed insofar as they have the following functions: They each have three elements, and have the function of distributing power input to one of the three elements to the other two elements, and the function of combining the power input to the other two elements, and then outputting the combined power to the above one element, and the three elements rotate while maintaining a linear speed relationship therebetween during distributing and combining the power. For example, in place of the gears of a planetary gear unit, there may be employed such a device as has a plurality of rollers for transmitting power by friction between surfaces thereof and has the functions equivalent to the planetary gear unit. Furthermore, although detailed description thereof is omitted, such a device as is disclosed in Japanese Patent Application No. 2006-213905, may be employed which is implemented by a combination of a plurality of magnets and soft magnetic material elements.

Figure 23:
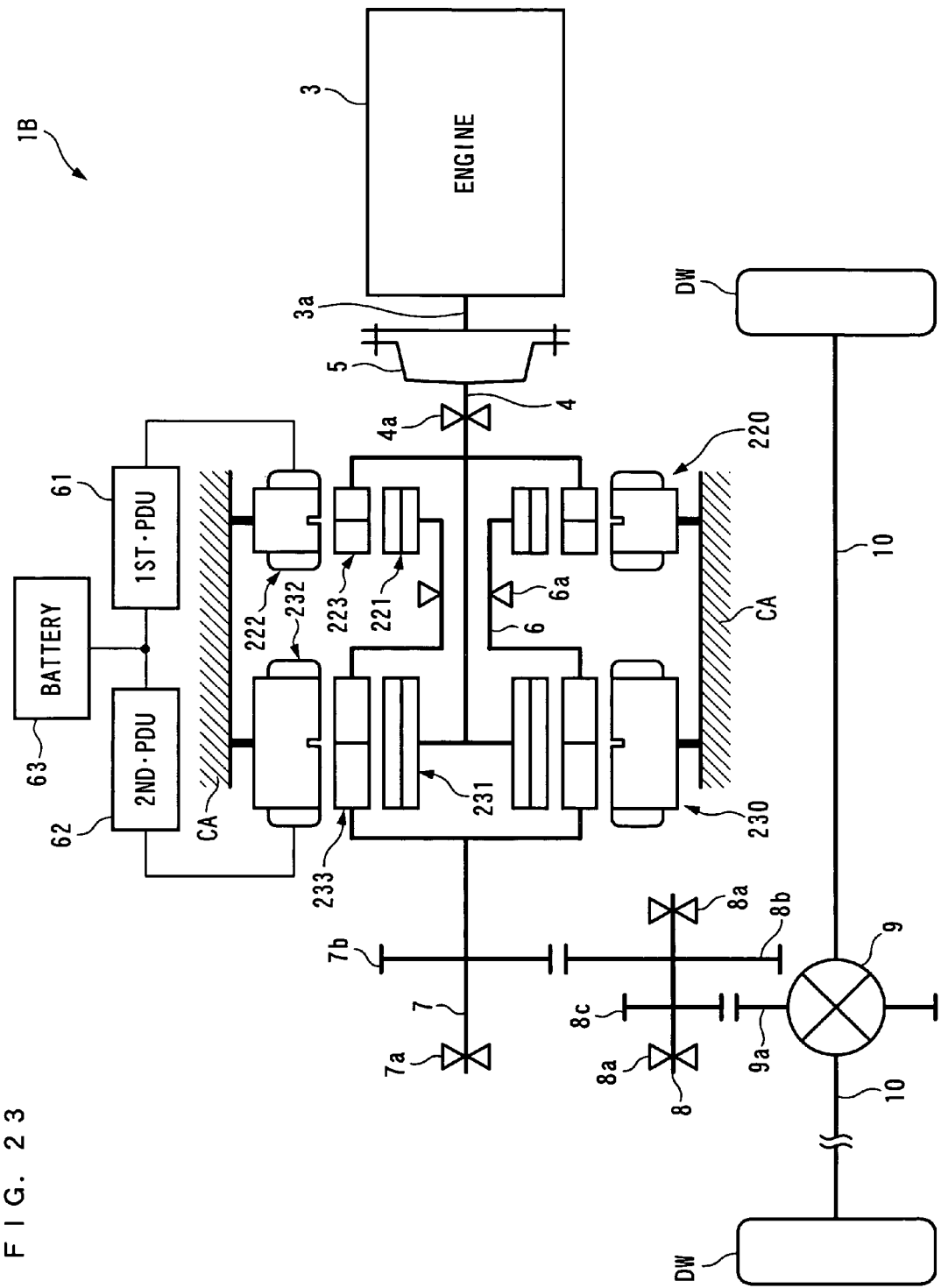
FIG. 23 A schematic view of an engine, third and fourth generator-motors etc. of a power plant according to a third embodiment.
Figure 24:
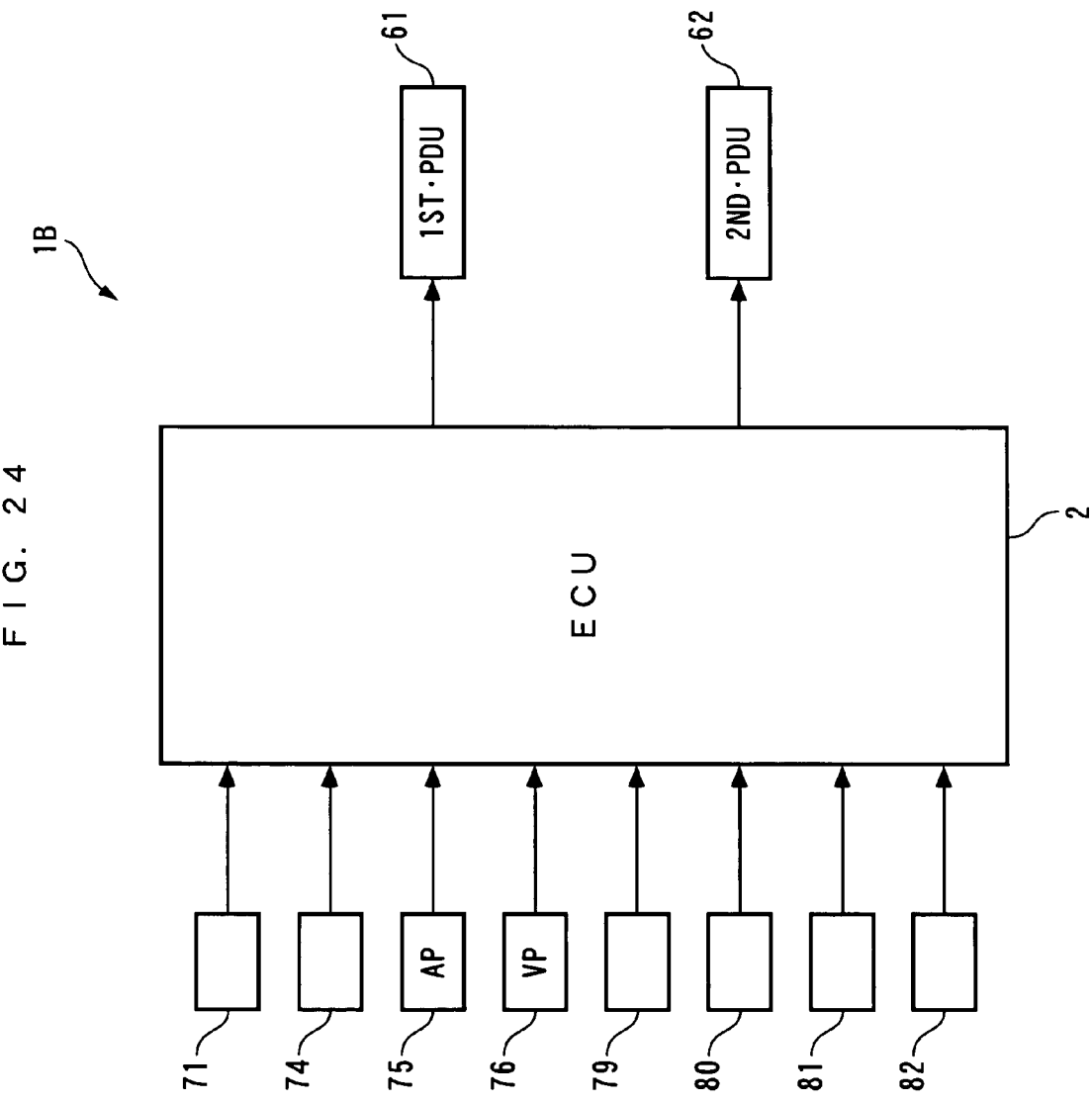
FIG. 24 A block diagram showing an ECU etc. that control the operations of the engine and the third and fourth generator-motors of the power plant according to the third embodiment.

Next, a power plant 1B according to a third embodiment of the present invention will be described with reference to FIGS. 23 and 24. This power plant 1B is distinguished from the power plant 1 according to the first embodiment in that it includes a third generator-motor 220 (first distributing and combining device) and a fourth generator-motor 230 (second distributing and combining device) in place of the first planetary gear unit 20, the first generator-motor 40, the second planetary gear unit 30, and the second generator-motor 50. In FIGS. 23 and 24, the component elements identical to those of the first embodiment are denoted by the same reference numerals. The following description is mainly given of different points from the first embodiment.

Figure 25:
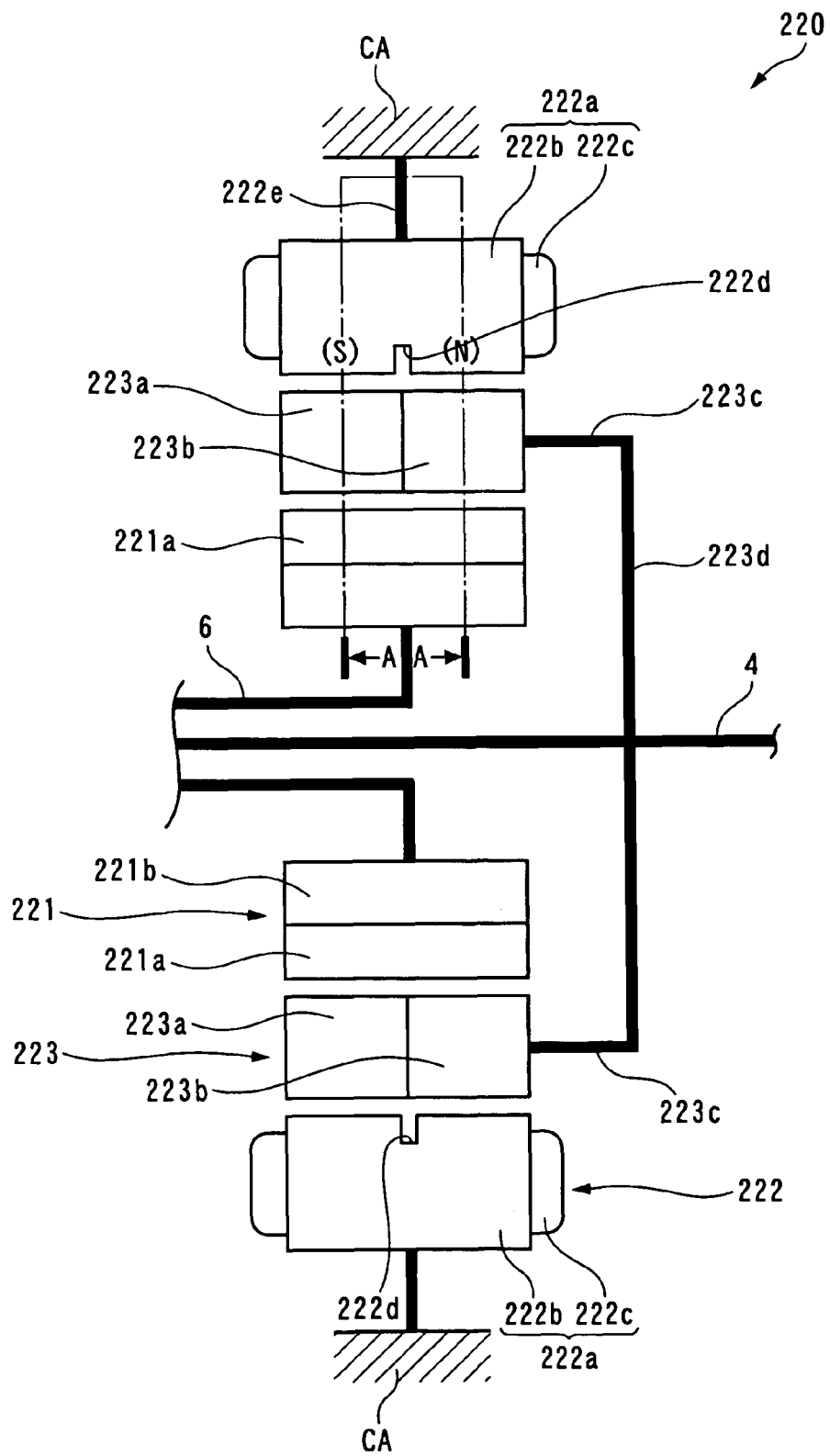
FIG. 25 An enlarged cross-sectional view of the third generator-motor.

As shown in FIGS. 23 and 25, the third generator-motor 220 is comprised of an A1 rotor 221 (first element), a third stator 222 (third element) disposed in a manner opposed to the A1 rotor 221, and an A2 rotor 223 (second element) disposed between the two 221 and 222 at predetermined spaced intervals. The A1 rotor 221, the A2 rotor 223, and the third stator 222 are radially arranged from the inner side in the mentioned order. Hereinafter, the left side and the right side as viewed in FIG. 25 will be referred to as "left" and "right".

The A1 rotor 221 has 2n permanent magnets 221a. The permanent magnets 221a are mounted on the outer peripheral surface of an annular fixing portion 221b in a state arranged at equal intervals in the circumferential direction. Each permanent magnet 221a has a generally sector-shaped cross-section orthogonal to the axial direction, and slightly extends in the axial direction. The above-mentioned fixing portion 221b is formed of a soft magnetic material, such as iron, and has an inner peripheral surface thereof integrally attached to the connection shaft 6. With the above arrangement, the permanent magnets 221a, that is, the A1 rotor 221 are rotatable in unison with the connection shaft 6.

Figure 26:
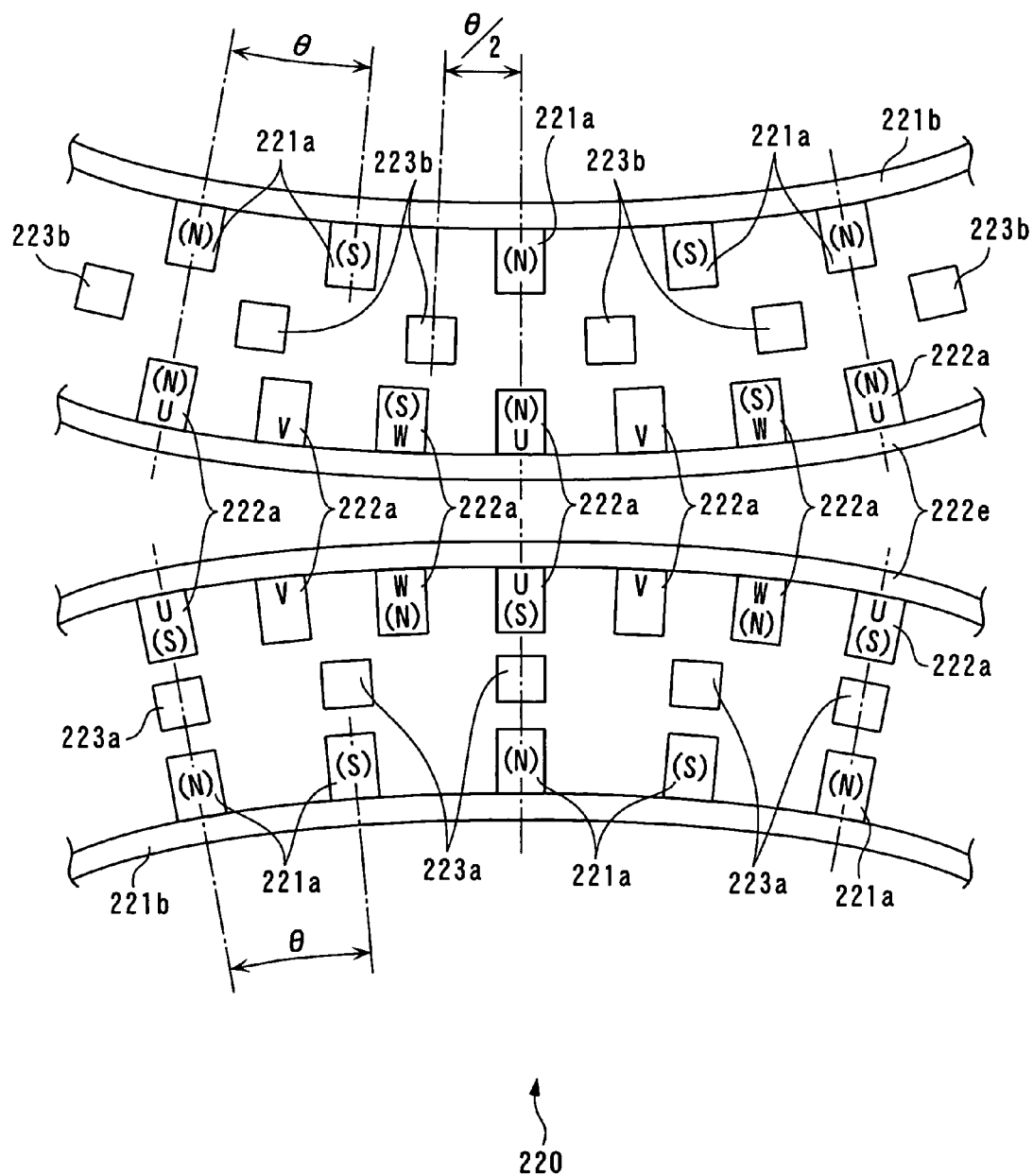
FIG. 26 A development view of part of a cross-section of the third generator-motor taken on line A-A of FIG. 25 along the circumferential direction during generation of first and second rotating magnetic fields.

Further, as shown in FIG. 26, a central angle formed by each two permanent magnets 221a circumferentially adjacent to each other about the connection shaft 6 is a predetermined angle θ. Further, the two permanent magnets 221a circumferentially adjacent to each other have polarities different from each other. Hereafter, respective magnetic poles on the left side and the right side of the permanent magnet 221a are referred to as "the first magnetic pole" and "the second magnetic pole", respectively.

The third stator 222 generates rotating magnetic fields, and has 3n armatures 222a arranged at equal intervals in the circumferential direction. Each armature 222a is comprised of an iron core 222b, a coil 222c wound around the iron core 222b, and so forth. The iron core 222b has a generally sector-shaped cross-section orthogonal to the axial direction, and has approximately the same axial length as that of the permanent magnet 221a. An axially central portion of the inner peripheral surface of the iron core 222b is formed with a circumferentially extending groove 222d. The 3n coils 222c form n sets of three-phase coils of U-phase coils, V-phase coils, and W-phase Coils (see FIG. 26). Further, the armatures 222a are mounted on the case CA via an annular fixing portion 222e such that the armatures 222a are immovable. Due to the numbers and the arrangements of the armatures 222a and the permanent magnets 221a, when the center of a certain armature 222a circumferentially coincides with the center of a certain permanent magnet 221a, the center of every three armatures 222a from the armature 222a, and the center of every two permanent magnets 221a from the permanent magnet 221a circumferentially coincide with each other.

Furthermore, each armature 222a is electrically connected to the battery 63 and the ECU 2 via the 1st·PDU 61. Further, the armature 222a is configured such that when it is supplied with electric power from the battery 63 or generate electric power, as described hereinafter, magnetic poles having different polarities from each other are generated on the left and right ends of the iron core 222b, respectively. Further, along with generation of these magnetic poles, first and second rotating magnetic fields are generated between the left portion of the A1 rotor 221 (on the first magnetic pole side) and the left end of the iron core 222b, and between the right portion of the A1 rotor 221 (on the second magnetic pole side) and the right end of the iron core 222b in a circumferentially rotating manner, respectively. Hereinafter, the magnetic poles generated on the left and right ends of the iron core 222b are referred to as "the first armature magnetic pole" and "the second armature magnetic pole". Further, the number of the first armature magnetic poles and that of the second armature magnetic poles are the same as the number of the magnetic poles of the permanent magnets 221a, that is, 2n, respectively.

The A2 rotor 223 has a plurality of first cores 223a and a plurality of second cores 223b. The first and second cores 223a and 223b are arranged at equal intervals in the circumferential direction, respectively, and the numbers of 223a and 223b are both set to the same number as that of the permanent magnets 221a that is, 2n. Each first core 223a is formed by laminating soft magnetic material elements, such as a plurality of steel plates, such that it has a generally sector-shaped cross-section orthogonal to the axial direction, and extends by a length approximately equal to a half of the length of the permanent magnet 221a in the axial direction. Similarly to the first core 223a, each second core 223b is formed by laminating a plurality of steel plates, such that it has a generally sector-shaped cross-section orthogonal to the axial direction, and extends by a length approximately equal to a half of the length of the permanent magnet 221a in the axial direction.

Further, the first cores 223a are each axially arranged between the left portion of the A1 rotor 221 (on the first magnetic pole side) and the left portion of the third stator 222 (on the first armature magnetic pole side), and the second cores 223b are each axially arranged between the right portion of the A1 rotor 221 (on the second magnetic pole side) and the right portion of the third stator 222 (on the second armature magnetic pole side). Furthermore, the second cores 223b are circumferentially alternately arranged with respect to the first cores 223a, and the center of the second cores 223b is displaced by a half of the aforementioned predetermined angle θ from the center of the first cores 223a (see FIG. 26).

The first and second cores 223a and 223b are mounted on an outer end of a flange 223d by bar-shaped connecting portions 223c slightly extending in the axial direction, respectively. The flange 223d is integrally concentrically fitted on the first main shaft 4. With this arrangement, the first and second cores 223a and 223b, that is, the A2 rotor 223 is rotatable in unison with the first main shaft 4, and is directly connected to the crankshaft 3a via the first main shaft 4.

In the third generator-motor 220 configured as above, as shown in FIG. 26, during generation of the first and second rotating magnetic fields, when the polarity of each first armature magnetic pole is different from the polarity of an opposed (closest) one of the first magnetic poles, the polarity of each second armature magnetic pole is the same as the polarity of an opposed (closest) one of the second magnetic poles. Further, when each first core 223a is in a position between each first magnetic pole and each first armature magnetic pole, each second core 223b is in a position between a pair of second armature magnetic poles circumferentially adjacent to each other and a pair of second magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole is the same as the polarity of an opposed (closest) one of the first magnetic poles. Further, when each second core 223b is in a position between each second magnetic pole and each second armature magnetic pole, each first core 223a is in a position between a pair of first armature magnetic poles circumferentially adjacent to each other, and a pair of first magnetic poles circumferentially adjacent to each other.

Figure 27:
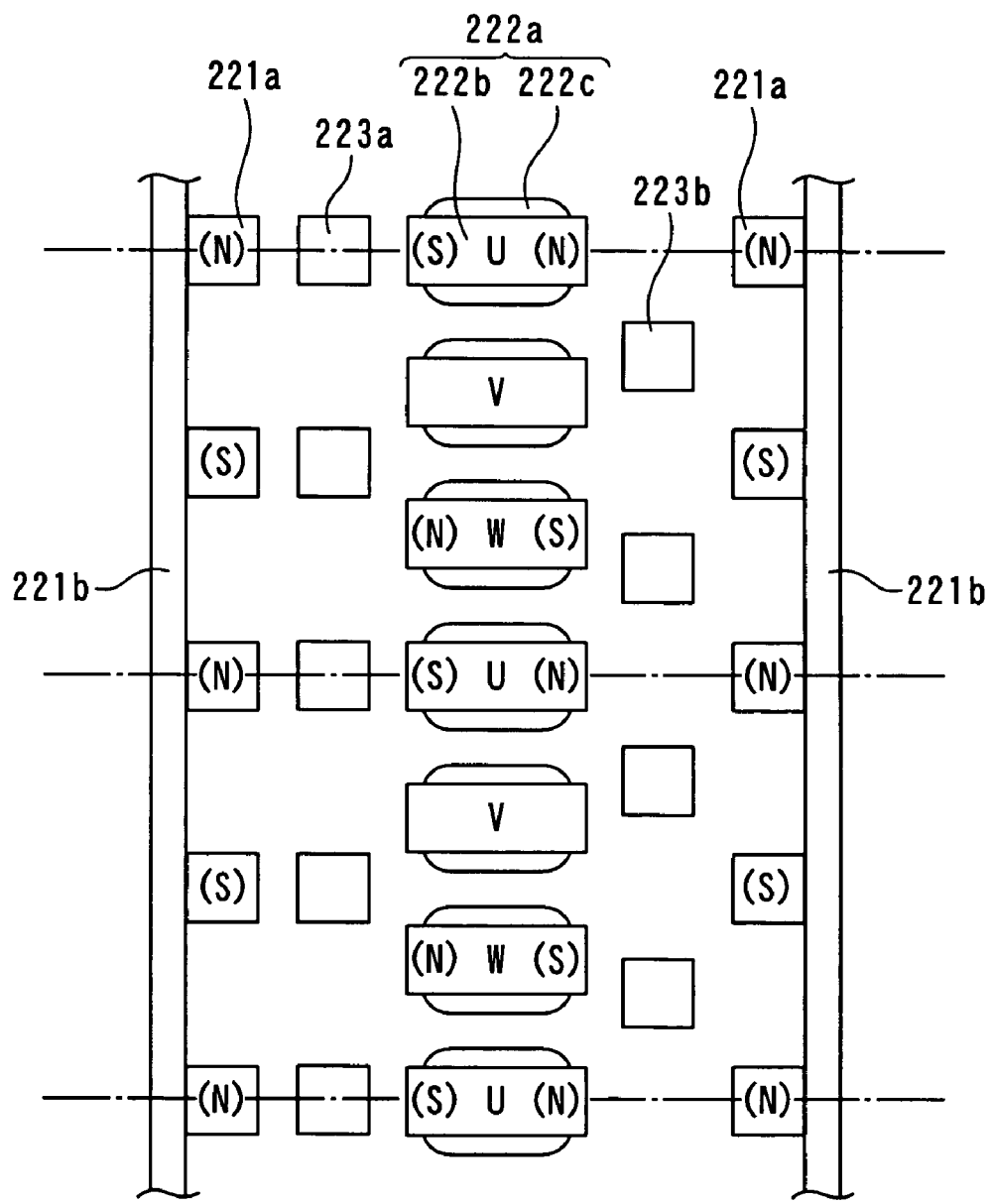
FIG. 27 A diagram showing an arrangement functionally equivalent to the arrangement of the FIG. 26 development view.

The third generator-motor 220 can be also regarded as a planetary gear unit which inputs and outputs torque by the A1 and A2 rotors 221 and 223 and inputs and outputs electric power by the third stator 222. The following description is given of this point based on the operation of the third generator-motor 220. It should be noted that although in FIG. 26, the armatures 222a and the fixing portion 222e are shown as if they were divided into two other parts since FIG. 26 is shown as a development view, actually, they are integrally formed with each other, so that the arrangement in FIG. 26 can be shown as in FIG. 27 as equivalent thereto. Therefore, hereinafter, the operation of the third generator-motor 220 is described assuming that the permanent magnets 221a, the armatures 222a, and the first and second cores 223a and 223b are arranged as shown in FIG. 27.

Further, for convenience of description, the operation of the third generator-motor 220 is described by replacing the motion of the first and second rotating magnetic fields by an equivalent physical motion of 2n imaginary permanent magnets (hereinafter referred to as "the imaginary magnets") VM, equal in number to the permanent magnets 221a. Further, the description will be given assuming that a magnetic pole at a left-side portion of each imaginary magnet VM (on the first magnetic pole side), and a magnetic pole at a right-side portion of the imaginary magnet VM (on the second magnetic pole side) are regarded as first and second armature magnetic poles, respectively, and that rotating magnetic fields generated between the left-side portion of the imaginary magnet VM and the left portion of the A1 rotor 221 (on the first magnetic pole side), and between the right-side portion of the imaginary magnet VM and the right portion of the A1 rotor 221 (on the second magnetic pole side) are regarded as first and second rotating magnetic fields. Furthermore, hereinafter, the left-side portion and the right-side portion of the permanent magnet 221a are referred to as "the first magnet portion" and "the second magnet portion".

First, a description will be given of the operation of the third generator-motor 220 in a state in which the A1 rotor 221 is made unrotatable, and the first and second rotating magnetic fields are generated by the supply of electric power to the third stator 222.

As shown in FIG. 28(a), the first and second rotating magnetic fields are generated in a manner rotated downward, as viewed in the figure, from a state in which each first core 223a is opposed to each first magnet portion, and each second core 223b is in a position between each adjacent two of the second magnet portions. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 223a are disposed as described above, they are magnetized by the first magnetic poles and the first armature magnetic poles, and magnetic lines G1 of force (hereinafter referred to as "the first magnetic force lines") are generated between the first magnetic poles, the first cores 223a, and the first armature magnetic poles. Similarly, since the second cores 223b are disposed as described above, they are magnetized by the second armature magnetic poles and the second magnetic poles, and magnetic lines G2 of force (hereinafter referred to as "the second magnetic force lines") are generated between the second armature magnetic poles, the second cores 223b, and the second magnetic poles.

In the state shown in FIG. 28(a), the first magnetic force lines G1 are generated such that they each connect the first magnetic pole, the first core 223a, and the first armature magnetic pole, and the second magnetic force lines G2 are generated such that they connect each circumferentially adjacent two second armature magnetic poles and the second core 223b located therebetween, and connect each circumferentially adjacent two second magnetic poles and the second core 223b located therebetween. As a result, in this state, magnetic circuits as shown in FIG. 30(a) are formed. In this state, since the first magnetic force lines G1 are linear, no magnetic forces for circumferentially rotating the first core 223a act on the first core 223a. Further, the two second magnetic force lines G2 between the circumferentially adjacent two second armature magnetic poles and the second core 223b are equal to each other in the degree of bend thereof and in the total magnetic flux amount. Similarly, the two second magnetic force lines G2 between the circumferentially adjacent two second magnetic poles and the second core 223b are equal to each other in the degree of bend thereof and in the total magnetic flux amount. As a consequence, the second magnetic force lines G2 are balanced. Therefore, no magnetic forces for circumferentially rotating the second core 223b act on the second core 223b, either.

When the imaginary magnets VM rotate from positions shown in FIG. 28(a) to positions shown in FIG. 28(b), the second magnetic force lines G2 are generated such that they each connect between the second armature magnetic pole, the second core 223b, and the second magnetic pole, and the first magnetic force lines G1 between the first cores 223a and the first armature magnetic poles are bent. As a result, magnetic circuits are formed by the first magnetic force lines G1 and the second magnetic force lines G2, as shown in FIG. 30(b).

In this state, since the degree of bend of each first magnetic force line G1 is small but the total magnetic flux amount thereof is large, a relatively large magnetic force acts on the first core 223a. This causes the first cores 223a to be driven by relatively large driving forces in the direction of rotation of the imaginary magnets VM, that is, the direction of rotation of the first and second rotating magnetic fields (hereinafter referred to as "the magnetic field rotation direction"), whereby the A2 rotor 223 rotates in the magnetic field rotation direction. Further, since the degree of bend of the second magnetic force line G2 is large but the total magnetic flux amount thereof is small, a relatively small magnetic force acts on the second core 223b. This causes the second cores 223b to be driven by relatively small driving forces in the magnetic field rotation direction, whereby the A2 rotor 223 rotates in the magnetic field rotation direction.

Then, when the imaginary magnets VM rotate from the positions shown in FIG. 28(b) to respective positions shown in FIGS. 28(c) and 28(d), and FIGS. 29(a) and 29(b), in the mentioned order, the first and second cores 223a and 223b are driven in the magnetic field rotation direction by magnetic forces caused by the first and second magnetic force lines G1 and G2, respectively, whereby the A2 rotor 223 rotates in the magnetic field rotation direction. During the time, the first magnetic force lines G1 increase in the degree of bend thereof but decrease in the total magnetic flux amount thereof, whereby the magnetic forces acting on the first cores 223a progressively decrease to progressively reduce the driving forces for driving the first cores 223a in the magnetic field rotation direction. Further, the second magnetic force lines G2 decrease in the degree of bend thereof but increase in the total magnetic flux amount thereof, whereby the magnetic forces acting on the second cores 223b progressively increase to progressively increase the driving forces for driving the second cores 223b in the magnetic field rotation direction.

Figure 29:
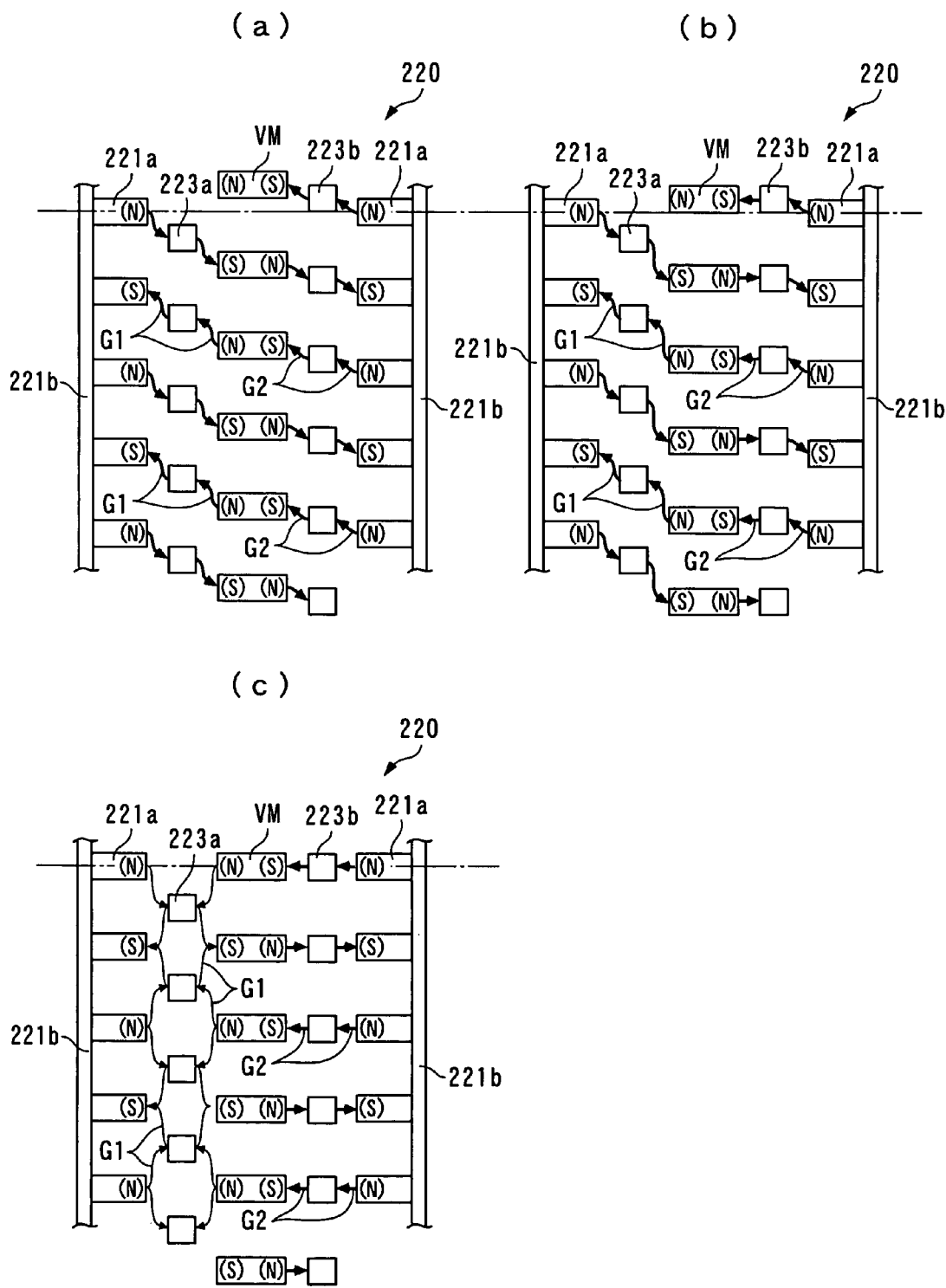
FIG. 29 Diagrams which are useful in explaining a continuation of the operation in FIG. 28.

Then, while the imaginary magnets VM rotate from the positions shown in FIG. 29(b) to the positions shown FIG. 29(c), the second magnetic force lines G2 are bent, and the total magnetic flux amounts thereof become close to their maximum, whereby the strongest magnetic forces act on the second cores 223b to maximize the driving forces acting on the second cores 223b. After that, as shown in FIG. 29(c), when the imaginary magnets VM each move to a position opposed to the first and second magnet portions, the respective polarities of the first armature magnetic pole and the first magnetic pole opposed to each other become identical to each other, and the first core 223a is positioned between circumferentially adjacent two pairs of first armature magnetic poles and first magnetic poles, each pair having the same polarity. In this state, since the degree of bend of the first magnetic force line G1 is large but the total magnetic flux amount thereof is small, no magnetic force for rotating the first core 223a in the magnetic field rotation direction acts on the first core 223a. Further, second armature magnetic poles and second magnetic poles opposed to each other come to have polarities different from each other.

From this state, when the imaginary magnets VM further rotate, the first and second cores 223a and 223b are driven in the magnetic field rotation direction by the magnetic forces caused by the first and second magnetic force lines G1 and G2, whereby the A2 rotor 223 rotates in the magnetic field rotation direction. At this time, while the imaginary magnets VM rotate to the positions shown FIG. 28(a), inversely to the above, since the first magnetic force lines G1 decrease in the degree of bend thereof but increase in the total magnetic flux amount thereof, the magnetic forces acting on the first cores 223a increase to increase the driving forces acing on the first cores 223a. On the other hand, since the second magnetic force lines G2 increase in the degree of bend thereof but decrease in the total magnetic flux amount thereof, the magnetic forces acting on the second cores 223b decrease to reduce the driving force acing on the second core 223b.

As described above, the A2 rotor 223 rotates in the magnetic field rotation direction, while the driving forces acting on the respective first and second cores 223a and 223b repeatedly increase and decrease by turns in accordance with the rotations of the imaginary magnets VM, that is, the rotations of the first and second rotating magnetic fields. In this case, assuming that the torques transmitted via the first and second cores 223a and 223b are denoted by T223a and T223b, the relationship between a torque TRA2 transmitted to the A2 rotor 223 (hereinafter referred to as "the A2 rotor transmission torque") and the two torques T223a and T223b is approximately as shown in FIG. 31. As shown in the figure, the two torques T223a and T223b change approximately sinusoidally at the same repetition period, and phases thereof are displaced from each other by a half period. Further, since the A2 rotor 223 has the first and second cores 223a and 223b connected thereto, the A2 rotor transmission torque TRA2 is equal to the sum of the two torques T223a and T223b that change as described above, and becomes approximately constant.

The first core 223a is positioned at an intermediate location between the first magnetic pole and the first armature magnetic pole connected by the first magnetic force line G1, by the action of the magnetic forces caused by the first and second magnetic force lines G1 and G2, and at the same time the A2 rotor 223 rotates while keeping the position of the second core 223b at an intermediate location between the second magnetic pole and the second armature magnetic pole connected by the second magnetic force line G2. Therefore, in general, between a first rotational speed VMF1 of the first and second rotating magnetic fields (hereinafter referred to as "the first magnetic field rotational speed"), a rotational speed VRA1 of the A1 rotor 221 (hereinafter referred to as "the A1 rotor rotational speed"), and a rotational speed VRA2 of the A2 rotor 223 (hereinafter referred to as "the A2 rotor rotational speed"), there holds the following equation (1):

$$VRA2 = (VMF1 + VRA1)/2 \tag{1}$$

By changing the equation (1), there is obtained the following equation (1'):

$$VMF1 - VRA2 = VRA2 - VRA1 \tag{1'}$$

As is clear from these equations (1) and (1'), the A2 rotor rotational speed VRA2 is equal to the average speed of the first magnetic field rotational speed VMF1 and the A1 rotor rotational speed VRA1. In other words, the difference between the first magnetic field rotational speed VMF1 and the A2 rotor rotational speed VRA2 is equal to the difference between the A2 rotor rotational speed VRA2 and the A1 rotor rotational speed VRA1.

Therefore, when the aforementioned A1 rotor rotational speed VRA1 is equal to a value of 0, VRA2=VMF1/2 holds, and the relationship between the first magnetic rotational speed VMF1, and the A1 and A2 rotor rotational speeds VRA1 and VRA2 can be expressed as shown in FIG. 32(a).

Further, in this case, the A2 rotor rotational speed VRA2 is reduced to ½ of the first magnetic field rotational speed VMF1, and hence, assuming that torque equivalent to the power supplied to the third stator 222 and the first magnetic field rotational speed VMF1 is a first driving equivalent torque TSE1, the A2 rotor transmission torque TRA2 becomes a twofold of the first driving equivalent torque TSE1. In short, there holds the following equation (2):

$$TRA2 = TSE1 \times 2 \tag{2}$$

As described above, when the electric power is supplied to the third stator 222 in a state in which the A1 rotor 221 is made unrotatable, all the electric power is transmitted to the A2 rotor 223 as power.

It should be noted that in the present embodiment, the first magnetic field rotational speed VMF1 corresponds to the rotational speed of the third element of the invention claimed in claim 1.

Next, a description will be given of an operation in the case where the first and second rotating magnetic fields are generated by the power supplied to the third stator 222, with the A2 rotor 223 made unrotatable.

Figure 33:
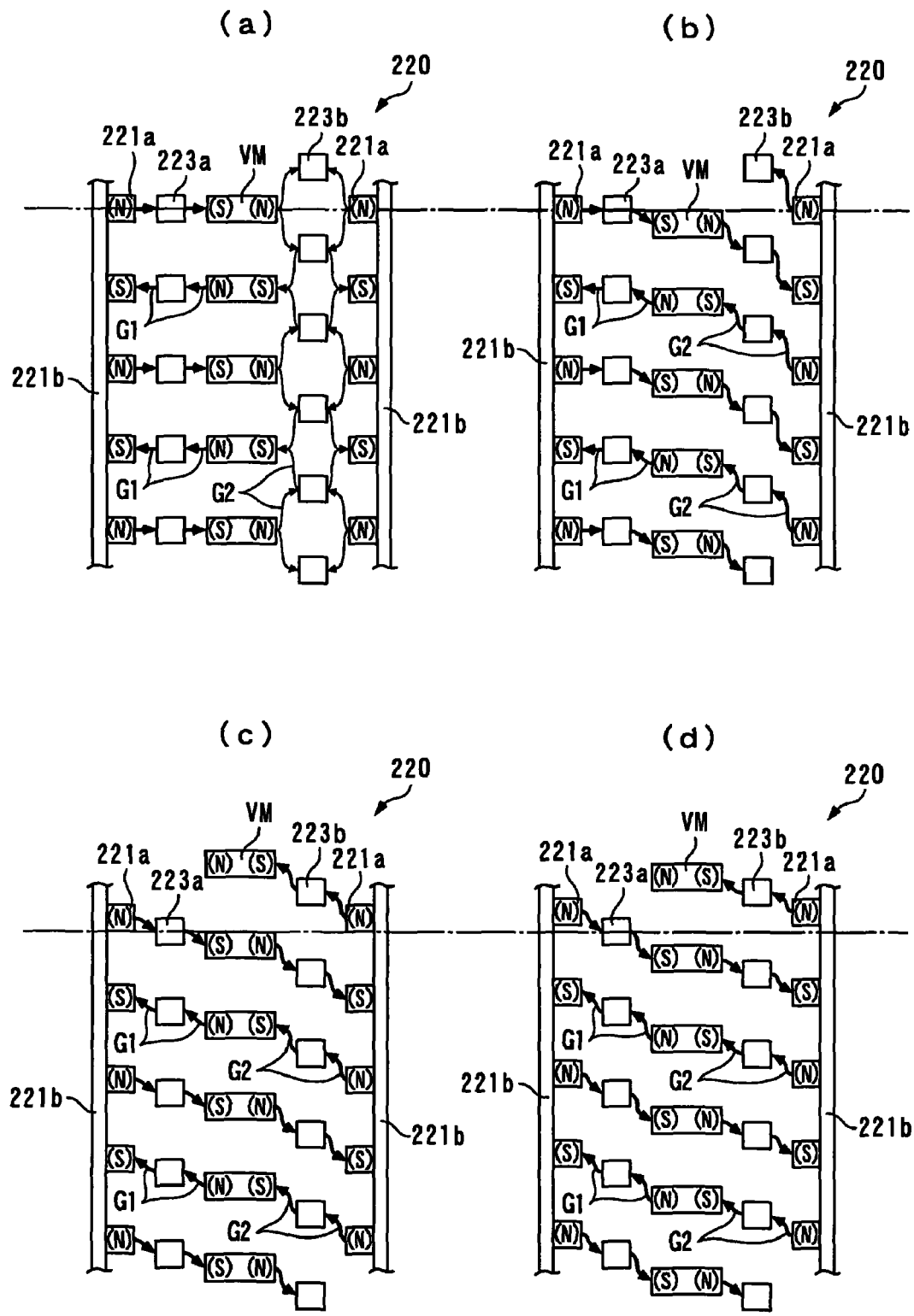
FIG. 33 Diagrams which are useful in explaining the operation of the third generator-motor performed when the first and second rotating magnetic fields are generated while holding the A2 rotor unrotatable.

In this case as well, as shown in FIG. 33(a), the first and second rotating magnetic fields are generated in a manner rotated downward, as viewed in the figure, from a state in which each first core 223a is opposed to each first magnet portion, and each second core 223b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 30(a) are formed.

Then, when the imaginary magnet VM rotates from the position shown in FIG. 33(a) to the position shown in FIG. 33(b), the first magnetic force line G1 between the first core 223a and the first armature magnetic pole is bent, and accordingly, the second armature magnetic pole becomes closer to the second core 223b, whereby the second magnetic force line G2 connecting between the second armature magnetic pole, the second core 223b, and the second magnetic pole is generated. As a consequence, the magnetic circuits as shown in FIG. 30(b) is formed.

In this state, although the total magnetic flux amounts of the first magnetic force lines G1 between the first magnetic poles and the first cores 223a are large, the first magnetic force lines G1 are straight, and hence no magnetic forces are generated which cause the first magnet portions to rotate with respect to the first cores 223a. Further, although the distance between second magnetic poles and the second armature magnetic poles having a polarity different from that of the second magnetic poles is relatively large, to make the total magnetic flux amounts of the second magnetic force lines G2 between the second cores 223b and the second magnetic poles relatively small, the degree of bend of the second magnetic force lines G2 is large, whereby magnetic forces that make the second magnet portions closer to the second cores 223b act on the second magnet portions. This causes the permanent magnets 221a to be driven in the direction of rotation of the imaginary magnets VM, that is, in a direction (upward, as viewed in FIG. 33) opposite to the magnetic field rotation direction, and be rotated toward positions shown in FIG. 33(c). In accordance with this, the A1 rotor 221 rotates in a direction opposite to the magnetic field rotation direction.

While the permanent magnets 221a rotate from the positions shown in FIG. 33(b) toward the positions shown in FIG. 33(c), the imaginary magnets VM rotate toward positions shown in FIG. 33(d). As described above, although the second magnet portions become closer to the second cores 223b to make the degree of bend of the second magnetic force lines G2 between the second cores 223b and the second magnetic poles smaller, the imaginary magnets VM become further closer to the second cores 223b, which increases the total magnetic flux amounts of the second magnetic force lines G2. As a result, in this case as well, the magnetic forces that make the second magnet portions closer to the second cores 223b act on the second magnet portions, whereby the permanent magnets 221a are driven in the direction opposite to the magnetic field rotation direction.

Further, as the permanent magnets 221a rotate in the direction opposite to the magnetic field rotation direction, the first magnetic force lines G1 between the first magnetic poles and the first cores 223a are bent, whereby magnetic forces that make the first magnet portions closer to the first cores 223a act on the first magnet portions. In this state, however, a magnetic force caused by the first magnetic force line G1 is smaller than the aforementioned magnetic force caused by the second magnetic force line G2, since the degree of bend of the first magnetic force line G1 is smaller than that of the second magnetic force line G2. As a result, a magnetic force corresponding to the difference between the two magnetic forces drives the permanent magnet 221a in the direction opposite to the magnetic field rotation direction.

Referring to FIG. 33(d), when the distance between the first magnetic pole and the first core 223a, and the distance between the second core 223b and the second magnetic pole have become approximately equal to each other, the total magnetic flux amount and the degree of bend of the first magnetic force line G1 between the first magnetic pole and the first core 223a become approximately equal to the total magnetic flux amount and the degree of bend of the second magnetic force line G2 between the second core 223b and the second magnetic pole, respectively. As a result, the magnetic forces caused by the first and second magnetic force lines G1 and G2 are approximately balanced, whereby the permanent magnet 221a is temporarily placed in an undriven state.

From this state, when the imaginary magnets VM rotate to positions shown in FIG. 34(*a*), the state of generation of the first magnetic force lines G1 is changed to form magnetic circuits as shown in FIG. 34(*b*). Accordingly, the magnetic forces caused by the first magnetic force lines G1 almost cease to act on the first magnet portions such that the magnetic forces make the first magnet portions closer to the first cores 223a, and therefore the permanent magnets 221a are driven by the magnetic forces caused by the second magnetic force lines G2, to positions shown in FIG. 34(*c*), in the direction opposite to the magnetic field rotation direction.

Then, when the imaginary magnets VM slightly rotate from the positions shown in FIG. 34(*c*), inversely to the above, the magnetic forces caused by the first magnetic force lines G1 between the first magnetic poles and the first cores 223a act on the first magnet portions such that the magnetic forces make the first magnet portions closer to the first cores 223a, whereby the permanent magnets 221a are driven in the direction opposite to the magnetic field rotation direction, to rotate the A1 rotor 221 in the direction opposite to the magnetic field rotation direction. Then, when the imaginary magnets VM further rotate, the permanent magnets 221a are driven in the direction opposite to the magnetic field rotation direction, by respective magnetic forces corresponding to the differences between the magnetic forces caused by the first magnetic force lines G1 between the first magnetic poles and the first cores 223a, and the magnetic forces caused by the second magnetic force lines G2 between the second cores 223b and the second magnetic poles. After that, when the magnetic forces caused by the second magnetic force lines G2 almost ceases to act on the second magnet portions such that the magnetic force makes the second magnet portions closer to the second cores 223b, the permanent magnets 221a are driven by the magnetic forces caused by the first magnetic force lines G1 in the direction opposite to the magnetic field rotation direction.

As described hereinabove, in accordance with the rotations of the first and second rotating magnetic fields, the magnetic forces caused by the first magnetic force lines G1 between the first magnetic poles and the first cores 223a, the magnetic forces caused by the second magnetic force lines G2 between the second cores 223b and the second magnetic poles, and the magnetic forces corresponding to the differences between the above magnetic forces alternately act on the permanent magnets 221a, i.e. on the A1 rotor 221, whereby the A1 rotor 221 is rotated in the direction opposite to the magnetic field rotation direction. Further, the magnetic forces, that is, the driving forces thus act on the A1 rotor 221 alternately, whereby a torque TRA1 transmitted to the A1 rotor 221 (hereinafter referred to as "the A1 rotor transmission torque") is made approximately constant.

Further, the relationship between the first magnetic field rotational speed VMF1 at this time and the rotational speeds VRA1 and VRA2 of the A1 and A2 rotors can be expressed as VRA1=−VMF1 by setting VRA2=0 in the aforementioned equation (1), and is shown as in FIG. 32(*b*). Thus, the A1 rotor 221 rotates in the reverse direction at the same speed as that of the first and second rotating magnetic fields. Further, in this case, the A1 rotor transmission torque TRA1 becomes equal to the first driving equivalent torque TSE1, and there holds the following equation (3):

$$TRA1 = TSE1 \qquad (3)$$

Further, if none of the first magnetic field rotational speed VMF1 and the A1 and A2 rotor rotational speeds VRA1 and VRA2 are equal to 0, e.g. if the first and second rotating magnetic fields are generated in a state in which the A1 and/or A2 rotors 221 and 223 are caused to rotate by inputting power thereto, the aforementioned general formula (1) holds between the first magnetic field rotational speed VMF1 and the A1 and A2 rotor rotational speeds VRA1 and VRA2 as it is and the speed relationship between the three is expressed as shown in FIG. 32(*c*).

Further, if the A2 rotor 223 is rotated by input of power, and the first magnetic field rotational speed VMF1 is controlled to 0, the power (energy) input to the A2 rotor 223 is not transmitted to the third stator 222, but is all transmitted to the A1 rotor 221 via the magnetic forces caused by the first and second magnetic force lines G1 and G2. Similarly, by causing the A1 rotor 221 to rotate by input of power, and the first magnetic field rotational speed VMF1 is controlled to 0, the power (energy) input to the A1 rotor 221 is not transmitted to the third stator 222 but is all transmitted to the A2 rotor 223 via the magnetic forces caused by the first and second magnetic force lines G1 and G2.

Further, the relationship between the first magnetic field rotational speed VMF1 and the A1 and A2 rotor rotational speeds VRA1 and VRA2 is expressed as VRA1=VRA2×2 by setting VMF1=0 in the aforementioned equation (1), and is expressed as shown in FIG. 32(*d*). Further, between the A1 and A2 rotor transmission torques TRA1 and TRA2, there holds the following equation (4):

$$TRA1 = TRA2/2 \qquad (4)$$

Further, in the third generator-motor 220, even in the case of electric power being not supplied to the third stator 222, induced electric motive force is generated in the armatures 222a to generate electric power, if with respect to the armatures 222a, the permanent magnets 221a are rotated by input of power to the A1 rotor 221 or the first and second cores 223a and 233b are rotated by input of power to the A2 rotor 223. If the first and second magnetic rotating fields are generated along with this electric power generation, the aforementioned equation (1) holds.

Further, between the first magnetic field rotational speed VMF1 and the A1 and A2 rotor rotational speeds VRA1 and VRA2, the relationship as expressed by the aforementioned equations (1) and (1') and FIGS. 32(*a*) to 32(*d*) is always satisfied, and the speed relationship between the three corresponds to the speed relationship between one and the other of the ring gear and sun gear of the planetary gear unit, and the carrier supporting the planetary gears. Further, such a speed relationship is obtained not only during the supply of electric power to the third stator 222, but also during the generation of electric power, and hence the third generator-motor 220 can be regarded as a planetary gear unit which inputs and outputs torque by the A1 and A2 rotors 221 and 223 and inputs and outputs electric power by the third stator 222.

Further, if power is supplied to the A1 rotor 221 and at the same time electric power is supplied to the third stator 222, when the directions of the rotations of the A1 rotor 221, the A2 rotor 223, and the first and second rotating magnetic fields are identical to each other, the first driving equivalent torque TSE1 output from the third stator 222 and the A1 rotor transmission torque TRA1 input to the A1 rotor 21 are combined by the first and second magnetic force lines G1 and G2, that is, magnetic circuits, and transmitted to the A2 rotor 223 as the A2 rotor transmission torque TRA2. That is, between the first driving equivalent torque TSE1 and the A1 and A2 rotor transmission torques TRA1 and TRA2, there holds the following equation (5):

$$TRA2=TSE1+TRA1 \tag{5}$$

However, in this case, as shown in the aforementioned equation (1'), the difference between the first magnetic field rotational speed VMF1 and the A2 rotor rotational speed VRA2 and the difference between the A2 rotor rotational speed VRA2 and the A1 rotor rotational speed VRA1 are equal to each other, and hence the torque combining ratio between the first driving equivalent torque TSE1 and the A1 rotor transmission torque TRA1 is 1:1. Therefore, the energy combining ratio (between power and electric power) is equal to the ratio between the A1 rotor rotational speed VRA1 and the first magnetic field rotational speed VMF1.

Further, if power is input to the A2 rotor 223 and at the same time, the electric power generation is performed by the third stator 222 using the power, when the directions of the rotations of the A1 rotor 221, the A2 rotor 223, and the first and second rotating magnetic fields are identical to each other, assuming that torque equivalent to the electric power generated by the third stator 222 and the first magnetic field rotational speed VMF1 is first power-generating equivalent torque TGE1, between the first power-generating equivalent torque TGE1 and the A1 and A2 rotor transmission torques TRA1 and TRA2, there holds the following equation (6):

$$TRA2=TGE1+TRA1 \tag{6}$$

In this case, as is clear from the equation (6), the A2 rotor transmission torque TRA2 is divided by the first and second magnetic force lines G1 and G2, that is, the magnetic circuits and is output as the first power-generating equivalent torque TGE1 and the A1 rotor transmission torque TRA1. Further, as shown in the aforementioned equation (1'), the difference between the first magnetic field rotational speed VMF1 and the A2 rotor rotational speed VRA2 and the difference between the A2 rotor rotational speed VRA2 and the A1 rotor rotational speed VRA1 are equal to each other, and hence the torque distribution ratio in this case is 1:1. Accordingly, the energy distribution ratio (between power and electric power) is equal to the ratio between the A1 rotor rotational speed VRA1 and the first magnetic field rotational speed VMF1.

Through the control of the 1st·PDU 61, the ECU 2 controls the electric power supplied to the third stator 222 and the first magnetic field rotational speed VMF1 of the first and second rotating magnetic fields generated by the supply of electric power. Further, through the control of the 1st·PDU 61, the ECU 2 controls the electric power generated by the third stator 222 and the first magnetic field rotational speed VMF1 of the first and second rotating magnetic fields generated by the electric power generation.

The fourth generator-motor 230 is comprised of a B1 rotor 231 (fourth element), a fourth stator 232 disposed in a manner opposed to the B1 rotor 231, and a B2 rotor 233 (fifth element) disposed between the two 231 and 232 at predetermined spaced intervals. The fourth stator 232 and the B1 and B2 rotors 231 and 233 are configured similarly to the third stator 222 and the A1 and A2 rotors 221 and 223 of the aforementioned third generator-motor 220, respectively, and hence detailed descriptions thereof is omitted. Further, the fourth stator 232 is electrically connected to the battery 63 and the ECU 2 via the 2nd·PDU 62.

Furthermore, the fourth generator-motor 230 has the same function as that of the third generator-motor 220 and can be regarded as a planetary gear unit which inputs and outputs torque by the B1 and B2 rotors 231 and 233 and inputs and outputs electric power by the fourth stator 232. Further, assuming that the rotational speed of the first and second rotating magnetic fields generated by the fourth stator 232 is a second magnetic field rotational speed VMF2, and the rotational speeds of the B1 and B2 rotors 231 and 233 are B1 and B2 rotor rotational speeds VRB1 and VRB2, respectively, the relationship as expressed by the aforementioned equations (1), (1'), and FIGS. 32(a) to 32(d) always holds between the rotational speeds VMF2, VRB1 and VRB2, both during the supply of electric power to the fourth stator 232 and during the generation of electric power. Therefore, there hold the following equations (7) and (7'):

$$VRB2=(VMF2+VRB1)/2 \tag{7}$$

$$VMF2-VRB2=VRB2-VRB1 \tag{7'}$$

It should be noted that in the present embodiment, the second magnetic field rotational speed VMF2 corresponds to the rotational speed of the sixth element as claimed in claim 1.

Further, let it be assumed that torques transmitted to the B1 and B2 rotors 231 and 233 are the B1 and B2 rotor transmission torques TRB1 and TRB2, respectively, torque equivalent to the electric power supplied to the fourth stator 232 and the second magnetic field rotational speed VMF2 is second driving equivalent torque TSE2, and torque equivalent to the electric power generated by the fourth stator 232 and the second magnetic field rotational speed VMF2 is second power-generating equivalent torque TGE2. In this case, the relationship as expressed by the aforementioned equations (2) to (6) always holds between the torques TRB1, TRB2, TSE2 and TGE2, and therefore, there hold the following equations (8) to (12):

$$TRB2=TSE2\times 2 \text{(provided } VRB1=0, VRB2=VMF2/2) \tag{8}$$

$$TRB1=TSE2 \text{(provided } VRB2=0, VRB1=-VMF2) \tag{9}$$

$$TRB1=TRB2/2 \text{(provided } VMF2=0, VRB1=VRB2\times 2) \tag{10}$$

$$TRB2=TSE2+TRB1 \text{(provided } TSE2=TRB1, VRB2=(VMF2+VRB1)/2) \tag{11}$$

$$TRB2=TGE2+TRB1 \text{(provided } TGE2=TRB1, VRB2=(VMF2+VRB1)/2) \tag{12}$$

Furthermore, as shown in FIG. 23, the B1 rotor 231 is connected to the first main shaft 4, and the B2 rotor 233 is connected to the connection shaft 6 and the second main shaft 7. With the above arrangement, the crankshaft 3a of the engine 3, the A2 rotor 223 of the third generator-motor 220 and the B1 rotor 231 of the fourth generator-motor 230 are mechanically connected to each other via the first main shaft 4. Further, the A1 rotor 221 of the third generator-motor 220 and the B2 rotor 233 of the fourth generator-motor 230 are mechanically connected to each other via the connection shaft 6, and the B2 rotor 233 and the drive wheels DW and DW are mechanically connected to each other via the second main shaft 7 and so forth. That is, the A1 rotor 221 and the B2 rotor 233 are mechanically connected to the drive wheels DW and DW.

Through the control of the 2nd·PDU 62, the ECU 2 controls the electric power supplied to the fourth stator 232 and the second magnetic field rotational speed VMF2 of the first and second rotating magnetic fields generated by the fourth stator 232 in accordance with the supply of electric power. Further, through the control of the 2nd-PDU 62, the ECU 2 controls the electric power generated by the fourth stator 232 and the second magnetic field rotational speed VMF2 of the first and second rotating magnetic fields generated by the fourth stator 232 in accordance with the electric power generation.

Further, as shown in FIG. 24, an A1 rotational angle sensor 79 and an A2 rotational angle sensor 80 detect the rotational angle positions of the respective A1 and A2 rotors 221 and 223 and deliver signals indicative of the sensed rotational angle positions to the ECU 2. The ECU 2 calculates the A1 and A2 rotor rotational speeds VRA1 and VRA2 based on the detected rotational angle positions of the A1 and A2 rotors 221 and 223.

Further, a B1 rotational angle sensor 81 and a B2 rotational angle sensor 82 deliver signals indicative of the rotational angle positions of the respective B1 and B2 rotors 231 and 233 to the ECU 2. The ECU 2 calculates the B1 and B2 rotor rotational speeds VRB1 and VRB2 based on the detected rotational angle positions of the B1 and B2 rotors 231 and 233.

Next, the control by the ECU 2 at the start or during traveling of the vehicle will be described. First, a description will be given of the control during the aforementioned EV creep operation and EV standing start of the vehicle. During the EV creep operation, basically, the engine 3 is stopped and only the fourth generator-motor 230 is used as a power source of the vehicle. More specifically, electric power is supplied from the battery 63 to the fourth stator 232 of the fourth generator-motor 230, whereby the first and second rotating magnetic fields generated in the fourth stator 232 are caused to perform normal rotation. Further, by using power transmitted to the A1 rotor 221 of the third generator-motor 220, as described hereinafter, electric power generation is performed by the third stator 222 to supply the generated electric power to the fourth stator 232.

Figure 35:
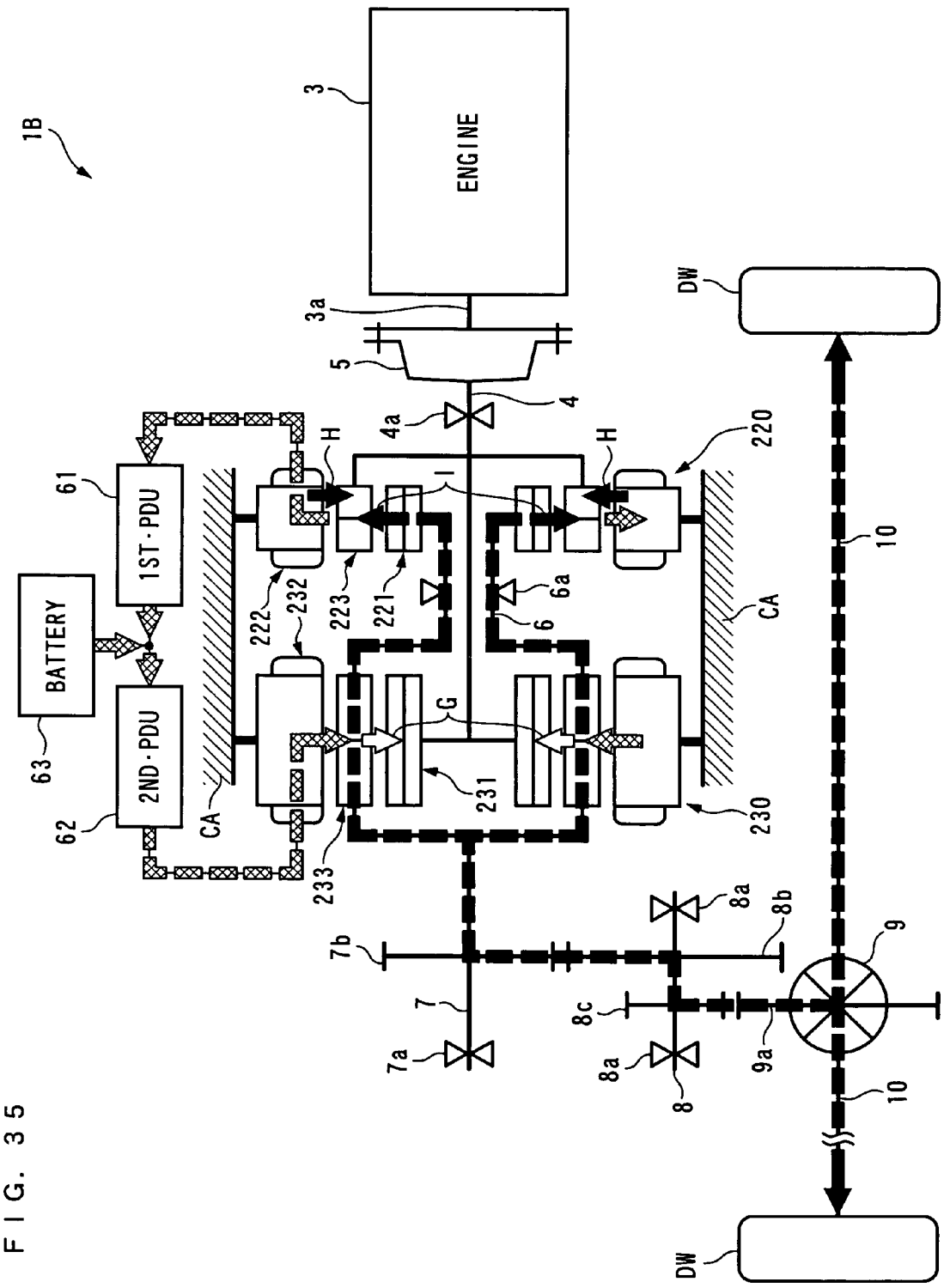
FIG. 35 A diagram showing how torque is transmitted in the power plant according to the third embodiment during the EV creep operation.

FIG. 35 shows how torque is transmitted during the above-described EV creep operation of the vehicle, and FIG. 36 shows a speed diagram representing the relationship between the first and second magnetic field rotational speeds VMF1 and VMF2 and so forth during the EV creep operation. Further, although in the third and fourth stators 222 and 232, actually, torque is transmitted in the form of electric energy, in FIG. 35 and other figures, referred to hereinafter, showing the states of transmission of torque, the input and output of energy to and from the third and fourth stators 222 and 232 are indicated by flows of torque which are hatched, for convenience.

As shown in FIG. 35, during the EV creep operation, as electric power is supplied to the fourth stator 232, torque that acts on the B2 rotor 233 so as to cause the B2 rotor 233 to perform normal rotation is transmitted from the fourth stator 232 to the B2 rotor 233, and as indicated by arrows G, torque that acts on the B1 rotor 231 so as to cause the B1 rotor 231 to perform reverse rotation is transmitted to the B1 rotor 231. Further, part of the torque transmitted to the B2 rotor 233 is transmitted to the drive wheels DW and DW via the second main shaft 7, the differential gear mechanism 9, and so forth, whereby the drive wheels DW and DW perform normal rotation.

Furthermore, during the EV creep operation, the remainder of the torque transmitted to the B2 rotor 233 is transmitted to the A1 rotor 221 via the connection shaft 6, and then is transmitted to the third stator 222 as the first power-generating equivalent torque TGE1 along with the electric power generation by the third stator 222. Further, as shown in FIG. 36, the first and second rotating magnetic fields generated by the electric power generation in the third stator 222 perform reverse rotation. As a result, as indicated by arrows H in FIG. 35, along with the electric power generation by the third stator 222, torque dependent on the amount of generated electric power is transmitted from the third stator 222 to the A2 rotor 223. This torque acts on the A2 rotor 223 to cause the A2 rotor 223 to perform normal rotation. Further, the torque transmitted to the A1 rotor 221 is further transmitted to the A2 rotor 223 (as indicated by arrows I) such that it is balanced with the torque transmitted from the third stator 222 to the A2 rotor 223, and these torques are combined at the torque combining ratio of 1:1.

In this case, the electric power supplied to the fourth stator 232 and the electric power generated by the third stator 222 are controlled such that the above-mentioned torque indicated by the arrows G, for causing the B1 rotor 231 to perform reverse rotation, and the torques indicated by the arrows H and I, for causing the A2 rotor 223 to perform normal rotation are balanced with each other, whereby the A2 rotor 223, the B1 rotor 231 and the crankshaft 3a, which are connected to each other, are held at rest. As a consequence, as shown in FIG. 36, during the EV creep operation, the A2 and B1 rotor rotational speeds VRA2 and VRB1 become equal to 0, and the engine speed NE as well become equal to 0.

Further, during the EV creep operation, the electric power supplied to the fourth stator 232, the electric power generated by the third stator 222, and the first and second magnetic field rotational speeds VMF1 and VMF2 are controlled such that the speed relationships expressed by the aforementioned equations (1) and (7) are maintained and at the same time, the A1 and B2 rotor rotational speeds VRA1 and VRB2 become very small (see FIG. 36). From the above, the creep operation with a very low vehicle speed VP is carried out. As described above, it is possible to perform the creep operation using the driving force of the fourth generator-motor 230 in a state in which the engine 3 is stopped.

The control at the EV standing start of the vehicle is carried out, subsequent to the above-described EV creep operation, as follows: The electric power supplied to the fourth stator 232 and the electric power generated by the third stator 222 are both increased. Further, while the relationships between the rotational speeds expressed by the aforementioned equations (1) and (7) are maintained and at the same time, the A2 and B1 rotor rotational speeds VRA2 and VRB1, that is, the engine speed NE is held at 0, the first magnetic field rotational speed VMF1 of the first and second rotating magnetic fields generated by the third stator 222 that has been performing reverse rotation during the EV creep operation, and the second magnetic field rotational speed VMF2 of the first and second rotating magnetic fields generated by the fourth stator 232 that has been performing normal rotation during the EV creep operation are increased in the same rotation directions as they have been. From the above, as indicated by thick solid lines in FIG. 37, the A1 and B2 rotor rotational speeds VRA1 and VRB2, that is, the vehicle speed VP is increased from the state of the EV creep operation, indicated by broken lines in FIG. 37, causing the vehicle to start.

Further, subsequent to the above-described EV standing start, the aforementioned ENG start during EV traveling is performed as follows. While holding the A1 and B2 rotor rotational speeds VRA1 and VRB2, that is, the vehicle speed VP at the value assumed then, the first magnetic field rotational speed VMF1 of the first and second rotating magnetic fields generated by the third stator 222 that has been performing reverse rotation during the EV standing start, as described above, is controlled to 0, and the second magnetic field rotational speed VMF2 of the first and second rotating magnetic fields generated by the fourth stator 232 that has been performing normal rotation during the EV standing start, is controlled such that it is decreased. Then, after the first magnetic field rotational speed VMF1 becomes equal to 0, electric power is supplied from the battery 63 not only to the fourth stator 232 but also to the third stator 222, whereby the first and second rotating magnetic fields generated by the third stator 222 are caused to perform normal rotation, and the first magnetic field rotational speed VMF1 is caused to be increased.

Figure 38:
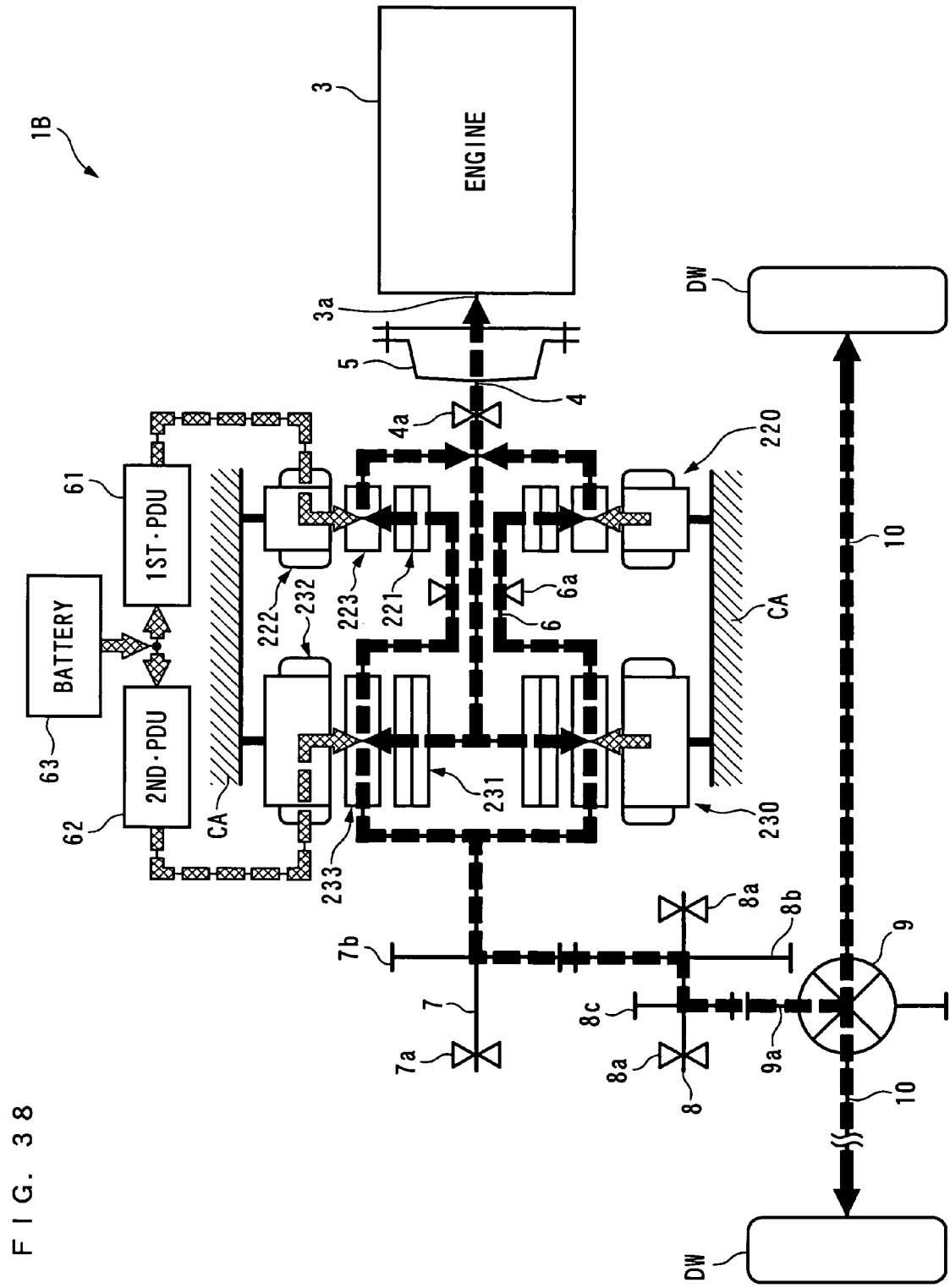
FIG. 38 A diagram showing how torque is transmitted in the power plant according to the third embodiment at the time of the ENG start during the EV traveling.

FIG. 38 shows how torque is transmitted in a state in which at the time of the ENG start during EV traveling, electric power has been supplied to the third and fourth stators 222 and 232, as described above. As described above using the aforementioned equation (11), when electric power is supplied to the fourth stator 232 in a state in which power is input to the B1 rotor 231, the second driving equivalent torque TSE2 and the B1 rotor transmission torque TRB1 are combined at the torque combining ratio of 1:1, and transmitted to the B2 rotor 233 as the B2 rotor transmission torque TRB2. Therefore, as shown in FIG. 38, as the supply of electric power to the fourth stator 232 as mentioned above causes the second driving equivalent torque TSE2 to be transmitted to the B2 rotor 233, torque transmitted to the B1 rotor 231, as will be described hereinafter, is transmitted to the B2 rotor 233. Further, part of the torque transmitted to the B2 rotor 233 is transmitted to the A1 rotor 221 via the connection shaft 6, and the remainder thereof is transmitted to the drive wheels DW and DW e.g. via the second main shaft 7.

Furthermore, as described above using the aforementioned equation (5), when electric power is supplied to the third stator 222 in a state in which power is input to the A1 rotor 221, the first driving equivalent torque TSE1 and the A1 rotor transmission torque TRA1 are combined at the torque combining ratio of 1:1, and transmitted to the A2 rotor 223 as the A2 rotor transmission torque TRA2. Therefore, as shown in FIG. 38, at the time of the ENG start during EV traveling, electric power is supplied from the battery 63 to the third stator 222, whereby as the first driving equivalent torque TSE1 is transmitted to the A2 rotor 223, the torque transmitted to the A1 rotor 221 as described above is transmitted to the A2 rotor 223.

Further, at the time of the ENG start during EV traveling, part of the torque transmitted to the A2 rotor 223 is transmitted to the B1 rotor 231 via the first main shaft 4, and the remainder thereof is transmitted to the crankshaft 3a via the first main shaft 4 and the flywheel 5, whereby the crankshaft 3a performs normal rotation. Furthermore, in this case, the electric power supplied to the third and fourth stators 222 and 232 is controlled such that sufficient power is transmitted to the drive wheels DW and DW and the engine 3.

Figure 39:
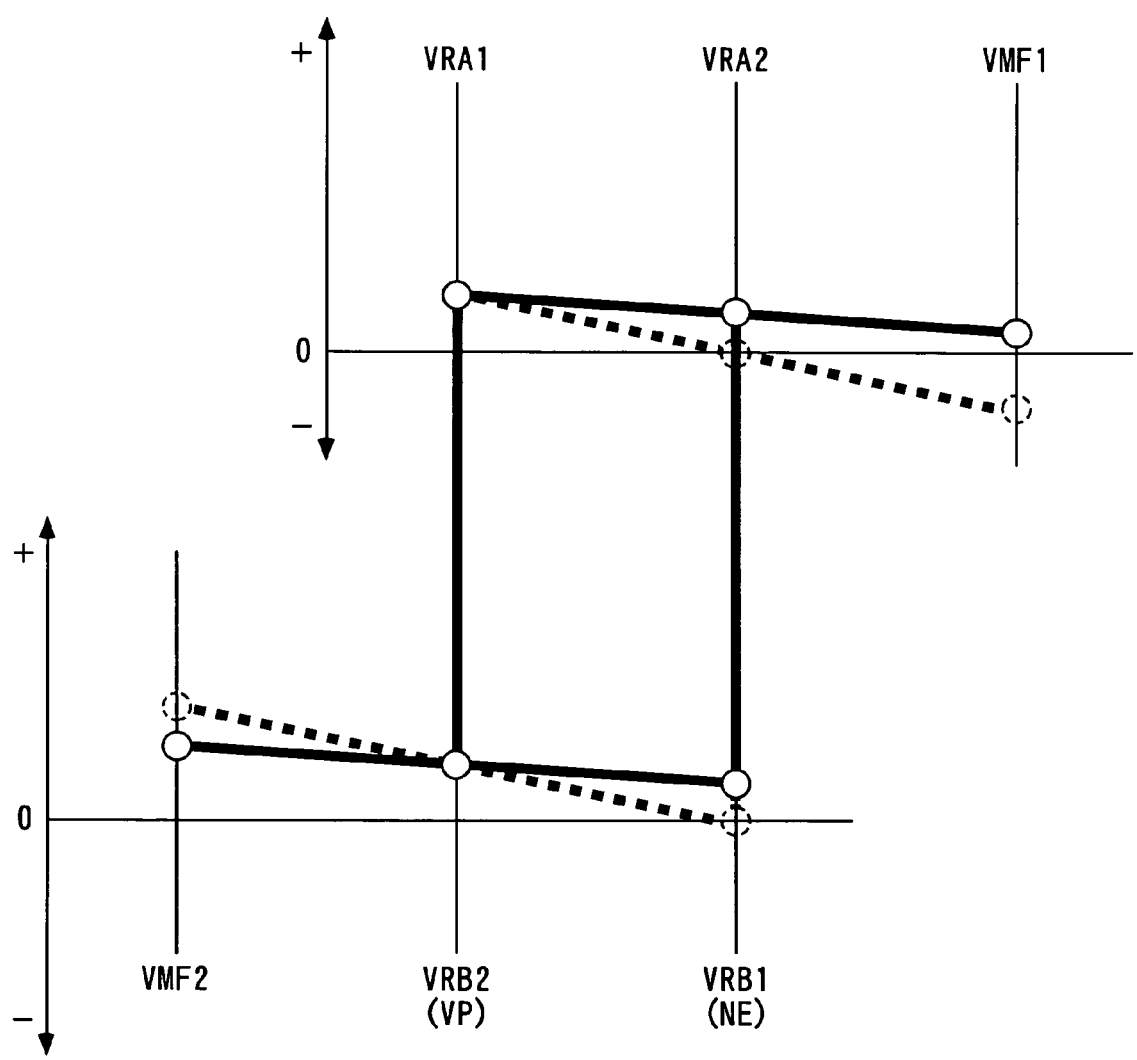
FIG. 39 A speed diagram of the first and second magnetic field rotational speeds VMF1 and VMF2, and the A1, A2, B1 and B2 rotor rotational speeds VRA1, VRA2, VRB1 and VRB2 at the time of the ENG start during the EV traveling, shown by way of example.

From the above, as indicated by thick solid lines in FIG. 39, at the time of the ENG start during EV traveling, while the vehicle speed VP is held at the value assumed then, the A2 and B1 rotor rotational speeds VRA2 and VRB1 are increased from a state in which they are equal to 0, indicated by broken lines, and the rotational speed of the crankshaft 3a connected to the A2 and B1 rotors 223 and 231, that is, the engine speed NE is also increased. In this state, the ignition operation of the fuel injection valves and the spark plugs of the engine 3 is controlled, whereby the engine 3 is started. Further, in this case, by controlling the first and second magnetic field rotational speeds VMF1 and VMF2, the engine speed NE is controlled to a relatively small value suitable for starting the engine 3.

Figure 40:
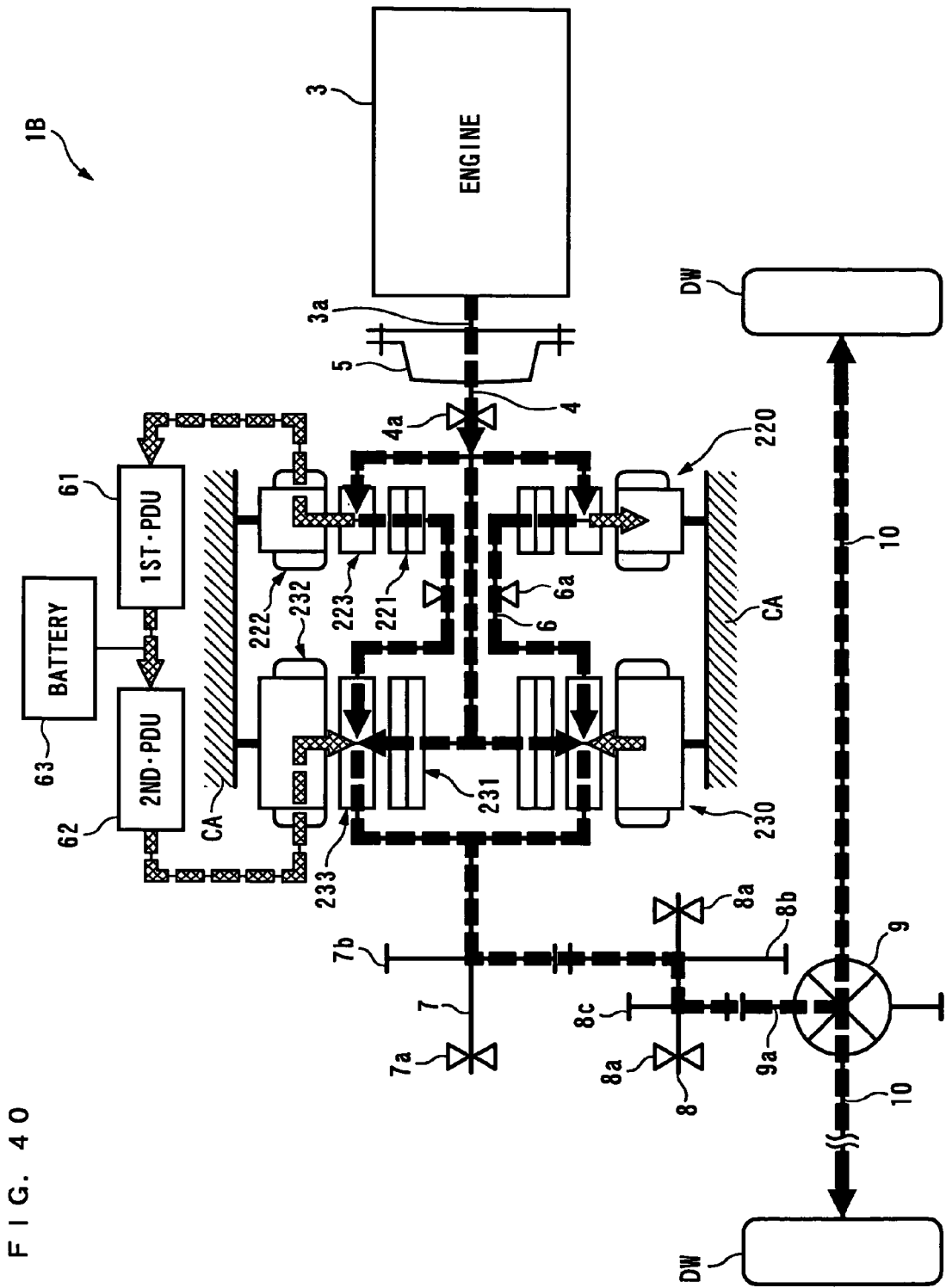
FIG. 40 A diagram showing how torque is transmitted in the power plant according to the third embodiment in the battery input/output zero mode.

Next, a description will be given of the control during traveling of the vehicle after the ENG start during EV traveling. During traveling of the vehicle, similarly to the first embodiment described above, the engine power WENG is basically controlled such that the optimum fuel economy can be obtained within a range within which the demanded torque PMCMD can be generated, and operation in the battery input/output zero mode is carried out. In the second embodiment, in the battery input/output zero mode, by using the engine power WENG transmitted to the A2 rotor 223, electric power generation is performed by the third stator 222 to supply generated electric power to the fourth stator 232 without charging it into the battery 63. FIG. 40 shows how torque is transmitted in the battery input/output zero mode.

As described hereinabove using the equation (6), during the generation of electric power using power input to the A2 rotor 223, the third generator-motor 220 divides the A2 rotor transmission torque TRA2 at a torque distribution ratio of 1:1 and outputs the divided torque as the first power-generating equivalent torque TGE1 and the A1 rotor transmission torque TRA1. Therefore, as shown in FIG. 40, as part of the engine torque TENG is transmitted to the third stator 222 as the first power-generating equivalent torque TGE1 via the A2 rotor 223, the engine torque TENG equal in magnitude to the first power-generating equivalent torque TGE1 is transmitted also to the A1 rotor 221 via the A2 rotor 223. That is, part of the engine torque TENG is transmitted to the A2 rotor 223, and the engine torque TENG transmitted to the A2 rotor 223 is distributed to the third stator 222 and the A1 rotor 221 at the torque distribution ratio of 1:1. Further, the remainder of the engine torque TENG is transmitted to the B1 rotor 231 via the first main shaft 4.

Further, similarly to the above-described case of the start of the engine 3, the second driving equivalent torque TSE2 and the B1 rotor transmission torque TRB1 are combined at the torque combining ratio of 1:1, and the combined torque is transmitted to the B2 rotor 233 as the B2 rotor transmission torque TRB2. Therefore, in the battery input/output zero mode, the electric power generated by the third stator 222 as described above is supplied to the fourth stator 232, whereby as the second driving equivalent torque TSE2 is transmitted to the B2 rotor 233, the engine torque TENG transmitted to the B1 rotor 231 as described above is transmitted to the B2 rotor 233. Further, the engine torque TENG distributed to the A1 rotor 221 along with the electric power generation as described above is further transmitted to the B2 rotor 233 via the connection shaft 6.

As described above, combined torque formed by combining the engine torque TENG distributed to the A1 rotor 221, the second driving equivalent torque TSE2 and the engine torque TENG transmitted to the B1 rotor 231 is transmitted to the B2 rotor 233. Further, this combined torque is transmitted to the drive wheels DW and DW e.g. via the second main shaft 7. As a consequence, if there is no transmission loss caused by the gears, in the battery input/output zero mode, power equal in magnitude to the engine power WENG is transmitted to the drive wheels DW and DW. Furthermore, differently from the aforementioned conventional case, the engine power WENG is transmitted to the drive wheels DW and DW without being recirculated.

Furthermore, in the battery input/output zero mode, the engine power WENG is transmitted to the drive wheels DW and DW while having the speed thereof steplessly changed through the control of the first and second magnetic field rotational speeds VMF1 and VMF2. In short, the third and fourth generator-motors 220 and 230 function as a stepless transmission.

Figure 41:
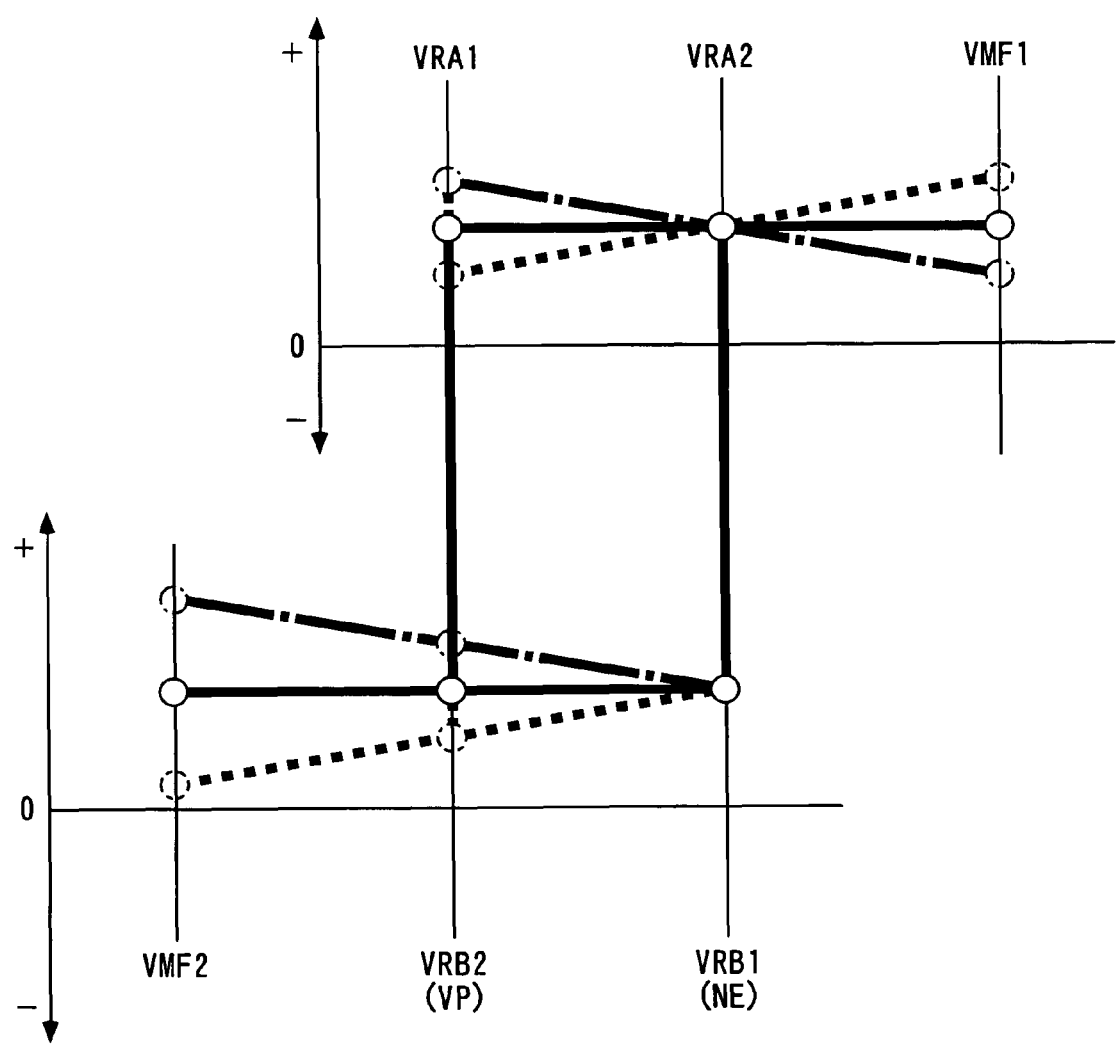
FIG. 41 A speed diagram of the first and second magnetic field rotational speeds VMF1 and VMF2, and the A1, A2, B1 and B2 rotor rotational speeds VRA1, VRA2, VRB1 and VRB2 in the battery input/output zero mode, shown by way of example.

More specifically, as indicated by broken lines in FIG. 41, while maintaining the speed relationships expressed by the aforementioned equations (1) and (7), by increasing the first magnetic field rotational speed VMF1 and decreasing the second magnetic field rotational speed VMF2 with respect to the A2 and B1 rotor rotational speeds VRA2 and VRB1, that is, the engine speed NE, it is possible to steplessly decrease the A1 and B2 rotor rotational speeds VRA1 and VRB2, that is, the vehicle speed VP. Inversely, as indicated by one-dot chain lines in FIG. 41, by decreasing the first magnetic field rotational speed VMF1 and increasing the second magnetic field rotational speed VMF2 with respect to the A2 and B1 rotor rotational speeds VRA2 and VRB1, it is possible to steplessly increase the vehicle speed VP. Further, in this case, the first and second magnetic field rotational speeds VMF1 and VMF2 are controlled such that the engine speed NE becomes equal to the above-mentioned target engine speed NECMD.

As described hereinabove, in the battery input/output zero mode, the engine power WENG is once divided by the third and fourth generator-motors 220 and 230, and is transmitted to the B2 rotor 233 via the next fifth to seventh transmission paths. Then, the divided engine power WENG is combined by the B2 rotor 233 and then is transmitted to the drive wheels DW and DW.

Fifth transmission path: A2 rotor 223→magnetic circuits→A1 rotor 221→connection shaft 6→B2 rotor 233

Sixth transmission path: B1 rotor 231→magnetic circuits→B2 rotor 233

Seventh transmission path: A2 rotor 223→magnetic circuits→third stator 222→1st·PDU 61→2nd·PDU 62→fourth stator 232→magnetic circuits→B2 rotor 233

In the above fifth and sixth transmission paths, the engine power WENG is transmitted to the drive wheels DW and DW by so-called magnetic paths through the magnetic circuits without being converted to electric power. Further, in the above-described seventh transmission path, the engine power WENG is once converted to electric power, and is then converted back into power again so as to be transmitted to the drive wheels DW and DW by the so-called electrical paths.

Further, in the battery input/output zero mode, the electric power generated by the third stator 222 and the first and second magnetic field rotational speeds VMF1 and VMF2 are controlled such that the speed relationships expressed by the aforementioned equations (1) and (7) are maintained. Further, the electric power generated by the third stator 222 is more specifically controlled as follows:

In the battery input/output zero mode, the relationship between the engine power WENG and the engine power WENG transmitted to the drive wheels DW and DW via the above-described electrical paths (hereinafter referred to as "the electrical path power WP'") is represented as follows: The engine power WENG is represented by the product of the engine torque TENG and the engine speed NE. Further, in the battery input/output zero mode, all the electric power generated by the third stator 222 is supplied to the fourth stator 232, so that the electrical path power WP' is equal to the product of the electric power generated by the third stator 222, that is, the first power-generating equivalent torque TGE1 and the first magnetic field rotational speed VMF1. Therefore, the ratio between the electrical path power WP' and the engine power WENG is expressed by the following equation (13):

$$WP'/WENG=(TGE1 \times VMF1)/(TENG \times NE) \quad (13)$$

Further, as described above, since part of the engine torque TENG is transmitted to the A2 rotor 223, and the remainder thereof is transmitted to the B1 rotor 231, the sum of the A2 rotor transmission torque TRA2 and the B1 rotor transmission torque TRB1 is equal to the engine torque TENG. Therefore, there holds the following equation (14):

$$TENG=TRA2+TRB1 \quad (14)$$

Furthermore, in this case, the aforementioned equation (6), that is, TRA2=TGE1+TRA1 holds, and the torque distribution ratio is 1:1, that is, TGE1=TRA1 holds, and hence there holds the following equation (15):

$$TRA2=TGE1 \times 2 \quad (15)$$

Further, as described above, since the torque combining ratio between the B1 rotor transmission torque TRB1 and the second driving equivalent torque TSE2 is 1:1, there holds the following equation (16):

$$TRB1=TSE2 \quad (16)$$

If the equations (15) and (16) are substituted into the equation (14), there is obtained the following equation (17):

$$TENG=2 \times TGE1+TSE2 \quad (17)$$

Furthermore, in the aforementioned equation (1), since the A2 rotor 223 is connected to the engine 3, the second rotor rotational speed VRA2 is equal to the engine speed NE and therefore, there holds the following equation (18):

$$NE=(VMF1+VRA1)/2 \quad (18)$$

Further, since the B2 rotor 233 and the A1 rotor 221 are directly connected to each other, the B2 rotor rotational speed VRB2 and the A1 rotor rotational speed VRA1 are equal to each other, and since the B1 rotor 231 is directly connected to the crankshaft 3a, the B1 rotor rotational speed VRB1 and the engine speed NE are equal to each other. Therefore, the aforementioned equation (7) can be represented by the following equation (19):

$$VRA1=(VMF2+NE)/2 \quad (19)$$

Furthermore, if the equation (19) is substituted into the equation (18), there is obtained the following equation (20):

$$NE=(2 \times VMF1+VMF2)/3 \quad (20)$$

Further, if the equations (17) and (20) are substituted into the equation (13), there is obtained the following equation (21):

$$WP'/WENG=(TGE1 \times VMF1)/\{(2 \times TGE1+TSE2) \times (2 \times VMF1+VMF2)/3\} \quad (21)$$

Further, in this case, since the electric power generated by the third stator 222 and the electric power supplied to the fourth stator 232 are equal to each other, there holds the following equation (22):

$$TSE2=(VMF1 \times TGE1)/VMF2 \quad (22)$$

If the equation (22) is substituted into the equation (21), there is obtained the following equation (23). More specifically, in the battery input/output zero mode, the ratio between the electrical path power WP' and the engine power WENG is expressed by the equation (23):

$$WP'/WENG=3/\{(2+VMF1/VMF2) \times (2+VMF2/VMF1)\} \quad (23)$$

provided VMF1>0 and VMF2>0 therein.

As described heretofore, the electrical path power WP' is equal to the electric power generated by the third stator 222. Therefore, the electric power generated by the third stator 222 is controlled based on the equation (23) to WENG×3/{(2+VMF1/VMF2)×(2+VMF2/VMF1)}.

Further, as is clear from the equation (23), the ratio between the electrical path power WP' and the engine power WENG is maximized when the first and second magnetic field rotational speeds VMF1 and VMF2 are equal to each other, giving WP'/WENG=⅓.

As described above, it is possible to reduce the engine power WENG transmitted by an electrical path via the aforementioned seventh transmission path having a low transmission efficiency to ⅓ or less thereof. In other words, ⅔ or more of the engine power WENG, that is, most of it can be transmitted to the drive wheels DW and DW by magnetic paths via the aforementioned fifth and sixth transmission paths having a high transmission efficiency. Further, the torque distribution ratio between the first power-generating equivalent torque TGE1 and the A1 rotor transmission torque TRA1 is 1:1, and the torque combining ratio between the B1 rotor transmission torque TRB1 and the second driving equivalent torque TSE2 is 1:1, so that if the first and second magnetic field rotational speeds VMF1 and VMF2 are equal to each other, and the speed of the engine power WENG is not changed, the engine torque TENG is divided into three equal parts, and is transmitted to the drive wheels DW and DW via the fifth to seventh transmission paths.

On the other hand, during traveling of the vehicle, if the above-described conditions (a) and (b) are both satisfied (demanded torque PMCMD>first predetermined value PM1 and at the same time remaining capacity SOC>lower limit value SOCL), similarly to the first embodiment, the operation in the assist mode is performed. In the assist mode, the engine 3 is assisted by the fourth generator-motor 230.

Figure 42:
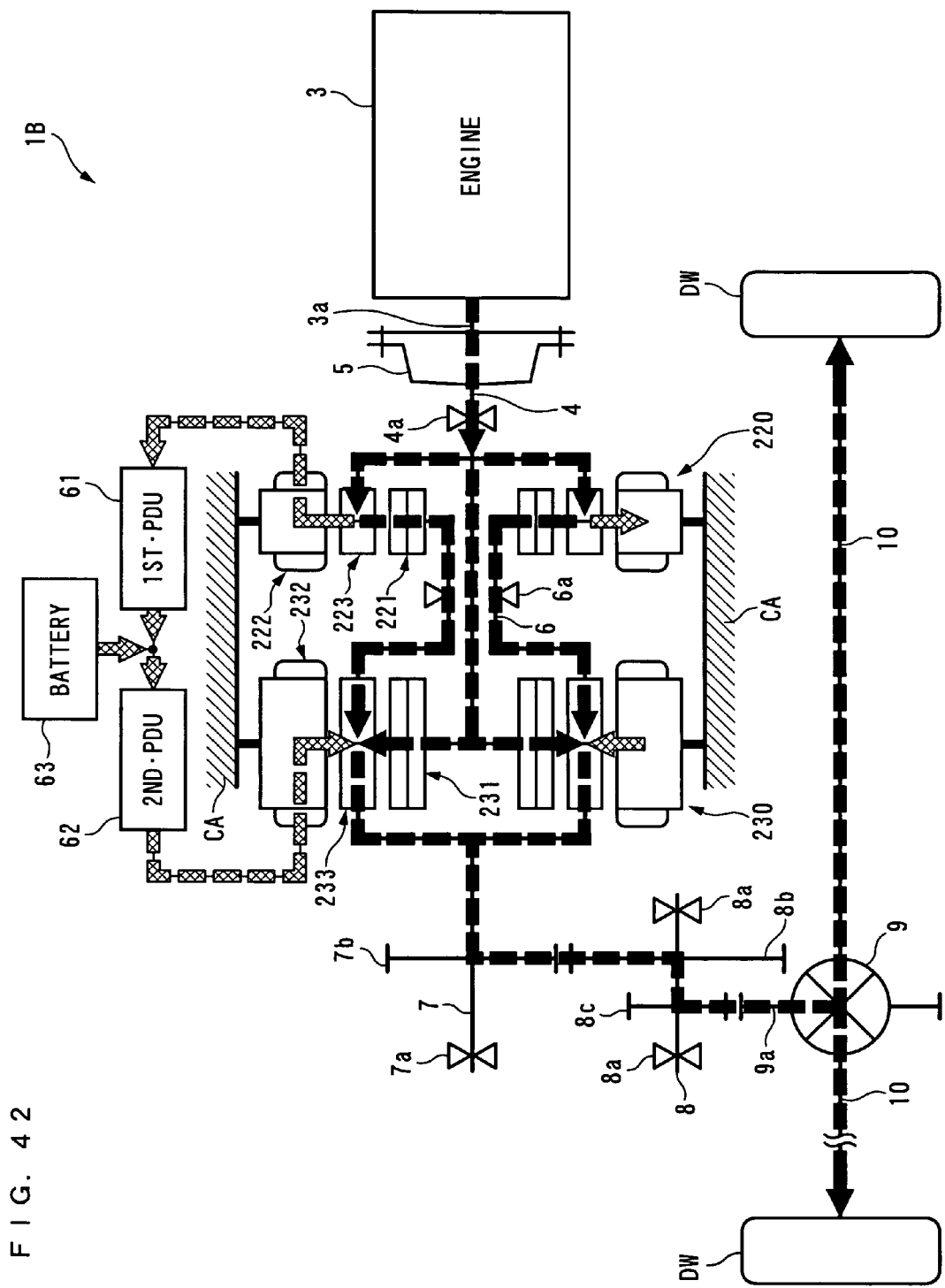
FIG. 42 A diagram showing how torque is transmitted in the assist mode in the power plant according to the third embodiment.

More specifically, similarly to the battery input/output zero mode, electric power is generated by the third stator 222 using the engine power WENG transmitted to the A2 rotor 223. Further, in this case, differently from the battery input/output zero mode, as shown in FIG. 42, electric power charged in the battery 63 is supplied to the fourth stator 232 in addition to the electric power generated by the third stator 222. Therefore, the second driving equivalent torque TSE2 based on the sum of the electric power generated by the third stator 222 and the electric power supplied from the battery 63 is transmitted to the B2 rotor 233. Further, similarly to the battery input/output zero mode, the second driving equivalent torque TSE2, the engine torque TENG distributed to the A1 rotor 221 along with the electric power generation and the engine torque TENG transmitted to the B1 rotor 231 are combined by the B2 rotor 233, and the combined torque is transmitted to the drive wheels DW and DW. As a result, assuming that there is no transmission loss caused by the gears or the like, in the assist mode, the power transmitted to the drive wheels DW and DW becomes equal to the sum of the engine power WENG and the electric power (energy) supplied from the battery 63.

Figure 56:
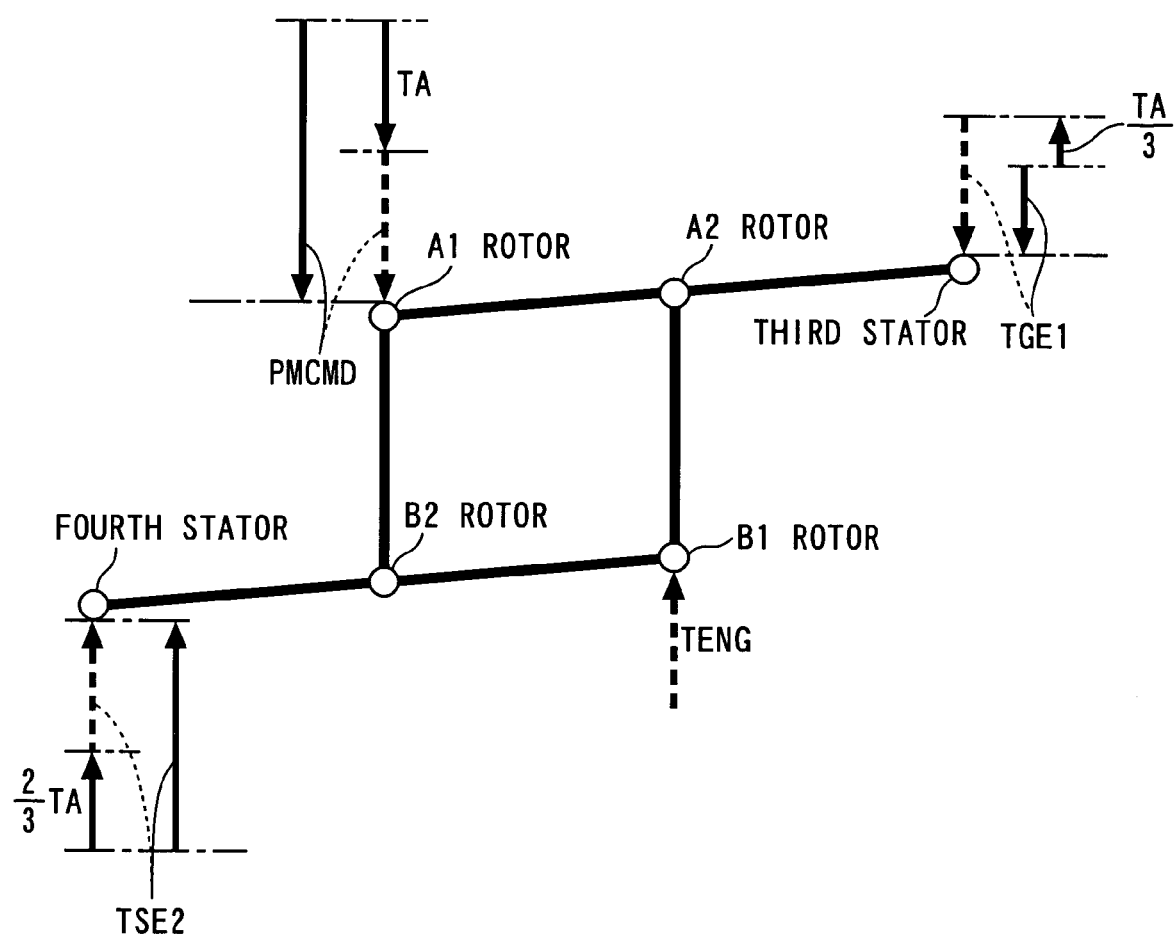
FIG. 56 A schematic diagram illustrating the relationship between the engine torque TENG and the demanded torque PMCMD in the power plant according to the third embodiment, by using solid lines with arrows for the assist mode and using broken lines with arrows for the battery input/output zero mode.

Further, in the assist mode, the electric power generated by the third stator 222, the electric power supplied from the battery 63 to the fourth stator 232, and the first and second magnetic field rotational speeds VMF1 and VMF2 are controlled such that the speed relationships expressed by the aforementioned equations (1) and (7) are maintained. More specifically, the electric power generated by the third stator 222 and the electric power supplied from the battery 63 are controlled as follows:

FIG. 56 schematically shows an example of the relationship between the engine torque TENG, the demanded torque PMCMD, and so forth, obtained in the assist mode. In FIG. 56, broken lines with arrows indicate states in the battery input/output zero mode before the assist mode, and it is assumed that the engine torque TENG, the demanded torque PMCMD, the first power-generating equivalent torque TGE1 and the second driving equivalent torque TSE2 are balanced with each other in the states. From the states, as indicated by solid lines with arrows in FIG. 56, when the demanded torque PMCMD is increased to switch the operation mode to the assist mode, the following control is carried out so as to supplement the aforementioned insufficient torque TA (insufficient amount of the engine torque TENG with respect to the demanded torque PMCMD).

In this case, as described hereinabove, the torque distribution ratio and the torque combining ratio in the third and fourth generator-motors 220 and 230 are 1:1, and hence to maintain the speed relationships expressed by the aforementioned equations (1) and (7), it is necessary to supplement ⅓ of the insufficient torque TA by the third generator-motor 220, and ⅔ of the insufficient torque TA by the fourth generator-motor 230. Further, since the first power-generating equivalent torque TGE1 acts on the engine torque TENG as negative torque, the electric power generated by the third stator 222 is controlled such that the first power-generating equivalent torque TGE1 becomes equal to the difference between the first power-generating equivalent torque TGE1 in the battery input/output zero mode and the ⅓ of the insufficient torque TA (TGE1−TA/3). As a consequence, the electric power supplied from the third stator 222 to the fourth stator 232 is reduced. Further, the electric power supplied from the battery 63 to the fourth stator 232 is controlled to a value obtained by converting the insufficient torque TA and the vehicle speed VP into electric energy. From the above, the total electric power supplied from the third stator 222 and the battery 63 to the fourth stator 232 is controlled such that the second driving equivalent torque TSE2 becomes equal to the sum of the second driving equivalent torque TSE2 in the battery input/output zero mode and the ⅔ of the insufficient torque TA (TSE2+TA×⅔).

It should be noted that although the above-described example is an example of a case in which the ⅓ of the insufficient torque TA to be supplemented is small with respect to the first power-generating equivalent torque TGE1 in the battery input/output zero mode, if the ⅓ of the insufficient torque TA is larger, the electric power is supplied from the battery 63 not only to the fourth stator 232 but also to the third stator 222.

As described above, similarly to the above-described first embodiment, the operation in the assist mode is performed when the vehicle demand power is large with respect to the engine power WENG that will make it possible to obtain the optimum fuel economy of the engine 3. Further, in the assist mode, the engine power WENG is controlled such that the optimum fuel economy of the engine 3 can be obtained, and the insufficient amount of the engine power WENG with respect to the vehicle demand power is made up for by supply of electric power from the battery 63.

On the other hand, during traveling of the vehicle, if the above-described conditions (c) and (d) are both satisfied (the demanded torque PMCMD<the second predetermined value PM2 and at the same time the remaining capacity SOC<the upper limit value SOCH), similarly to the first embodiment, the operation in the drive-time charging mode is performed. In the drive-time charging mode, part of the electric power generated by the third stator 222 using the engine power WENG, as described above, is charged into the battery 63, and the remainder thereof is supplied to the fourth stator 232.

Figure 43:
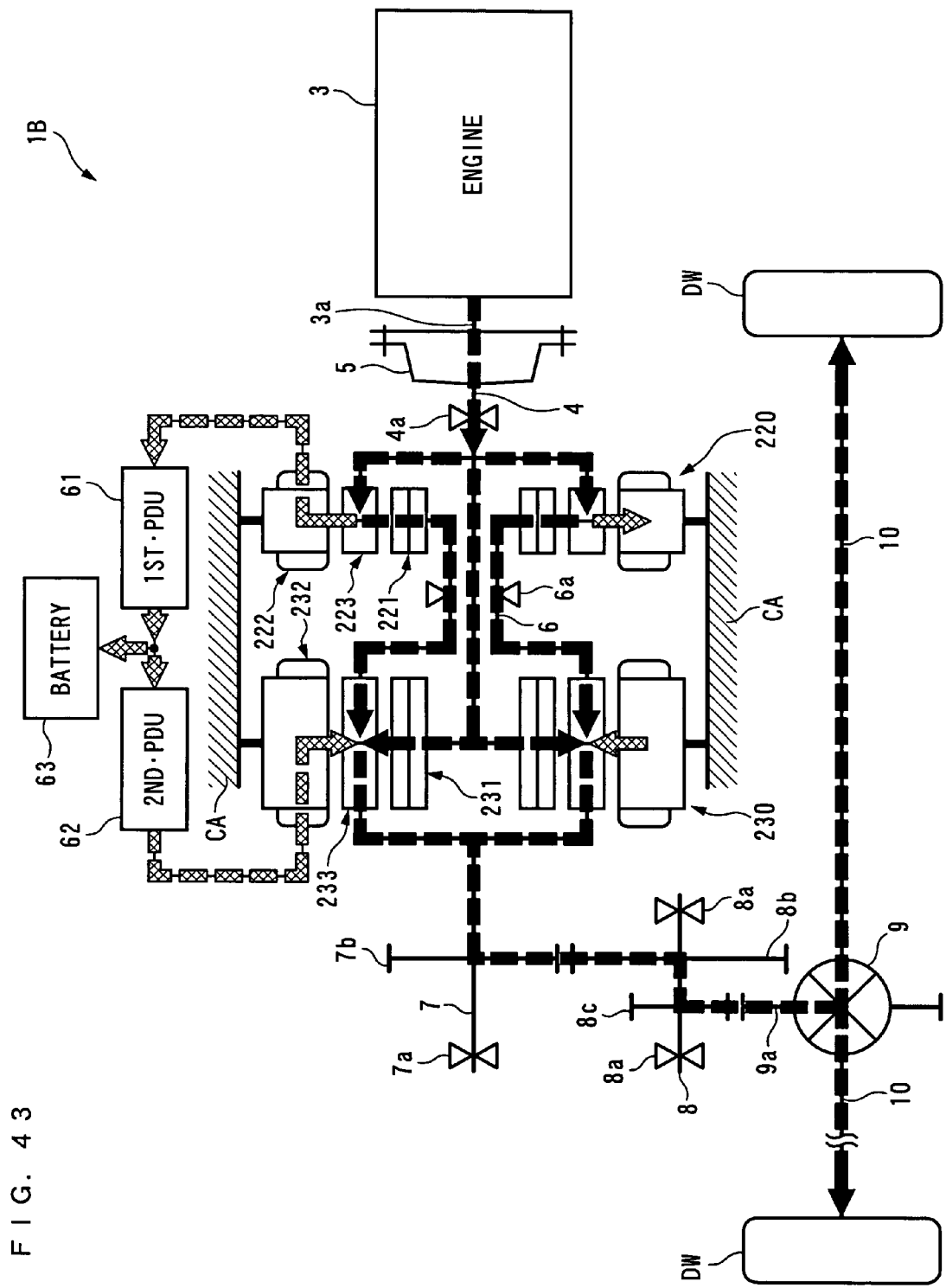
FIG. 43 A diagram showing how torque is transmitted in the power plant according to the third embodiment in the drive-time charging mode.

Referring to FIG. 43, in the drive-time charging mode, differently from the aforementioned battery input/output zero mode, electric power, which has a magnitude obtained by subtracting the electric power charged into the battery 63 from the electric power generated by the third stator 222, is supplied to the fourth stator 232, and the second driving equivalent torque TSE2 based on the electric power having the magnitude is transmitted to the B2 rotor 233. Further, similarly to the battery input/output zero mode, the second driving equivalent torque TSE2, the engine torque TENG distributed to the A1 rotor 221 along with the electric power generation and the engine torque TENG transmitted to the B1 rotor 231 are combined by the B2 rotor 233, and the combined torque is transmitted to the drive wheels DW and DW. As a result, if there is no transmission loss caused by the gears, in the drive-time charging mode, the power transmitted to the drive wheels DW and DW has a magnitude obtained by subtracting the electric power (energy) charged into the battery 63 from the engine power WENG.

Further, in the drive-time charging mode, the electric power generated by the third stator 222, the electric power charged into the battery 63 and the first and second magnetic field rotational speeds VMF1 and VMF2 are controlled such that the speed relationships expressed by the aforementioned equations (1) and (7) are maintained. Furthermore, more specifically, the electric power generated by the third stator 222 and the electric power charged into the battery 63 are controlled as follows:

FIG. 57 schematically shows an example of the relationship between the engine torque TENG, the demanded torque PMCMD, and so forth, obtained in the drive-time charging mode. In the figure, broken lines with arrows indicate states in the battery input/output zero mode before the drive-time charging mode, and it is assumed that the engine torque TENG, the demanded torque PMCMD, the first power-generating equivalent torque TGE1 and the second driving equivalent torque TSE2 are balanced with each other in the states. From the states, as indicated by solid lines with arrows in FIG. 57, when the demanded torque PMCMD is decreased to switch the operation mode to the drive-time charging mode, the engine torque TENG becomes larger than the demanded torque PMCMD.

In this case, as described hereinabove, the torque distribution ratio and the torque combining ratio in the third and fourth generator-motors 220 and 230 are 1:1, and hence to maintain the speed relationships expressed by the aforementioned equations (1) and (7), it is necessary to reduce torque by an amount corresponding to ⅔ of the surplus torque TG (the surplus amount of the value of TENG with respect to the value of PMCMD) in the third generator-motor 220, and by an amount corresponding to ⅓ of the surplus torque TG in the fourth generator-motor 230. In this case, since the first power-generating equivalent torque TGE1 acts on the engine torque TENG as negative torque, the electric power generated by the third stator 222 is controlled such that the first power-generating equivalent torque TGE1 becomes equal to the sum of the first power-generating equivalent torque TGE1 in the battery input/output zero mode and the ⅔ of the surplus torque TG (TGE1+TG×⅔). Further, the electric power charged into the battery 63 is controlled to a value obtained by converting the surplus torque TG and the engine speed NE into electric energy. From the above, the electric power supplied from the third stator 222 to the fourth stator 232 is controlled such that the second driving equivalent torque TSE2 becomes equal to the difference between the second driving equivalent torque TSE2 in the battery input/output zero mode and the ⅓ of the surplus torque TG (TSE2−TG/3).

As described above, similarly to the above-described first embodiment, the operation in the drive-time charging mode is performed when the vehicle demand power is small with respect to the engine power WENG that will make it possible to obtain the optimum fuel economy of the engine 3. Further, in the drive-time charging mode, the engine power WENG is controlled such that the optimum fuel economy of the engine 3 can be obtained, and the surplus amount of the engine power WENG with respect to the vehicle demand power is charged into the battery 63 as electric power.

Figure 44:
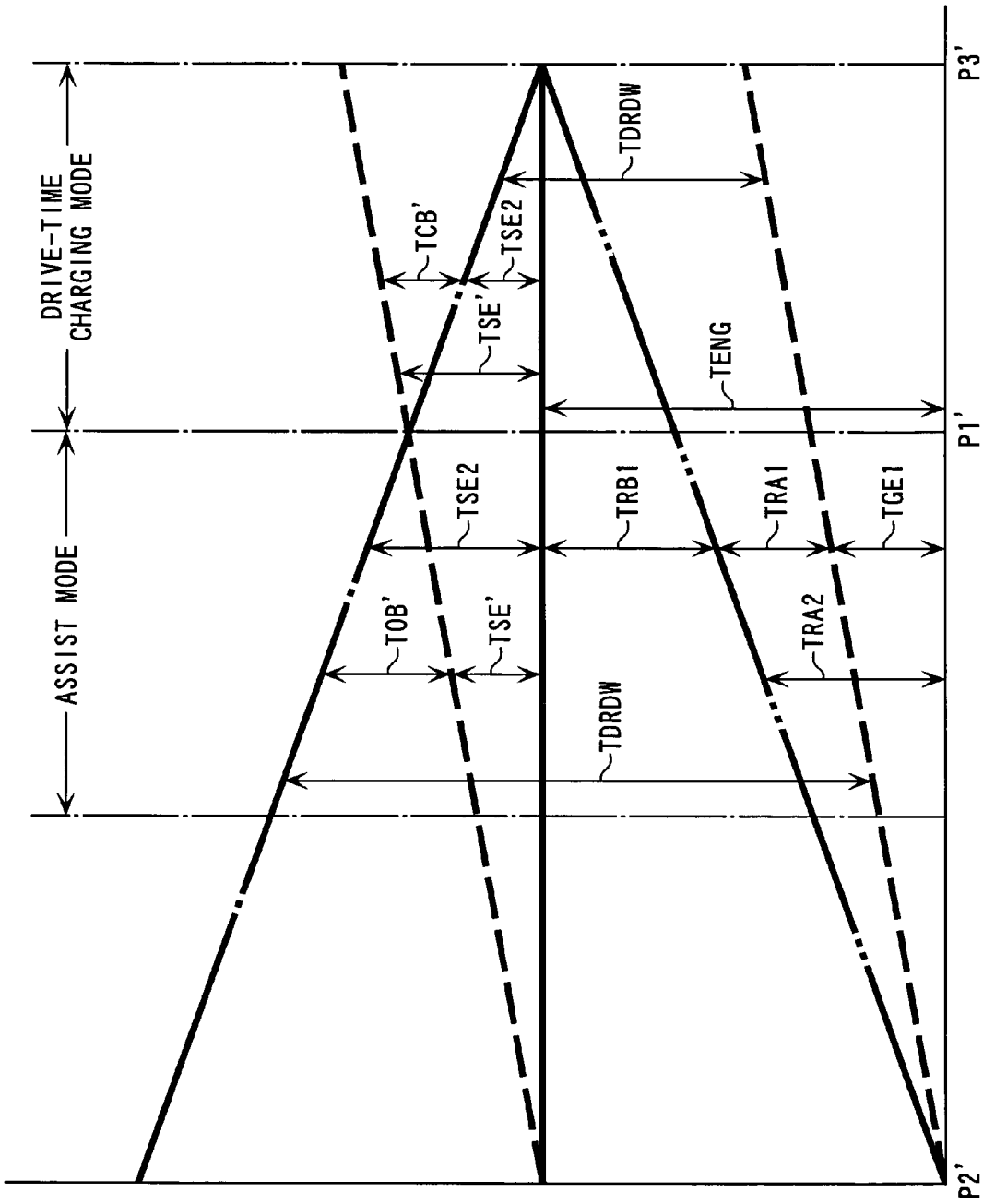
FIG. 44 A diagram showing the foot axis drive torque TDRDW etc. expressed in ratios to the engine torque TENG, assuming that the engine torque TENG is held constant and at the same time the first and second magnetic field rotational speeds VMF1 and VMF2 are equal to each other in the battery input/output zero mode, the assist mode, and the drive-time charging mode.

FIG. 44 shows a diagram showing the foot axis drive torque TDRDW etc. expressed in ratios to the engine torque TENG, assuming that the engine torque TENG is held constant and at the same time the first and second magnetic field rotational speeds VMF1 and VMF2 are equal to each other, in the battery input/output zero mode, the assist mode and the drive-time charging mode described above. Further, in FIG. 44, P1′ indicates torques in the battery input/output zero mode. It should be noted that FIG. 44 does not reflect changes in the torques due to shifting of the gears of the differential gear mechanism 9, and this also applies to the following description.

Further, in FIG. 44, TSE′ represents, in a case where all the electric power generated by the third stator 222 using the engine power WENG is supplied to the fourth stator 232, torque equivalent to the supplied electric power and the second magnetic field rotational speed VMF2 (hereinafter referred to as "the supplied electric power equivalent torque"). In short, the supplied electric power equivalent torque TSE′ is equal to the first power-generating equivalent torque TGE1.

As described above, basically, in any of the operation modes, combined torque formed by combining the second driving equivalent torque TSE2, the B1 rotor transmission torque TRB1, and the A1 rotor transmission torque TRA1 is transmitted to the drive wheels DW and DW via the B2 rotor 233, and therefore the foot axis drive torque TDRDW is equal to the total sum of the torques TSE2, TRB1 and TRA1. Further, since the torque combining ratio between the second driving equivalent torque TSE2 and the B1 rotor transmission torque TRB1 is 1:1, TSE2 and TRB1 are equal to each other. Furthermore, since the A2 rotor 223 and the B1 rotor 231 are connected to the engine 3, the sum of the A2 rotor transmission torque TRA2 and the B1 rotor transmission torque TRB1 is equal to the engine torque TENG, and as the value of TRA2 is larger, the value of TRB1 becomes smaller. Inversely, as the value of TRB1 is larger, the value of TRA2 becomes smaller.

Further, as described hereinabove, in the battery input/output zero mode, when the first and second magnetic field rotational speeds VMF1 and VMF2 are equal to each other, the engine torque TENG is divided into three equal parts, and is transmitted to the drive wheels DW and DW via the fifth to seventh transmission paths. Therefore, as indicated by P1′ in FIG. 44, the A1 rotor transmission torque TRA1, the first power-generating equivalent torque TGE1 and the B1 rotor transmission torque TRB1 are equal to each other. Furthermore, in this case, all the electric power generated by the third stator 222 is supplied to the fourth stator 232, so that the second driving equivalent torque TSE2 is equal to the supplied electric power equivalent torque TSE′ and the first power-generating equivalent torque TGE1.

Further, in FIG. 44, TOB′ represents, in the assist mode, torque equivalent to the electric power supplied from the battery 63 to the fourth stator 232 and the second magnetic field rotational speed VMF2 (hereinafter referred to as "the battery output equivalent torque"). As described hereinabove, in the assist mode, not only the electric power generated by the third stator 222 but also the electric power from the battery 63 are supplied to the fourth stator 232, and hence as shown in FIG. 44, the second driving equivalent torque TSE2 becomes equal to the sum of the supplied electric power equivalent torque TSE′ and the battery output equivalent torque TOB′, and as the battery output equivalent torque TOB′ is larger, the second driving equivalent torque TSE2 becomes larger. Furthermore, as the battery output equivalent torque TOB′ is larger, the foot axis drive torque TDRDW becomes larger.

Further, the torque combining ratio between the second driving equivalent torque TSE2 and the B1 rotor transmission torque TRB1 is 1:1, and hence as the second driving equivalent torque TSE2 is larger, the B1 rotor transmission torque TRB1 becomes larger. Furthermore, as described above, as the B1 rotor transmission torque TRB1 is larger, the A2 rotor transmission torque TRA2 becomes smaller, so that the first power-generating equivalent torque TGE1 distributed from the A2 rotor transmission torque TRA2 is also smaller. From the above, as the second driving equivalent torque TSE2 is larger, and the battery output equivalent torque TOB' is larger, the first power-generating equivalent torque TGE1 becomes smaller, and the ratio of the supplied electric power equivalent torque TSE' to the second driving equivalent torque TSE2 becomes smaller. That is, as the electric power supplied from the battery 63 is larger, the engine power WENG transmitted to the drive wheels DW and DW by the above-described electrical paths becomes smaller, while the engine power WENG transmitted to the drive wheels DW and DW by the aforementioned magnetic paths becomes larger.

When the electric power generation is not performed by the third stator 222 but the electric power supplied from the battery 63 to the fourth stator 232 is controlled such that the battery output equivalent torque TOB' becomes equal to the engine torque TENG, it is possible to transmit the engine power WENG to the drive wheels DW and DW only by the magnetic paths without transmitting the same by the electrical paths. In this case, as indicated by P2' in FIG. 44, all of the A2 rotor transmission torque TRA2, the A1 rotor transmission torque TRA1, the first power-generating equivalent torque TGE1 and the supplied electric power equivalent torque TSE' become equal to 0. Further, the B1 rotor transmission torque TRB1 becomes equal to the engine torque TENG, and the foot axis drive torque TDRDW becomes equal to the sum of the engine torque TENG and the second driving equivalent torque TSE2, i.e. the battery output equivalent torque TOB'.

Further, in FIG. 44, TCB' represents torque equivalent to the electric power charged into the battery 63 in the drive-time charging mode, and the first magnetic field rotational speed VMF1 (hereinafter referred to as "the charging equivalent torque"). As described hereinabove, in the drive-time charging mode, part of the electric power generated by the third stator 222 is charged into the battery 63, and the remainder thereof is supplied to the fourth stator 232, so that as shown in FIG. 44, the charging equivalent torque TCB' is equal to the difference between the supplied electric power equivalent torque TSE' and the second driving equivalent torque TSE2. Furthermore, as the first power-generating equivalent torque TGE1 is larger and the A2 rotor transmission torque TRA2 is larger, both the B1 rotor transmission torque TRB1 and the second driving equivalent torque TSE2 become smaller. Further, as described above, as the first power-generating equivalent torque TGE1 is larger, the second driving equivalent torque TSE2 becomes smaller, and hence the charging equivalent torque TCB' becomes larger. Furthermore, as the charging equivalent torque TCB' is larger, the foot axis drive torque TDRDW becomes smaller.

Further, in FIG. 44, P3' indicates torques obtained in the case where the electric power generated by the third stator 222 is controlled such that the first power-generating equivalent torque TGE1 becomes equal to ½ of the engine torque TENG, and all the generated electric power is charged into the battery 63. In this case, as indicated by P3', the A2 rotor transmission torque TRA2 becomes equal to the engine torque TENG, and both the B1 rotor transmission torque TRB1 and the second driving equivalent torque TSE2 become equal to 0. Furthermore, both the foot axis drive torque TDRDW and the charging equivalent torque TCB' becomes equal to ½ of the engine torque TENG. As described above, in this case, the second driving equivalent torque TSE2 become equal to 0, so that it is possible to transmit the engine power WENG to the drive wheels DW and DW only by the magnetic paths without transmitting the same by the electrical paths.

Next, a description will be given of the control during decelerating traveling of the vehicle. During decelerating traveling, when the ratio of the foot axis input torque transmitted to the engine 3 to foot axis input torque which is the torque of the drive wheels DW and DW is small, electric power generation is performed by both the third and fourth stators 222 and 232 using part of power from the drive wheels DW and DW, and generated electric power is charged into the battery 63. More specifically, this electric power generation is performed by the third stator 222 using power transmitted, as described hereinafter, to the A2 rotor 223, and is performed by the fourth stator 232 using power transmitted, as described hereinafter, to the B2 rotor 233.

Figure 45:
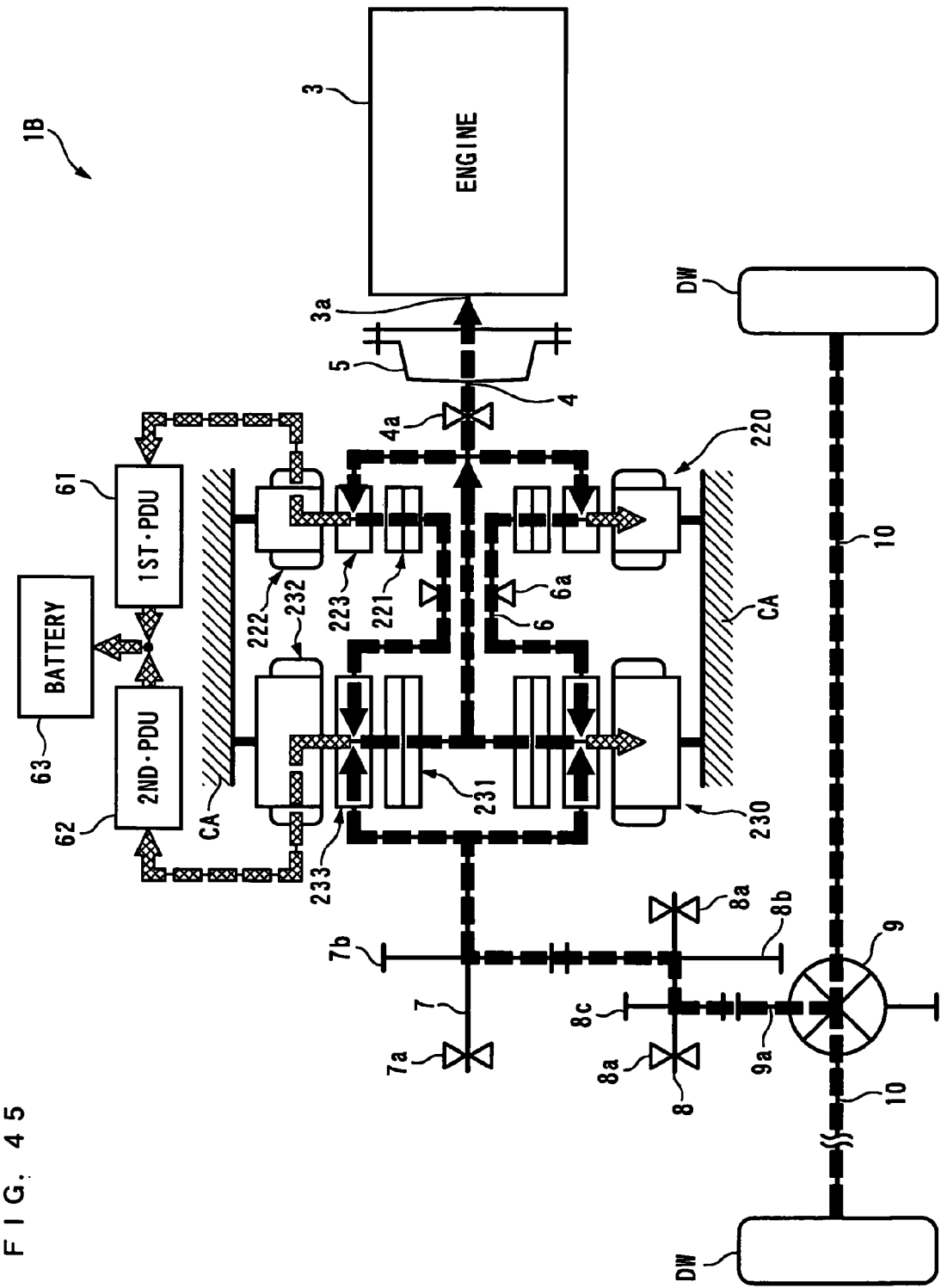
FIG. 45 A diagram showing how torque is transmitted during the decelerating traveling of the vehicle in the power plant according to the third embodiment.

FIG. 45 shows how torque is transmitted during the above-mentioned decelerating traveling of the vehicle. As shown in FIG. 45, combined torque formed by combining all the foot axis input torque and torque distributed, as described hereinafter, to the A1 rotor 221 is transmitted to the B2 rotor 233. As described above using the aforementioned equation (12), in the fourth generator-motor 230, during electric power generation using power input to the B2 rotor 233, the B2 rotor transmission torque TRB2 is distributed to the fourth stator 232 and the B1 rotor 231 at the distribution ratio of 1:1 and transmitted thereto as the second power-generating equivalent torque TGE2 and the B1 rotor transmission torque TRB1. Therefore, along with the electric power generation, the combined torque transmitted to the B2 rotor 233 is distributed to the fourth stator 232 and the B1 rotor 231 at the distribution ratio of 1:1.

Further, part of the torque distributed to the B1 rotor 231 is transmitted to the engine 3. Similarly to the case in the above-mentioned battery input/output zero mode, as the electric power is generated by the third stator 222, the remainder thereof is transmitted to the A2 rotor 223 and then is distributed to the third stator 222 and the A1 rotor 221 at the distribution ratio of 1:1. Further, the torque distributed to the A1 rotor 221 is transmitted to the B2 rotor 233. As a result, if there is no transmission loss caused by the gears, during the decelerating traveling of the vehicle, the sum of the power transmitted to the engine 3 and the electric power (energy) charged into the battery 63 becomes equal to the power from the drive wheels DW and DW.

Further, the ENG start during stoppage of the vehicle, the ENG creep operation and the ENG-based standing start are performed as follows: First, a description will be given of the ENG start during stoppage of the vehicle. At the ENG start during stoppage of the vehicle, electric power is supplied from the battery 63 to the third stator 222, and electric power generation is performed by the fourth stator 232 using power transmitted, as described hereinafter, to the B1 rotor 231, for supplying the generated electric power to the third stator 222.

Figure 46:
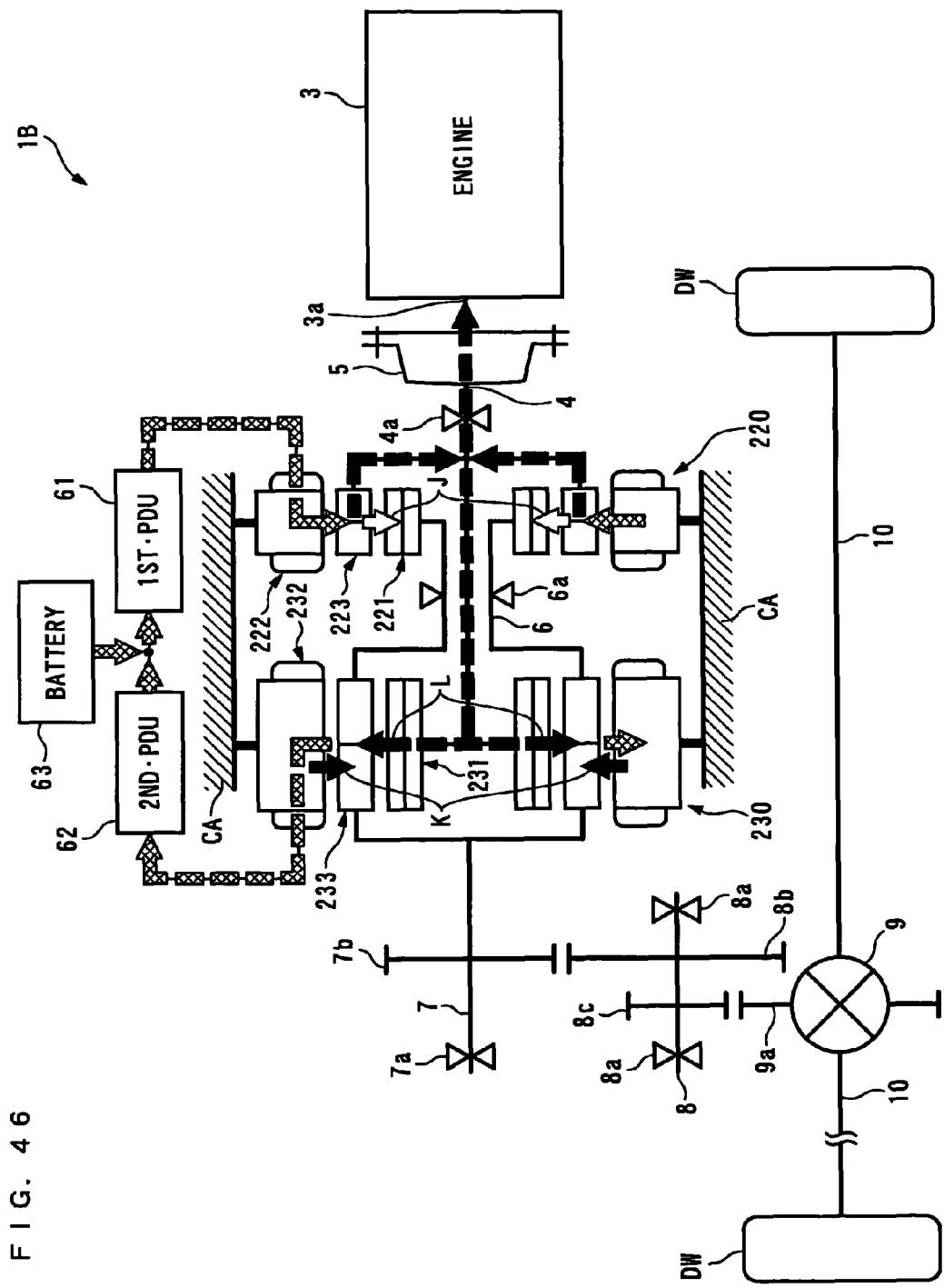
FIG. 46 A diagram showing how torque is transmitted in the power plant according to the third embodiment at the time of the ENG start during stoppage of the vehicle.
Figure 47:
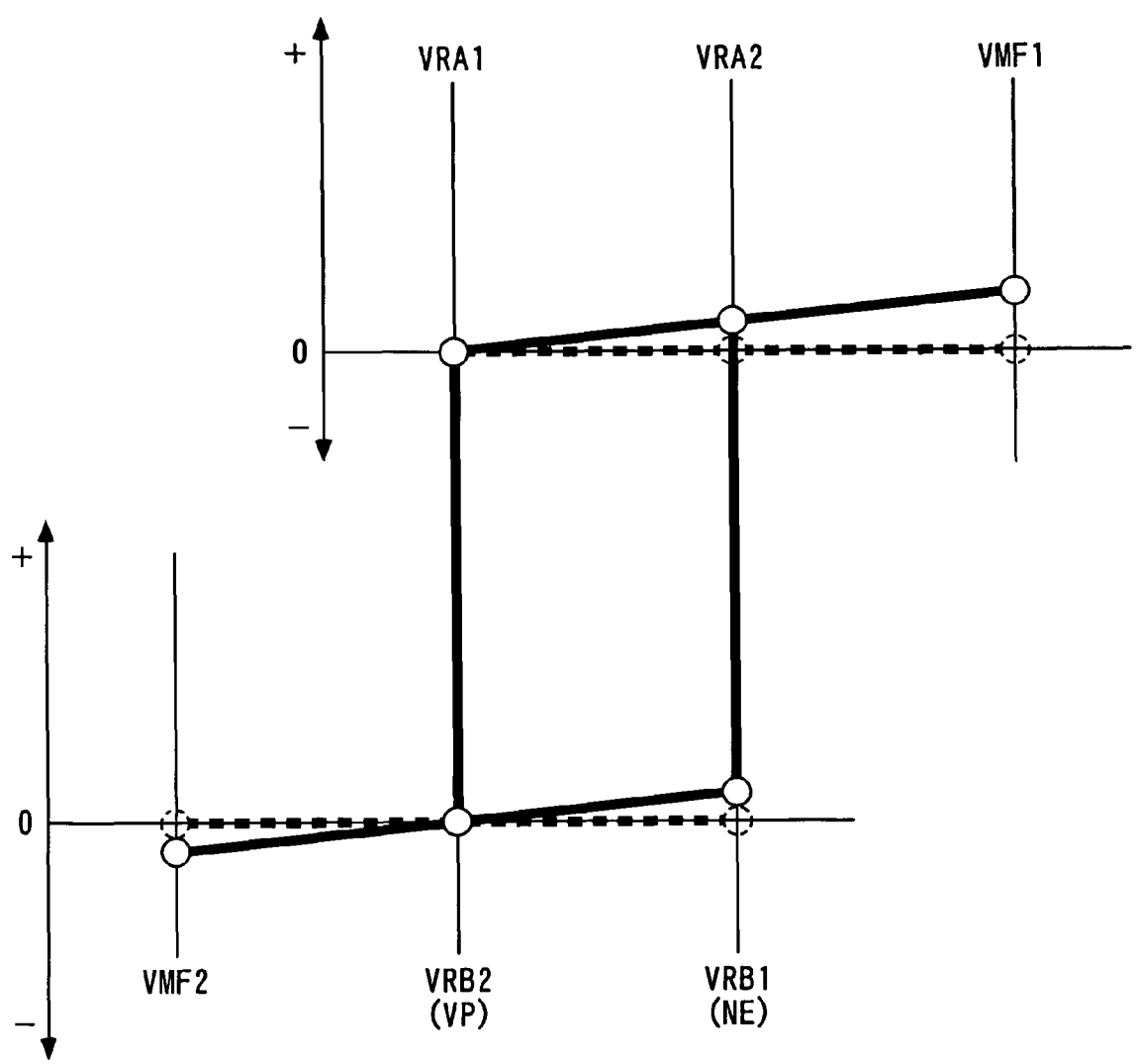
FIG. 47 A speed diagram of the first and second magnetic field rotational speeds VMF1 and VMF2, and the A1, A2, B1 and B2 rotor rotational speeds VRA1, VRA2, VRB1 and VRB2 at the time of the ENG start during stoppage of the vehicle, shown by way of example.

FIG. 46 shows how torque is transmitted at the above-described ENG start during stoppage of the vehicle, and FIG. 47 shows a speed diagram at the time of the ENG start during stoppage of the vehicle. As shown in FIG. 46, along with the supply of the electric power to the third stator 222, torque that acts on the A2 rotor 223 to cause the A2 rotor 223 to perform normal rotation is transmitted from the third stator 222 to the A2 rotor 223, and as indicated by arrows J, torque that acts on the A1 rotor 221 to cause the A1 rotor 221 to perform reverse rotation is transmitted from the third stator 222 to the A1 rotor 221. Further, part of the torque transmitted to the A2 rotor 223 is transmitted to the crankshaft 3a, whereby the crankshaft 3a performs normal rotation.

Furthermore, at the ENG start during stoppage of the vehicle, the remainder of the torque transmitted to the A2 rotor 223 is transmitted to the B1 rotor 231, and then is transmitted to the fourth stator 232 as the second power-generating equivalent torque TGE2 as the electric power is generated by the fourth stator 232. Further, as indicated by thick solid lines in FIG. 47, the first and second rotating magnetic fields generated along with the electric power generation by the fourth stator 232 perform reverse rotation. Therefore, as indicated by arrows K in FIG. 46, along with the electric power generation by the fourth stator 232, torque dependent on the amount of generated electric power is transmitted from the fourth stator 232 to the B2 rotor 233. This torque acts on the B2 rotor 233 to cause the B2 rotor 233 to perform normal rotation. Further, the torque transmitted to the B1 rotor 231 is further transmitted to the B2 rotor 233 (as indicated by arrows L) such that it is balanced with the torque transmitted from the fourth stator 232 to the B2 rotor 233, and these torques are combined at the torque combining ratio of 1:1.

In this case, the electric power supplied to the third stator 222 and the electric power generated by the fourth stator 232 are controlled such that the above-described torque indicated by the arrows J, for causing the A1 rotor 221 to perform reverse rotation, and the torques indicated by the arrows K and L, for causing the B2 rotor 233 to perform normal rotation are balanced with each other, whereby the A1 rotor 221, the B2 rotor 233 and the drive wheels DW and DW, which are connected to each other, are held at rest. As a consequence, as shown in FIG. 47, the A1 and B2 rotor rotational speeds VRA1 and VRB2 become equal to 0, and the vehicle speed VP as well become equal to 0.

Further, in this case, the electric power supplied to the third stator 222, the electric power generated by the fourth stator 232 and the first and second magnetic field rotational speeds VMF1 and VMF2 are controlled such that the speed relationships expressed by the aforementioned equations (1) and (7) are maintained and at the same time, the A2 and B1 rotor rotational speeds VRA2 and VRB1 take relatively small values (see FIG. 47). From the above, at the ENG start during stoppage of the vehicle, while holding the vehicle speed VP at 0, the engine speed NE is controlled to a relatively small value suitable for the start of the engine 3. Further, in this state, the ignition operation of the fuel injection valves and the spark plugs of the engine 3 is controlled, whereby the engine 3 is started.

The control during the ENG creep operation is performed subsequent to the above-described ENG start during stoppage of the vehicle, as follows. Electric power generation is performed by the third stator 222 by using the engine power WENG transmitted to the A2 rotor 223, and electric power generation is performed by the fourth stator 232 by using the engine power WENG transmitted to the B1 rotor 231. Further, the electric power thus generated by the third and fourth stators 222 and 232 is charged into the battery 63.

Figure 48:
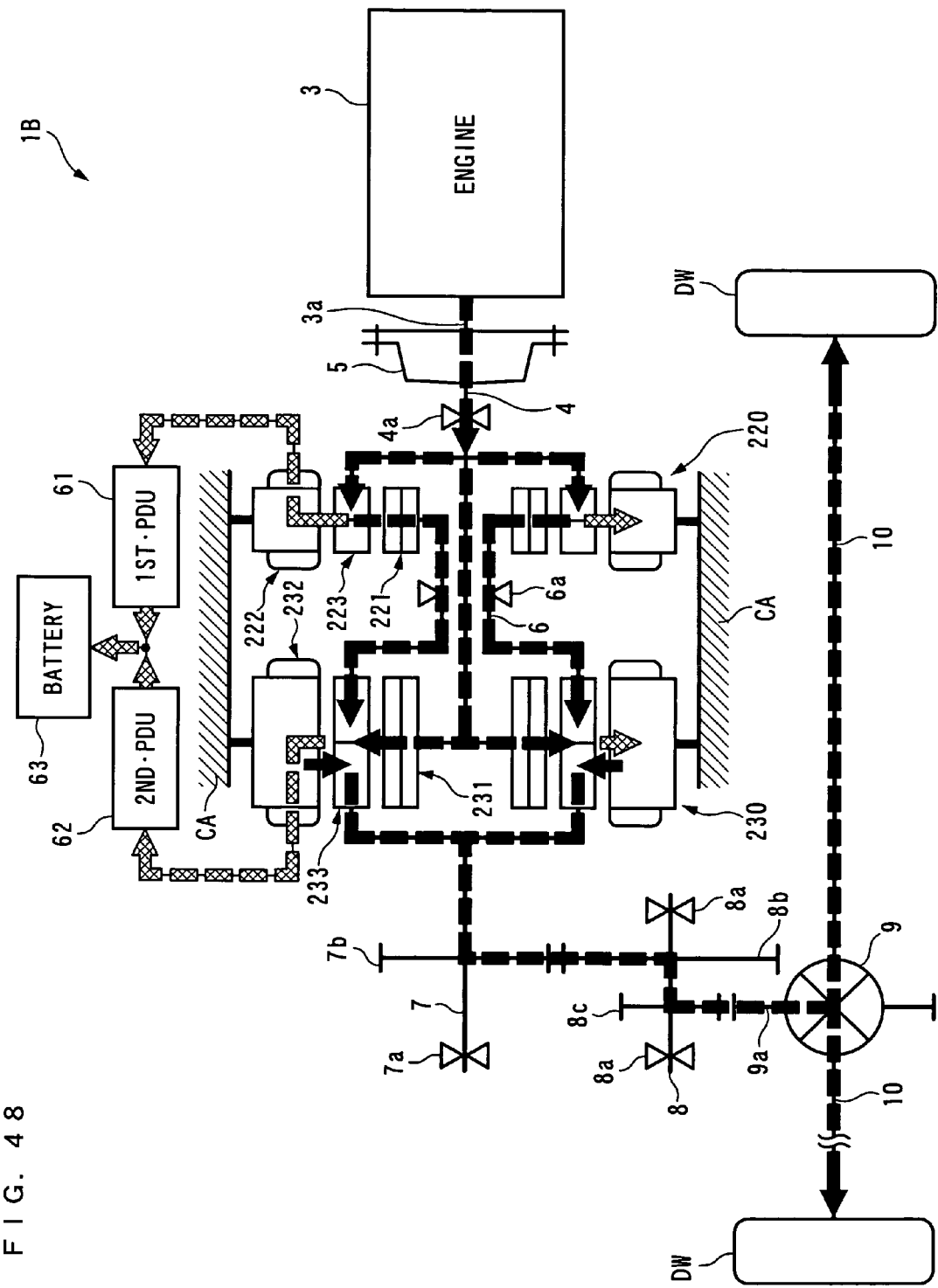
FIG. 48 A diagram showing how torque is transmitted in the power plant according to the third embodiment during the ENG creep operation.
Figure 51:
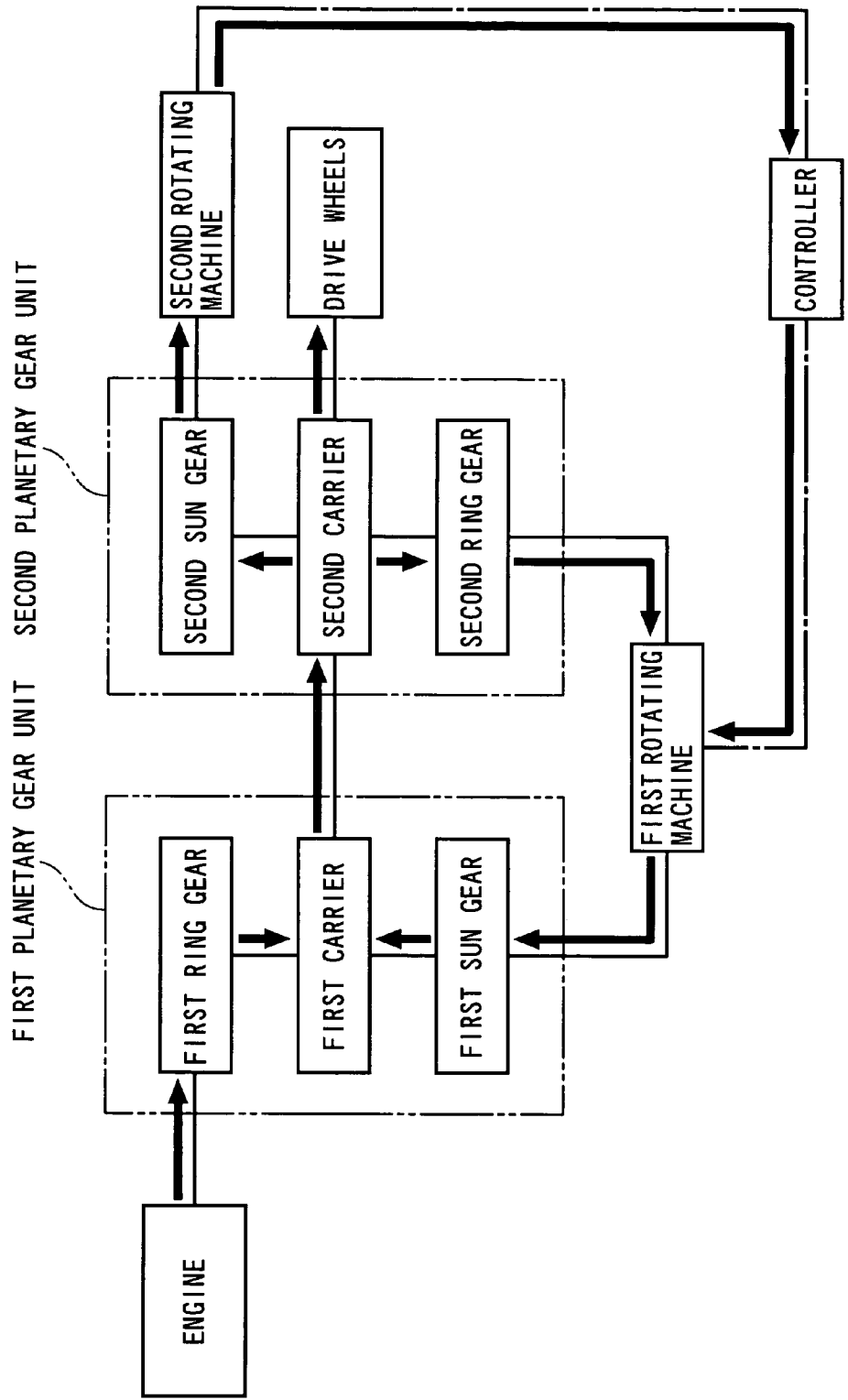
FIG. 51 A diagram which is useful in explaining an example of the operation of the conventional power plant.
Figure 52:
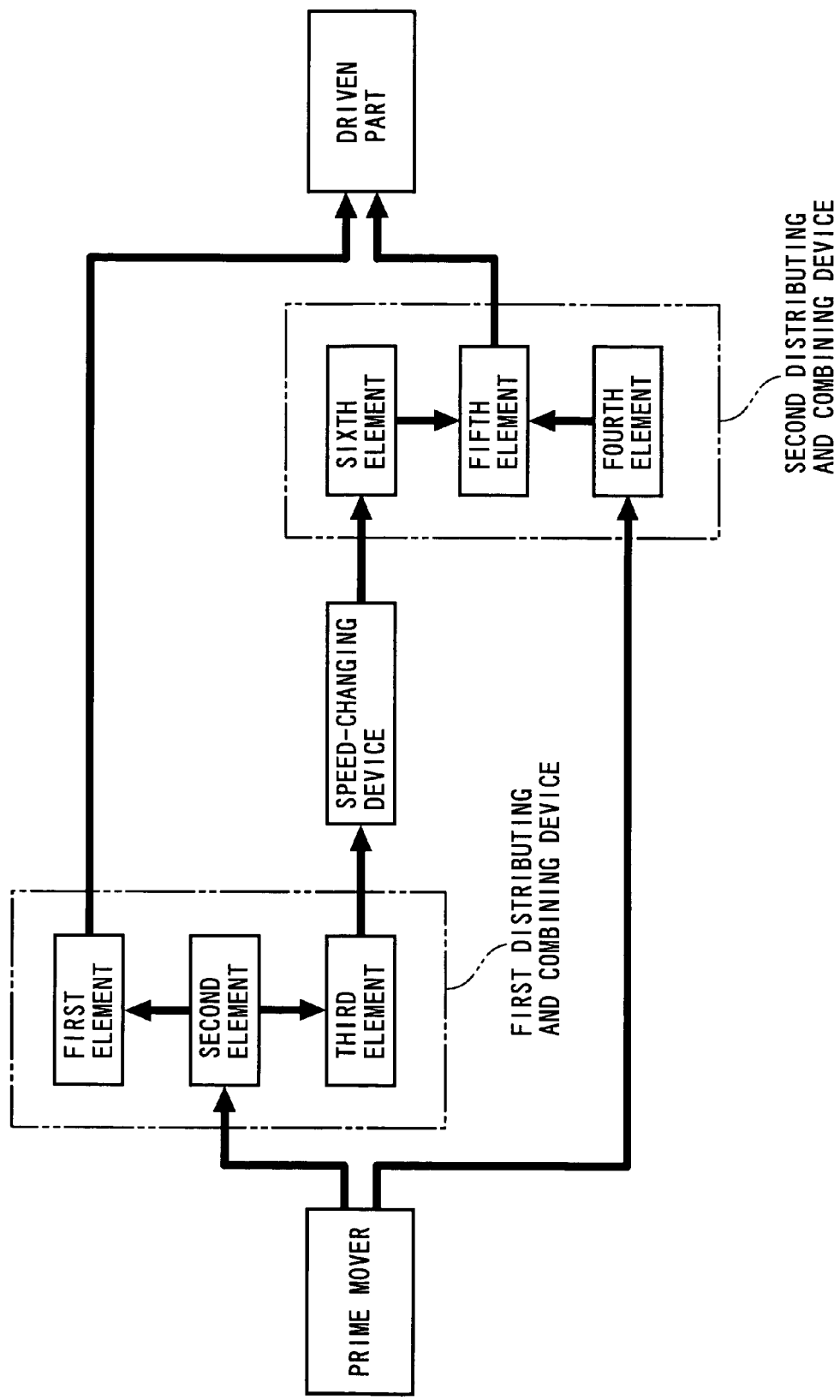
FIG. 52 A diagram which is useful in explaining an example of the operation of a power plant according of the invention as claimed in claim 1.
Figure 53:
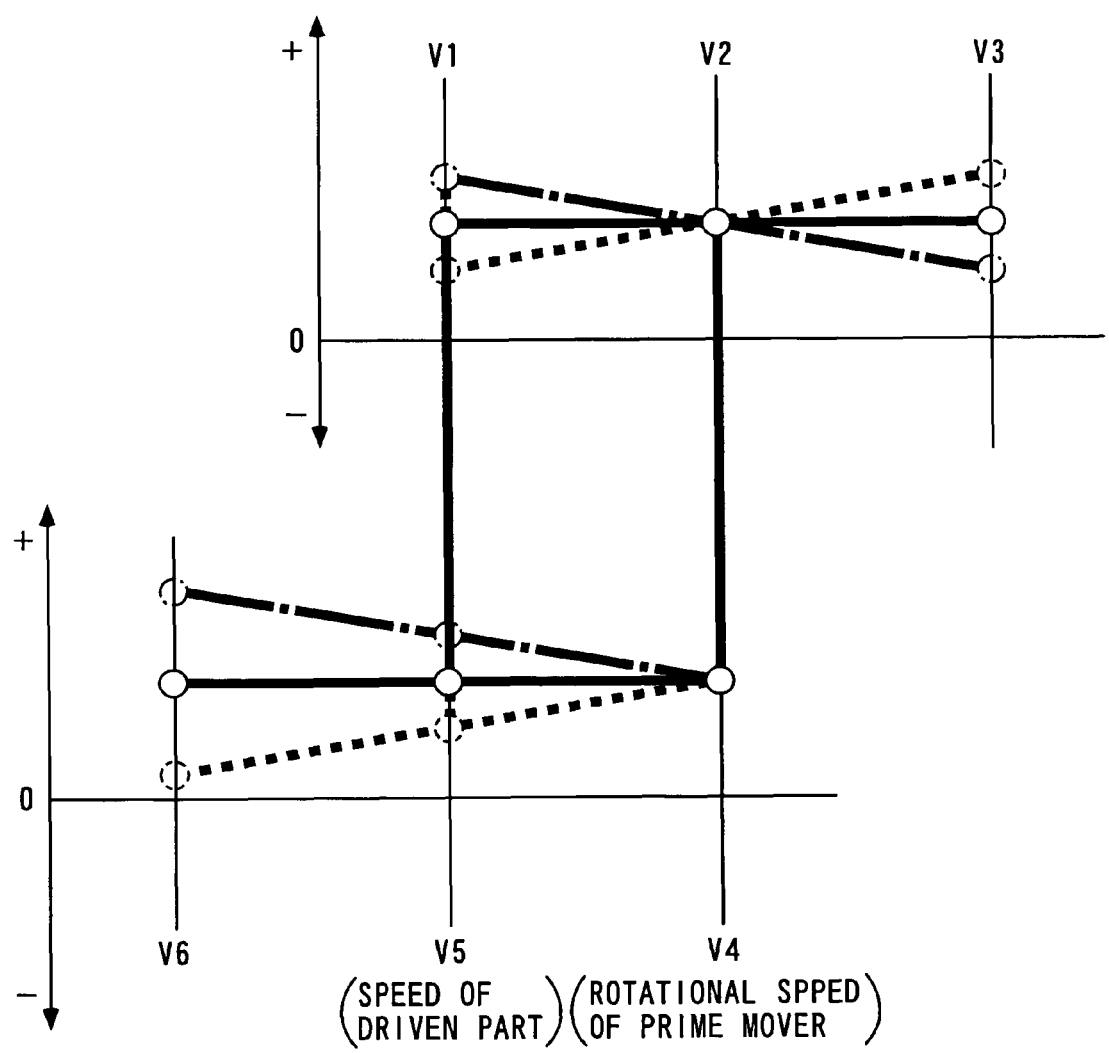
FIG. 53 A diagram which is useful in explaining a speed-changing operation of the power plant of the invention as claimed in claim 1.

FIG. 48 shows how torque is transmitted during the above-described ENG creep operation and FIG. 49 shows a speed diagram during the ENG creep operation. As shown in FIG. 48, during the ENG creep operation, similarly to the case in the above-mentioned battery input/output zero mode, along with the electric power generation by the third stator 222, part of the engine torque TENG is transmitted to the A2 rotor 223, and the engine torque TENG transmitted to the A2 rotor 223 is distributed to the third stator 222 and the A1 rotor 221 at the torque distribution ratio of 1:1.

Further, as shown in FIG. 49, the first and second rotating magnetic fields generated along with the electric power generation by the fourth stator 232 perform reverse rotation. Therefore, as shown in FIG. 48, along with the electric power generation, similarly to the case of the above-described start of the engine 3, torque, which is dependent on the amount of generated electric power and causes the B2 rotor 233 to perform normal rotation, is transmitted from the fourth stator 232 to the B2 rotor 233. Further, the engine torque TENG transmitted to the B1 rotor 231 is further transmitted to the B2 rotor 233 such that it is balanced with the torque causing the B2 rotor 233 to perform normal rotation, and these torques are combined at the torque combining ratio of 1:1. Furthermore, the engine torque TENG distributed to the A1 rotor 221, as described above, is transmitted to the B2 rotor 233.

As described above, during the ENG creep operation, combined torque formed by combining the engine torque TENG distributed to the A1 rotor 221, the torque dependent on the amount of the electric power generated by the fourth stator 232, and the engine torque TENG transmitted to the B1 rotor 231 is transmitted to the B2 rotor 233. Further, this combined torque is transmitted to the drive wheels DW and DW, for causing the drive wheels DW and DW to perform normal rotation. Furthermore, the electric power generated by the third and fourth stators 222 and 232, and the first and second magnetic field rotational speeds VMF1 and VMF2 are controlled such that the A1 and B2 rotor rotational speeds VRA1 and VRB2, that is, the vehicle speed VP becomes very small (see FIG. 49), whereby the creep operation is carried out.

Further, during the ENG creep operation, as described above, the engine torque TENG distributed to the A1 rotor 221 along with the electric power generation by the third stator 222, and the engine torque TENG transmitted to the B2 rotor 233 via the B1 rotor 231 along with the electric power generation by the fourth stator 232 are transmitted to the drive wheels DW and DW. That is, since part of the engine torque TENG is transmitted to the drive wheels DW and DW, it is possible to prevent the large reaction from the drive wheels DW and DW from acting on the engine 3, thereby making it possible to perform the ENG creep operation without causing engine stall. It should be noted that the ENG creep operation using the above-described engine power WENG is mainly carried out when the remaining charge SOC is small or when the vehicle is ascending a slope.

The control at the time of the ENG-based standing start is performed subsequent to the above-described ENG creep operation, as follows. While controlling the second magnetic field rotational speed VMF2 of the first and second rotating magnetic fields of the fourth stator 232, which have been performing reverse rotation during the ENG creep operation, such that it becomes equal to 0, the first magnetic field rotational speed VMF1 of the first and second rotating magnetic fields of the third stator 222 which have been performing normal rotation during the ENG creep operation, is increased, and the engine power WENG is increased. Then, after the second magnetic field rotational speed VMF2 becomes equal to 0, the operation in the above-mentioned battery input/output zero mode is performed. From the above, as indicated by thick solid lines in FIG. 50, at the time of the ENG-based standing start, the A1 and B2 rotor rotational speeds VRA1 and VRB2, i.e. the vehicle speed VP is increased from a state of the ENG creep operation, indicated by broken lines in the figure, causing the vehicle to start.

As described hereinabove, according to the above-mentioned third embodiment, in the battery input/output zero mode, similarly to the first and second embodiments, the engine power WENG is transmitted to the drive wheels DW and DW without being recirculated, and hence it is possible to reduce the power passing through the third and fourth generator-motors 220 and 230. This makes it possible to downsize the third and fourth generator-motors 220 and 230, thereby making it possible to attain the reduction of the size and manufacturing costs of the power plant 1B. Further, generator-motors having torque capacities corresponding to the reduced power, as described above, are used as the third and fourth generator-motors 220 and 230, whereby it is possible to suppress the loss of power to improve the driving efficiency of the power plant 1B.

Further, the engine power WENG is transmitted to the drive wheels DW and DW in a divided state via the fifth to seventh transmission paths. This makes it possible to reduce power (energy) passing through the 1st·PDU 61 and 2nd·PDU 62 via the seventh transmission path, so that it is possible to reduce the sizes of the 1st·PDU 61 and 2nd·PDU 62, thereby making it possible to attain further reduction of the size and manufacturing costs of the power plant 1B. Furthermore, since it is possible to reduce the power transmitted to the drive wheels DW and DW via the seventh transmission path, i.e. by the electrical paths, the driving efficiency of the power plant 1B can be further enhanced.

Further, as described hereinabove with reference to FIG. 41, in the battery input/output zero mode, by controlling the first and second magnetic field rotational speeds VMF1 and VMF2, the engine power WENG is transmitted to the drive wheels DW and DW while having the speed thereof steplessly changed. Furthermore, in this case, the first and second magnetic field rotational speeds VMF1 and VMF2 are controlled such that the engine speed NE becomes equal to the target engine speed NECMD set to a value that will make it possible to obtain the optimum fuel economy of the engine 3, and therefore it is possible to drive the drive wheels DW and DW while controlling the engine power WENG such that the optimum fuel economy of the engine 3 can be obtained. This makes it possible to further enhance the driving efficiency of the power plant 1B.

Further, similarly to the first embodiment, the operation in the drive-time charging mode is performed when the vehicle demand power is smaller than the optimum fuel economy power. In the drive-time charging mode, the engine power WENG is controlled such that the optimum fuel economy of the engine 3 can be obtained, and the surplus amount of the engine power WENG with respect to the vehicle demand power is charged into the battery 63 as electric power. Furthermore, the operation in the assist mode is performed when the vehicle demand power is larger than the optimum fuel economy power, and in the assist mode, the engine power WENG is controlled such that the optimum fuel economy of the engine 3 can be obtained. Further, the insufficient amount of the engine power WENG with respect to the vehicle demand power is made up for by the supply of the electric power from the battery 63. Therefore, it is possible to further enhance the driving efficiency of the power plant 1B.

Further, as described heretofore, the third and fourth generator-motors 220 and 230 each have a function obtained by combining a general generator-motor and a general planetary gear unit, so that differently from the first embodiment, the first and second planetary gear units 20 and 30 can be dispensed with. Therefore, compared with the first embodiment, it is possible to reduce the number of component parts to thereby reduce the size of the power plant 1B. Furthermore, the input and output of energy between the third stator 222, the A1 rotor 221 and the A2 rotor 223 and between the fourth stator 232, the B1 rotor 231 and the B2 rotor 233 is performed via the magnetic circuits in a non-contacting manner, i.e. by the so-called magnetic paths. Therefore, differently from the case of using the planetary gear units, there occur no power transmission losses. This makes it possible to further enhance the driving efficiency of the power plant 1B.

It should be noted that although in the third embodiment, the battery 63 is used as the energy storing and releasing device for storing and releasing electric energy, it is to be understood that e.g. a capacitor may be used, similarly to the above-described first embodiment. Further, although in the third embodiment, the A2 rotor 223 and the B1 rotor 231 are directly connected to each other, and the A1 rotor 221 and the B2 rotor 233 are directly connected to each other, the A2 rotor 223 and the B1 rotor 231 are not necessarily required to be directly connected to each other insofar as they are connected to the crankshaft 3*a*, and the A1 rotor 221 and the B2 rotor 233 are not necessarily required to be directly connected to each other insofar as they are connected to the drive wheels DW and DW.

Further, one of the third and fourth generator-motors 220 and 230 may be formed by a combination of a planetary gear unit and a DC brushless motor, such as the first planetary gear unit 20 and the first generator-motor 40 in the first embodiment.

Next, a power plant 1C according to a fourth embodiment of the present invention will be described with reference to FIG. 58. This power plant 1C is distinguished from the third embodiment only in that it includes the second planetary gear unit 30 and the second generator-motor 50 in the first embodiment in place of the fourth generator-motor 230. It should be noted that in FIG. 58, the component elements identical to those of the first to third embodiments are denoted by the same reference numerals. This also applies to the other embodiments, described hereinafter. The following description is mainly given of different points from the third embodiment.

Figure 58:
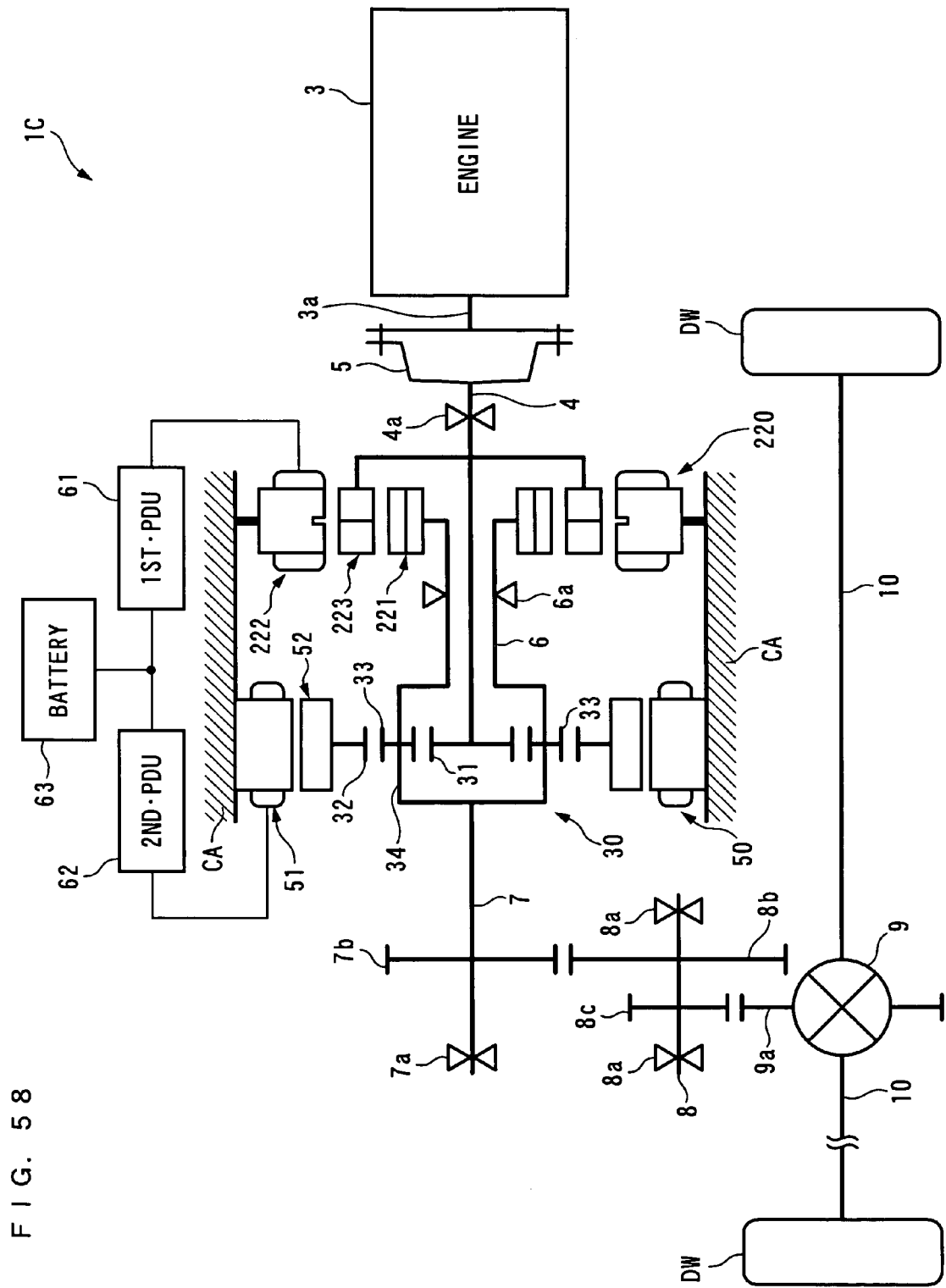
FIG. 58 A schematic diagram of an engine, third and second generator-motors, etc. of a power plant according to a fourth embodiment.

Referring to FIG. 58, in the power plant 1C, the A2 rotor 223 of the third generator-motor 220 and the second sun gear 31 of the second planetary gear unit 30 are directly connected to each other via the first main shaft 4, and are mechanically connected to the crankshaft 3*a* via the first main shaft 4 and the flywheel 5. Further, the second carrier 34 of the second planetary gear unit 30 is mechanically directly connected to the A1 rotor 221 of the third generator-motor 220 via the connection shaft 6, and is mechanically connected to the drive wheels DW and DW via the second main shaft 7, the gear 7*b*, the first gear 8*b*, the idler shaft 8, the second gear 8*c*, the gear 9*a*, the differential gear mechanism 9, and so forth. In short, the A1 rotor 221 and the second carrier 34 are mechanically connected to the drive wheels DW and DW.

Furthermore, as described hereinabove, the second rotor 52 of the second generator-motor 50 is attached to the outer peripheral surface of the second ring gear 32 of the second planetary gear unit 30, and is rotatable in unison with the second ring gear 32. Further, the third stator 222 of the third generator-motor 220 and the second stator 51 of the second generator-motor 50 are electrically connected to each other via the 1st·PDU 61 and 2nd·PDU 62.

In the power plant 1C configured as above, operations, such as the EV creep operation and the operation in the battery input/output zero mode, described above in the third embodiment, are carried out similarly to the third embodiment. In this case, these operations are performed by replacing the parameters (e.g. the second magnetic field rotational speed VMF2) concerning the fourth generator-motor 230 by corresponding parameters concerning the second generator-motor 50.

Figure 59:
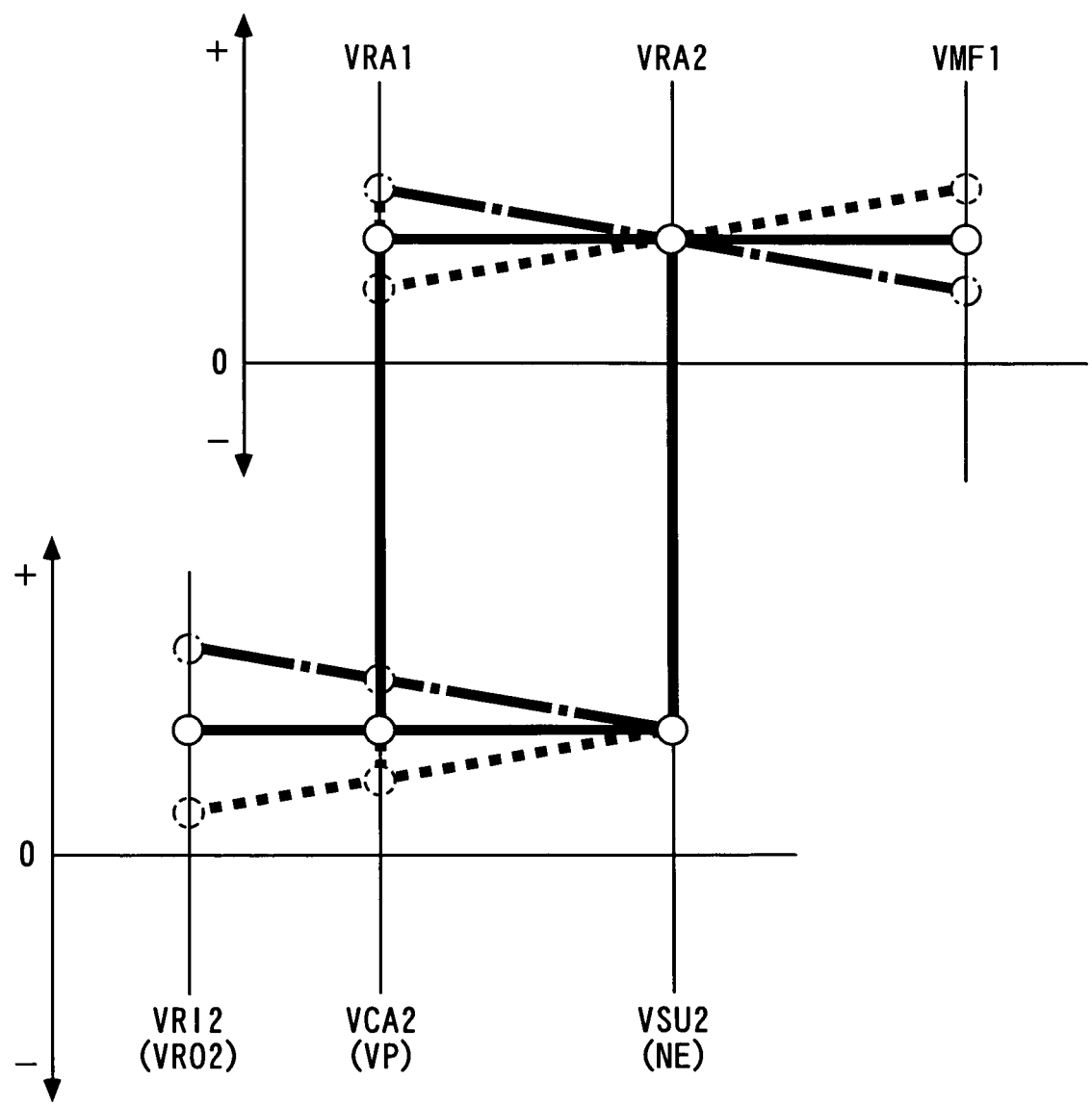
FIG. 59 A speed diagram of the first magnetic field rotational speed VMF1, the A1 and A2 rotor rotational speeds VRA1 and VRA2, the second sun gear rotational speed VSU2, the second carrier rotational speed VCA2, and the second ring gear rotational speed VRI2 in the battery input/output zero mode of the power plant according to the fourth embodiment, shown by way of example.

The following description will be given only of a speed-changing operation by the third and second generator-motors 220 and 50 in the battery input/output zero mode, as a representative of the above described operations. FIG. 59 shows an example of the relationship between the first magnetic field rotational speed VMF1, the second rotor rotational speed VRO2, and so forth in the power plant 1C. As indicated by broken lines in the figure, the first magnetic field rotational speed VMF1 is increased and the second rotor rotational speed VRO2 is decreased, with respect to the A2 rotor rotational speed VRA2 and the second sun gear rotational speed VSU2, that is, the engine speed NE. This makes it possible to steplessly reduce the A1 rotor rotational speed VRA1 and the second carrier rotational speed VCA2, that is, the vehicle speed VP. Inversely, as indicated by one-dot chain lines in FIG. 59, the first magnetic field rotational speed VMF1 is decreased and the second rotor rotational speed VRO2 is increased, with respect to the engine speed NE, whereby it is possible to steplessly increase the vehicle speed VP.

As described above, the power plant 1C is distinguished from the first embodiment in that the third generator-motor 220 replaces the first planetary gear unit 20 and the first generator-motor 40, and is distinguished from the third embodiment in that the second planetary gear unit 30 and the second generator-motor 50 replace the fourth generator-motor 230. Further, as described heretofore, the third and fourth generator-motors 220 and 230 each have a function obtained by combining a general generator-motor and a general planetary gear unit. Therefore, according to the present embodiment, it is possible to obtain the same advantageous effects as provided by the first and third embodiments.

Next, power plants 1D, 1E, 1F, 1G and 1H according to fifth to ninth embodiments of the present invention will be described with reference to FIGS. 60 to 64. These power plant 1D to 1H are distinguished from the fourth embodiment in that they further include transmissions 240, 250, 260, 270 and 280, respectively. The following description is mainly given of different points of the power plants 1D to 1H from the fourth embodiment, in order from the power plant 1D of the fifth embodiment.

Figure 60:
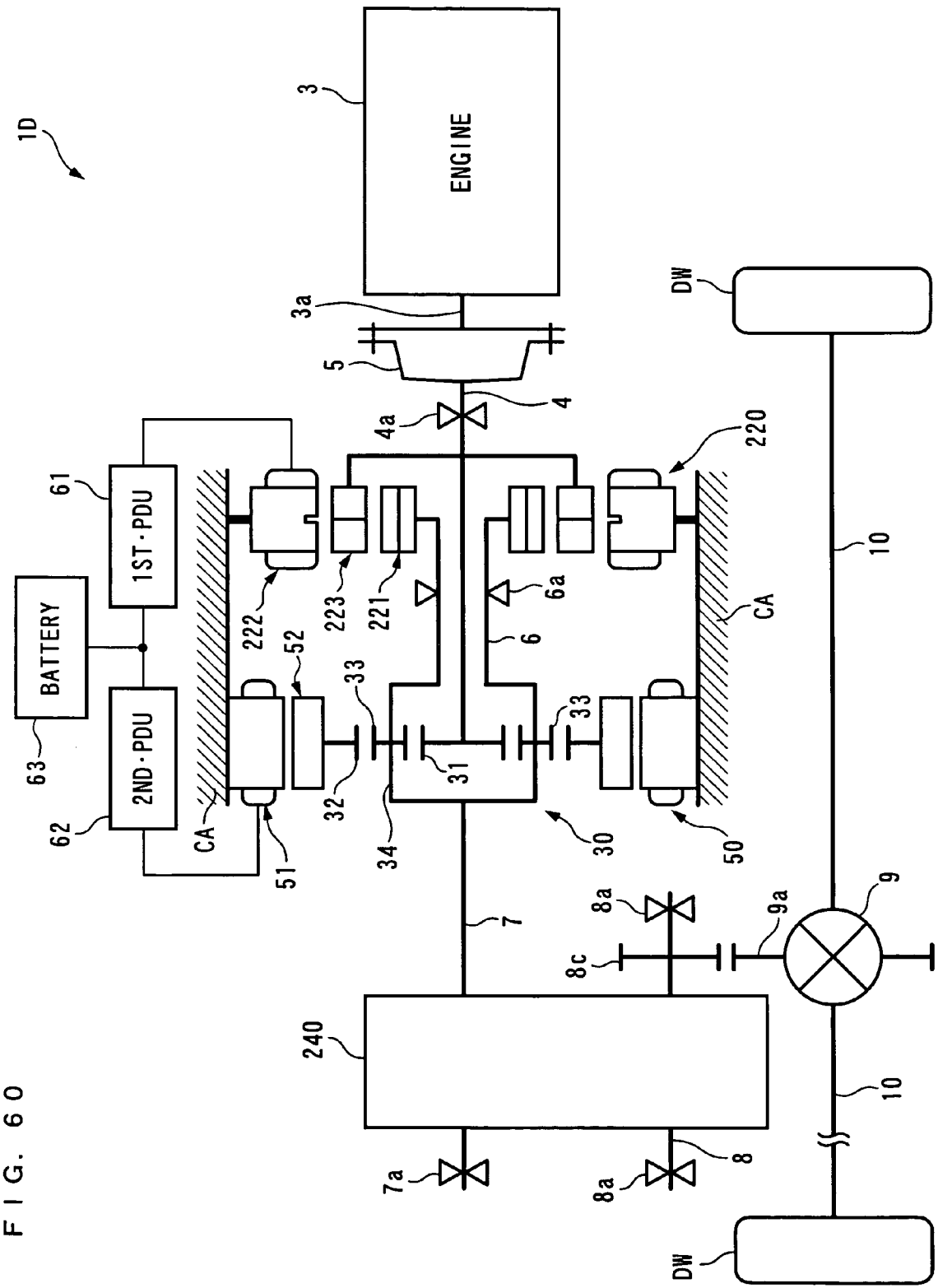
FIG. 60 A schematic view of an engine, third and second generator-motors etc. of a power plant according to a fifth embodiment.

Referring to FIG. 60, in the power plant 1D, the transmission 240 is provided in place of the gear 7b and the first gear 8b in mesh with each other. This transmission 240 is a belt-type stepless transmission, and includes an input shaft connected to the aforementioned second main shaft 7, an output shaft connected to the idler shaft 8, pulleys provided on the input shaft and the output shaft, respectively, and metal belts wound around the pulleys, none of which are shown. The transmission 240 changes effective diameters of the pulleys, thereby outputting power input to the input shaft to the output shaft while changing the speed thereof. Further, the transmission gear ratio of the transmission 240 (the rotational speed of the input shaft/the rotational speed of the output shaft) is controlled by the ECU 2.

As described above, the transmission 240 is provided between the A1 rotor 221 and the second carrier 34 and the drive wheels DW and DW, and the power transmitted to the A1 rotor 221 and the second carrier 34 is transmitted to the drive wheels DW and DW while having the speed thereof changed by the transmission 240.

In the power plant 1D configured as above, when a very large torque is transmitted from the A1 rotor 221 and the second carrier 34 to the drive wheels DW and DW, e.g. during the above-described EV standing start (see FIGS. 3 to 5, and FIGS. 35 to 37) and ENG-based standing start (see FIGS. 16 to 18, and FIGS. 48 to 50), the transmission gear ratio of the transmission 240 is controlled to a predetermined speed-reducing value which is larger than 1.0. Thus, the torque transmitted to the A1 rotor 221 and the second carrier 34 is increased by the transmission 240, and then is transmitted to the drive wheels DW and DW. In accordance therewith, electric power generated by the third generator-motor 220 and electric power supplied to the second generator-motor 51 (generated electric power) are controlled such that the torque transmitted to the A1 rotor 221 and the second carrier 34 becomes smaller. Therefore, according to the present embodiment, it is possible to make smaller the maximum value of torque demanded of the third and second generator-motors 220 and 50, thereby making it possible to further reduce the sizes and costs of the third and second generator-motors 220 and 50. In addition, the maximum value of the torque transmitted to the second carrier 34 via the second sun gear 31 and the second ring gear 32 can be made smaller, and hence it is possible to further reduce the size and costs of the second planetary gear unit 30.

Furthermore, during the aforementioned EV traveling and traveling of the vehicle including traveling in the battery input/output zero mode (see FIGS. 8, 9, 40 and 41), in such a case as the A1 rotor rotational speed VRA1 becomes too high, e.g. when the vehicle speed VP becomes very high, the transmission gear ratio of the transmission 240 is controlled to a predetermined speed-increasing value smaller than 1.0. Thus, according to the present embodiment, the A1 rotor rotational speed VRA1 can be decreased with respect to the vehicle speed VP, and hence it is possible to prevent failure of the third generator-motor 220 due to an excessive increase in the A1 rotor rotational speed VRA1. The above-mentioned inconveniences are liable to occur, since the A1 rotor 221 is formed by magnets and the magnets are lower in strength than soft magnetic material elements, as described hereinabove. Therefore, the above-mentioned control is particularly effective.

Further, in such a case as the second rotor rotational speed VRO2, which is determined by the relationship between the vehicle speed VP and the engine speed NE, becomes too high, e.g. during high-vehicle speed operation of the vehicle in which the vehicle speed VP is higher than the engine speed NE, the transmission gear ratio of the transmission 240 is controlled to a predetermined speed-increasing value smaller than 1.0. As a consequence, according to the present embodiment, the second carrier rotational speed VCA2 is lowered with respect to the vehicle speed VP, whereby as is clear from FIG. 59, referred to hereinabove, it is possible to make the second rotor rotational speed VRO2 lower, thereby making it possible to prevent failure of the second generator-motor 50 due to an excessive increase in the second rotor rotational speed VRO2.

Furthermore, during traveling of the vehicle, the transmission gear ratio of the transmission 240 is controlled such that the first magnetic field rotational speed VMF1 and the second rotor rotational speed VRO2 become equal to first and second predetermined target values, respectively. The first and second target values are calculated by searching a map according to the vehicle speed VP when only the third and second generator-motors 220 and 50 are used as power sources, whereas when the engine 3 and the third and second generator-motors 220 and 50 are used as power sources, the first and second target values are calculated by searching a map other than the above-mentioned map according to the engine speed NE and the vehicle speed VP. Further, in these maps, the first and second target values are set to values that will make it possible to obtain high efficiencies of the third and second generator-motors 220 and 50 with respect to the vehicle speed VP (and engine speed NE) assumed at the time. Furthermore, in parallel with the above control of the transmission 240 as described above, the first magnetic field rotational speed VMF1 and the second rotor rotational speed VRO2 are controlled to the first and second target values, respectively. From the above, according to the present embodiment, during traveling of the vehicle, it is possible to obtain the high efficiencies of the third and second generator-motors 220 and 50.

Further, also in the present embodiment, as described above with reference to FIG. 59, if the third and second generator-motors 220 and 50 are used, it is possible to transmit the engine power WENG to the drive wheels DW and DW while steplessly changing the speed thereof, thereby making it possible to reduce the frequency of the speed-changing operation of the transmission 240. This makes it possible to suppress heat losses by the speed-changing operation, whereby it is possible to ensure the high driving efficiency of the power plant 1D. In addition to this, according to the present embodiment, it is possible to obtain the same advantageous effects as provided by the fourth embodiment.

It should be noted that although in the present embodiment, the transmission 240 is a belt-type stepless transmission, it is to be understood that a toroidal-type or a hydraulic-type stepless transmission or a gear-type stepped transmission may be employed.

Figure 61:
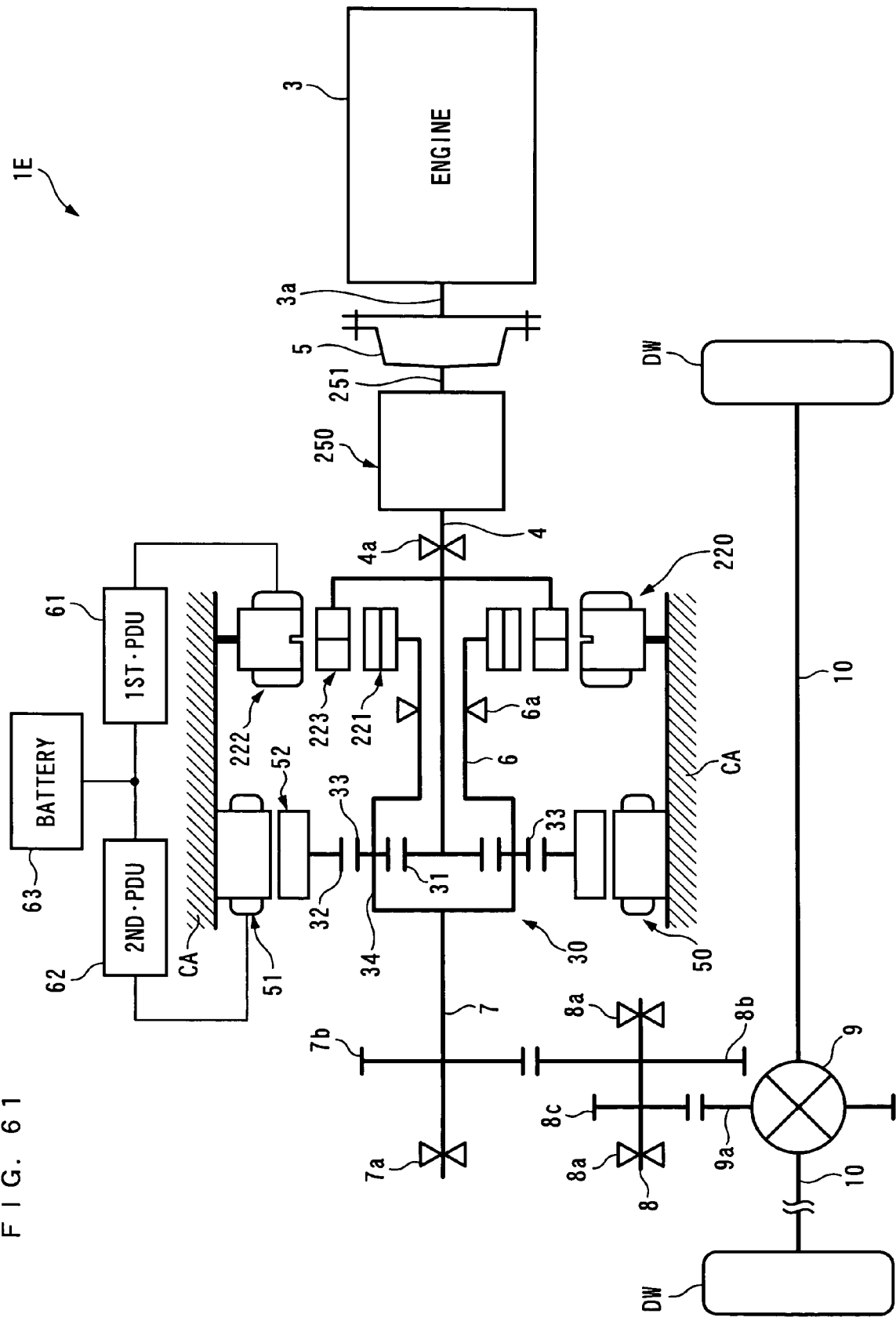
FIG. 61 A schematic view of an engine, third and second generator-motors etc. of a power plant according to a sixth embodiment.

In the power plant 1E according to the sixth embodiment shown FIG. 61, the transmission 250 is a gear-type stepped transmission formed by a planetary gear unit and so forth, and includes an input shaft 251 and an output shaft (not shown). In the transmission 250, a total of two speed positions, i.e. a first speed (transmission gear ratio=the rotational speed of the input shaft 251/the rotational speed of the output shaft=1.0) and a second speed (transmission gear ratio <1.0) are set as speed positions. The ECU 2 performs a change between these speed positions. Further, the input shaft 251 of the transmission 250 is directly connected to the crankshaft 3a via the flywheel 5, and the output shaft (not shown) thereof is directly connected to the aforementioned first main shaft 4. As described above, the transmission 250 is provided between the crankshaft 3a and the A2 rotor 223 and the second sun gear 31, for transmitting the engine power WENG to the A2 rotor 223 and the second sun gear 31 while changing the speed of the engine power WENG. Furthermore, the number of the gear teeth of the gear 9a of the differential gear mechanism 9 is larger than that of the gear teeth of the second gear 8c of the idler shaft 8, whereby power transmitted to the idler shaft 8 is transmitted to the drive wheels DW and DW in a reduced state.

In the power plant 1E configured as above, in such a case as a very large torque is transmitted from the A1 rotor 221 and the second carrier 34 to the drive wheels DW and DW, e.g. during the ENG-based standing start, the speed position of the transmission 250 is controlled to the second speed (transmission gear ratio <1.0). Thus, the engine torque TENG input to the A2 rotor 223 and the second sun gear 31 is made smaller. In accordance therewith, electric power generated by the third generator-motor 220 and electric power supplied to the second generator-motor 50 (generated electric power) are controlled such that the engine torque TENG to be transmitted to the A1 rotor 221 and the second carrier 34 becomes smaller. Further, the engine torque TENG transmitted to the A1 rotor 221 and the second carrier 34 is transmitted to the drive wheels DW and DW in a state increased by deceleration by the second gear 8c and the gear 9a. From the above, according to the present embodiment, it is possible to make smaller the maximum value of torque demanded of the third and second generator-motors 220 and 50, thereby making it possible to reduce the sizes and costs of the third and second generator-motors 220 and 50. In addition, it is possible to make smaller the maximum value of the torque transmitted to the second carrier 34 via the second sun gear 31 and the second ring gear 32, which makes it possible to further reduce the size and costs of the second planetary gear unit 30.

Further, when the engine speed NE is very high, the speed position of the transmission 250 is controlled to the first speed (transmission gear ratio=1.0). Thus, according to the present embodiment, compared with the case of the speed position being the second speed, the A2 rotor rotational speed VRA2 can be reduced, whereby it is possible to prevent the third generator-motors 220 from becoming faulty due to an event that the A2 rotor rotational speed VRA2 becomes too high.

Further, in such a case as the second rotor rotational speed VRO2 becomes too high, e.g. during high-vehicle speed operation of the vehicle in which the vehicle speed VP is higher than the engine speed NE, the speed position of the transmission 250 is controlled to the second speed. As a consequence, according to the present embodiment, the second sun gear rotational speed VSU2 is increased with respect to the engine speed NE, whereby as is clear from FIG. 59, it is possible to make the second rotor rotational speed VRO2 lower, thereby making it possible to prevent failure of the second generator-motor 50 due to an excessive increase in the second rotor rotational speed VRO2.

Furthermore, when the vehicle is traveling using the engine 3 as a power source, e.g. as in the battery input/output zero mode, the speed position of the transmission 250 is changed such that the first magnetic field rotational speed VMF1 and the second rotor rotational speed VRO2 take respective values that will make it possible to obtain the high efficiencies of the third and second generator-motors 220 and 50 according to the engine speed NE and the vehicle speed VP. Further, in parallel with such a change in the speed position of the transmission 250, the first magnetic field rotational speed VMF1 and the second rotor rotational speed VRO2 are controlled to values determined based on the engine speed NE and vehicle speed VP assumed then, the speed position of the transmission 250, the aforementioned equation (1), and the gear ratio between the second sun gear 31 and the second ring gear 32. Thus, according to the present embodiment, during traveling of the vehicle, it is possible to obtain the high efficiencies of the third and second generator-motors 220 and 50.

Furthermore, when the vehicle is traveling using the engine 3 as a power source, and at the same time during the speed-changing operation of the transmission 250, that is, while the engine 3 is disconnected from the A2 rotor 223 and the second sun gear 31 by the transmission 250, to suppress a speed-change shock, the third and second generator-motors 220 and 50 are controlled as described hereafter. Hereinafter, such control of the third and second generator-motors 220 and 50 is referred to as "the speed-change shock control".

Electric power is supplied to the third stator 222, and both the first and second rotating magnetic fields generated in the third stator 222 in accordance therewith are caused to perform normal rotation, while electric power is supplied to the second stator 51 to cause the second rotor 52 to perform normal rotation. Thus, the first driving equivalent torque TSE1 from the third stator 222 and torque transmitted, as described hereafter, to the A1 rotor 221 are combined, and this combined torque is transmitted to the A2 rotor 223. The torque transmitted to the A2 rotor 223 is transmitted to the second sun gear 31 without being transmitted to the crankshaft 3a, by the above-mentioned disconnection by the transmission 250.

Further, the torque is combined with the second generator-motor torque TM2 transmitted to the second ring gear 32, and then is transmitted to the second carrier 34. Part of the torque transmitted to the second carrier 34 is transmitted to the A1 rotor 221, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, thereby making it possible to improve marketability. It should be noted that this speed-change shock control is performed only during the speed-changing operation of the transmission 250. In addition to this, according to the present embodiment, it is possible to obtain the same advantageous effects as provided by the fourth embodiment.

Figure 62:
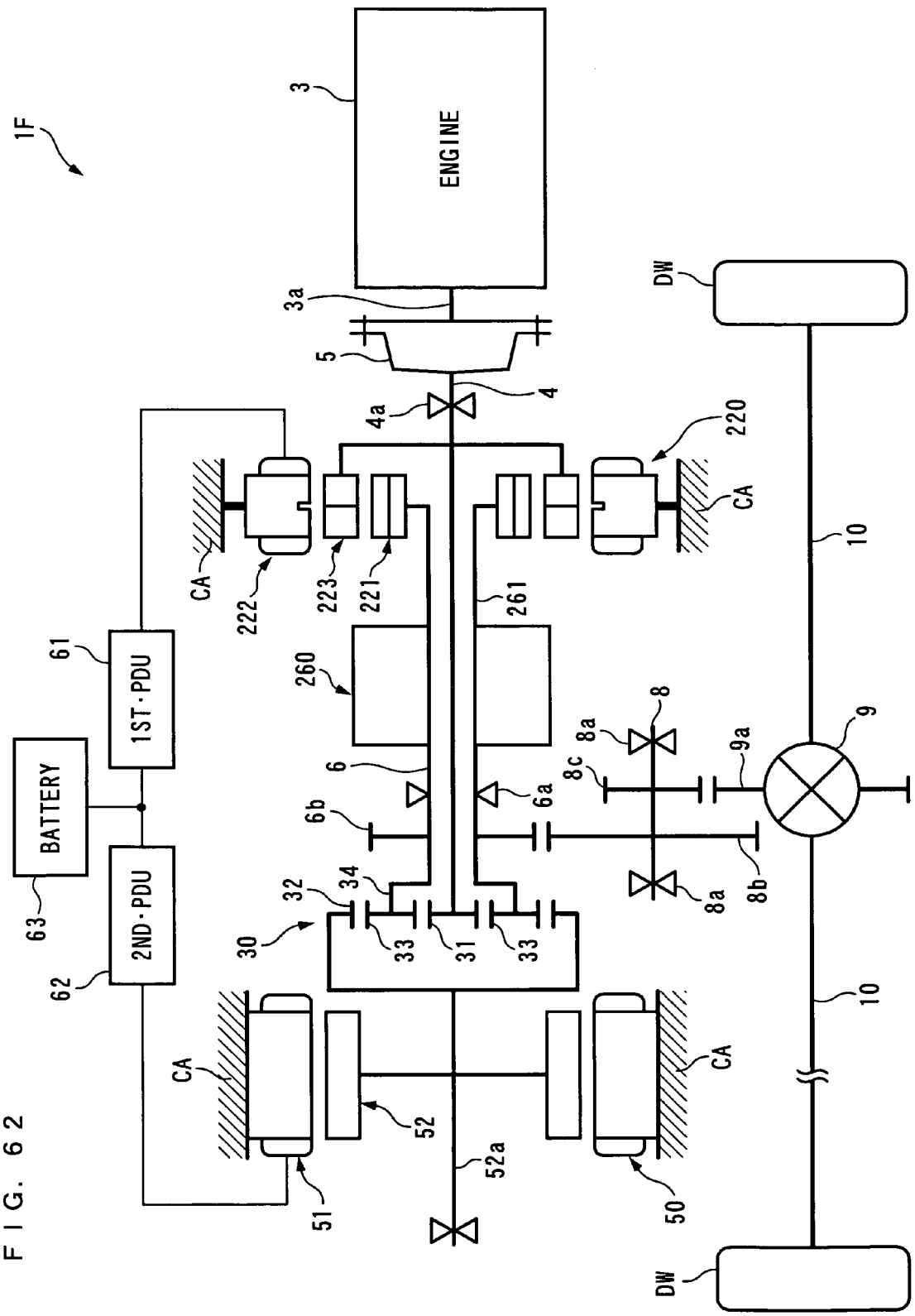
FIG. 62 A schematic view of an engine, third and second generator-motors etc. of a power plant according to a seventh embodiment.

In the power plant 1F according to the seventh embodiment shown in FIG. 62, the transmission 260 is the gear-type stepped transmission including an input shaft 261 and an output shaft (not shown), a plurality of gear trains different in gear ratio from each other, and clutches (not shown) for engaging and disengaging respectively between the gear trains, and the input shaft 261 and the output shaft. The transmission 260 changes the speed of power inputted to the input shaft 261 by using one of the gear trains, and outputs the power to the output shaft. Further, in the transmission 260, a total of four speed positions, i.e. a first speed (transmission gear ratio=the rotational speed of the input shaft 261/the rotational speed of the output shaft>1.0), a second speed (transmission gear ratio=1.0), a third speed (transmission gear ratio <1.0) for forward travel, and one speed position for rearward travel can be set using these gear trains, and the ECU 2 controls a change between these speed positions.

Further, in the power plant 1F, differently from the fourth embodiment, the second main shaft 7 is not provided, and the A1 rotor 221 is directly connected to the input shaft 261 of the transmission 260, while the output shaft of the transmission 260 is directly connected to the above-described connection shaft 6. The connection shaft 6 is integrally formed with a gear 6b, and the gear 6b is in mesh with the aforementioned first gear 8b.

As described above, the A1 rotor 221 is mechanically connected to the drive wheels DW and DW via the transmission 260, the gear 6b, the first gear 8b, the idler shaft 8, the second gear 8c, the gear 9a and the differential gear mechanism 9, and so forth. Further, the power transmitted to the A1 rotor 221 is transmitted to the drive wheels DW and DW while having the speed thereof changed by the transmission 260. Furthermore, the second carrier 34 is mechanically connected to the drive wheels DW and DW via the connection shaft 6, the gear 6b and the first gear 8b, and so forth, without via the transmission 260.

Further, the second rotor 52 of the second generator-motor 50 is integrally formed with a rotating shaft 52a. The rotating shaft 52a is directly connected to the second ring gear 32 via a flange. This mechanically directly connects the second rotor 52 to the second ring gear 32 such that the second rotor 52 is rotatable in unison with the second ring gear 32.

In the power plant 1F configured as above, in such a case as a very large torque is transmitted from the A1 rotor 221 to the drive wheels DW and DW, e.g. during the ENG-based standing start, the speed position of the transmission 260 is controlled to the first speed (transmission gear ratio >1.0). Thus, torque transmitted to the A1 rotor 221 is increased by the transmission 260, and then is transmitted to the drive wheels DW and DW. In accordance therewith, the electric power generated by the third generator-motor 220 is controlled such that torque to be transmitted to the A1 rotor 221 becomes smaller. As a consequence, according to the present embodiment, the maximum value of torque demanded of the third generator-motor 220 can be made smaller, thereby making it possible to further reduce the size and costs of the third generator-motor 220.

Further, in such a case as the A1 rotor rotational speed VRA1 becomes too high, e.g. during the high-vehicle speed operation in which the vehicle speed VP is very high, the speed position of the transmission 260 is controlled to the third speed (transmission gear ratio <1.0). Thus, according to the present embodiment, since the A1 rotor rotational speed VRA1 can be lowered with respect to the vehicle speed VP, it is possible to prevent failure of the third generator-motor 220 due to an excessive increase in the A1 rotor rotational speed VRA1. The above-mentioned inconveniences are liable to occur, since the A1 rotor 221 is formed by magnets and the magnets are lower in strength than soft magnetic material elements, as described hereinabove. Therefore, the above-mentioned control is particularly effective.

Furthermore, during traveling of the vehicle, the speed position of the transmission 260 is controlled such that the first magnetic field rotational speed VMF1 becomes equal to a predetermined target value. This target value is calculated by searching a map according to the vehicle speed VP when only the third and second generator-motors 220 and 50 are used as power sources, whereas when the engine 3 and the third and second generator-motors 220 and 50 are used as power sources, the target value is calculated by searching a map other than the above-mentioned map according to the engine speed NE and the vehicle speed VP. Further, in these maps, the target values are set to values that will make it possible to obtain high efficiency of the third generator-motor 220 with respect to the vehicle speed VP (and engine speed NE) assumed at the time. Furthermore, in parallel with the above control of the transmission 260 as described above, the first magnetic field rotational speed VMF1 is controlled to the above-mentioned target value. Thus, according to the present embodiment, during traveling of the vehicle, it is possible to obtain the high efficiency of the third generator-motors 220.

Further, when the vehicle is traveling using the engine 3 as a power source, and at the same time the transmission 260 is performing a speed-changing operation, that is, after the input shaft 261 and output shaft of the transmission 260 are disconnected from a gear train before being shifted to a desired transmission gear ratio and until the input shaft 261 and the output shaft are connected to a gear train shifted to the desired transmission gear ratio, the third and second generator-motors 220 and 50 are controlled as follows: During the speed-changing operation of the transmission 260, the gear trains of the transmission 260 and the input shaft 261 and output shaft thereof are disconnected from each other to thereby disconnect between the A1 rotor 221 and the drive wheels DW and DW, whereby the load of the drive wheels DW and DW ceases to act on the A1 rotor 221. Therefore, no electric power is generated by the third generator-motor 220, and the second stator 51 is supplied with the electric power from the battery 63.

As a consequence, according to the present embodiment, during the speed-changing operation of the transmission 260, the second generator-motor torque TM2 and part of the engine torque TENG transmitted to the second sun gear 31 are combined, and the combined torque is transmitted to the drive wheels DW and DW via the second carrier 34. This makes it possible to suppress a speed-change shock, which is caused by interruption of transmission of the engine torque TENG to the drive wheels DW and DW. Therefore, it is possible to improve marketability.

Further, by using the third and second generator-motors 220 and 50, it is possible to transmit the engine power WENG to the drive wheels DW and DW while steplessly changing the speed thereof, thereby making it possible to reduce the frequency of the speed-changing operation of the transmission 260. This makes it possible to enhance the driving efficiency of the power plant 1F. In addition to this, according to the present embodiment, it is possible to obtain the same advantageous effects as provided by the fourth embodiment.

Figure 63:
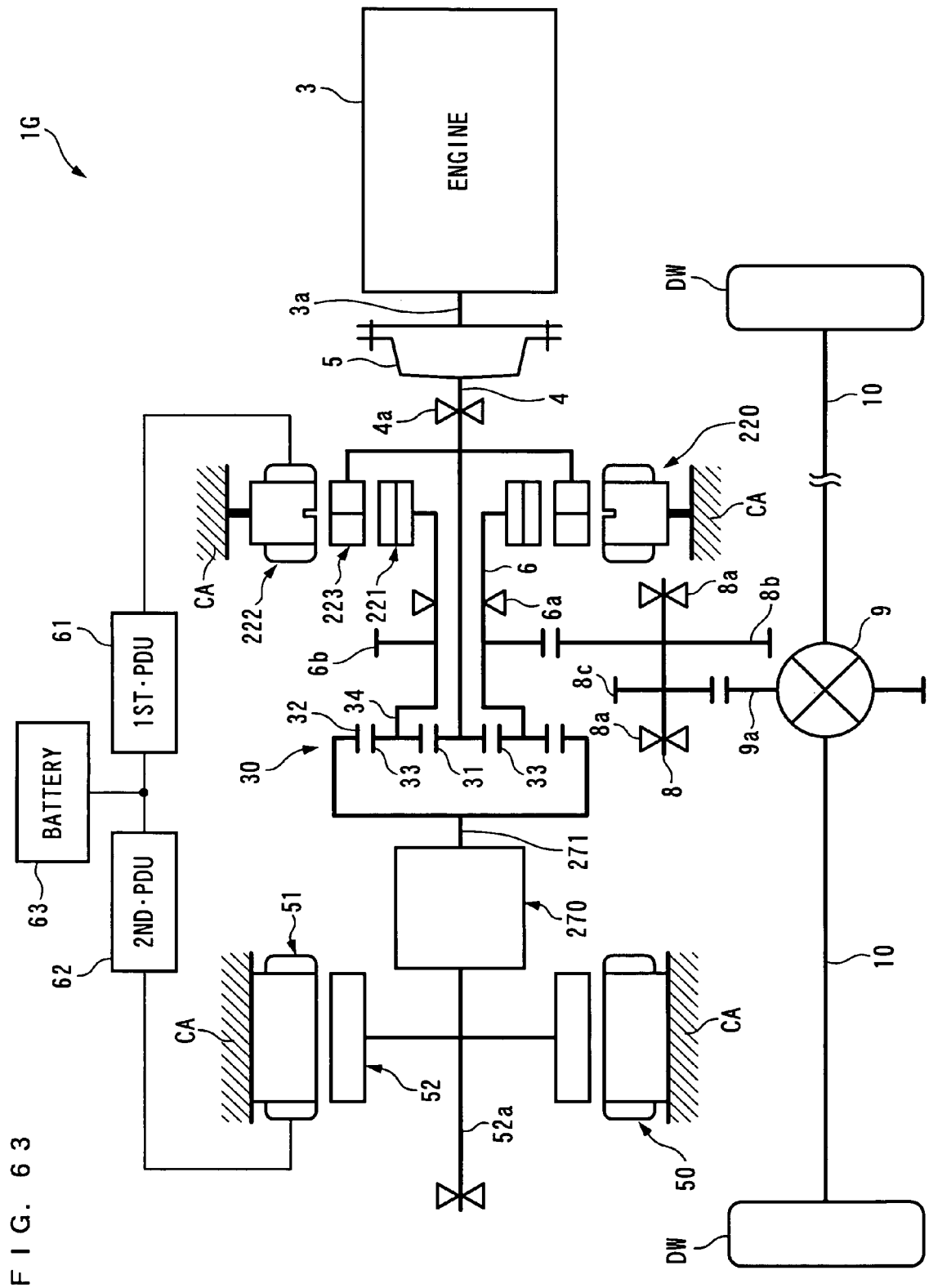
FIG. 63 A schematic view of an engine, third and second generator-motors etc. of a power plant according to an eighth embodiment.

In the power plant 1G according to the eighth embodiment shown in FIG. 63, similarly to the seventh embodiment, the second main shaft 7 is not provided, and the first gear 8*b* is in mesh with the gear 6*b* integrally formed with the connection shaft 6. Thus, the A1 rotor 221 and the second carrier 34 are mechanically connected to the drive wheels DW and DW via the connection shaft 6, the gear 6*b*, the first gear 8*b*, the idler shaft 8, the second gear 8*c*, the gear 9*a* and the differential gear mechanism 9, without via the transmission 270.

Further, the transmission 270 is a gear-type stepped transmission configured, similarly to the transmission 260 according to the seventh embodiment, to have speed positions including a first speed to a third speed. The transmission 270 includes an input shaft (not shown) directly connected to the second rotor 52 via the rotating shaft 52*a*, and an output shaft 271 directly connected to the second ring gear 32, and transmits power input to the input shaft to the output shaft 271 while changing the speed of the power. Further, the ECU 2 controls a change between the speed positions of the transmission 270. As described above, the second rotor 52 is mechanically connected to the second ring gear 32 via the transmission 270. Further, the power of the second rotor 52 is transmitted to the second ring gear 32 while having the speed thereof changed by the transmission 270.

In the power plant 1G configured as above, when a very large torque is transmitted from the second rotor 52 to the drive wheels DW and D, e.g. during the EV standing start and the ENG-based standing start, the speed position of the transmission 270 is controlled to the first speed (transmission gear ratio >1.0). Thus, the second generator-motor torque TM2 is increased by the transmission 270, and then is transmitted to the drive wheels DW and DW via the second ring gear 32 and the second carrier 34. In accordance therewith, electric power supplied to the second generator-motor 50 (generated electric power) is controlled such that the second generator-motor torque TM2 becomes smaller. Therefore, according to the present invention, it is possible to make smaller the maximum value of torque required of the second generator-motor 50, thereby making it possible to further reduce the size and costs of the second generator-motor 50.

Further, when the second rotor rotational speed VRO2 becomes very high, e.g. during the high-vehicle speed operation in which the vehicle speed VP is higher than the engine speed NE, the speed position of the transmission 270 is controlled to the third speed (transmission gear ratio <1.0). Thus, according to the present embodiment, the second rotor rotational speed VRO2 can be reduced with respect to the second ring gear rotational speed VRI2, which is determined by the relationship between the vehicle speed VP and engine speed NE, assumed at the time, and hence it is possible to prevent failure of the second generator-motor 50 due to an excessive increase in the second rotor rotational speed VRO2.

Furthermore, during traveling of the vehicle, the speed position of the transmission 270 is controlled such that the second rotor rotational speed VRO2 becomes equal to a predetermined target value. This target value is calculated by searching a map according to the vehicle speed VP when only the third and second generator-motors 220 and 50 are used as power sources, whereas when the engine 3 and the third and second generator-motors 220 and 50 are used as power sources, the target value is calculated by searching a map other than the above-mentioned map according to the engine speed NE and the vehicle speed VP. Further, in these maps, the target values are set to values that will make it possible to obtain high efficiency of the second generator-motor 50 with respect to the vehicle speed VP (and engine speed NE) assumed at the time. Furthermore, in parallel with the above control of the transmission 270 as described above, the second rotor rotational speed VRO2 is controlled to the above-described target value. Thus, according to the present embodiment, during traveling of the vehicle, it is possible to obtain the high efficiency of the second generator-motors 50.

Further, when the vehicle is traveling using the engine 3 as a power source and at the same time during the speed-changing operation of the transmission 270, that is, while the second rotor 52 is disconnected from the drive wheels DW and DW by the transmission 270, as is clear from how torque is transmitted, described with reference to FIG. 40, part of the engine torque TENG is transmitted to the drive wheels DW and DW via the A1 rotor 221. Therefore, according to the present embodiment, during the speed-changing operation of the transmission 270, it is possible to suppress a speed-change shock, which can be caused by interruption of transmission of the engine torque TENG to the drive wheels DW and DW. This makes it possible to improve marketability.

Further, by using the third and second generator-motors 220 and 50, it is possible to transmit the engine power WENG to the drive wheels DW and DW while steplessly changing the speed thereof, so that it is possible to reduce the frequency of the speed-changing operation of the transmission 270. This makes it possible to enhance the driving efficiency of the power plant 1G. In addition to this, according to the present embodiment, it is possible to obtain the same advantageous effects as provided by the fourth embodiment.

Figure 64:
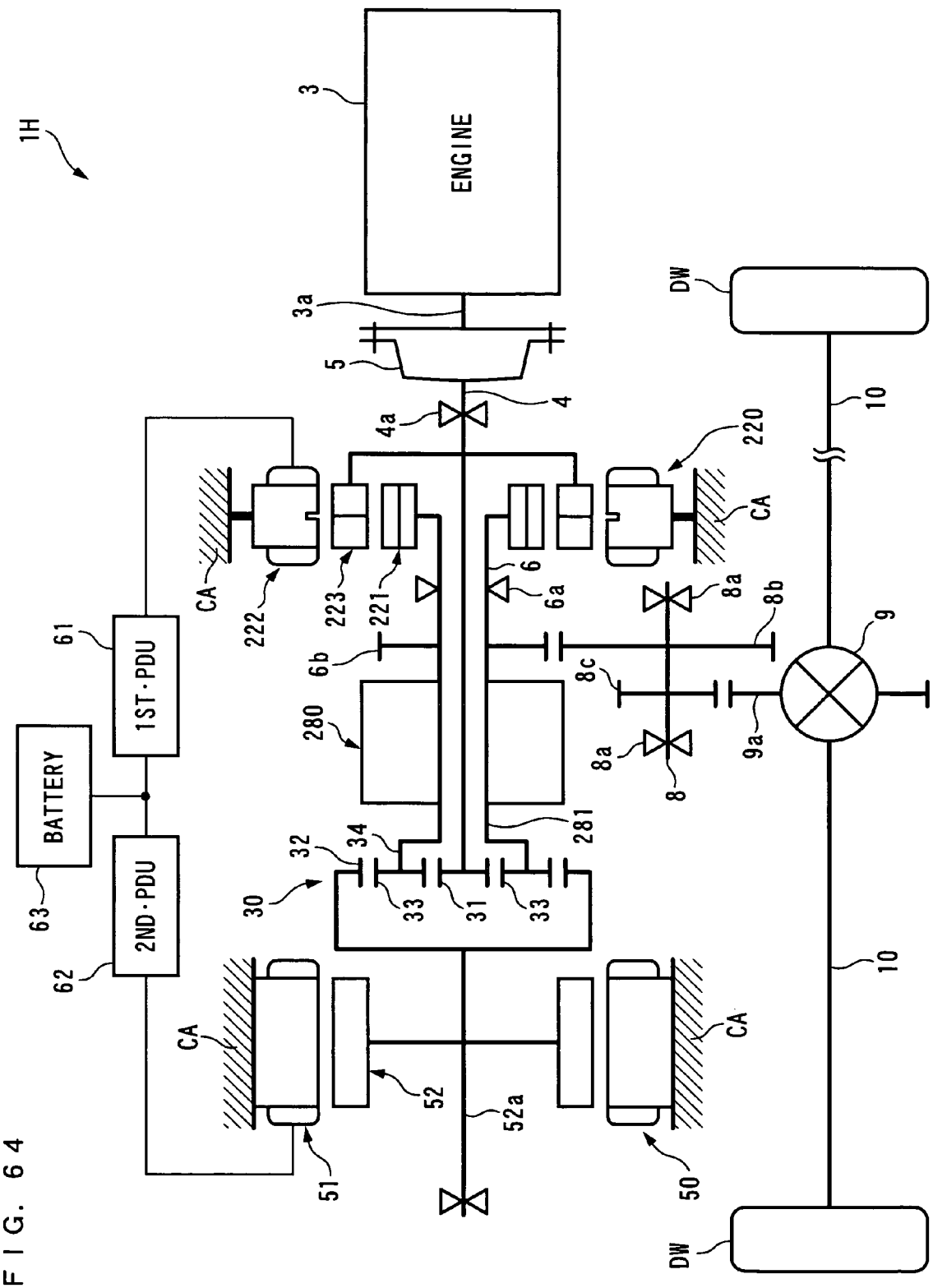
FIG. 64 A schematic view of an engine, third and second generator-motors etc. of a power plant according to a ninth embodiment.

In the power plant 1H according to the ninth embodiment shown in FIG. 64, similarly to the seventh and eighth embodiments, the second main shaft 7 is not provided, and the first gear 8*b* is in mesh with the gear 6*b* integrally formed with the connection shaft 6. Further, the transmission 280 is a gear-type stepped transmission which is configured similarly to the transmission 260 according to the seventh embodiment and has speed positions of the first to third speeds. The transmission 280 includes an input shaft 281 directly connected to the second carrier 34, and an output shaft (not shown) directly connected to the connection shaft 6, and transmits power input to the input shaft 281 to the output shaft while changing the speed of the power. Furthermore, a change between the speed positions of the transmission 280 is controlled by the ECU 2.

As described above, the second carrier 34 is mechanically connected to the drive wheels DW and DW via the transmission 280, the connection shaft 6, the gear 6*b*, the first gear 8*b*, and so forth. Further, power transmitted to the second carrier 34 is transmitted to the drive wheels DW and DW while having the speed thereof changed by the transmission 280. Furthermore, the A1 rotor 221 is mechanically connected to the drive wheels DW and DW via the connection shaft 6, the gear 6*b*, the first gear 8*b*, and so forth without via the transmission 280. Further, similarly to the seventh embodiment, the second rotor 52 is directly connected to the second ring gear 32 via the rotating shaft 52*a*, and is rotatable in unison with the second ring gear 32.

In the power plant 1H configured as above, in such a case as a very large torque is transmitted from the second carrier 34 to the drive wheels DW and DW, e.g. during the EV standing start and the ENG-based standing start, the speed position of the transmission 280 is controlled to the first speed (transmission gear ratio >1.0). Thus, the torque transmitted to the second carrier 34 is increased by the transmission 280, and then is transmitted to the drive wheels DW and DW. In accordance therewith, the electric power supplied to the second generator-motor 50 (generated electric power) is controlled such that the second generator-motor torque TM2 becomes smaller. As a consequence, according to the present embodiment, the maximum value of torque demanded of the second generator-motor 50, and the maximum value of torque to be transmitted to the second carrier 34 can be made smaller, thereby making it possible to further reduce the sizes and costs of the second generator-motor 50 and the second planetary gear unit 30.

Further, in such a case as the second rotor rotational speed VRO2 becomes too high, e.g. during the high-vehicle speed operation in which the vehicle speed VP is higher than the engine speed NE, the speed position of the transmission 280 is controlled to the third speed (transmission gear ratio <1.0). As a consequence, according to the present embodiment, the second carrier rotational speed VCA2 is reduced with respect to the vehicle speed VP, whereby as is clear from FIG. 59, it is possible to lower the second rotor rotational speed VRO2, thereby making it possible to prevent failure of the second generator-motor 50 due to an excessive increase in the second rotor rotational speed VRO2.

Furthermore, during traveling of the vehicle, including the EV traveling and the traveling in the battery input/output zero mode, the speed position of the transmission 280 is controlled such that the second rotor rotational speed VRO2 becomes equal to a predetermined target value. This target value is calculated by searching a map according to the vehicle speed VP when only the third and second generator-motors 220 and 50 are used as power sources, whereas when the engine 3 and the third and second generator-motors 220 and 50 are used as power sources, the target value is calculated by searching a map other than the above-mentioned map according to the engine speed NE and the vehicle speed VP. Further, in these maps, the target value is set to a value that will make it possible to obtain high efficiency of the second generator-motor 50 with respect to the vehicle speed VP (and engine speed NE) assumed at the time. Furthermore, in parallel with the above control of the transmission 280 as described above, the second rotor rotational speed VRO2 is controlled to the above-described target value. Thus, according to the present embodiment, during traveling of the vehicle, it is possible to obtain the high efficiency of the second generator-motor 50.

Further, when the vehicle is traveling using the engine 3 as a power source, and at the same time the transmission 280 is performing a speed-changing operation, that is, when the second carrier 34 and the drive wheels DW and DW are disconnected from each other by the transmission 280, as is clear from the state of transmission of torque described above with reference to FIG. 40, part of the engine torque TENG is transmitted to the drive wheels DW and DW via the A1 rotor 221. As a consequence, according to the present embodiment, similarly to the eighth embodiment, during the speed-changing operation of the transmission 280, it is possible to suppress a speed-change shock, which is caused by interruption of transmission of the engine torque TENG to the drive wheels DW and DW. This makes it possible to improve marketability.

Further, by using the third and second generator-motors 220 and 50, it is possible to transmit the engine power WENG to the drive wheels DW and DW while steplessly changing the speed thereof, so that it is possible to reduce the frequency of the speed-changing operation of the transmission 280. This makes it possible to enhance the driving efficiency of the power plant 1H. In addition to this, according to the present embodiment, it is possible to obtain the same advantageous effects as provided by the fourth embodiment.

It should be noted that although in the sixth to ninth embodiments, the transmissions 250 to 280 are gear-type stepped transmissions, it is to be understood that belt-type, toroidal-type or hydraulic-type stepless transmission may be employed.

Figure 65:
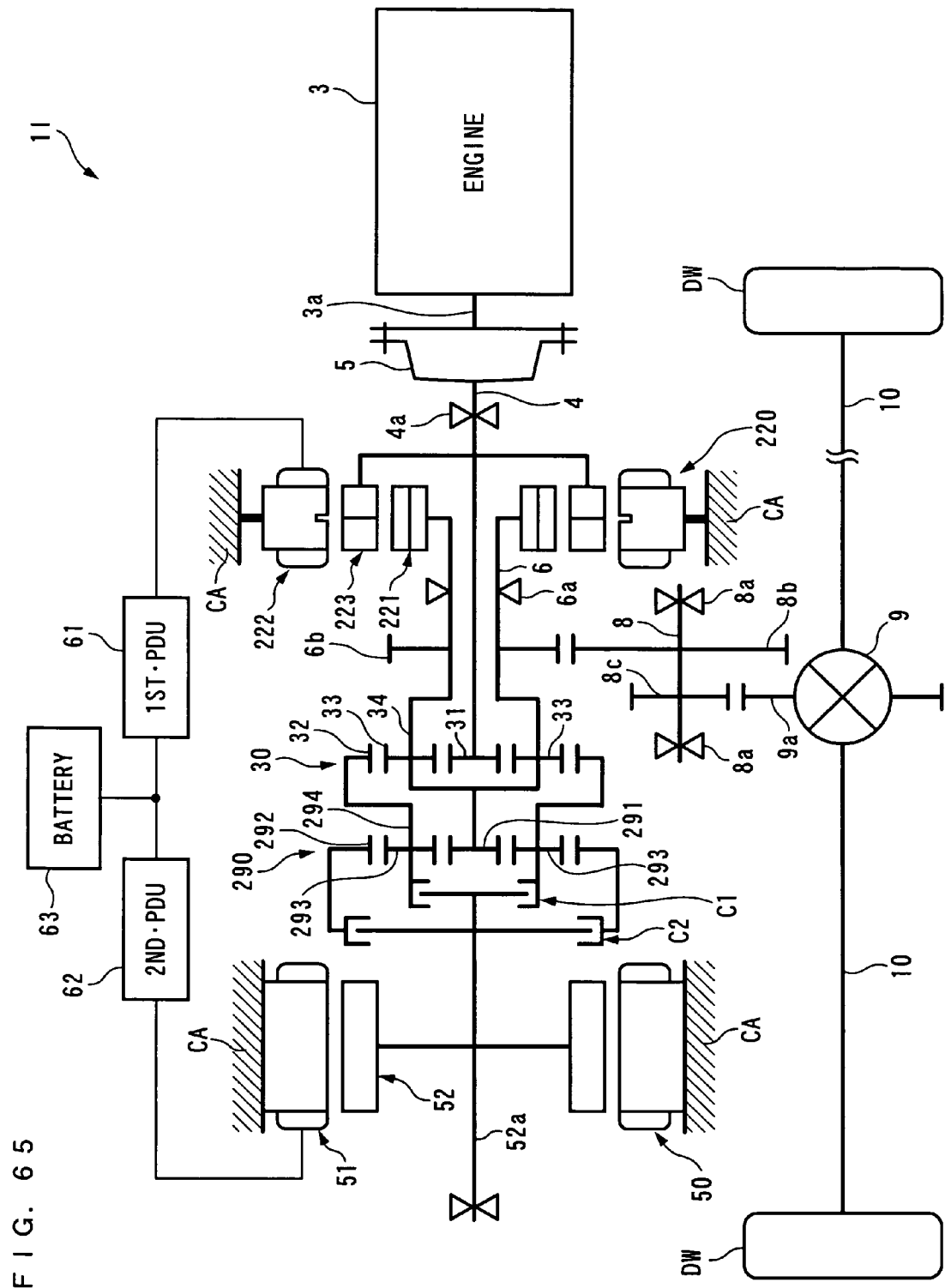
FIG. 65 A schematic view of an engine, third and second generator-motors etc. of a power plant according to a tenth embodiment.

Next, a power plant 1I according to a tenth embodiment of the present invention will be described with reference to FIG. 65. This power plant 1I is distinguished from the fourth embodiment in that it further includes a transmission for changing a ratio between the speed difference between the second rotor rotational speed VRO2 and the vehicle speed VP and the speed difference between the vehicle speed VP and the engine speed NE. In FIG. 65, the component elements identical to those of the fourth embodiment are denoted by the same reference numerals. The following description is mainly given of different points from the fourth embodiment.

Referring to FIG. 65, in this power plant 1I, similarly to the eighth embodiment, the second main shaft 7 is not provided, and the first gear 8b is in mesh with the gear 6b integrally formed with the connection shaft 6, whereby the A1 rotor 221 and the second carrier 34 are mechanically connected to the drive wheels DW and DW via the connection shaft 6, the gear 6b, the first gear 8b, the differential gear mechanism 9, and so forth without via the above-mentioned transmission. Further, similarly to the seventh embodiment, the second rotor 52 is rotatable in unison with the rotating shaft 52a.

The above-described transmission includes a third planetary gear unit 290, a first clutch C1 and a second clutch C2. The third planetary gear unit 290 is configured similarly to the first planetary gear unit 20, and includes a third sun gear 291, a third ring gear 292, and a third carrier 294 rotatably supporting a plurality of third planetary gears 293 in mesh with the two gears 291 and 292. The third sun gear 291 is mechanically directly connected to the second carrier 34 via a connection shaft, whereby the third sun gear 291 is rotatable in unison with the second carrier 34. Further, the third carrier 294 is mechanically directly connected to the second ring gear 32 via a hollow shaft and a flange, whereby the third carrier 294 is rotatable in unison with the second ring gear 32. Hereinafter, the rotational speeds of the third sun gear 291, the third ring gear 292 and the third carrier 294 are referred to as "the third sun gear rotational speed VSU3, "the third ring gear rotational speed VRI3" and "the third carrier rotational speed VCA3", respectively.

The above-mentioned first clutch C1 is formed e.g. by a friction multiple disk clutch, and is disposed between the third carrier 294 and the rotating shaft 52a. That is, the third carrier 294 is mechanically directly connected to the second rotor 52 via the first clutch C1. Further, the degree of engagement of the first clutch C1 is controlled by the ECU 2 to thereby connect and disconnect between the third carrier 294 and the rotating shaft 52a, that is, between the third carrier 294 and the second rotor 52.

Similarly to the first clutch C1, the above-described second clutch C2 is formed by a friction multiple disk clutch, and is disposed between the third ring gear 292 and the rotating shaft 52a. That is, the third ring gear 292 is mechanically directly connected to the second rotor 52 via the second clutch C2.

Further, the degree of engagement of the second clutch C2 is controlled by the ECU 2 to thereby connect and disconnect between the third ring gear 292 and the rotating shaft 52a, i.e. between the third ring gear 292 and the second rotor 52.

FIG. 66(a) shows a speed diagram of an example of the relationship between the second sun gear rotational speed VSU2, the second carrier rotational speed VCA2, and the second ring gear rotational speed VRI2 together with a speed diagram of an example of the relationship between the third sun gear rotational speed VSU3, the third carrier rotational speed VCA3, and the third ring gear rotational speed VRI3. In FIG. 66(a), M designates a value obtained by dividing the number of the gear teeth of the second sun gear 31 by that of the gear teeth of the second ring gear 32, and N designates a value obtained by dividing the number of the gear teeth of the third sun gear 291 by that of the gear teeth of the third ring gear 292.

As described above, since the second carrier 34 and the third sun gear 291 are directly connected to each other, the second carrier rotational speed VCA2 and the third sun gear rotational speed VSU3 are equal to each other, and since the second ring gear 32 and the third carrier 294 are directly connected to each other, the second ring gear rotational speed VRI2 and the carrier rotational speed VCA3 are equal to each other. Therefore, the two speed diagrams concerning the second and third planetary gear units 30 and 290 shown in FIG. 66(a) can be represented by a single speed diagram as shown in FIG. 66(b). Referring to FIG. 66(b), four rotary elements of which rotational speeds are in a collinear relationship with each other are formed by connecting the elements of the second and third planetary gear units 30 and 290 described above.

Figure 67:
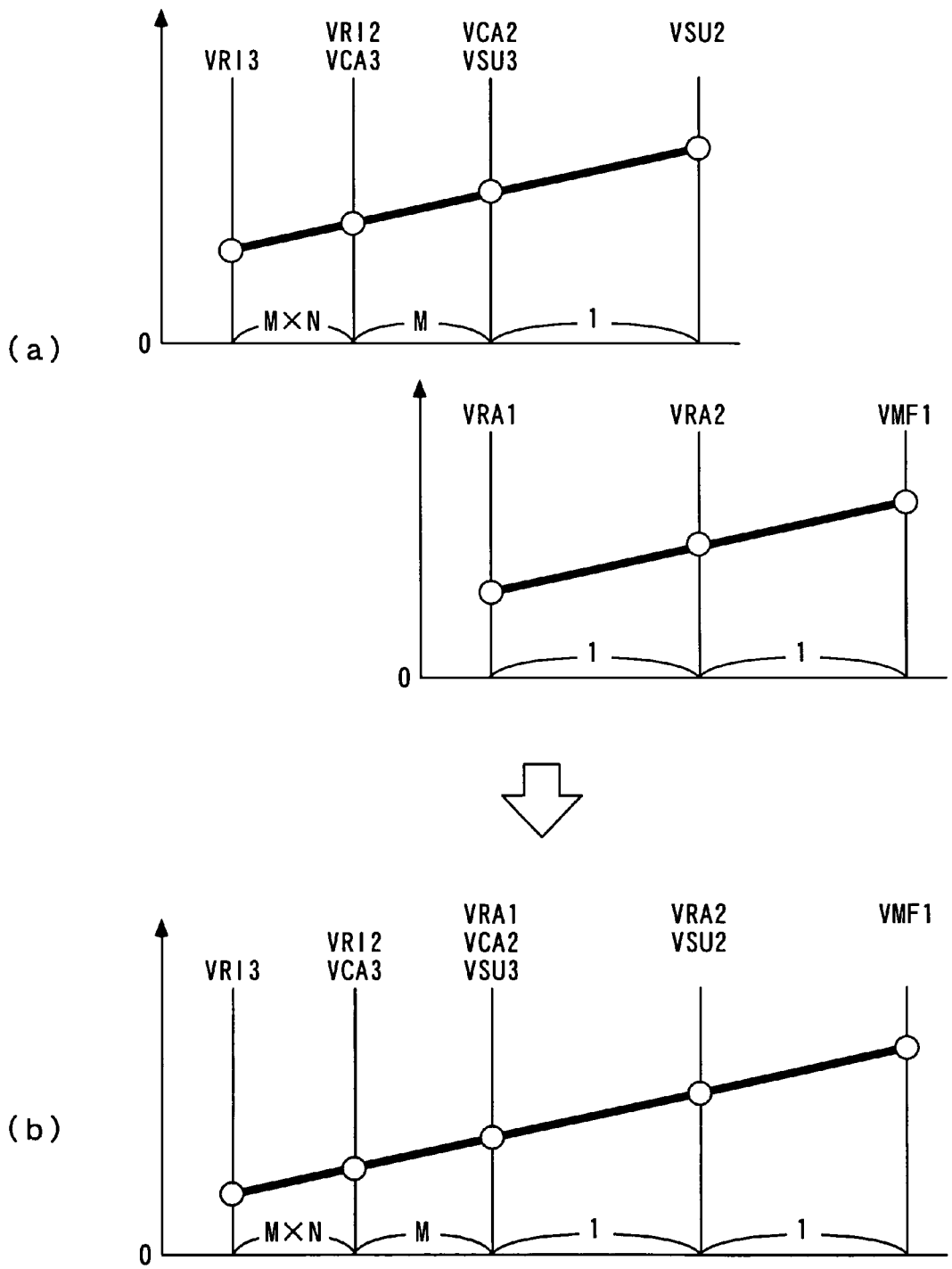
FIG. 67 (*a*) A speed diagram of the rotational speeds of the four rotary elements formed by connecting the second and third planetary gear units, by way of example, depicted together with a speed diagram of the first magnetic field rotational speed VMF1, and the A1 and A2 rotor rotational speeds VRA1 and VRA2, shown by way of example; and (*b*) a speed diagram of the rotational speeds of the five rotary elements formed by connecting the third generator-motor, and the second and third planetary gear units, shown by way of example.

Further, FIG. 67(a) shows a speed diagram of an example of the relationship between the rotational speeds of the above-mentioned four rotary elements together with a speed diagram of an example of the relationship between the first magnetic field rotational speed VMF1 and the A1 and A2 rotor rotational speeds VRA1 and VRA2. As described hereinabove, the difference between the first magnetic field rotational speed VMF1 and the A2 rotor rotational speed VRA2 is equal to the difference between the A2 rotor rotational speed VRA2 and the A1 rotor rotational speed VRA1, so that a ratio between the distance from a vertical line representing the first magnetic field rotational speed VMF1 to a vertical line representing the A2 rotor rotational speed VRA2, and the distance from a vertical line representing the A2 rotor rotational speed VRA2 to a vertical line representing the A1 rotor rotational speed VRA1 is 1:1.

As described above, since the second carrier 34 and the A1 rotor 221 are directly connected to each other, the second carrier rotational speed VCA2 and the A1 rotor rotational speed VRA1 are equal to each other. Further, since the second sun gear 31 and the A2 rotor 223 are directly connected to each other, the second sun gear rotational speed VSU2 and the A2 rotor rotational speed VRA2 are equal to each other. Therefore, the two speed diagrams shown in FIG. 67(a) can be represented by a single speed diagram as shown in FIG. 67(b).

Further, since the crankshaft 3a, the A2 rotor 223 and the second sun gear 31 are directly connected to each other, the engine speed NE, the A2 rotor rotational speed VRA2 and the second sun gear rotational speed VSU2 are equal to each other. Furthermore, since the drive wheels DW and DW, the A1 rotor 221, the second carrier 34 and the third sun gear 291 are connected to each other, if a change in speed by the differential gear mechanism 9 and the like is ignored, the vehicle speed VP, the A1 rotor rotational speed VRA1, the second carrier rotational speed VCA2 and the third sun gear rotational speed VSU3 are equal to each other.

Further, the second rotor 52 is connected to the third carrier 294 and the third ring gear 292 via the first and second clutches C1 and C2, respectively, and hence when the first clutch C1 is engaged and the second clutch C2 is disengaged (hereinafter, such an engaged and disengaged state of the clutches is referred to as "the first speed change mode"), the second rotor rotational speed VRO2 and the third carrier rotational speed VCA3 are equal to each other. Furthermore, when the first clutch C1 is disengaged and the second clutch C2 is engaged (hereinafter, such an engaged and disengaged state of the clutches is referred to as "the second speed change mode"), the second rotor rotational speed VRO2 and the third ring gear rotational speed VRI3 are equal to each other.

From the above, the first magnetic field rotational speed VMF1, the engine speed NE, the vehicle speed VP, and the second rotor rotational speed VRO2 are in a collinear relationship (linear relationship) as shown e.g. in FIG. 68(a) in the first speed change mode, whereas in the second speed change mode, they are in a collinear relationship as shown e.g. in FIG. 68(b).

As shown in FIGS. 68(a) and 68(b), the distance between the vertical line representing the vehicle speed VP and the vertical line representing the second rotor rotational speed VRO2 in the speed diagrams is shorter in the first speed change mode than in the second speed change mode, and therefore a ratio between a rotational difference DN2 between the second rotor rotational speed VRO2 and the vehicle speed VP and a rotational difference DN1 between the vehicle speed VP and the engine speed NE (hereinafter referred to as "the rotational ratio DN2/DN1) is smaller in the first speed change mode.

In the power plant 1I configured as above, in such a case as the second rotor rotational speed VRO2 becomes too high, e.g. during the high-vehicle speed operation in which the vehicle speed VP is higher than the engine speed NE, or when the vehicle speed VP is high during the aforementioned EV traveling, the first speed change mode is used. As a consequence, according to the present embodiment, as is clear from the relationship of the rotational ratio DN2/DN1, the second rotor rotational speed VRO2 can be made lower than when the second speed change mode is used, so that it is possible to prevent failure of the second generator-motor 50 due to an excessive increase in the second rotor rotational speed VRO2.

Further, during the aforementioned EV standing start and at the same time in the first speed change mode, the relationship between torque (indicated by the symbol H in FIG. 35, hereinafter referred to as "the third electric power-generating torque") TG3 transmitted from the third stator 222 to the A2 rotor 223, the foot axis drive torque TDRDW transmitted to the drive wheels DW and DW, and the second generator-motor torque TM2 by the second generator-motor 50 is expressed e.g. by the following equations (24) and (25):

$$TM2+TG3=TDRDW \qquad (24)$$

$$TM2=(2\times TDRDW)/(2+M) \qquad (25)$$

On the other hand, in the second speed change mode, the above-mentioned relationship between the parameters is expressed e.g. by the following equations (26) and (27):

$$TM2+TG3=TDRDW \qquad (26)$$

$$TM2=(2\times TDRDW)/(2+M+M\times N) \qquad (27)$$

As is clear from comparison between the above equations (25) and (27), the second generator-motor torque TM2 is smaller in the second speed change mode with respect to the foot axis drive torque TDRDW having an identical magnitude. Therefore, during the EV standing start, that is, when a very large torque is transmitted from the second rotor 52 to the drive wheels DW and DW, the second speed change mode is used.

Further, during traveling of the vehicle using the power of the engine 3, e.g. in the above-described battery input/output zero mode, and at the same time in the first speed change mode, the relationship between the engine torque TENG, the first power-generating equivalent torque TGE1, the foot axis drive torque TDRDW and the second generator-motor torque TM2 is expressed e.g. by the following equations (28) and (29):

$$TENG+TM2=TDRDW+TGE1 \tag{28}$$

$$TM2=(2\times TDRDW-TENG)/(2+M) \tag{29}$$

On the other hand, in the second speed change mode, the above-described relationship between the parameters is expressed e.g. by the following equations (30) and (31):

$$TENG+TM2=TDRDW+TGE1 \tag{30}$$

$$TM2=(2\times TDRDW-TENG)/(2+M+M\times N) \tag{31}$$

As is clear from comparison between the above equations (29) and (31), the second generator-motor torque TM2 is smaller in the second speed change mode with respect to the foot axis drive torque TDRDW having an identical magnitude. Therefore, when the vehicle is traveling using the power of the engine 3, to transmit a very large torque from the second rotor 52 to the drive wheels DW and DW, e.g. during the ENG-based standing start or during ascending a slope, the second speed change mode is employed.

According to the present embodiment, since the second speed change mode is used and the electric power supplied to the second generator-motor 50 (generated electric power) is controlled based on the above-mentioned equations (27) and (31), it is possible to make smaller the maximum value of torque required of the second generator-motor 50 to thereby further reduce the size and costs of the second generator-motor 50.

Further, during traveling of the vehicle, a speed change mode that will make it possible to obtain higher efficiency of the second generator-motor 50 is selected from the first and second speed change modes, according the vehicle speed VP during stoppage of the engine 3, and according to the vehicle speed VP and the engine speed NE during operation of the engine 3. Thus, according to the present embodiment, it is possible to control the second rotor rotational speed VRO2 to an appropriate value, thereby making it possible to obtain a high efficiency of the second generator-motor 50.

Furthermore, the switching between the first and second speed change modes is performed when the third carrier rotational speed VCA3 and the third ring gear rotational speed VRI3 are equal to each other. Thus, according to the present embodiment, it is possible to smoothly switch between the first and second speed change modes while maintaining the respective rotations of the drive wheels DW and DW and the engine 3, thereby making it possible to ensure excellent drivability.

Further, during traveling of the vehicle using the power of the engine 3 and at the same time during transition between the first and second speed change modes, even when both of the first and second clutches C1 and C2 are disengaged, as is clear e.g. from the state of transmission of torque in FIG. 40, part of the engine torque TENG can be transmitted to the drive wheels DW and DW via the A2 and A1 rotors 223 and 221. This makes it possible to suppress a speed-change shock, such as a sudden decrease in torque, whereby it is possible to improve marketability. In addition to this, according to the present embodiment, it is possible to obtain the same advantageous effects as provided by the fourth embodiment.

It should be noted that in the present embodiment, the third planetary gear unit 290 corresponds to the planetary gear unit in the invention as claimed in claim 15, and the third sun gear 291, the third ring gear 292, the third planetary gears 293, and the third carrier 294 correspond to a sun gear, a ring gear, planetary gears, and the carrier in the invention as claimed in claim 15, respectively.

Further, although in the present embodiment, the third sun gear 291 is connected to the second carrier 34, and the third ring gear 292 is connected to the second rotor 52 via the second clutch C2, the above connecting relationships may be inverted, that is, the third ring gear 292 may be connected to the second carrier 34, and the third sun gear 291 may be connected to the second rotor 52 via the second clutch C2. Further, although in the present embodiment, the first and second clutches C1 and C2 are formed by friction multiple disk clutches, they may be formed e.g. by electromagnetic clutches.

Next, a power plant 1J according to an eleventh embodiment of the present invention will be described with reference to FIG. 69. This power plant 1J is constructed by adding a brake mechanism BL to the power plant 1C according to the fourth embodiment. The following description is mainly given of different points from the fourth embodiment.

Figure 69:
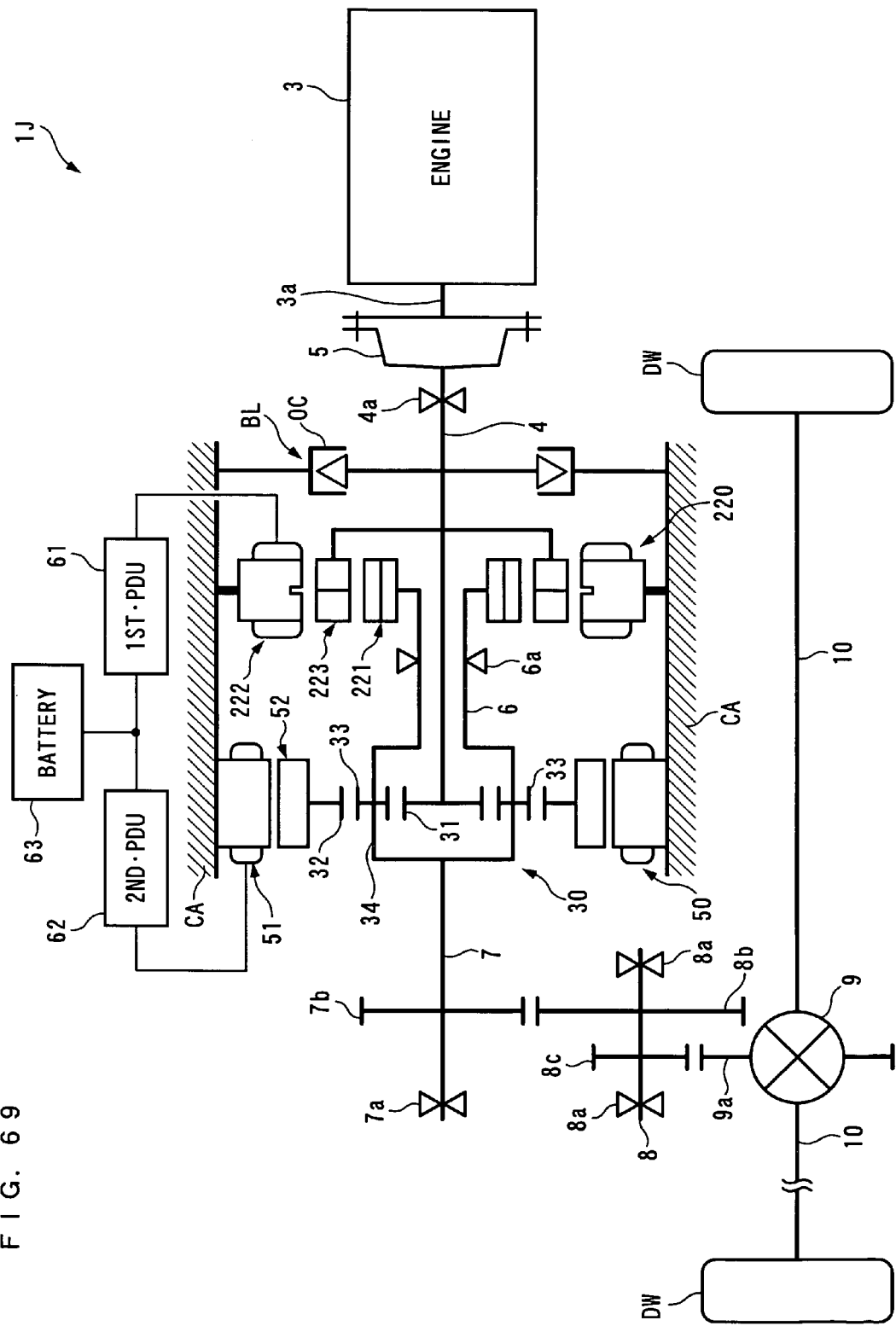
FIG. 69 A schematic view of an internal combustion engine, third and second generator-motors etc. of a power plant according to an eleventh embodiment.

Referring to FIG. 69, the brake mechanism BL includes a one-way clutch OC connected to the aforementioned first main shaft 4 and casing CA. The one-way clutch OC is configured such that it engages between the first main shaft 4 and the casing CA configured to be unrotatable, when such power as causes the crankshaft 3a having the first main shaft 4 connected thereto to perform reverse rotation, acts on the crankshaft 3a, whereas when such power as causes the crankshaft 3a to perform normal direction acts on the crankshaft 3a, the one-way clutch OC disengages between the first main shaft 4 and the casing CA. More specifically, the brake mechanism BL formed by the one-way clutch OC and the casing CA permits the first main shaft 4 to rotate only when it performs normal rotation together with the crankshaft 3a, the A2 rotor 223 and the second sun gear 31, but blocks rotation of the first main shaft 4 when it performs reverse rotation together with the crankshaft 3a and so forth.

The power plant 1J configured as above performs the aforementioned EV creep operation and EV standing start as follows: The power plant 1J supplies electric power to the third and second stators 222 and 52 and causes the first and second rotating magnetic fields generated by the third stator 222 in accordance with the supply of the electric power to perform reverse rotation, while causing the second rotor 52 to perform normal rotation together with the second ring gear 32. Further, the power plant 1J controls the first magnetic field rotational speed VMF1 and the second rotor rotational speed VRO2 such that $(1+M)\times|VMF1|=|VRO2|$ holds. Here, M designates a value obtained by dividing the number of the gear teeth of the second sun gear 31 by that of the gear teeth of the second ring gear 32, as described above. Furthermore, the power plant 1J controls the electric power supplied to the third and second generator-motors 220 and 50 such that sufficient torque is transmitted to the drive wheels DW and DW.

While the first and second rotating magnetic fields of the third stator 222 perform reverse rotation as described above, the A2 rotor 223 is blocked from performing reverse rotation by the brake mechanism BL as described above, so that as described heretofore using the aforementioned equation (3), torque having the same magnitude as that of the first driving equivalent torque TSE1 is transmitted from the third stator 222 to the A1 rotor 221, and acts such that the A1 rotor 221 is caused to perform normal rotation. Further, while the second stator 52 performs normal rotation as described above, the second sun gear 31 is blocked from performing reverse rotation by the brake mechanism BL as described above, so that the second generator-motor torque TM2 is transmitted to the second carrier 34 via the second ring gear 32 and the second planetary gears 33, for acting on the second carrier 34 to cause the second carrier 34 to perform normal rotation. Furthermore, the torque transmitted to the A1 rotor 221 and the second carrier 34 is transmitted to the drive wheels DW and DW, and causes the drive wheels DW and DW to perform normal rotation.

Further, in this case, on the A2 rotor 223 and the second sun gear 31, which are blocked from performing reverse rotation by the brake mechanism BL, through the above-mentioned control of the third and second generator motors 220 and 50, torques act from the third stator 222 and the second rotor 52 such that the torques cause the A2 rotor 223 and the second sun gear 31 to perform reverse rotation, respectively, whereby the crankshaft 3a, the A2 rotor 223 and the second sun gear 31 are not only blocked from performing reverse rotation but also held at rest.

As described above, according to the present embodiment, it is possible to drive the drive wheels DW and DW by the third and second generator-motors 220 and 50 without using the engine power WENG. Further, during driving of the drive wheels DW and DW, the crankshaft 3a is not only blocked from performing reverse rotation but also held in a stopped state, and hence the crankshaft 3a is prevented from dragging the engine 3. In addition to this, according to the present embodiment, it is possible to obtain the same advantageous effects as provided by the fourth embodiment.

It should be noted that in the fourth to eleventh embodiments, the third generator-motor 220 and the second planetary gear unit 30 correspond to the first generator-motor and the distributing and combining device in the invention as claimed in claims 8 to 15 and 20. Further, the third stator 222, and the A1 and A2 rotors 221 and 223 correspond to the stator and the first and second rotors in the invention as claimed in claims 8 to 15 and 20, respectively. The second sun gear 31, the second carrier 34 and the second ring gear 32 correspond to the first, second and third elements in the invention as claimed in claims 8 to 15 and 20, respectively. Furthermore, the second rotor 52 corresponds to the second output portion in the invention as claimed in claims 8 to 15 and 20. Further, the ECU 2 and the 1st·PDU 61 correspond to the first controller in the invention as claimed in claims 8 to 15 and 20, and the ECU 2 and the 2nd·PDU 62 correspond to the second controller in the invention as claimed in claims 8 to 15 and 20.

Further, although in the fourth to eleventh embodiments, the A2 rotor 223 and the second sun gear 31 are directly connected to each other, and the A1 rotor 221 and the second carrier 34 are directly connected to each other, the A2 rotor 223 and the second sun gear 31 are not necessarily required to be directly connected to each other insofar as they are connected to the crankshaft 3a. Further, the A1 rotor 221 and the second carrier 34 are not necessarily required to be directly connected to each other insofar as they are connected to the drive wheels DW and DW. In this case, each of the transmissions 240 and 250 of the fifth and sixth embodiments may be formed by two transmissions, which may be arranged as follows: One of the two transmissions forming the transmission 240 may be disposed between the A1 rotor 221 and the drive wheels DW and DW while the other thereof may be disposed between the second carrier 34 and the drive wheels DW and DW. Further, one of the two transmissions forming the transmission 250 may be disposed between the A2 rotor 223 and the crankshaft 3a while the other thereof may be disposed between the sun gear 31 and the crankshaft 3a.

Further, although in the fourth to eleventh embodiments, the second sun gear 31 and the second ring gear 32 are connected to the engine 3 and the second generator-motor 50, respectively, the above connecting relationships may be inverted, that is, the second ring gear 32 and the second sun gear 31 may be connected to the engine 3 and the second generator-motor 50, respectively.

Next, a power plant 1K according to a twelfth embodiment of the present invention will be described with reference to FIG. 70. This power plant 1K is distinguished from the third embodiment only in that it includes the first planetary gear unit 20 and the first generator-motor 40 in the first embodiment in place of the third generator-motor 220. The following description is mainly given of different points from the third embodiment.

Figure 70:
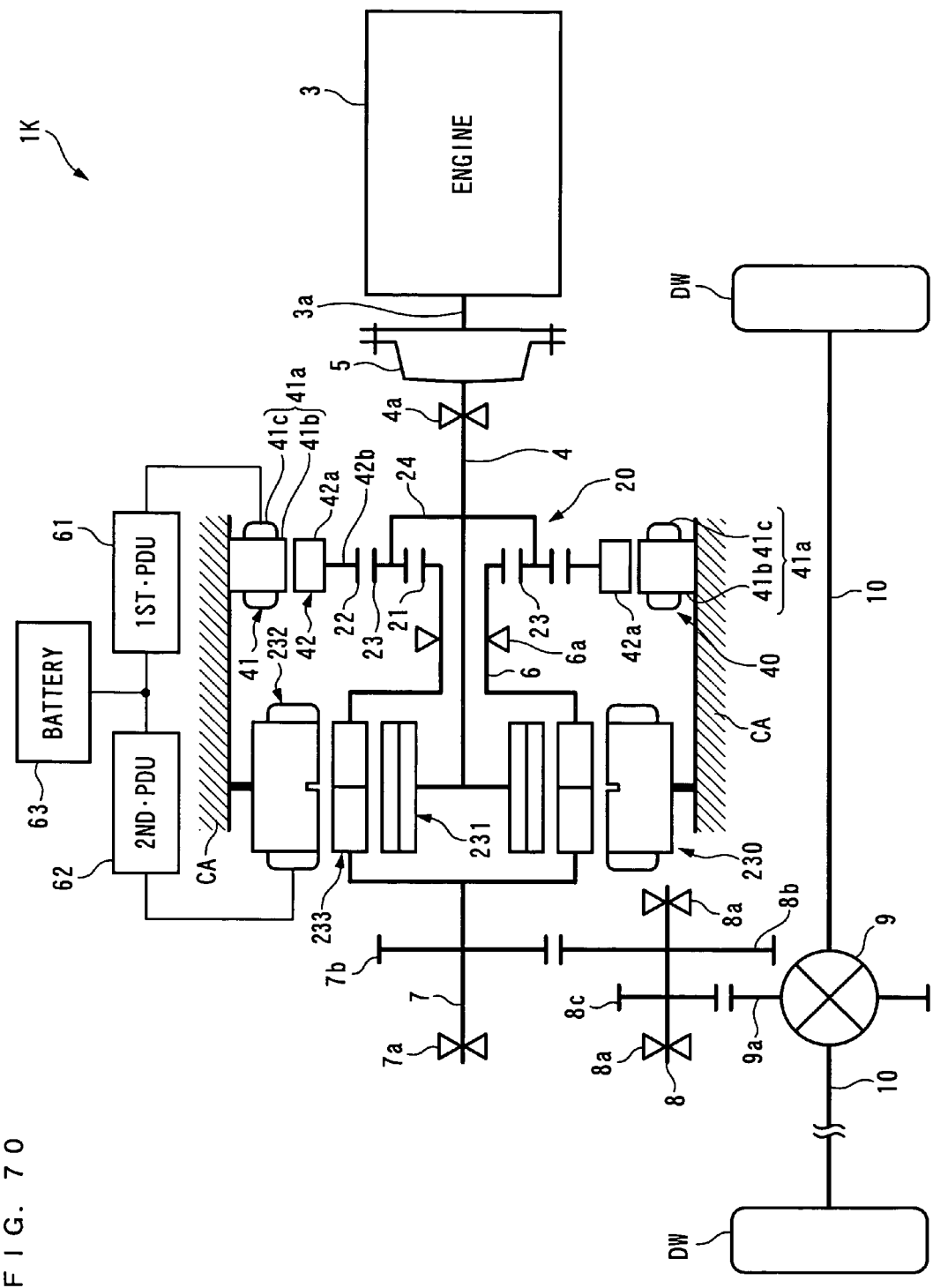
FIG. 70 A schematic view of an internal combustion engine, first and fourth generator-motors etc. of a power plant according to a twelfth embodiment.

As shown in FIG. 70, in the power plant 1K, the first carrier 24 of the aforementioned first planetary gear unit 20 and the B1 rotor 231 of the fourth generator-motor 230 are mechanically directly connected to each other via the first main shaft 4, and are mechanically directly connected to the crankshaft 3a via the first main shaft 4 and the flywheel 5. Further, the B2 rotor 233 of the fourth generator-motor 230 is mechanically directly connected to the first sun gear 21 of the first planetary gear unit 20 via the connection shaft 6, and is mechanically connected to the drive wheels DW and DW via the second main shaft 7, the gear 7b, the first gear 8b, the idler shaft 8, the second gear 8c, the gear 9a, the differential gear mechanism 9, and so forth. In short, the first sun gear 21 and the B2 rotor 233 are mechanically connected to the drive wheels DW and DW. Further, the first stator 22 of the first generator-motor 20 and the fourth stator 232 of the fourth generator-motor 230 are electrically connected to each other via the 1st·PDU 61 and the 2nd·PDU 62.

In the power plant 1K configured as above, operations, such as the EV creep operation and the operation in the battery input/output zero mode, described above as to the third embodiment, are carried out similarly to the third embodiment. In this case, these operations are performed by replacing the parameters (e.g. the first magnetic field rotational speed VMF1) concerning the third generator-motor 220 by corresponding parameters concerning the first generator-motor 40.

The following description will be given only of speed-changing operations by the third and fourth generator-motors 40 and 230 in the battery input/output zero mode, as representatives of the above described operations. FIG. 71 shows an example of the relationship between the first rotor rotational speed VRO1 and the second magnetic field rotational speed VMF2, and so forth in the power plant 1K. As indicated by broken lines in FIG. 71, the first rotor rotational speed VRO1 is increased and the second magnetic field rotational speed VMF2 is decreased, with respect to the first carrier rotational speed VCA1 and the B1 rotor rotational speed VRB1, that is, the engine speed NE. This makes it possible to steplessly reduce the first sun gear rotational speed VSU1 and the B2 rotor rotational speed VRB2, that is, the vehicle speed VP. Inversely, as indicated by one-dot chain lines in FIG. 71, the first rotor rotational speed VRO1 is decreased and the second magnetic field rotational speed VMF2 is increased, with respect to the engine speed NE, whereby it is possible to steplessly increase the vehicle speed VP.

As described above, the power plant 1K is distinguished from the first embodiment in that the fourth generator-motor 230 replaces the second planetary gear unit 30 and the second generator-motor 50, and is distinguished from the third embodiment in that the first planetary gear unit 20 and the first generator-motor 40 replace the third generator-motor 220. Further, as described heretofore, the third and fourth generator-motors 220 and 230 each have a function obtained by combining a general generator-motor and a general planetary gear unit. Therefore, according to the present embodiment, it is possible to obtain the same advantageous effects as provided by the first and third embodiments.

Next, power plants 1L, 1M, 1N, and 1O according to thirteenth to sixteenth embodiments of the present invention will be described with reference to FIGS. 72 to 75. These power plant 1L to 1O are distinguished from the twelfth embodiment in that they further include transmissions 300, 310, 320, and 330, respectively. The following description is mainly given of different points of the power plants 1L to 1O from the twelfth embodiment, in order from the power plant 1L of the thirteenth embodiment.

Figure 72:
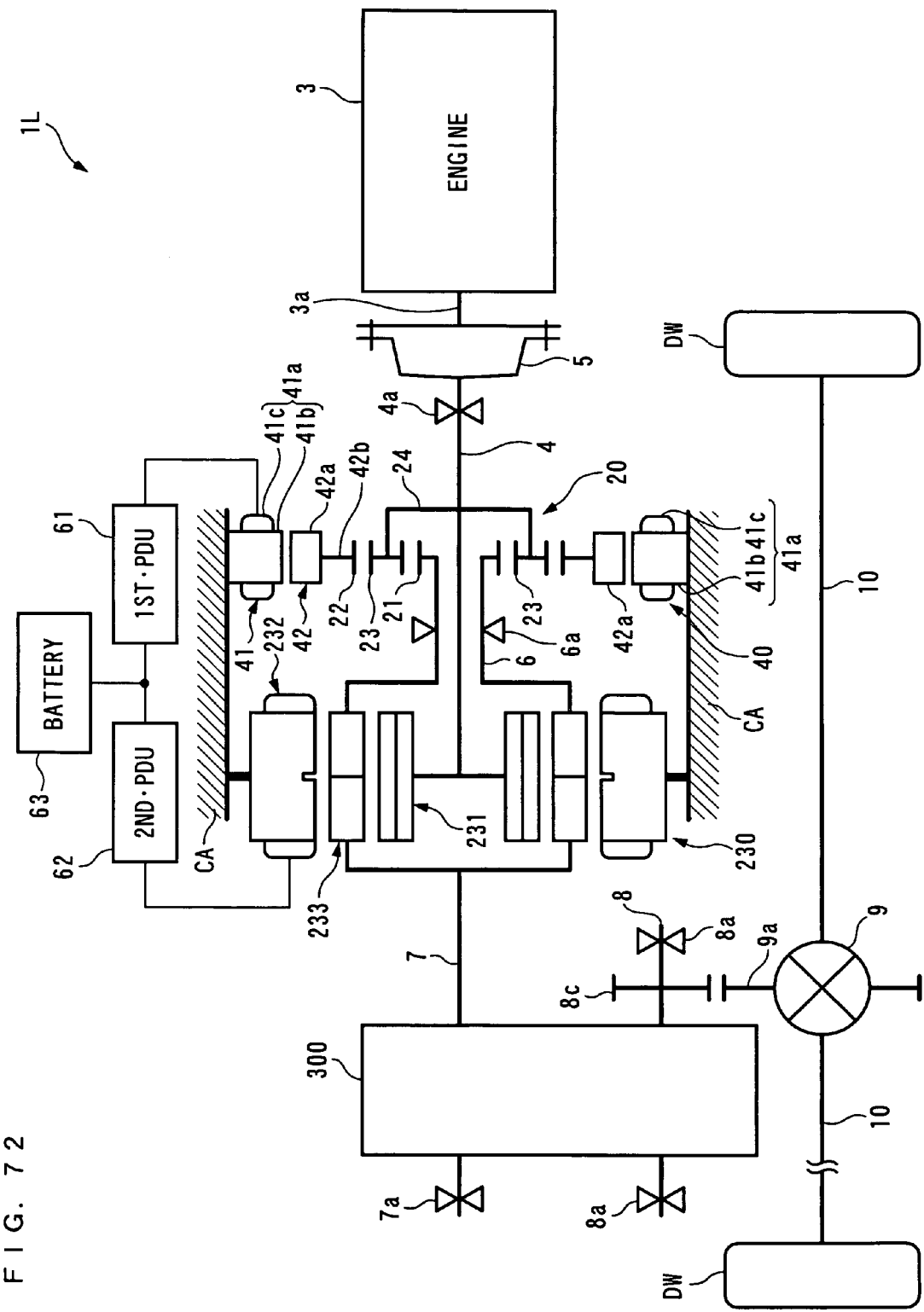
FIG. 72 A schematic view of an internal combustion engine, first and fourth generator-motors etc. of a power plant according to a thirteenth embodiment.

Referring to FIG. 72, in the power plant 1L, the transmission 300 is provided in place of the gear 7b and the first gear 8b, described above, in mesh with each other. Similarly to the transmission 240 according to the fifth embodiment, this transmission 300 is a belt-type stepless transmission, and includes an input shaft connected to the aforementioned second main shaft 7, an output shaft connected to the idler shaft 8, pulleys provided on the input shaft and the output shaft, respectively, and metal belts wound around the pulleys, none of which are shown. The transmission 300 changes effective diameters of the pulleys, thereby outputting power input to the input shaft to the output shaft while changing the speed thereof. Further, the transmission gear ratio of the transmission 300 (the rotational speed of the input shaft/the rotational speed of the output shaft) is controlled by the ECU 2.

As described above, the transmission 300 is provided between the first sun gear 21 and the B2 rotor 233, and the drive wheels DW and DW, and the power transmitted to the first sun gear 21 and the B2 rotor 233 is transmitted to the drive wheels DW and DW while having the speed thereof changed by the transmission 300.

In the power plant 1L configured as above, in such a case as a very large torque is transmitted from the first sun gear 21 and the B2 rotor 233 to the drive wheels DW and DW, e.g. during the EV standing start and the ENG-based standing start, the transmission gear ratio of the transmission 300 is controlled to a predetermined speed-reducing value which is larger than 1.0. Thus, the torque transmitted to the first sun gear 21 and the B2 rotor 233 is increased by the transmission 300, and then is transmitted to the drive wheels DW and DW. In accordance therewith, the electric power generated by the first generator-motor 40 and the electric power supplied to the fourth generator-motor 230 (generated electric power) are controlled such that the torque transmitted to the first sun gear 21 and the B2 rotor 233 becomes smaller. Therefore, according to the present invention, it is possible to make smaller the maximum value of torque demanded of the first and fourth generator-motors 40 and 230, thereby making it possible to further reduce the sizes and costs of the first and fourth generator-motors 40 and 230. Further, through the control of the above-mentioned transmission 300 and first generator-motor 40, it is possible to make smaller the torque distributed to the first sun gear 21 and the first ring gear 22 via the first carrier 24, to make smaller the maximum value of the torque transmitted to the first carrier 24, so that it is possible to further reduce the size and costs of the first planetary gear unit 20.

Furthermore, in such a case as the B2 rotor rotational speed VRB2 becomes too high, e.g. during the high-vehicle speed operation in which the vehicle speed VP is very high, the transmission gear ratio of the transmission 300 is controlled to a predetermined speed-increasing value smaller than 1.0. As a consequence, according to the present embodiment, since the B2 rotor rotational speed VRB2 can be decreased with respect to the vehicle speed VP, it is possible to prevent failure of the fourth generator-motor 230 due to an excessive increase in the B2 rotor rotational speed VRB2.

Further, in such a case as the first rotor rotational speed VRO1, which is determined by the relationship between the engine speed NE and the vehicle speed VP, becomes too high, e.g. during rapid acceleration of the vehicle in which the engine speed NE is higher than the vehicle speed VP, the transmission gear ratio of the transmission 300 is controlled to a predetermined speed-reducing value larger than 1.0. As a consequence, according to the present embodiment, the first sun gear rotational speed VSU1 is increased with respect to the vehicle speed VP, whereby as is clear from FIG. 71, referred to hereinabove, it is possible to reduce the first rotor rotational speed VRO1, thereby making it possible to prevent failure of the first generator-motor 40 due to an excessive increase in the first rotor rotational speed VRO1.

Furthermore, during traveling of the vehicle, the transmission gear ratio of the transmission 300 is controlled such that the first rotor rotational speed VRO1 and the second magnetic field rotational speed VMF2 become equal to first and second predetermined target values, respectively. The first and second target values are calculated by searching a map according to the vehicle speed VP when only the first and fourth generator-motors 40 and 230 are used as power sources, whereas when the engine 3 and the first and fourth generator-motors 40 and 230 are used as power sources, the first and second target values are calculated by searching a map other than the above-mentioned map according to the engine speed NE and the vehicle speed VP. Further, in these maps, the first and second target values are set to values that will make it possible to obtain high efficiencies of the first and fourth generator-motors 40 and 230 with respect to the vehicle speed VP (and engine speed NE) assumed at the time. Furthermore, in parallel with the above control of the transmission 300 as described above, the first rotor rotational speed VRO1 and the second magnetic field rotational speed VMF2 are controlled to the first and second target values, respectively. From the above, according to the present embodiment, during traveling of the vehicle, it is possible to obtain the high efficiencies of the first and fourth generator-motors 40 and 230.

Further, also in the present embodiment, as described above with reference to FIG. 71, by using the first and fourth generator-motors 40 and 230, it is possible to transmit the engine power WENG to the drive wheels DW and DW while steplessly changing the speed thereof, and therefore it is possible to reduce the frequency of the speed-changing operation of the transmission 300. This makes it possible to suppress heat losses by the speed-changing operation, thereby making it possible to ensure the high driving efficiency of the power plant 1L. In addition, according to the present embodiment, it is possible to obtain the same advantageous effects as provided by the twelfth embodiment.

It should be noted that although in the present embodiment, the transmission 300 is a belt-type stepless transmission, it is to be understood that a toroidal-type or a hydraulic-type stepless transmission or a gear-type stepped transmission may be employed.

Figure 73:
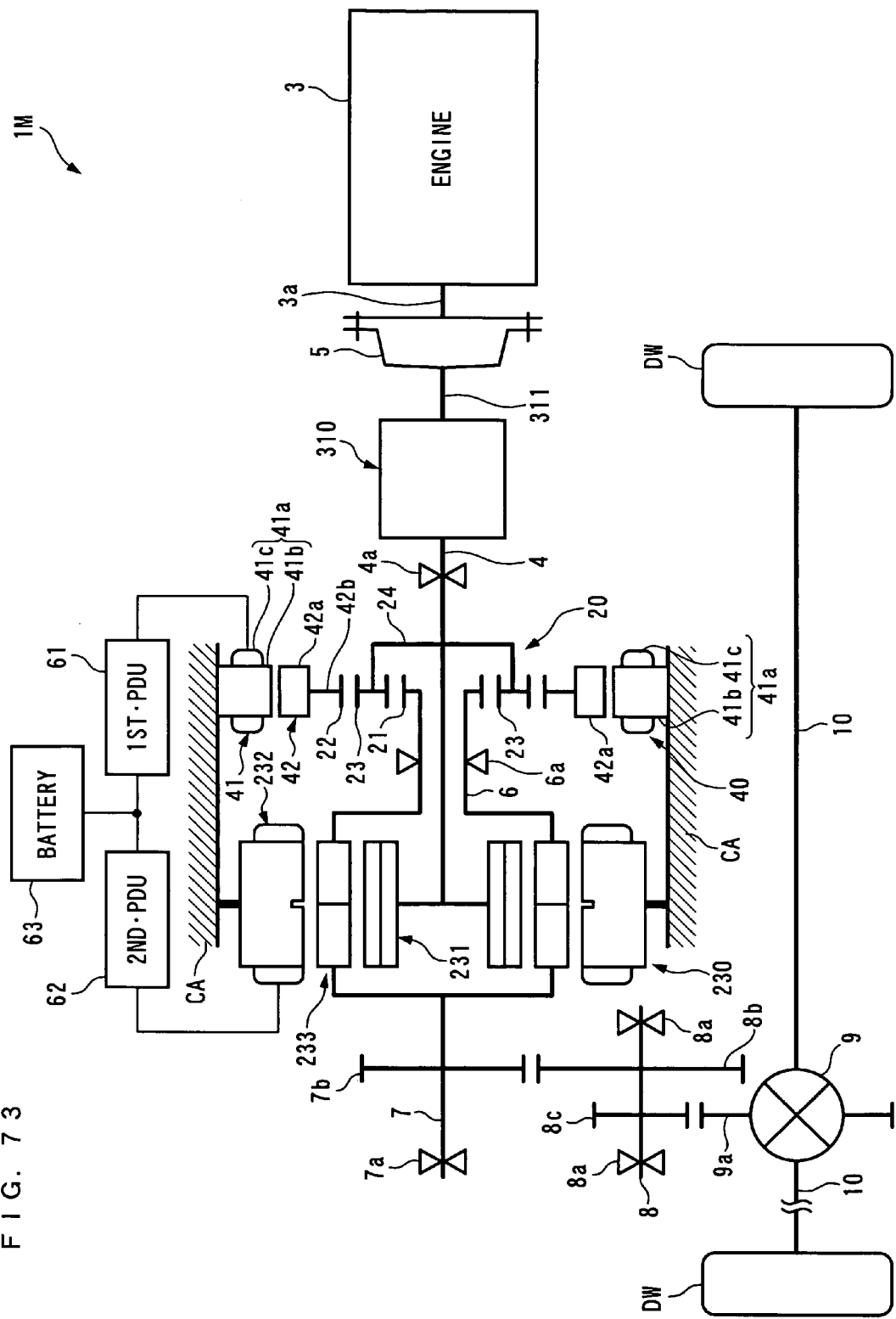
FIG. 73 A schematic view of an internal combustion engine, first and fourth generator-motors etc. of a power plant according to a fourteenth embodiment.

In the power plant 1M according to the fourteenth embodiment shown FIG. 73, a transmission 310 is a gear-type stepped transmission formed by a planetary gear unit and so forth, similarly to the above-described transmission 250 in the sixth embodiment, and includes an input shaft 311 and an output shaft (not shown). In the transmission 310, a total of two speed positions, i.e. a first speed (transmission gear ratio=the rotational speed of the input shaft 311/the rotational speed of the output shaft=1.0) and a second speed (transmission gear ratio <1.0) are set as speed positions. The ECU 2 performs a change between these speed positions. Further, the input shaft 311 of the transmission 310 is directly connected to the crankshaft 3a via the flywheel 5, and the output shaft (not shown) thereof is directly connected to the first main shaft 4. As described above, the transmission 310 is provided between the crankshaft 3a, and the first carrier 24 and the B1 rotor 231, for transmitting the engine power WENG to the first carrier 24 and the B1 rotor 231 while changing the speed of the engine power WENG. Furthermore, similarly to the sixth embodiment, the number of the gear teeth of the gear 9a of the differential gear mechanism 9 is larger than that of the gear teeth of the second gear 8c of the idler shaft 8, whereby the power transmitted to the idler shaft 8 is transmitted to the drive wheels DW and DW in a reduced state.

In the power plant 1M configured as above, in such a case as a very large torque is transmitted from the first sun gear 21 and the B2 rotor 233 to the drive wheels DW and DW, e.g. during the ENG-based standing start, the speed position of the transmission 310 is controlled to the second speed (transmission gear ratio <1.0). This makes smaller the engine torque TENG input to the first carrier 24 and the B1 rotor 231. In accordance therewith, the electric power generated by the first generator-motor 40 and the electric power supplied to the fourth generator-motor 230 (generated electric power) are controlled such that the engine torque TENG to be transmitted to the first sun gear 21 and the B2 rotor 233 becomes smaller. Further, the engine torque TENG transmitted to the first sun gear 21 and the B2 rotor 233 is transmitted to the drive wheels DW and DW in a state increased by deceleration by the second gear 8c and the gear 9a. From the above, according to the present invention, it is possible to make smaller the maximum value of torque demanded of the first and fourth generator-motors 40 and 230, thereby making it possible to reduce the sizes and costs of the first and fourth generator-motors 40 and 230. In addition to this, since the maximum value of the torque transmitted to the first sun gear 21 and the ring gear 22 via the first carrier 24 can be made smaller, thereby making it possible to further reduce the size and costs of the first planetary gear unit 20.

Further, when the engine speed NE is very high, the speed position of the transmission 310 is controlled to the first speed (transmission gear ratio=1.0). Thus, according to the present invention, compared with the case of the speed position being the second speed, the B1 rotor rotational speed VRB1 can be reduced, whereby it is possible to prevent failure of the fourth generator-motor 230 due to an excessive increase in the B1 rotor rotational speed VRB1. The above-mentioned inconveniences are liable to occur since the B1 rotor 231 is formed by magnets, and hence, this control is particularly effective.

Further, in such a case as the first rotor rotational speed VRO1 becomes too high, e.g. during rapid acceleration of the vehicle in which the engine speed NE is higher than the vehicle speed VP, the speed position of the transmission 310 is controlled to the first speed. Thus, compared with the case of the speed position being the second speed, the first carrier rotational speed VCA1 becomes smaller, and hence according to the present embodiment, as is clear from FIG. 71, the first rotor rotational speed VRO1 can be lowered, thereby making it possible to prevent failure of the first generator-motor 40 due to an excessive increase in the first rotor rotational speed VRO1.

Further, when the vehicle is traveling using the engine 3 as a power source, the speed position of the transmission 310 is changed according to the engine speed NE and the vehicle speed VP such that the first rotor rotational speed VRO1 and the second magnetic field rotational speed VMF2 take respective values that will make it possible to obtain the high efficiencies of the first and fourth generator-motors 40 and 230. Further, in parallel with such a change in the speed position of the transmission 310, the first rotor rotational speed VRO1 and the second magnetic field rotational speed VMF2 are controlled to values determined based on the engine speed NE and vehicle speed VP assumed then, the speed position of the transmission 310, the aforementioned equation (7), and the gear ratio between the first sun gear 21 and the first ring gear 22. Thus, according to the present embodiment, during traveling of the vehicle, it is possible to obtain the high efficiencies of the first and fourth generator-motors 40 and 230.

Furthermore, when the vehicle is traveling using the engine 3 as a power source, and at the same time during the speed-changing operation of the transmission 310, that is, while the engine 3, the first carrier 24 and the B1 rotor 231 are disconnected from each other by the transmission 310, to suppress a speed-change shock, the first and fourth generator-motors 40 and 230 are controlled as described hereafter. Hereinafter, such control of the first and fourth generator-motors 40 and 230 is referred to as "the speed-change shock control", similarly to the sixth embodiment.

Electric power is supplied to the first stator 41, for causing the first rotor 42 to perform normal rotation, and electric power is supplied to the fourth stator 232, for causing the first and second rotating magnetic fields, which are generated by the fourth stator 232 in accordance with the supply of the electric power, to perform normal rotation. As a consequence, torque transmitted from the first rotor 42 to the first ring gear 22, and the torque transmitted, as described hereafter, to the first sun gear 21 are combined, and the combined torque is transmitted to the first carrier 24. The torque transmitted to the first carrier 24 is transmitted to the B1 rotor 231 without being transmitted to the crankshaft 3a, by the above-mentioned disconnection by the transmission 310. Further, this torque is combined with the second driving equivalent torque TSE2 from the fourth stator 232, and then is transmitted to the B2 rotor 233. Part of the torque transmitted to the B2 rotor 233 is transmitted to the first sun 21, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, and therefore it is possible to improve marketability. It should be noted that this speed-change shock control is performed only during the speed-changing operation of the transmission 310. In addition, according to the present embodiment, it is possible to obtain the same advantageous effects as provided by the twelfth embodiment.

Figure 74:
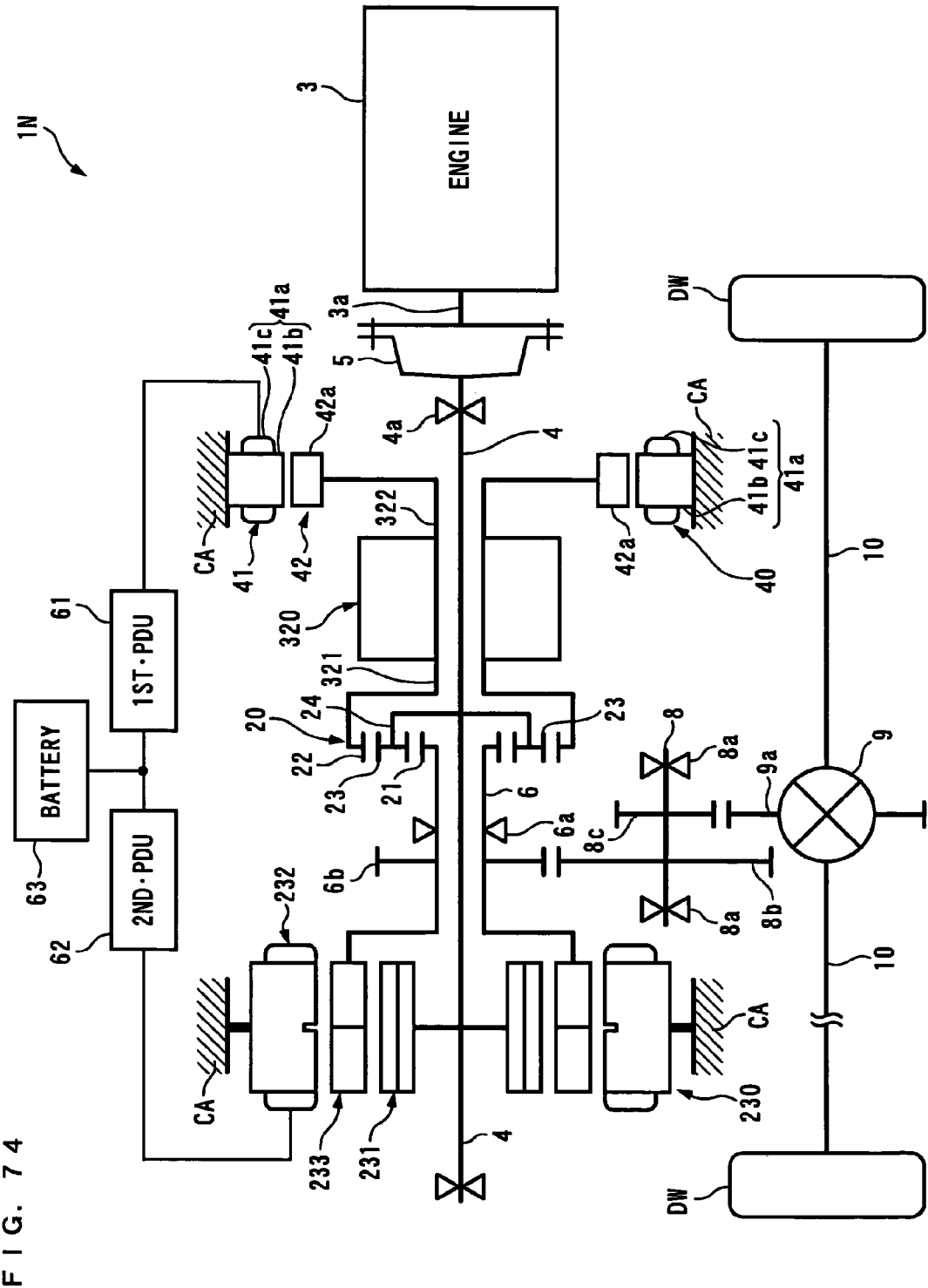
FIG. 74 A schematic view of an internal combustion engine, first and fourth generator-motors etc. of a power plant according to a fifteenth embodiment.

In the power plant 1N according to the fifteenth embodiment shown in FIG. 74, differently from the twelfth embodiment, the second main shaft 7 is not provided, and the first gear 8b is in mesh with the gear 6b integrally formed with the connection shaft 6, whereby the first sun gear 21 and the B2 rotor 233 are mechanically connected to the drive wheels DW and DW via the connection shaft 6, the gear 6b, the first gear 8*b*, the idler shaft 8, the second gear 8*c*, the gear 9*a*, the differential gear mechanism 9, and so forth, without via the transmission 320.

The transmission 320 is a gear-type stepped transmission which is configured similarly to the transmission 260 according to the seventh embodiment and has speed positions of the first to third speeds. The transmission 320 includes an input shaft 321 directly connected to the first ring gear 22 via a flange, and an output shaft 322 directly connected to the first rotor 42 via the flange, and transmits power input to the input shaft 321 to the output shaft 322 while changing the speed of the power. Furthermore, a change between the speed positions of the transmission 320 is controlled by the ECU 2. As described above, the first ring gear 22 is mechanically connected to the first rotor 42 via the transmission 320, and power transmitted to the first ring gear 22 is transmitted to the first rotor 42 while having the speed thereof changed by the transmission 320.

In the power plant 1N configured as above, when a very large torque is transmitted to the first rotor 42, e.g. during the EV standing start and the ENG-based standing start, the speed position of the transmission 320 is controlled to the third speed (transmission gear ratio <1.0). Thus, the torque transmitted to the first ring gear 22 is reduced by the transmission 320, and then is transmitted to the first rotor 42. In accordance therewith, the electric power generated by the first generator-motor 40 is controlled such that the torque transmitted to the first rotor 42 becomes smaller. Further, at the time of the above-described ENG start during stoppage of the vehicle (see FIG. 14 and FIG. 47), the speed position of the transmission 320 is controlled to the third speed (transmission gear ratio <1.0). In this case, the input shaft 321 and the output shaft 322 are connected to the first ring gear 22 and the first rotor 42, respectively, so that through the above-described control of the transmission 320, at the time of the above-described ENG start during stoppage of the vehicle, the torque from the first generator-motor 40 is increased, and is transmitted to the crankshaft 3*a* via the first ring gear 22, the first planetary gears 23 and the first carrier 24. In accordance therewith, the electric power supplied to the first generator-motor 40 is controlled such that the power from the first generator-motor 40 becomes smaller. From the above, according to the present embodiment, it is possible to further reduce the size and costs of the first generator-motor 40.

Further, during the EV standing start and the like, even when the speed position of the transmission 320 is controlled as described above, the magnitude of the power transmitted from the first ring gear 22 to the first rotor 42 is not changed, and when the electric power generated by the first generator-motor 40 is transmitted to the B2 rotor 233 via the fourth stator 232 as power, the torque transmitted to the drive wheels DW and DW via the B2 rotor 233 can be controlled to have a desired magnitude. This makes it possible to transmit torque having a sufficient magnitude to the drive wheels DW and DW.

Further, when the first rotor rotational speed VRO1, which is determined by the relationship between the engine speed NE and the vehicle speed VP, becomes too high, e.g. during rapid acceleration of the vehicle in which the engine speed NE is higher than the vehicle speed VP, the speed position of the transmission 320 is controlled to the first speed (transmission gear ratio >1.0). This makes it possible to reduce the first rotor rotational speed VRO1 with respect to the first ring gear rotational speed VRI1 which is determined by the relationship between the engine speed NE and vehicle speed VP assumed at the time, thereby making it possible to prevent failure of the first generator-motor 40 due to an excessive increase in the first rotor rotational speed VRO1.

Furthermore, during traveling of the vehicle, the speed position of the transmission 320 is controlled such that the first rotor rotational speed VRO1 becomes equal to a predetermined target value. This target value is calculated by searching a map according to the vehicle speed VP when only the first and fourth generator-motors 40 and 230 are used as power sources, whereas when the engine 3 and the first and fourth generator-motors 40 and 230 are used as power sources, the target value is calculated by searching a map other than the above-mentioned map according to the engine speed NE and the vehicle speed VP. Further, in these maps, the target value is set to a value that will make it possible to obtain high efficiency of the first generator-motor 40 with respect to the vehicle speed VP (and engine speed NE) assumed at the time. Furthermore, in parallel with the above control of the transmission 320 as described above, the first rotor rotational speed VRO1 is controlled to the above-described target value. Thus, according to the present embodiment, during traveling of the vehicle, it is possible to obtain the high efficiency of the first generator-motor 40.

Further, when the vehicle is traveling using the engine 3 as a power source, e.g. as in the battery input/output zero mode, during the speed-changing operation of the transmission 320, the gear trains of the transmission 320 and the input shaft 321 and output shaft 322 thereof are disconnected from each other to thereby disconnect between the first rotor 42 and the first ring gear 22, whereby the engine torque TENG ceases to act on the first rotor 42. Therefore, no electric power is generated by the first stator 41, and the fourth stator 232 is supplied with electric power from the battery 63.

As a consequence, according to the present embodiment, during the speed-changing operation of the transmission 320, the second driving equivalent torque TSE2 from the fourth stator 232 and part of the engine torque TENG transmitted to the B1 rotor 231 are combined, and the combined torque is transmitted to the drive wheels DW and DW via the B2 rotor 233. This makes it possible to suppress a speed-change shock, which can be caused by interruption of transmission of the engine torque TENG to the drive wheels DW and DW, and therefore it is possible to improve marketability.

Further, by using the first and fourth generator-motors 40 and 230, it is possible to transmit the engine power WENG to the drive wheels DW and DW while steplessly changing the speed thereof, so that it is possible to reduce the frequency of the speed-changing operation of the transmission 320. This makes it possible to enhance the driving efficiency of the power plant 1N. In addition, according to the present embodiment, it is possible to obtain the same advantageous effects as provided by the twelfth embodiment.

Figure 75:
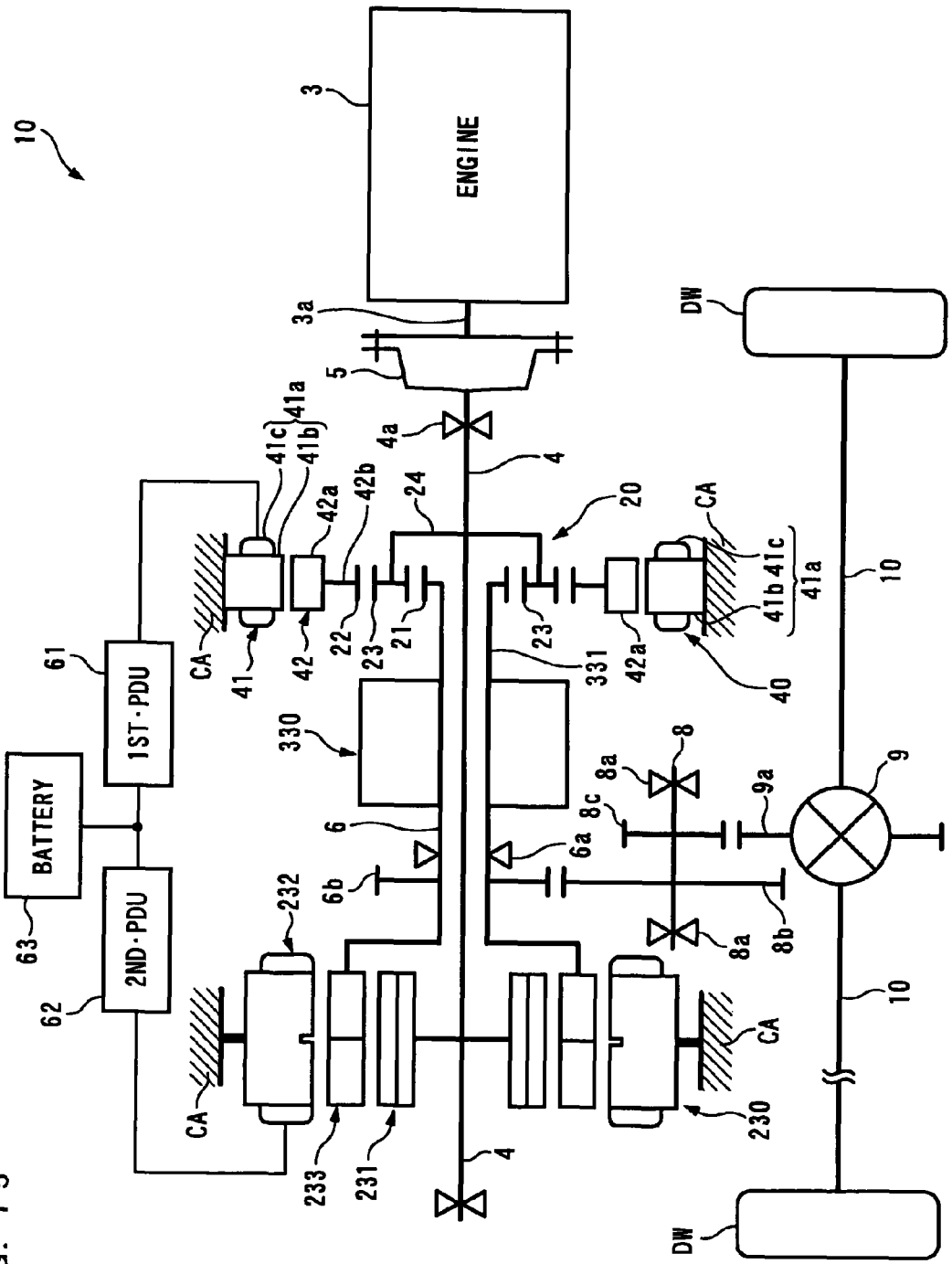
FIG. 75 A schematic view of an internal combustion engine, first and fourth generator-motors etc. of a power plant according to a sixteenth embodiment.

In the power plant 10 according to the sixteenth embodiment shown in FIG. 75, similarly to the fifteenth embodiment, the second main shaft 7 is not provided, and the first gear 8*b* is in mesh with the gear 6*b* integrally formed with the connection shaft 6. Further, the transmission 330 is a gear-type stepped transmission which is configured similarly to the transmission 260 according to the seventh embodiment and has speed positions of the first to third speeds. The transmission 330 includes an input shaft 331 directly connected to the first sun gear 21, and an output shaft (not shown) directly connected to the connection shaft 6, and transmits power input to the input shaft 331 to the output shaft while changing the speed of the power. Furthermore, a change between the speed positions of the transmission 330 is controlled by the ECU 2.

As described above, the first sun gear 21 is mechanically connected to the drive wheels DW and DW via the transmission 330, the connection shaft 6, the gear 6b, the first gear 8b, and so forth. Further, the power transmitted to the first sun gear 21 is transmitted to the drive wheels DW and DW while having the speed thereof changed by the transmission 330. Furthermore, the B2 rotor 233 is mechanically connected to the drive wheels DW and DW via the connection shaft 6, the gear 6b, the first gear 8b, and so forth, without via the transmission 330.

In the power plant 10 configured as above, in such a case as a very large torque is transmitted from the first sun gear 21 to the drive wheels DW and DW, e.g. during the ENG-based standing start, the speed position of the transmission 330 is controlled to the first speed (transmission gear ratio >1.0). Thus, the torque transmitted to the first sun gear 21 is increased by the transmission 330, and then is transmitted to the drive wheels DW and DW. In accordance therewith, the electric power generated by the first generator-motor 40 is controlled such that torque distributed to the first sun gear 21 and the first ring gear 22 becomes smaller. As a consequence, according to the present embodiment, the torque distributed to the first sun gear 21 and the first ring gear 22 via the first carrier 24 can be made smaller, and hence it is possible to further reduce the size and costs of the first planetary gear unit 20. In addition to this, since torque transmitted from the first ring gear 22 to the first rotor 42 can be made smaller, it is possible to further reduce the size and costs of the first generator-motor 40.

Further, in such a case as the first rotor rotational speed VRO1 becomes too high, e.g. during rapid acceleration of the vehicle in which the engine speed NE is higher than the vehicle speed VP, the speed position of the transmission 330 is controlled to the first speed. As a consequence, according to the present embodiment, the first sun gear rotational speed VSU1 is increased with respect to the vehicle speed VP, whereby as is clear from FIG. 71, it is possible to reduce the first rotor rotational speed VRO1, so that it is possible to prevent failure of the first generator-motor 40 due to an excessive increase in the first rotor rotational speed VRO1.

Furthermore, during the EV traveling and traveling of the vehicle including the traveling in the battery input/output zero mode, the speed position of the transmission 330 is controlled such that the first rotor rotational speed VRO1 becomes equal to a predetermined target value. This target value is calculated by searching a map according to the vehicle speed VP when only the first and fourth generator-motors 40 and 230 are used as power sources, whereas when the engine 3 and the first and fourth generator-motors 40 and 230 are used as power sources, the target value is calculated by searching a map other than the above-mentioned map according to the engine speed NE and the vehicle speed VP. Further, in these maps, the target value is set to a value that will make it possible to obtain high efficiency of the first generator-motor 40 with respect to the vehicle speed VP (and engine speed NE) assumed at the time. Furthermore, in parallel with the above control of the transmission 330 as described above, the first rotor rotational speed VRO1 is controlled to the above-described target value. Thus, according to the present embodiment, during traveling of the vehicle, it is possible to obtain the high efficiency of the first generator-motor 40.

Further, when the vehicle is traveling using the engine 3 as a power source, and at the same time the transmission 330 is performing a speed-changing operation, the gear trains of the transmission 330 and the input shaft 331 and output shaft thereof are disconnected from each other to thereby disconnect between the first sun gear 21 and the drive wheels DW and DW, whereby the load of the drive wheels DW and DW ceases to act on the first sun gear 21. Therefore, no electric power is generated by the first generator-motor 40 during the speed-changing operation of the transmission 330, and the fourth stator 232 is supplied with electric power from the battery 63.

As a consequence, according to the present embodiment, during the speed-changing operation of the transmission 330, the second driving equivalent torque TSE2 and part of the engine torque TENG transmitted to the B1 rotor 231 are combined, and the combined torque is transmitted to the drive wheels DW and DW via the B2 rotor 233. This makes it possible to suppress a speed-change shock, which can be caused by interruption of transmission of the engine torque TENG to the drive wheels DW and DW, thereby making it possible to improve marketability.

Further, by using the first and fourth generator-motors 40 and 230, it is possible to transmit the engine power WENG to the drive wheels DW and DW while steplessly changing the speed thereof, so that it is possible to reduce the frequency of the speed-changing operation of the transmission 330. This makes it possible to enhance the driving efficiency of the power plant 1O. In addition to this, according to the present embodiment, it is possible to obtain the same advantageous effects as provided by the twelfth embodiment.

It should be noted that although in the fourteenth to sixteenth embodiments, the transmissions 310 to 330 are gear-type stepped transmissions, it is to be understood that belt-type, toroidal-type or hydraulic-type stepless transmission may be employed.

Figure 76:
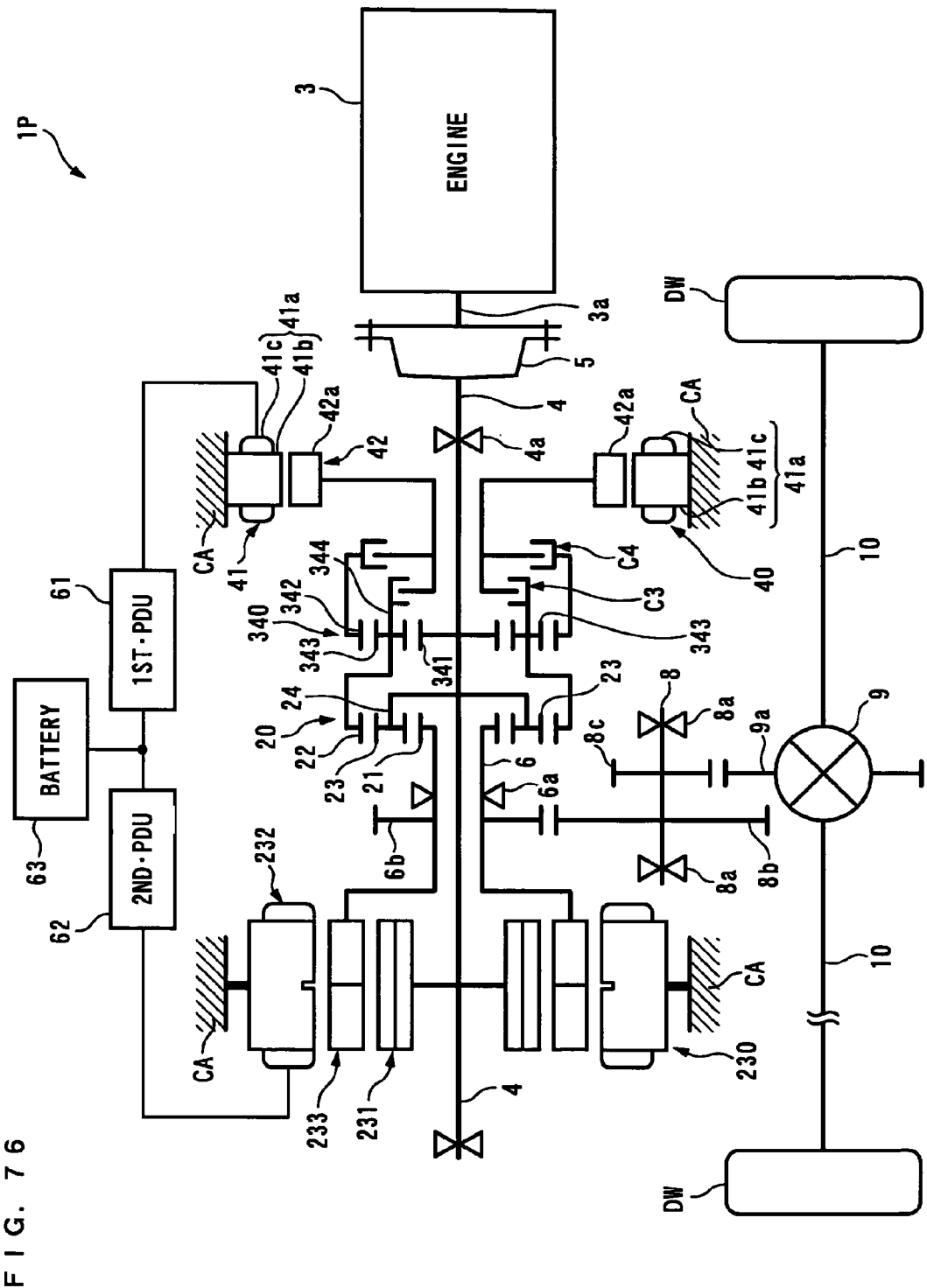
FIG. 76 A schematic view of an internal combustion engine, first and fourth generator-motors etc. of a power plant according to a seventeenth embodiment.

Next, a power plant 1P according to a seventeenth embodiment of the present invention will be described with reference to FIG. 76. This power plant 1P is distinguished from the twelfth embodiment in that it further includes a transmission for changing a ratio between the speed difference between the first rotor rotational speed VRO1 and the vehicle speed VP and the speed difference between the vehicle speed VP and the engine speed NE. In FIG. 76, the component elements identical to those of the twelfth embodiment are denoted by the same reference numerals. The following description is mainly given of different points from the twelfth embodiment.

Referring to FIG. 76, in this power plant 1P, similarly to the fifteenth embodiment, the second main shaft 7 is not provided, and the first gear 8b is in mesh with the gear 6b integrally formed with the connection shaft 6, whereby the first sun gear 21 and the B2 rotor 233 are mechanically connected to the drive wheels DW and DW via the connection shaft 6, the gear 6b, the first gear 8b, the differential gear mechanism 9, and so forth.

The above-described transmission includes a fourth planetary gear unit 340, a third clutch C3 and a fourth clutch C4. The fourth planetary gear unit 340 is configured similarly to the first planetary gear unit 20, and includes a fourth sun gear 341, a fourth ring gear 342, and a fourth carrier 344 rotatably supporting a plurality of fourth planetary gears 343 in mesh with the two gears 341 and 342. The fourth sun gear 341 is integrally concentrically fitted on the first main shaft 4, whereby the fourth sun gear 341 is mechanically directly connected to the first carrier 24, the crankshaft 3a and the B1 rotor 231. Further, the fourth carrier 344 is mechanically directly connected to the first ring gear 22 via a flange and a hollow shaft, whereby the fourth carrier 344 is rotatable in unison with the first ring gear 22. Hereinafter, the rotational speeds of the fourth sun gear 341, the fourth ring gear 342 and the fourth carrier 344 are referred to as "the fourth sun gear rotational speed VSU4, "the fourth ring gear rotational speed VRI4" and "the fourth carrier rotational speed VCA4", respectively.

The above-described third clutch C3 is formed e.g. by a friction multiple disk clutch, similarly to the above-mentioned first clutch C1, and is disposed between the fourth carrier 344 and the first rotor 42. That is, the fourth carrier 344 is mechanically directly connected to the first rotor 42 via the third clutch C3. Further, the degree of engagement of the third clutch C3 is controlled by the ECU 2, to thereby connect and disconnect between the fourth carrier 344 and the first rotor 42.

The above-mentioned fourth clutch C4 is formed by a friction multiple disk clutch, similarly to the third clutch C3, and is disposed between the fourth ring gear 342 and the first rotor 42. That is, the fourth ring gear 342 is mechanically directly connected to the first rotor 42 via the fourth clutch C4. Further, the degree of engagement of the fourth clutch C4 is controlled by the ECU 2, to thereby connect and disconnect between the fourth ring gear 342 and the first rotor 42.

FIG. 77(a) shows a speed diagram showing an example of the relationship between the first sun gear rotational speed VSU1, the first carrier rotational speed VCA1 and the first ring gear rotational speed VRI1, together with a speed diagram showing an example of the relationship between the fourth sun gear rotational speed VSU4, the fourth carrier rotational speed VCA4 and the fourth ring gear rotational speed VRI41. In FIG. 77(a), P designates a value obtained by dividing the number of the gear teeth of the first ring gear 22 by that of the gear teeth of the first sun gear 21, and Q designates a value obtained by dividing the number of the gear teeth of the fourth sun gear 341 by that of the gear teeth of the fourth ring gear 342.

As described above, since the first carrier 24 and the fourth sun gear 341 are directly connected to each other, the first carrier rotational speed VCA1 and the fourth sun gear rotational speed VSU4 are equal to each other, and since the first ring gear 22 and the fourth carrier 344 are directly connected to each other, the first ring gear rotational speed VRI1 and the fourth carrier rotational speed VCA4 are equal to each other. Therefore, the two speed diagrams concerning the first and fourth planetary gear units 20 and 340 shown in FIG. 77(a) can be represented by a single speed diagram as shown in FIG. 77(b). As shown in FIG. 77(b), four rotary elements of which rotational speeds are in a collinear relationship with each other are formed by connecting the elements of the first and fourth planetary gear units 20 and 340, as described above.

Figure 78:
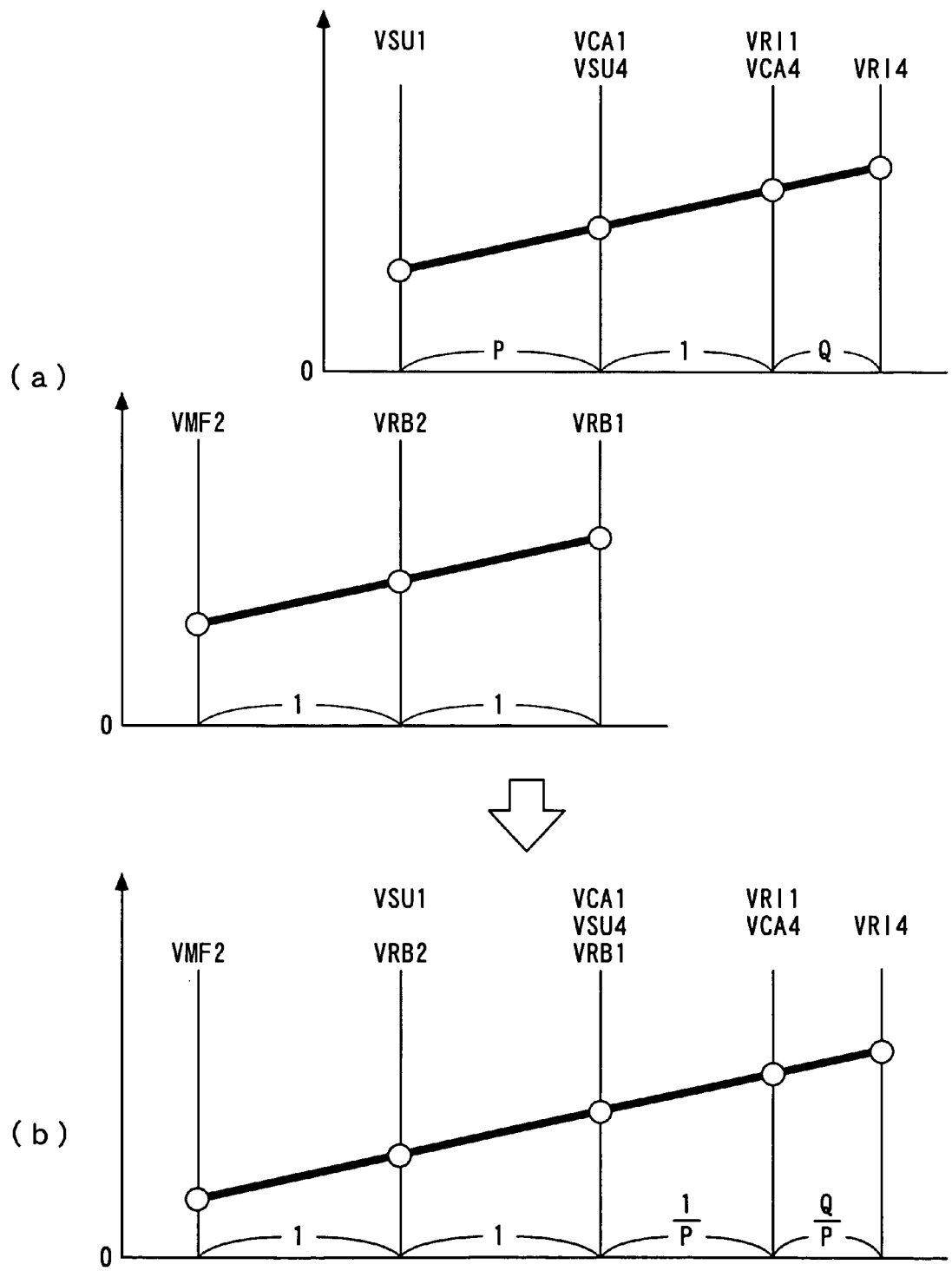
FIG. 78 (a) A speed diagram of the rotational speeds of the four rotary elements formed by connecting the first and fourth planetary gear units, by way of example, depicted together with a speed diagram of the second magnetic field rotational speed VMF2, and the B1 and B2 rotor rotational speeds VRB1 and VRB2, shown by way of example; and (b) a speed diagram of the rotational speeds of the five rotary elements formed by connecting the first and fourth planetary gear units and the fourth generator-motor, shown by way of example.

Further, FIG. 78(a) shows a speed diagram showing an example of the relationship between the rotational speeds of the above-described four rotary elements together with a speed diagram showing an example of the relationship between the second magnetic field rotational speed VMF2 and the B1 and B2 rotor rotational speeds VRB1 and VRB2. As described hereinabove, the difference between the second magnetic field rotational speed VMF2 and the B2 rotor rotational speed VRB2 is equal to the difference between the B2 rotor rotational speed VRB2 and the B1 rotor rotational speed VRB1, so that a ratio between the distance from a vertical line representing the second magnetic field rotational speed VMF2 to a vertical line representing the B2 rotor rotational speed VRB2 and the distance from a vertical line representing the B2 rotor rotational speed VRB2 to a vertical line representing the B1 rotor rotational speed VRB1 is 1:1.

As described above, since the first carrier 24 and the B1 rotor 231 are directly connected to each other, the first carrier rotational speed VCA1 and the B1 rotor rotational speed VRB1 are equal to each other. Further, since the first sun gear 21 and the B2 rotor 233 are directly connected to each other, the first sun gear rotational speed VSU1 and the B2 rotor rotational speed VRB2 are equal to each other. Therefore, the two speed diagrams shown in FIG. 78(a) can be represented by a single speed diagram as shown in FIG. 78(b).

Further, since the crankshaft 3a, the first carrier 24, the B1 rotor 231 and the fourth sun gear 341 are directly connected to each other, the engine speed NE, the first carrier rotational speed VCA1, the B1 rotor rotational speed VRB1 and the fourth sun gear rotational speed VSU4 are equal to each other. Furthermore, since the drive wheels DW and DW, the first sun gear 21 and the B2 rotor 233 are connected to each other, if a change in speed by the differential gear mechanism 9 and the like is ignored, the vehicle speed VP, the first sun gear rotational speed VSU1 and the B2 rotor rotational speed VRB2 are equal to each other.

Further, the first rotor 42 is directly connected to the fourth carrier 344 and the fourth ring gear 342 via the third and fourth clutches C3 and C4, respectively, and hence when the third clutch C3 is engaged and the fourth clutch C4 is disengaged (hereinafter, such an engaged and disengaged state of the clutches is referred to as "the third speed change mode"), the first rotor rotational speed VRO1 and the fourth carrier rotational speed VCA4 are equal to each other. Furthermore, when the third clutch C3 is disengaged and the fourth clutch C4 is engaged (hereinafter, such an engaged and disengaged state of the clutches is referred to as "the fourth speed change mode"), the first rotor rotational speed VRO1 and the fourth ring gear rotational speed VRI4 are equal to each other.

From the above, the first rotor rotational speed VRO1, the engine speed NE, the vehicle speed VP, and the second magnetic field rotational speed VMF2 are in a collinear relationship (linear relationship) as shown e.g. in FIG. 79(a) in the third speed change mode, whereas in the fourth speed change mode, they are in a collinear relationship as shown e.g. in FIG. 79(b).

As shown in FIGS. 79(a) and 79(b), the distance between a vertical line representing the vehicle speed VP and a vertical line representing the first rotor rotational speed VRO1 is shorter in the aforementioned third speed change mode than in the fourth speed change mode, and therefore a ratio between a rotational difference DN4 between the first rotor rotational speed VRO1 and the vehicle speed VP and a rotational difference DN3 between the engine speed NE and the vehicle speed VP (hereinafter referred to as "the rotational ratio DN4/DN3) is smaller in the third speed change mode.

In the power plant 1P configured as above, in such a case as the first rotor rotational speed VRO1, which is determined by the relationship between the engine speed NE and the vehicle speed VP, becomes too high, e.g. during rapid acceleration of the vehicle in which the engine speed NE is higher than the vehicle speed VP, the third speed change mode is used. As a consequence, according to the present embodiment, as is clear from the relationship of the above-mentioned rotational ratio DN4/DN3, the first rotor rotational speed VRO1 can be made lower than when the fourth speed change mode is used, so that it is possible to prevent failure of the first generator-motor 40 due to an excessive increase in the first rotor rotational speed VRO1.

Further, during the aforementioned EV standing start and at the same time in the third speed change mode, the relationship between torque (indicated by the arrows B in FIG. 3, hereinafter referred to as "the first generator-motor torque") TM1 transmitted from the first generator-motor 40 to the first carrier 24, the foot axis drive torque TDRDW transmitted to the drive wheels DW and DW, and the second driving equivalent torque TSE2 by the fourth generator-motor 230 is expressed e.g. by the following equations (32) and (33):

$$TM1 + TSE2 = TDRDW \quad (32)$$

$$TM1 = TDRDW/(2+1/P) \quad (33)$$

On the other hand, in the fourth speed change mode, the above-described relationship between the parameters is expressed e.g. by the following equations (34) and (35):

$$TM1 + TSE2 = TDRDW \quad (34)$$

$$TM1 = TDRDW/(2+1/P+Q/P) \quad (35)$$

As is clear from comparison between the above equations (33) and (35), the first generator-motor torque TM1 is smaller in the fourth speed change mode with respect to the foot axis drive torque TDRDW having an identical magnitude. Therefore, during the EV standing start, that is, when a very large torque is transmitted from the first generator-motor 40 to the drive wheels DW and DW, the fourth speed change mode is used.

Further, during traveling of the vehicle using the power of the engine 3, and at the same time in the third speed change mode, the relationship between the engine torque TENG, the aforementioned first electric power-generating torque TGM1 transmitted to the first generator-motor 40, the foot axis drive torque TDRDW, and the second driving equivalent torque TSE2 is expressed e.g. by the following equations (36) and (37):

$$TENG + TSE2 = TDRDW + TGE1 \quad (36)$$

$$TGM1 = (2 \times TENG - TDRDW)/(2+1/PM) \quad (37)$$

On the other hand, in the fourth speed change mode, the above-described relationship between the parameters is expressed e.g. by the following equations (38) and (39):

$$TENG + TSE2 = TDRDW + TGM1 \quad (38)$$

$$TGM1 = (2 \times TENG - TDRDW)/(2+1/P+Q/P) \quad (39)$$

As is clear from comparison between the above equations (37) and (39), the first electric power-generating torque TGM1 is smaller in the fourth speed change mode with respect to the engine torque TENG and the foot axis drive torque TDRDW which having respective identical magnitudes. Therefore, when the vehicle is traveling using the power of the engine 3, to transmit a very large torque to the first rotor 42, e.g. during ascending a slope or during the ENG-based standing start, the fourth speed change mode is employed.

Furthermore, at the time of the ENG start during stoppage of the vehicle, and at the same time in the first speed change mode, the relationship between torque TCRK transmitted to the engine 3 (hereinafter referred to as "the engine transmitting torque"), the first generator-motor torque TM1, and torque TS4 transmitted from the fourth stator 232 to the B2 rotor 233 (hereinafter referred to as "the fourth stator torque") is expressed e.g. by the following equations (40) and (41):

$$TCRK = TM1 + TS4 \quad (40)$$

$$TM1 = (2 \times TCRK)/(2+1/P) \quad (41)$$

On the other hand, in the fourth speed change mode, the above-described relationship between the parameters is expressed e.g. by the following equations (42) and (43):

$$TCRK = TM1 + TS4 \quad (42)$$

$$TM1 = (2 \times TCRK)/(2+1/P+Q/P) \quad (43)$$

As is clear from comparison between the above equations (41) and (43), the first generator-motor torque TM1 is smaller in the fourth speed change mode with respect to the engine transmitting torque TCRK having an identical magnitude. Therefore, at the time of the ENG start during stoppage of the vehicle, the fourth speed change mode is employed.

According to the present embodiment, the fourth speed change mode is employed, as described above, and the electric power generated by the first generator-motor 40 and the electric power supplied to the first generator-motor 40 are controlled based on the equation (35), the equation (39), or the equation (43). Therefore, both of the maximum value of the torque transmitted to the first generator-motor 40 and the maximum value of the torque required of the first generator-motor 40 can be made smaller, and further it is possible to further reduce the size and costs of the first generator-motor 40.

Further, during traveling of the vehicle, a speed change mode that will make it possible to obtain higher efficiency of the first generator-motor 40 is selected from the third and fourth speed change modes, according the vehicle speed VP during stoppage of the engine 3, and according to the vehicle speed VP and the engine speed NE during operation of the engine 3. Thus, according to the present embodiment, during traveling of the vehicle, it is possible to control the first rotor rotational speed VRO1 to an appropriate value, so that it is possible to obtain the high efficiency of the first generator-motor 40.

Furthermore, switching between the third and fourth speed change modes is performed when the fourth carrier rotational speed VCA4 and the fourth ring gear rotational speed VRI4 are equal to each other. As a consequence, according to the present embodiment, similarly to the aforementioned tenth embodiment, it is possible to smoothly switch between the third and fourth speed change modes while maintaining the respective rotations of the drive wheels DW and DW and the engine 3, and hence it is possible to ensure excellent drivability.

Further, during traveling of the vehicle using the power of the engine 3 and at the same time during transition between the third and fourth speed change modes, after both of the third and fourth clutches C3 and C4 are disengaged, and until one of the third and fourth clutches C3 and C4 is engaged, the first rotor 42 and the crankshaft 3a remain disconnected from each other, whereby the engine torque TENG does not act on the first rotor 42. Therefore, no electric power is generated by the first stator 41, and the fourth stator 232 is supplied with electric power from the battery 63.

As a result, according to the present embodiment, during the transition between the third and fourth speed change modes, even when both of the third and fourth clutches C3 and C4 are disengaged, similarly to the fifteenth embodiment, the second driving equivalent torque TSE2 and part of the engine torque TENG transmitted to the B1 rotor 231 are combined, and the combined torque is transmitted to the drive wheels DW and DW via the second rotor 233. This makes it possible to suppress a speed-change shock, which can be caused by interruption of transmission of the engine torque TENG to the drive wheels DW and DW, thereby making it possible to improve marketability. In addition, according to the present embodiment, it is possible to obtain the same advantageous effects as provided by the twelfth embodiment.

It should be noted that in the present embodiment, the fourth planetary gear unit 340 corresponds to the planetary gear unit in the invention as claimed in claim 18, and the fourth sun gear 341, the fourth ring gear 342, the fourth planetary gears 343, and the fourth carrier 344 correspond to the sun gear, the ring gear, the planetary gears, and the carrier in the invention as claimed in claim 18, respectively.

Further, although in the present embodiment, the fourth sun gear 341 is connected to the first carrier 24, and the fourth ring gear 342 is connected to the first rotor 42 via the fourth clutch C4, the above connecting relationships may be inverted, that is, the fourth ring gear 342 may be connected to the first carrier 24 while the fourth sun gear 341 may be connected to the first rotor 42 via the fourth clutch C4. Further, although in the present embodiment, the third and fourth clutches C3 and C4 are formed by friction multiple disk clutches, they may be formed e.g. by electromagnetic clutches.

Figure 80:
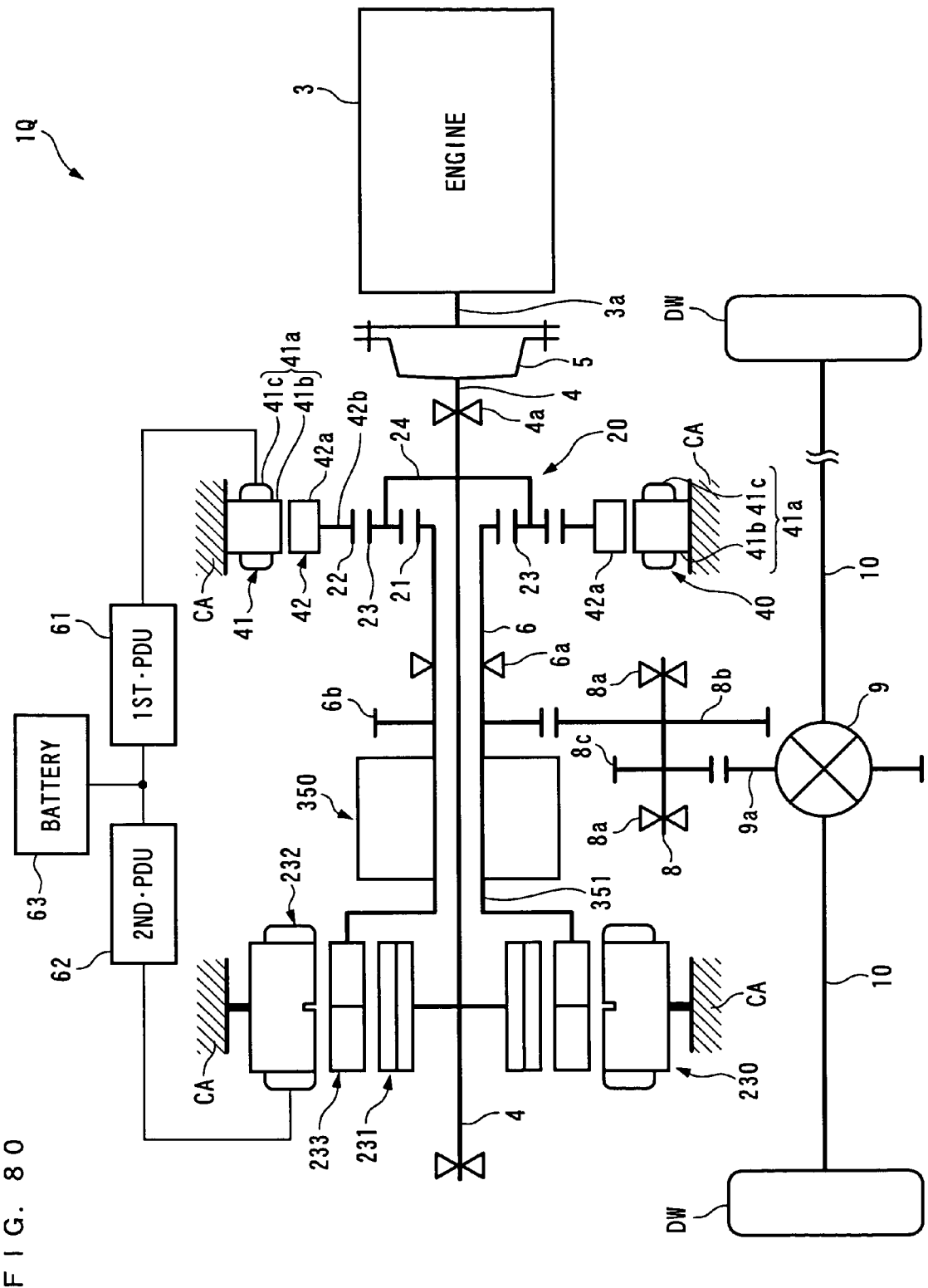
FIG. 80 A schematic view of an internal combustion engine, first and fourth generator-motors etc. of a power plant according to an eighteenth embodiment.

Next, a power plant 1Q according to an eighteenth embodiment of the present invention will be described with reference to FIG. 80. This power plant 1Q is distinguished from the twelfth embodiment in that it further includes a transmission 350. In FIG. 80, the component elements identical to those of the twelfth embodiment are denoted by the same reference numerals. The following description is mainly given of different points from the twelfth embodiment.

As shown in FIG. 80, similarly to the fifteenth to seventeenth embodiments, this power plant 1Q is not provided with the second main shaft 7, and the first gear 8b is in mesh with the gear 6b integrally formed with the connection shaft 6. Thus, the first sun gear 21 is mechanically connected to the drive wheels DW and DW via the connection shaft 6, the gear 6b, the first gear 8b, the differential gear mechanism 9, and so forth, without via the transmission 350.

Further, the transmission 350 is a gear-type stepped transmission which is configured similarly to the transmission 260 according to the seventh embodiment and has speed positions of the first to third speeds. The transmission 350 includes an input shaft 351 directly connected to the B2 rotor 233, and an output shaft (not shown) directly connected to the connection shaft 6, and transmits power input to the input shaft 351 to the output shaft while changing the speed of the power. Furthermore, a change between the speed positions of the transmission 350 is controlled by the ECU 2.

As described above, the B2 rotor 233 is connected to the drive wheels DW and DW via the transmission 350, the connection shaft 6, the gear 6b, the first gear 8b, and so forth. Power transmitted to the B2 rotor 233 is transmitted to the drive wheels DW and DW while having the speed thereof changed by the transmission 350.

In the power plant 1Q configured as above, in such a case as a very large torque is transmitted from the B2 rotor 233 to the drive wheels DW and D, e.g. during the EV standing start and the ENG-based standing start, the speed position of the transmission 350 is controlled to the first speed (transmission gear ratio >1.0). Thus, the B2 rotor transmission torque TRB2 transmitted to the B2 rotor 233 is increased by the transmission 350, and then is transmitted to the drive wheels DW and DW. In accordance therewith, electric power supplied to the second stator 232 is controlled such that the B2 rotor transmission torque TRB2 becomes smaller. As a consequence, according to the present invention, it is possible to make smaller the maximum value of torque required of the fourth generator-motor 230, thereby making it possible to further reduce the size and costs of the fourth generator-motor 230.

Further, in such a case as the B2 rotor rotational speed VRB2 becomes too high, e.g. during the high-vehicle speed operation in which the vehicle speed VP is very high, the speed position of the transmission 350 is controlled to the third speed (transmission gear ratio <1.0). Thus, according to the present embodiment, since the B2 rotor rotational speed VRB2 can be reduced with respect to the vehicle speed VP, it is possible to prevent failure of the second generator-motor 230 due to an excessive increase in the B2 rotor rotational speed VRB2.

Furthermore, during the EV traveling and traveling of the vehicle including the traveling in the battery input/output zero mode, the speed position of the transmission 350 is controlled such that the second magnetic field rotational speed VMF2 becomes equal to a predetermined target value. This target value is calculated by searching a map according to the vehicle speed VP when only the first and fourth generator-motors 40 and 230 are used as power sources, whereas when the engine 3 and the first and fourth generator-motors 40 and 230 are used as power sources, the target value is calculated by searching a map other than the above-mentioned map according to the engine speed NE and the vehicle speed VP. Further, in these maps, the target value is set to a value that will make it possible to obtain high efficiency of the fourth generator-motor 230 with respect to the vehicle speed VP (and engine speed NE) assumed at the time. Furthermore, in parallel with the above control of the transmission 350 as described above, the second magnetic field rotational speed VMF2 is controlled to the above-mentioned target value. As a consequence, according to the present embodiment, during traveling of the vehicle, it is possible to obtain the high efficiency of the fourth generator-motor 230.

Further, when the vehicle is running using the engine 3 as a power source, during the speed-changing operation of the transmission 350 (after the input shaft 351 and output shaft of the transmission 350 are disconnected from a gear train before being shifted to a desired transmission gear ratio and until the input shaft 351 and the output shaft are connected to a gear train shifted to the desired transmission gear ratio), that is, when the B2 rotor 233 and the drive wheels DW and DW are disconnected from each other by the transmission 350, as is clear from the state of transmission of torque described above with reference to FIG. 8, part of the engine torque TENG is transmitted to the drive wheels DW and DW via the first sun gear 21. As a consequence, according to the present embodiment, similarly to the seventeenth embodiment, during the speed-changing operation of the transmission 350, it is possible to suppress a speed-change shock, which can be caused by interruption of transmission of the engine torque TENG to the drive wheels DW and DW. This makes it possible to improve marketability.

Further, by using the first and fourth generator-motors 40 and 230, it is possible to transmit the engine power WENG to the drive wheels DW and DW while steplessly changing the speed thereof, so that it is possible to reduce the frequency of the speed-changing operation of the transmission 350. This makes it possible to enhance the driving efficiency of the power plant 1P. In addition, according to the present embodiment, it is possible to obtain the same advantageous effects as provided by the twelfth embodiment.

It should be noted that although in the present embodiment, the transmission 350 is a gear-type stepped transmission, it is to be understood that a belt-type, toroidal-type or hydraulic-type stepless transmission may be employed.

Figure 81:
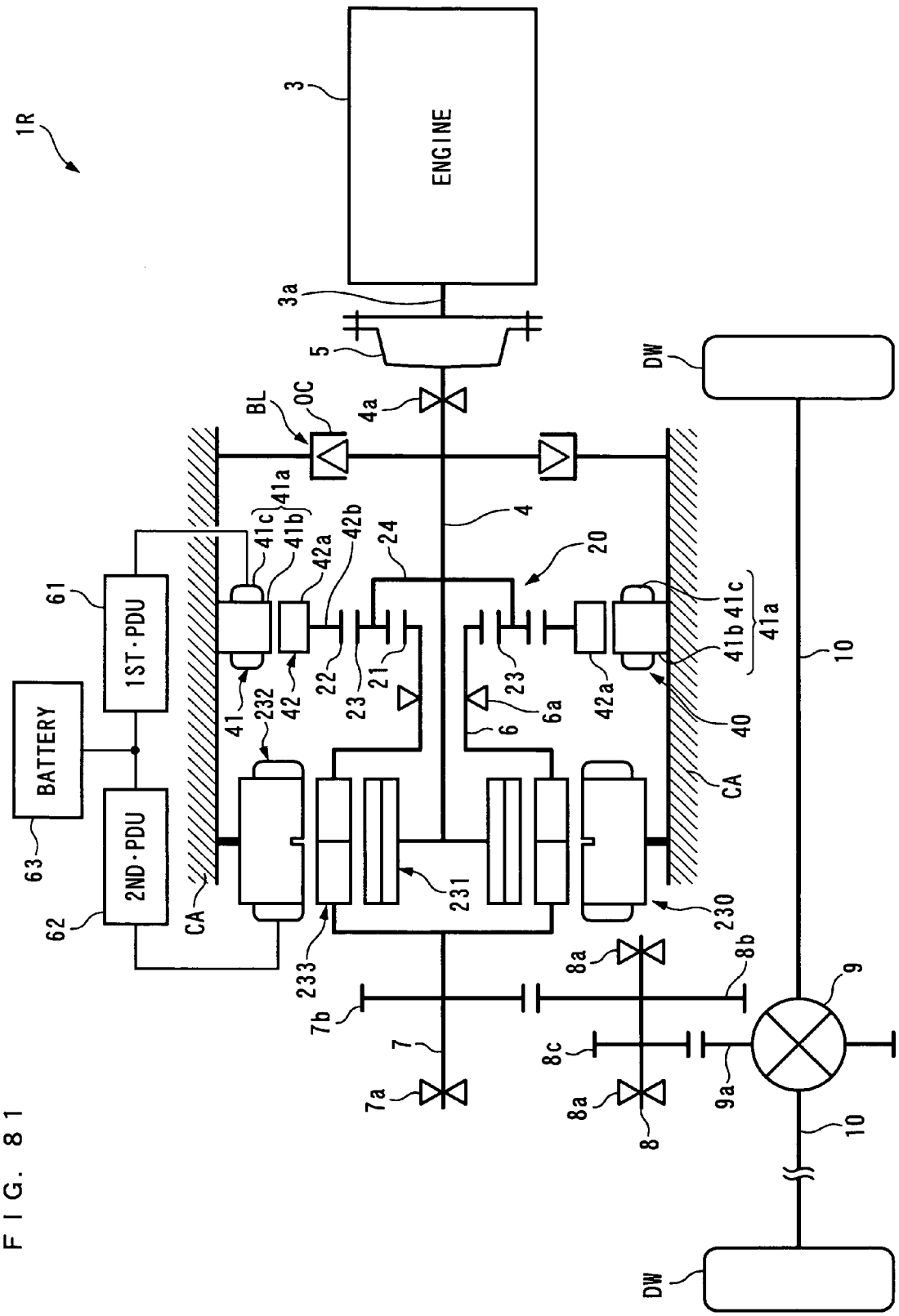
FIG. 81 A schematic view of an internal combustion engine, first and fourth generator-motors etc. of a power plant according to a nineteenth embodiment.
Figure 82:
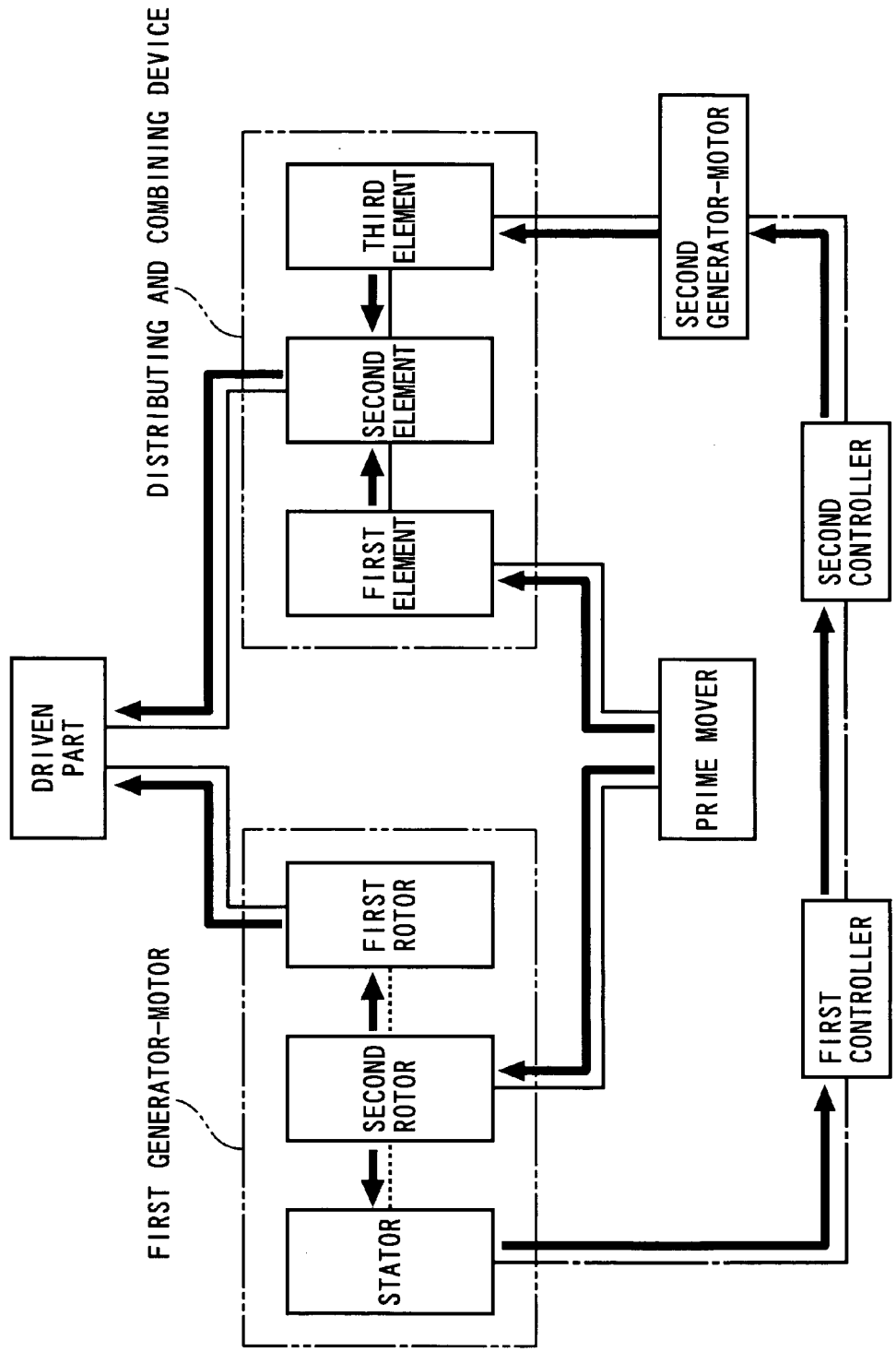
FIG. 82 A diagram which is useful in explaining an example of the operation of first power plant according to the invention as claimed in claim 8.
Figure 83:
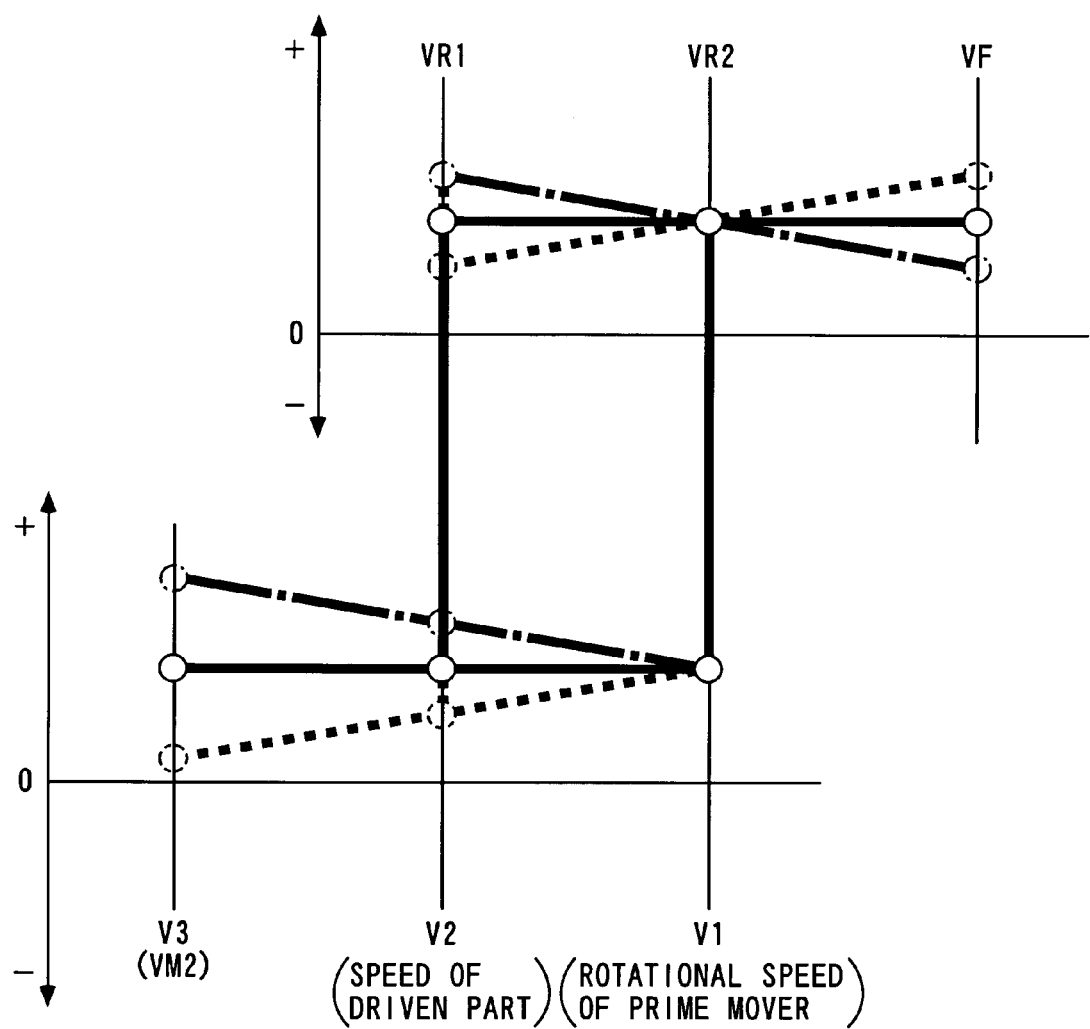
FIG. 83 A diagram which is useful in explaining a speed-changing operation of the first power plant according to the invention as claimed in claim 8.
Figure 84:
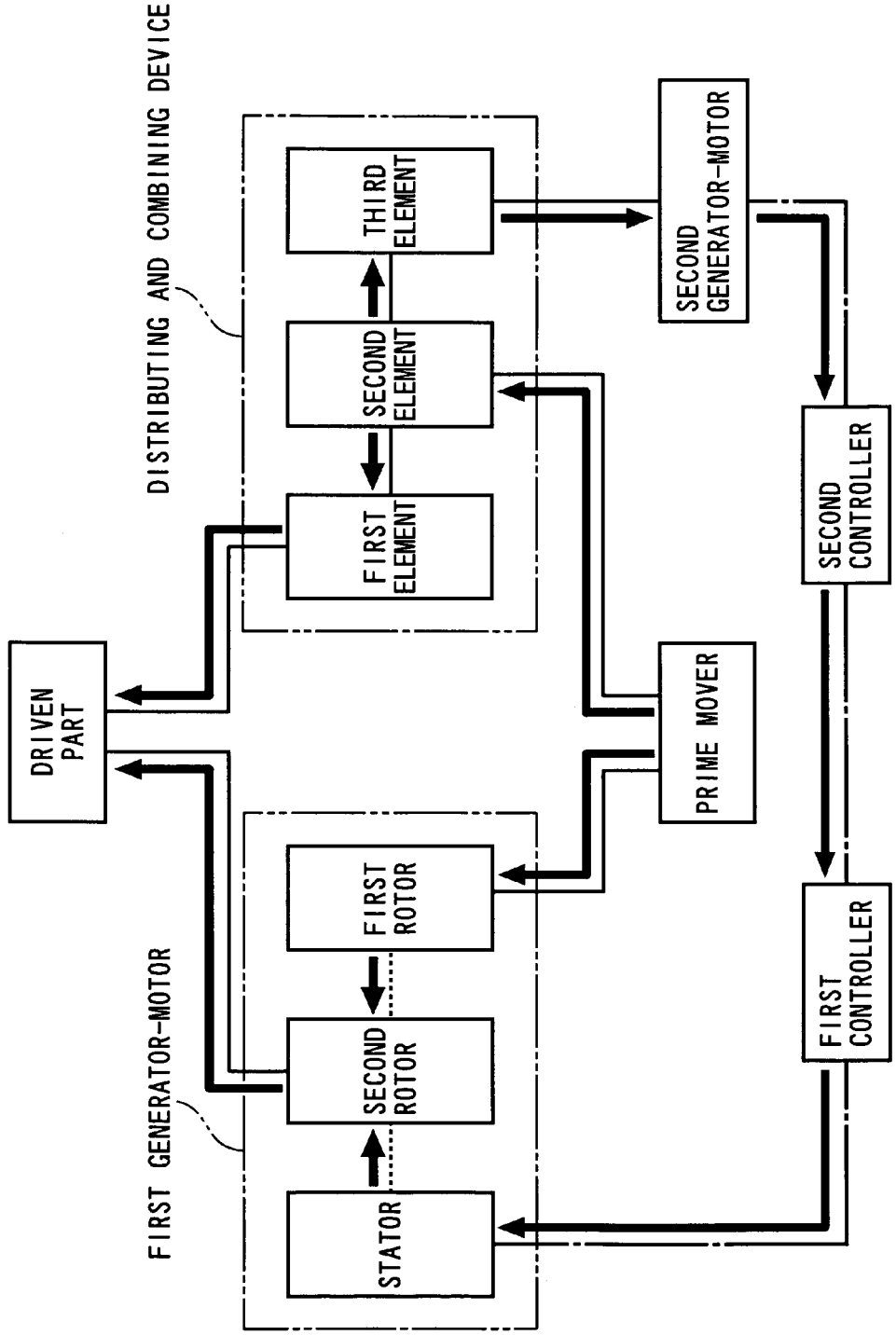
FIG. 84 A diagram which is useful in explaining an example of the operation of a second power plant according to the invention as claimed in claim 8.
Figure 85:
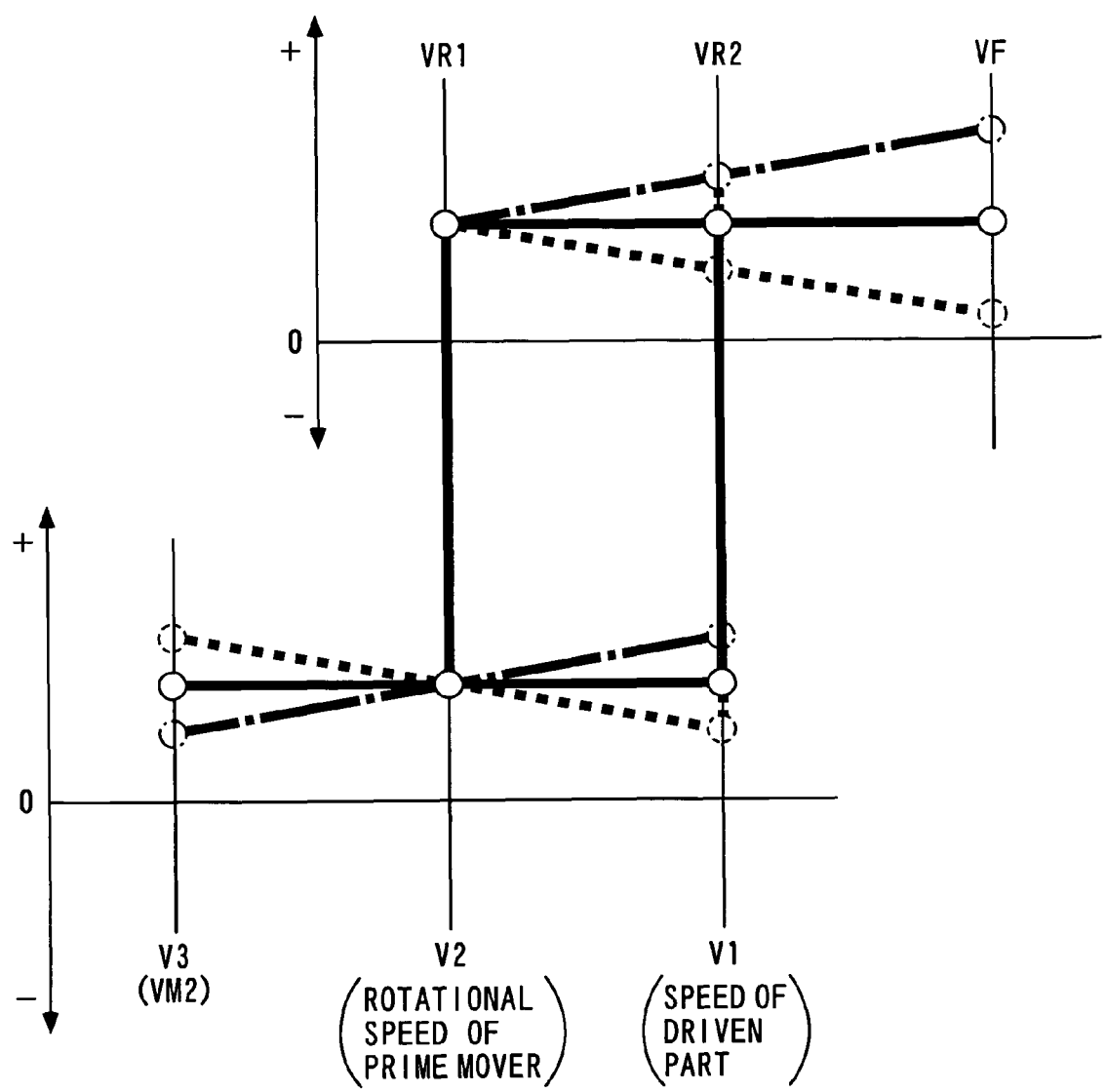
FIG. 85 A diagram which is useful in explaining a speed-changing operation of the second power plant according to the invention as claimed in claim 8.
Figure 87:
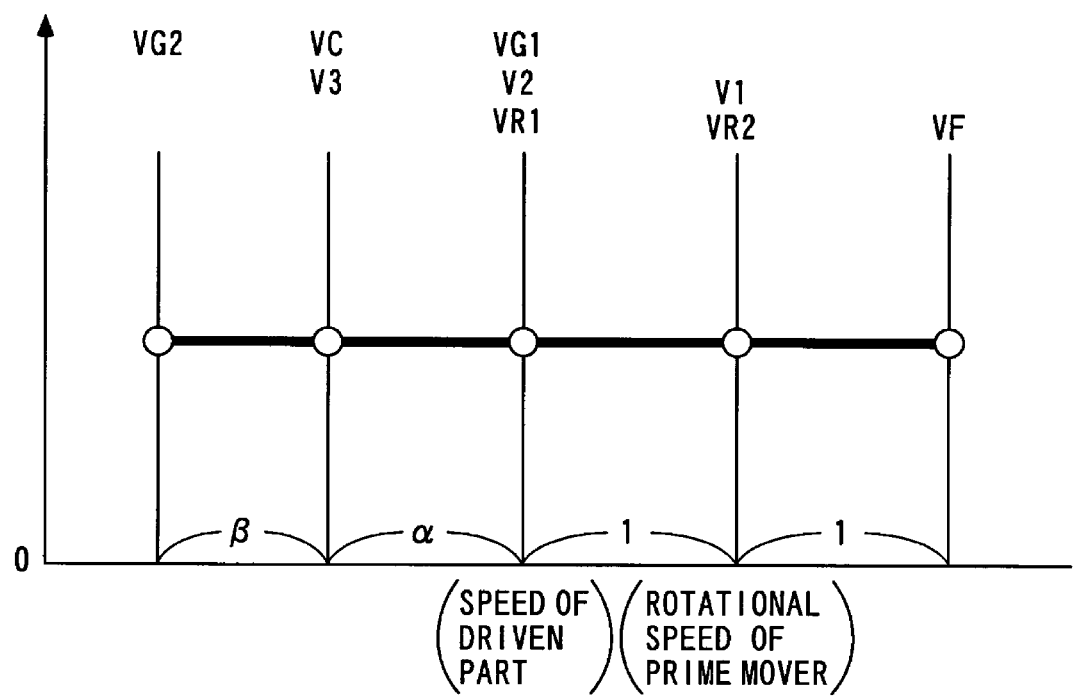
FIG. 87 A diagram useful in explaining switching between the first speed change mode and the second speed change mode of the power plant according to the invention as claimed in claim 15.

Next, a power plant 1R according to a nineteenth embodiment of the present invention will be described with reference to FIG. 81. As shown in the figure, this power plant 1R is constructed by adding the aforementioned brake mechanism BL to the power plant 1K according to the twelfth embodiment. The following description is mainly given of different points from the twelfth embodiment.

In the power plant 1R, the brake mechanism BL permits the first main shaft 4 to rotate only when it performs normal rotation together with the crankshaft 3a, the first carrier 24, and the B1 rotor 231, but blocks rotation of the first main shaft 4 when it performs reserve rotation together with the crankshaft 3a and so forth.

Further, the power plant 1R performs the aforementioned EV creep operation and EV standing start as follows: The power plant 1R supplies electric power to the first stator 41 to cause the first rotor 42 to perform reverse rotation together with the first ring gear 22, and supplies electric power to the fourth stator 232 to cause the first and second rotating magnetic fields generated by the fourth stator 232 in accordance with the supply of the electric power to perform normal rotation. Further, the power plant 1R controls the first rotor rotational speed VRO1 and the second magnetic field rotational speed VMF2 such that $2 \times |VRO1| = (1/P) \times |VMF2|$ holds. As described hereinabove, P designates a value obtained by dividing the number of the gear teeth of the first ring gear 22 by that of the gear teeth of the first sun gear 21. Furthermore, the electric power supplied to the first and fourth stators 41 and 232 is controlled such that sufficient torque is transmitted to the drive wheels DW and DW.

While the first ring gear 22 performs reverse rotation together with the first rotor 42, as described above, the reverse rotation of the first carrier 24 is blocked by the brake mechanism BL, as described above, so that the first generator-motor torque TM1 of the first generator-motor 40 is transmitted to the first sun gear 21 via the first ring gear 22 and the first planetary gears 23, and acts on the first sun gear 21 to cause the first sun gear 21 to perform normal rotation. Further, while the first and second rotating magnetic fields generated by the fourth stator 232 perform normal rotation, as described above, the reverse rotation of the B1 rotor 231 is blocked by the brake mechanism BL, so that as described heretofore using the aforementioned equation (8), torque having a magnitude twice as large as that of the second driving equivalent torque TSE2 is transmitted from the fourth stator 232 to the B2 rotor 233, and acts on the B2 rotor 233 to cause the same to perform normal rotation. Furthermore, the torques transmitted to the first sun gear 21 and the B2 rotor 233 are transmitted to the drive wheels DW and DW, for causing the drive wheels DW and DW to perform normal rotation.

Further, in this case, on the first carrier 24 and the B1 rotor 231, which are blocked from performing reverse rotation by the brake mechanism BL, torques act from the first rotor 42 and the fourth stator 232 through the control of the first and fourth generator-motors 40 and 230 such that the torques cause the first carrier 24 and the B1 rotor 231 to perform reverse rotation, respectively, whereby the crankshaft 3a, the first carrier 24 and the B1 rotor 231 are not only blocked from performing reverse rotation but also held at rest.

As described above, according to the present embodiment, it is possible to drive the drive wheels DW and DW by the first and fourth generator-motors 40 and 230 without using the engine power WENG. Further, during driving of drive wheels DW and DW, the crankshaft 3a is not only prevented from reverse rotation but also is held in a stopped state, and hence the crankshaft 3a does not drag the engine 3. In addition, it is possible to obtain the same advantageous effects as provided by the twelfth embodiment.

It should be noted that in the twelfth to nineteenth embodiments, the first and fourth generator-motors 40 and 230 correspond to the second and first generator-motors in the invention as claimed in claims 8 and 9 and 16 to 20, respectively, and the first planetary gear unit 20 corresponds to the distributing and combining device in the invention as claimed in claims 8 and 9 and 16 to 20. Further, the first rotor 42 corresponds to the second output portion in the invention as claimed in claims 8 and 9 and 16 to 20, and the fourth stator 232, and the B1 and B2 rotors 231 and 233 correspond to the stator and the first and second rotors in the invention as claimed in claims 8 and 9 and 16 to 20, respectively. The first sun gear 21, the first carrier 24, and the first ring gear 22 correspond to the first, second and third elements in the invention as claimed in claims 8 and 9 and 16 to 20, respectively. Furthermore, the ECU 2 and the 1st·PDU 61 correspond to the second controller in the invention as claimed in claims 8 and 9 and 16 to 20, and the ECU 2 and the 2nd·PDU 62 correspond to the first controller in the invention as claimed in claims 8 and 9 and 16 to 20. Further, in the fourth to nineteenth embodiments, the engine 3 and the crankshaft 3a correspond to the prime mover and the first output portion in the invention as claimed in claim 8, respectively, and the battery 63 corresponds to the electric power storage device in the invention as claimed in claim 9.

Furthermore, although in the twelfth to nineteenth embodiments, the first carrier 24 and the B1 rotor 231 are directly connected to each other, and the first sun gear 21 and the B2 rotor 233 are directly connected to each other, the first carrier 24 and the B1 rotor 231 are not necessarily required to be directly connected to each other insofar as they are connected to the crankshaft 3a. Further, the first sun gear 21 and the B2 rotor 233 are not necessarily required to be directly connected to each other insofar as they are connected to the drive wheels DW and DW. In this case, each of the transmissions 300 and 310 in the thirteenth and fourteenth embodiments may be formed by two transmissions, which are arranged as follows: One of the two transmissions forming the transmission 300 may be disposed between the first sun gear 21 and the drive wheels DW and DW, while the other thereof may be disposed between the B2 rotor 233 and the drive wheels DW and DW. Further, one of the two transmissions forming the transmission 310 may be disposed between the first carrier 24 and the crankshaft 3a, while the other thereof may be disposed between the B1 rotor 231 and the crankshaft 3a.

Further, although in the twelfth to nineteenth embodiments, the first sun gear 21 and the first ring gear 22 are connected to the drive wheels DW and DW and the first generator-motor 40, respectively, the above connecting relationships may be inverted, that is, the first ring gear 22 and the first sun gear 21 may be connected to the drive wheels DW and DW and the first generator-motor 40, respectively.

It should be note that the present invention is not limited to the embodiments described above, but it can be practiced in various forms. For example, it is to be understood that in the fifth to tenth embodiments and the thirteenth to eighteenth embodiments, the brake mechanism BL for blocking the reverse rotation of the crankshaft 3a may be provided. Further, although the brake mechanism BL is formed by the one-way clutch OC and the casing CA, the brake mechanism BL may be formed by another suitable mechanism, such as a hand brake, insofar as it is capable of blocking the reverse rotation of the crankshaft 3a.

Further, although in the fourth to nineteenth embodiments, the first and second planetary gear units 20 and 30 are used as the distributing and combining device in the invention as claimed in claim 8, any other suitable devices may be employed insofar as they have the following functions: They each have three elements, and have the function of distributing power input to one of the three elements to the other two elements, and the function of combining the power input to the other two elements, and then outputting the combined power to the above one element, the three elements rotating while maintaining a linear speed relationship therebetween during distribution and combining of the power. For example, such devices may be employed as have the functions equivalent to the planetary gear units, such as a plurality of rollers for transmitting power by friction between surfaces, instead of the gears of the planetary gear units. Furthermore, although detailed description thereof is omitted, such a device as is disclosed in Japanese Patent Application No. 2006-213905, may be employed which is implemented by a combination of a plurality of magnets and soft magnetic material elements. Further, a double pinion type planetary gear unit may be used as the distributing and combining device.

Further, although in the fourth to nineteenth embodiments, the first and second generator-motors 40 and 50 are DC motors, any other suitable devices, such as AC motors, may be employed insofar as they have the function of converting input electric power into power, and the function of converting input power into electric power. Further, although in the fourth to nineteenth embodiments, the first and second controllers in the invention as claimed in claim 8 are formed by the ECU 2, the 1st·PDU 61 and the 2nd·PDU 62, the first and second controllers are not limited to these, but any suitable controllers may be used insofar as they are capable of controlling electric power generation by the first and second stators 22 and 32 and electric power supplied thereto. For example, the first and second controllers may be formed by electric circuits or the like having microcomputers installed thereon. Furthermore, although in the fourth to nineteenth embodiments, the electric power storage device in the invention as claimed in claim 9 is the battery 63, this is not limitative, but it is to be understood that the electric power storage device may be a capacitor, for example.

Further, although in the above-described embodiments, the prime mover according to the present invention is the engine 3 formed by a gasoline engine, it is to be understood that any other suitable engine, such as a diesel engine or an external combustion engine, may be used, for example. Furthermore, although in the above-described embodiments, the present invention is applied to the vehicle, by way of example, this is not limitative, but for example, it can be applied to a boat, an aircraft, and so forth. It is to be further understood that various changes and modifications may be made without departing from the spirit and scope thereof.

INDUSTRIAL APPLICABILITY

The power plant according to the present invention is very useful in attaining reduction of the size and manufacturing costs of the power plant, and further enhancing driving efficiency thereof.

The invention claimed is:

1. A power plant for driving driven parts, comprising:
a prime mover including an output shaft;
a first distributing and combining device that includes first, second and third elements and has a function of distributing energy input to said second element to said first and third elements and a function of combining energy input to said first and third elements and then outputting combined energy to said second element, said first to third elements rotating while maintaining a linear speed relationship therebetween, during distributing and combining the energy, wherein the second element is coupled between the first element and the third element;
a second distributing and combining device that includes fourth, fifth and sixth elements and has a function of distributing energy input to said fifth element to said fourth and sixth elements and a function of combining energy input to said fourth and sixth elements and then outputting combined energy to said fifth element, said fourth to sixth elements rotating while maintaining a linear speed relationship therebetween, during distributing and combining the energy, wherein the fifth element is coupled between the fourth element and the sixth element; and
a speed-changing device that is connected to said third and sixth elements such that said speed-changing device is capable of changing a relationship between a rotational speed of said third element and a rotational speed of said sixth element,
wherein said second and fourth elements are mechanically connected directly to said output shaft of said prime mover, and said first and fifth elements are mechanically connected directly to the driven parts.

2. A power plant as claimed in claim 1, wherein said speed-changing device is a mechanical stepless transmission.

3. A power plant as claimed in claim 1, wherein said speed-changing device comprises:
a first energy conversion device that is mechanically connected to said third element, for transmitting rotational power between said first energy conversion device and said third element, and converting a form of energy between the rotational power and another form of energy than the rotational power;
a second energy conversion device that is connected to said first energy conversion device, and is mechanically connected to said sixth element, for transmitting rotational power between said second energy conversion device and said sixth element, and converting a form of energy between the rotational power and the other form of energy; and
a controller that controls torque and a rotational speed of the rotational power when the other form of energy is converted into the rotational power by at least one of said first and second energy conversion devices.

4. A power plant as claimed in claim 3, further comprising an energy storing and releasing device that is configured to be capable of storing and releasing the other form of energy, and is connected to said first and second energy conversion devices.

5. A power plant as claimed in claim 3, wherein the other form of energy is electric energy.

6. A power plant as claimed in claim 1, wherein said first distributing and combining device is a first planetary gear unit, one of said first and third elements is first sun gear, the other thereof is a first ring gear, and said second element is a first carrier for rotatably supporting first planetary gears in mesh with said first sun gear and said first ring gear, and
wherein said second distributing and combining device is a second planetary gear unit, one of said fourth and sixth elements is a second sun gear, the other thereof is a second ring gear, and said fifth element is a second carrier for rotatably supporting second planetary gears in mesh with said second sun gear and said second ring gear.

7. A power plant as claimed in claim 6, wherein said first element is said first sun gear, said third element is said first ring gear, said fourth element is said second sun gear, and said sixth element is said second ring gear.

8. A power plant for driving driven parts, comprising:
a prime mover including a first output portion;
a first generator-motor that includes an immovable stator for generating a rotating magnetic field, a first rotor formed by magnets and disposed in a manner opposed to said stator, and a second rotor formed by soft magnetic material elements and disposed between said stator and said first rotor, said first generator-motor inputting and outputting energy between said stator, said first rotor and said second rotor, via magnetic circuits formed by generation of the rotating magnetic field, the rotating magnetic field and said first and second rotors rotating along with the input and output of the energy while holding such a linear speed relationship that a difference between a rotational speed of the rotating magnetic field and a rotational speed of said second rotor, and a difference between the rotational speed of said second rotor and a rotational speed of said first rotor become equal to each other;
a first controller electrically connected to said stator, for controlling electric power generated by said stator and electric power supplied to said stator;
a distributing and combining device that includes first, second and third elements mechanically connected to each other and has a function of distributing power input to said second element to said first and third elements and a function of combining power input to said first and third elements and then outputting combined power to said second element, said first to third elements rotating while maintaining a linear speed relationship therebetween, during distributing and combining the power, wherein the second element is coupled between the first element and the third element;
a second generator-motor that includes a second output portion, and has a function of converting supplied electric power into power and outputting the converted power to said second output portion and a function of converting the power input to said second output portion into electric power to thereby generate electric power; and
a second controller electrically connected to said second generator-motor, for controlling electric power generated by said second generator-motor and electric power supplied to said second generator-motor,
wherein one of a pair of said first rotor and said second element, and a pair of said second rotor and said first element are mechanically connected directly to said first output portion of said prime mover, while the other of the pair of said first rotor and said second element, and the pair of said second rotor and said first element are mechanically connected directly to the driven parts, said third element being mechanically connected to said second output portion of said second generator-motor, and said stator and said second generator-motor being electrically connected to each other via said first and second controllers.

9. A power plant as claimed in claim 8, further comprising an electric power storage device that is configured to be capable of being charged and discharged and is electrically connected to said stator and said second generator-motor via said first and second controllers, respectively.

10. A power plant as claimed in claim 8, further comprising a transmission disposed between the other of the pair of said first rotor and said second element and the pair of said second rotor and said first element, and the driven parts, for transmitting power from the other to the driven parts while changing the speed of the power.

11. A power plant as claimed in claim 8, further comprising a transmission disposed between said first output portion of said prime mover and the one of the pair of said first rotor and said second element and the pair of said second rotor and said first element, for transmitting power from said first output portion to the one while changing the speed of the power.

12. A power plant as claimed in claim 8, wherein said second rotor and said first element are mechanically connected to said first output portion of said prime mover, and said first rotor and said second element are mechanically connected to the driven parts,
the power plant further comprising a transmission disposed between said first rotor and the driven parts, for transmitting power from said first rotor to the driven parts while changing the speed of the power.

13. A power plant as claimed in claim 8, wherein said second rotor and said first element are mechanically connected to said first output portion of said prime mover, and said first rotor and said second element are mechanically connected to the driven parts,
the power plant further comprising a transmission disposed between said second output portion of said second generator-motor and said third element, for transmitting power from said second output portion to said third element while changing the speed of the power.

14. A power plant as claimed in claim 8, wherein said second rotor and said first element are mechanically connected to said first output portion of said prime mover, and said first rotor and said second element are mechanically connected to the driven parts,
the power plant further comprising a transmission disposed between said second element and the driven parts, for transmitting power from said second element to the driven parts while changing the speed of the power.

15. A power plant for driving driven parts, comprising: a prime mover including a first output portion;
a first generator-motor that includes an immovable stator for generating a rotating magnetic field, a first rotor formed by magnets and disposed in a manner opposed to said stator, and a second rotor formed by soft magnetic material elements and disposed between said stator and said first rotor, said first generator-motor inputting and outputting energy between said stator, said first rotor and said second rotor, via magnetic circuits formed by generation of the rotating magnetic field, the rotating magnetic field and said first and second rotors rotating along with the input and output of the energy while holding such a linear speed relationship that a difference between a rotational speed of the rotating magnetic field and a rotational speed of said second rotor, and a difference between the rotational speed of said second rotor and a rotational speed of said first rotor become equal to each other;
a first controller electrically connected to said stator, for controlling electric power generated by said stator and electric power supplied to said stator;
a distributing and combining device that includes first, second and third elements mechanically connected to each other and has a function of distributing power input to said second element to said first and third elements and a function of combining power input to said first and third elements and then outputting combined power to said second element, said first to third elements rotating while maintaining a linear speed relationship therebetween, during distributing and combining the power, wherein the second element is coupled between the first element and the third element;
a second generator-motor that includes a second output portion, and has a function of converting supplied electric power into power and outputting the converted power to said second output portion and a function of converting the power input to said second output portion into electric power to thereby generate electric power; and
a second controller electrically connected to said second generator-motor, for controlling electric power generated by said second generator-motor and electric power supplied to said second generator-motor,
wherein one of a pair of said first rotor and said second element, and a pair of said second rotor and said first element are mechanically connected directly to said first output portion of said prime mover, while the other of the pair of said first rotor and said second element, and the pair of said second rotor and said first element are mechanically connected directly to the driven parts, said third element being mechanically connected to said second output portion of said second generator-motor, and said stator and said second generator-motor being electrically connected to each other via said first and second controllers, wherein said second rotor and said first element are mechanically connected to said first output portion of said prime mover, and said first rotor and said second element are mechanically connected to the driven parts, the power plant further comprising:
- a planetary gear unit having a sun gear, a ring gear, and a carrier rotatably supporting planetary gears in mesh with said sun gear and said ring gear;
- a first clutch; and
- a second clutch, wherein one of said sun gear and said ring gear is mechanically connected to said second element, wherein said carrier is mechanically connected to said third element and is mechanically connected to said second output portion of said second generator-motor via said first clutch, and wherein the other of said sun gear and said ring gear is mechanically connected to said second output portion via said second clutch.

16. A power plant as claimed in claim 8, wherein said first rotor and said second element are mechanically connected to said first output portion of said prime mover, and said second rotor and said first element are mechanically connected to the driven parts, the power plant further comprising a transmission disposed between said second output portion of said second generator-motor and said third element, for changing the speed of power transmitted between said second output portion and said third element.

17. A power plant as claimed in claim 8, wherein said first rotor and said second element are mechanically connected to said first output portion of said prime mover, and said second rotor and said first element are mechanically connected to the driven parts, the power plant further comprising a transmission disposed between said first element and the driven parts, for transmitting power from said first element to the driven parts while changing the speed of the power.

18. A power plant for driving driven parts, comprising:
a prime mover including a first output portion;
a first generator-motor that includes an immovable stator for generating a rotating magnetic field, a first rotor formed by magnets and disposed in a manner opposed to said stator, and a second rotor formed by soft magnetic material elements and disposed between said stator and said first rotor, said first generator-motor inputting and outputting energy between said stator, said first rotor and said second rotor, via magnetic circuits formed by generation of the rotating magnetic field, the rotating magnetic field and said first and second rotors rotating along with the input and output of the energy while holding such a linear speed relationship that a difference between a rotational speed of the rotating magnetic field and a rotational speed of said second rotor, and a difference between the rotational speed of said second rotor and a rotational speed of said first rotor become equal to each other;
a first controller electrically connected to said stator, for controlling electric power generated by said stator and electric power supplied to said stator;
a distributing and combining device that includes first, second and third elements mechanically connected to each other and has a function of distributing power input to said second element to said first and third elements and a function of combining power input to said first and third elements and then outputting combined power to said second element, said first to third elements rotating while maintaining a linear speed relationship therebetween, during distributing and combining the power, wherein the second element is coupled between the first element and the third element;
a second generator-motor that includes a second output portion, and has a function of converting supplied electric power into power and outputting the converted power to said second output portion and a function of converting the power input to said second output portion into electric power to thereby generate electric power; and
a second controller electrically connected to said second generator-motor, for controlling electric power generated by said second generator-motor and electric power supplied to said second generator-motor, wherein one of a pair of said first rotor and said second element, and a pair of said second rotor and said first element are mechanically connected directly to said first output portion of said prime mover, while the other of the pair of said first rotor and said second element, and the pair of said second rotor and said first element are mechanically connected directly to the driven parts, said third element being mechanically connected to said second output portion of said second generator-motor, and said stator and said second generator-motor being electrically connected to each other via said first and second controllers, wherein said first rotor and said second element are mechanically connected to said first output portion of said prime mover, and said second rotor and said first element are mechanically connected to the driven parts, the power plant further comprising:
- a planetary gear unit having a sun gear, a ring gear, and a carrier rotatably supporting planetary gears in mesh with said sun gear and said ring gear;
- a first clutch; and
- a second clutch, wherein one of said sun gear and said ring gear is mechanically connected to said second element, wherein said carrier is mechanically connected to said third element and is mechanically connected to said second output portion of said second generator-motor via said first clutch, and wherein the other of said sun gear and said ring gear is mechanically connected to said second output portion via said second clutch.

19. A power plant as claimed in claim 8, wherein said first rotor and said second element are mechanically connected to said first output portion of said prime mover, and said second rotor and said first element are mechanically connected to the driven parts, the power plant further comprising a transmission disposed between said second rotor and said driven parts, for transmitting power from said second rotor to the driven parts while changing the speed of the power.

20. A power plant as claimed in claim 8, further comprising a brake mechanism for blocking reverse rotation of said first output portion of said prime mover.

* * * * *